United States Patent
Sasaki et al.

(10) Patent No.: US 8,045,844 B2
(45) Date of Patent: Oct. 25, 2011

(54) RECORDING MEDIUM, PLAYBACK APPARATUS, AND INTEGRATED CIRCUIT

(75) Inventors: Taiji Sasaki, Osaka (JP); Hiroshi Yahata, Osaka (JP); Tomoki Ogawa, Osaka (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/749,830

(22) Filed: Mar. 30, 2010

(65) Prior Publication Data

US 2010/0254679 A1   Oct. 7, 2010

Related U.S. Application Data

(60) Provisional application No. 61/165,067, filed on Mar. 31, 2009.

(51) Int. Cl.
*H04N 5/76* (2006.01)
*H04N 5/84* (2006.01)
*H04N 5/917* (2006.01)
*H04N 9/80* (2006.01)

(52) U.S. Cl. ........ 386/341; 386/239; 386/330; 386/332; 386/356

(58) Field of Classification Search .................. 386/341, 386/239, 330, 332, 356, E5.003
See application file for complete search history.

(56) References Cited

U.S. PATENT DOCUMENTS

| | | | |
|---|---|---|---|
| 5,923,869 A | 7/1999 | Kashiwagi et al. | |
| 6,393,574 B1 | 5/2002 | Kashiwagi et al. | |
| 6,470,460 B1 | 10/2002 | Kashiwagi et al. | |
| 6,484,266 B2 | 11/2002 | Kashiwagi et al. | |
| 6,502,198 B2 | 12/2002 | Kashiwagi et al. | |
| 6,502,199 B2 | 12/2002 | Kashiwagi et al. | |
| 6,502,200 B2 | 12/2002 | Kashiwagi et al. | |
| 6,516,138 B2 | 2/2003 | Kashiwagi et al. | |
| 6,516,139 B2 | 2/2003 | Kashiwagi et al. | |
| 6,519,414 B2 | 2/2003 | Kashiwagi et al. | |
| 6,526,226 B2 | 2/2003 | Kashiwagi et al. | |
| 6,546,195 B2 | 4/2003 | Kashiwagi et al. | |
| 6,573,819 B1 | 6/2003 | Oshima et al. | |
| 6,574,423 B1 | 6/2003 | Oshima et al. | |
| 6,907,190 B2 | 6/2005 | Kashiwagi et al. | |
| 6,925,250 B1 | 8/2005 | Oshima et al. | |

(Continued)

FOREIGN PATENT DOCUMENTS

JP   2000-270347   9/2000

(Continued)

*Primary Examiner* — Thai Tran
*Assistant Examiner* — Syed Hasan
(74) *Attorney, Agent, or Firm* — Wenderoth Lind & Ponack, L.L.P.

(57) ABSTRACT

A playback device includes a reading unit that reads extent blocks from a recording medium. A switching unit extracts a main-view stream and a sub-view stream from the extent blocks. Each stream is stored in a different read buffer. A decoding unit reads and decodes each stream from a corresponding read buffer. A time (t) required for the decoding unit to decode all data blocks in one extent block is greater than or equal to the sum $(t_1+t_2+t_3)$ of a time $(t_1)$ required for the reading unit to read the data blocks except for the top data block in the extent block, a time $(t_2)$ required for the reading unit to start to read the top of a next extent block from the time of finishing reading the tail of the extent block, and a time $(t_3)$ required for the reading unit to read the top data block in the next extent block.

5 Claims, 85 Drawing Sheets

U.S. PATENT DOCUMENTS

| | | |
|---|---|---|
| 6,954,584 B2 | 10/2005 | Kashiwagi et al. |
| 7,194,194 B2 | 3/2007 | Kashiwagi et al. |
| 7,317,868 B2 | 1/2008 | Oshima et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1 | 3/2003 | Oshima et al. |
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2008/0056686 A1 | 3/2008 | Oshima et al. |
| 2008/0063385 A1 | 3/2008 | Oshima et al. |
| 2008/0063386 A1* | 3/2008 | Oshima et al. ............. 386/125 |
| 2008/0101767 A1 | 5/2008 | Oshima et al. |
| 2008/0292287 A1 | 11/2008 | Oshima et al. |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0111503 A1 | 5/2010 | Oshima et al. |
| 2010/0119213 A1 | 5/2010 | Oshima et al. |

FOREIGN PATENT DOCUMENTS

| | | |
|---|---|---|
| JP | 3935507 | 3/2007 |
| JP | 2007-166651 | 6/2007 |
| WO | 2010/032404 | 3/2010 |

* cited by examiner

FIG. 3A

| PID=0x1011 | Primary video stream |
|---|---|
| 0x1100 | Primary audio stream |
| 0x1101 | Primary audio stream |
| 0x1200 | PG stream |
| 0x1201 | PG stream |
| 0x1400 | IG stream |
| 0x1A00 | Secondary audio stream |
| 0x1B00 | Secondary video stream |

FIG. 3B

| PID=0x1012 | Primary video stream |
|---|---|
| 0x1220 | Left-view PG stream |
| 0x1221 | Left-view PG stream |
| 0x1240 | Right-view PG stream |
| 0x1241 | Right-view PG stream |
| 0x1420 | Left-view IG stream |
| 0x1440 | Right-view IG stream |
| 0x1B20 | Secondary video stream |

FIG. 3C

| PID=0x1013 | Primary video stream |
|---|---|
| 0x1260 | Depth map PG stream |
| 0x1261 | Depth map PG stream |
| 0x1460 | Depth map IG stream |
| 0x1B40 | Secondary video stream |

FIG. 19

| $S_{JUMP}$ (Sector) | 0 | 1 – 10000 | 10001 – 20000 | 20001 – 40000 | 40000 – 1/10 stroke | Greater than or equal to 1/10 stroke |
|---|---|---|---|---|---|---|
| $T_{JUMP\_MAX}$ (m seconds) | $50 = T_{JUMP0}$ | 250 | 300 | 350 | 700 | 1400 |

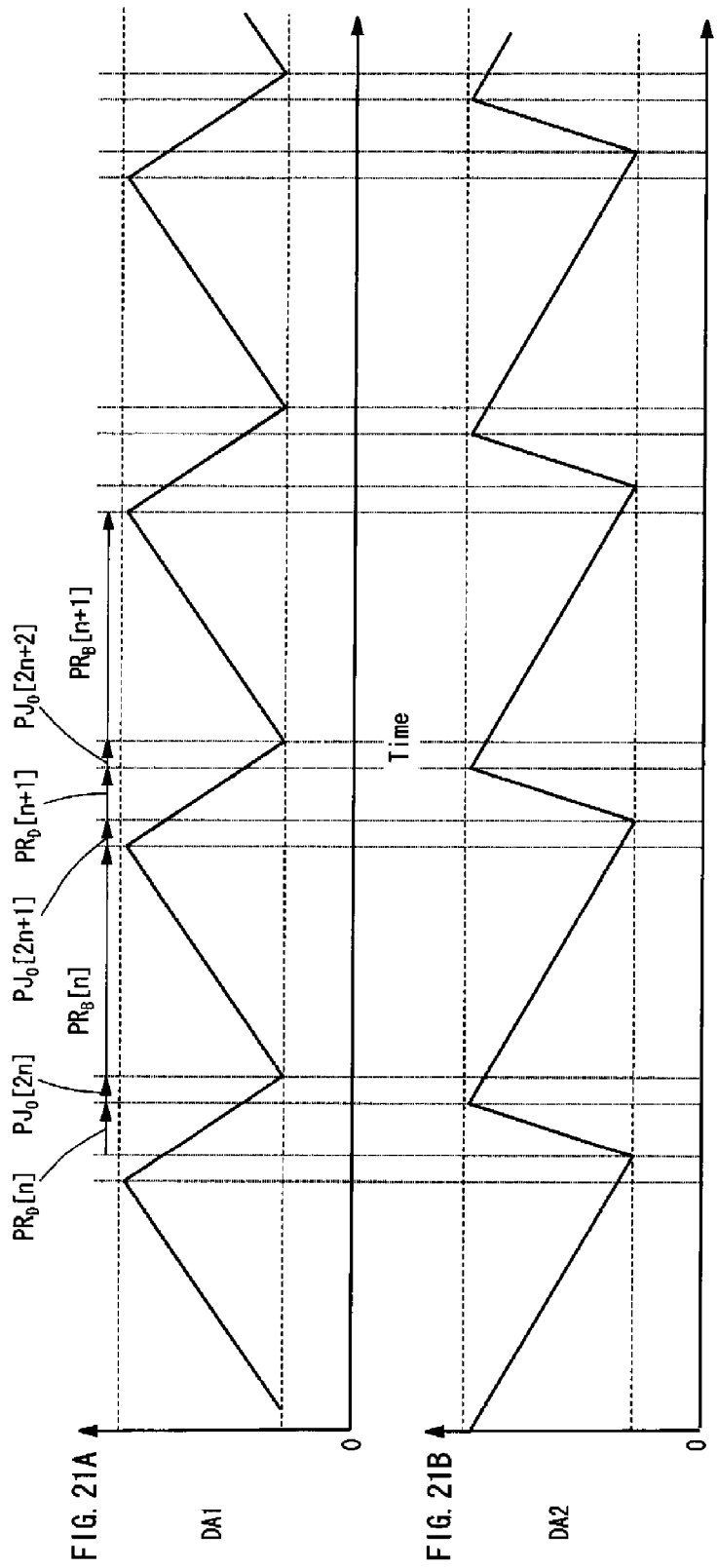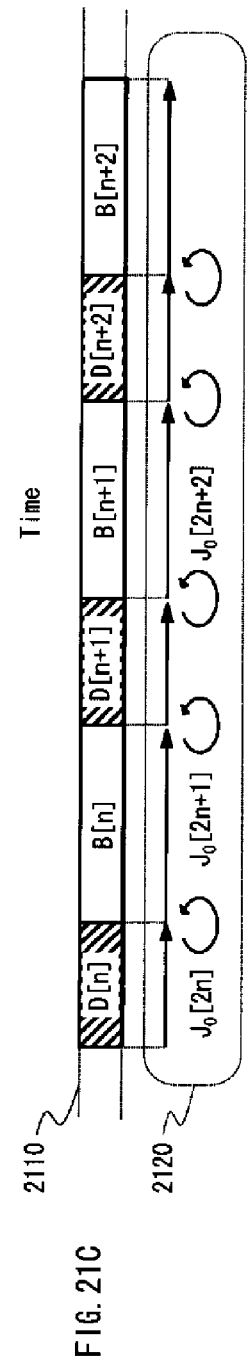

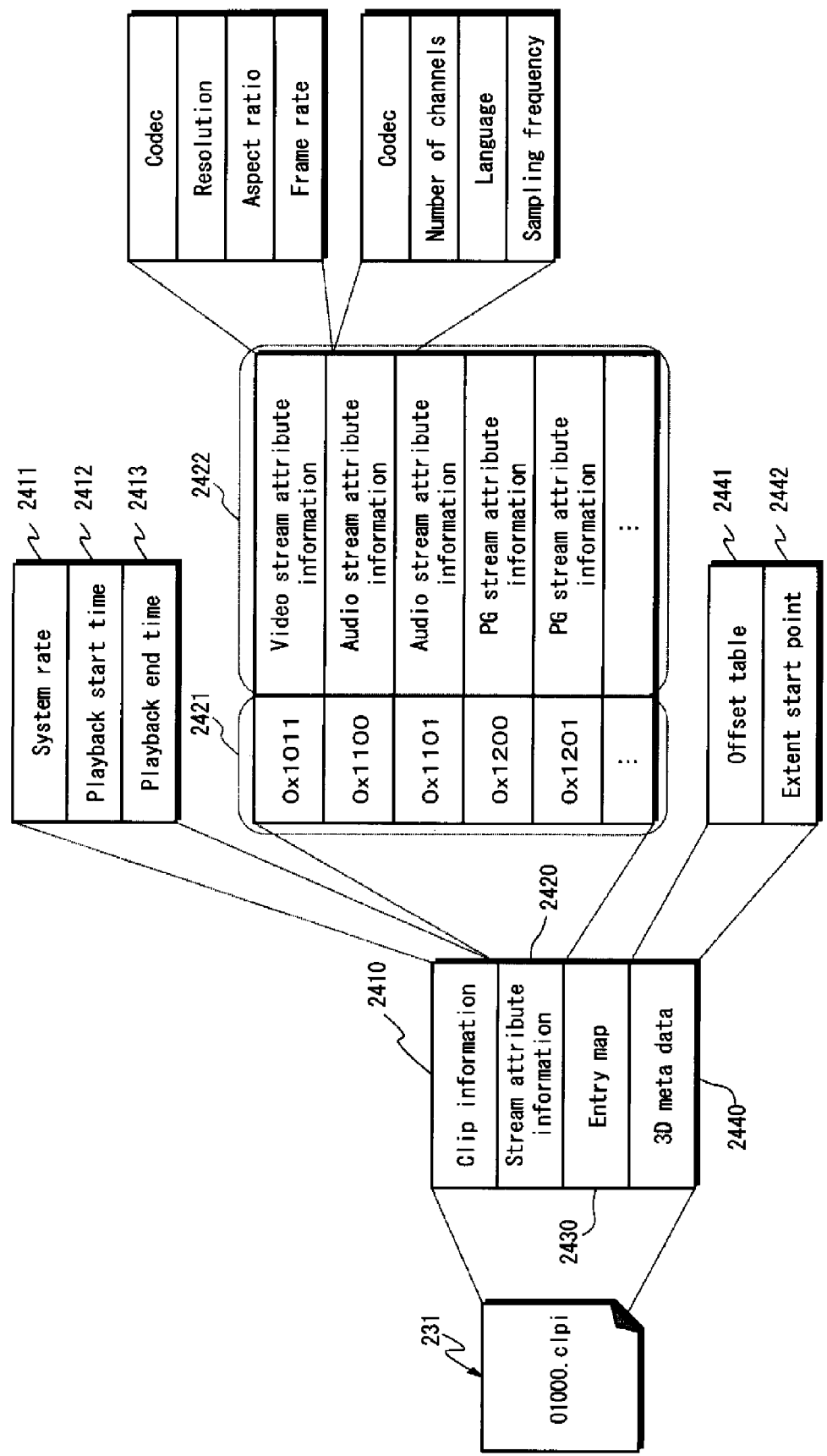

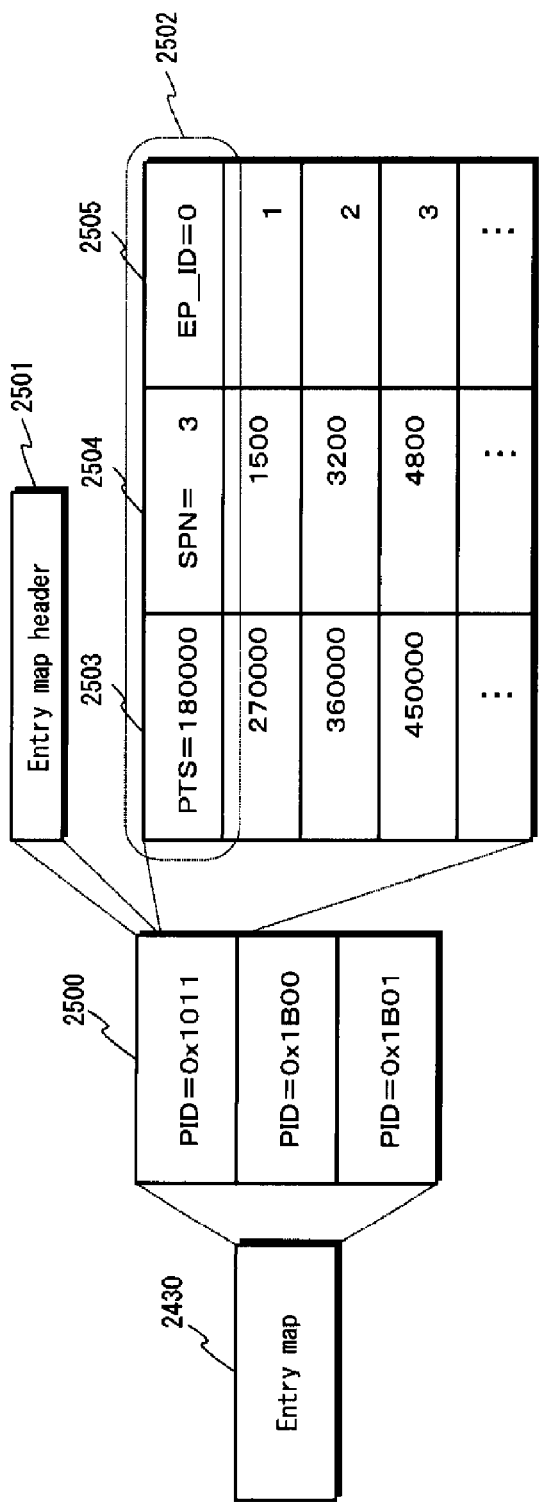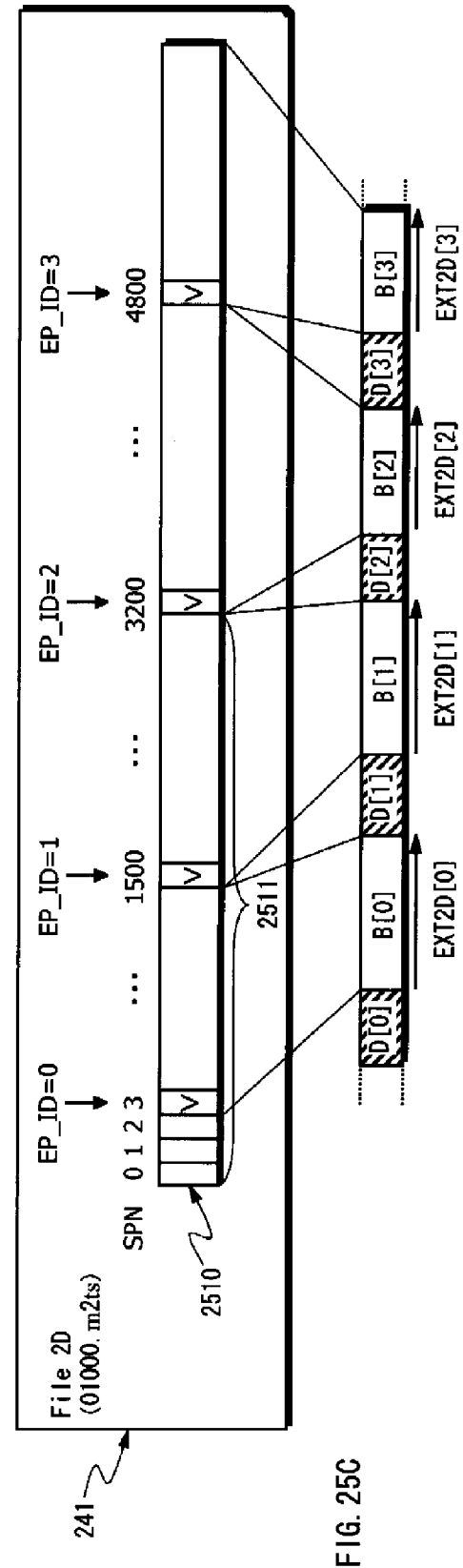
FIG. 25A
FIG. 25B
FIG. 25C

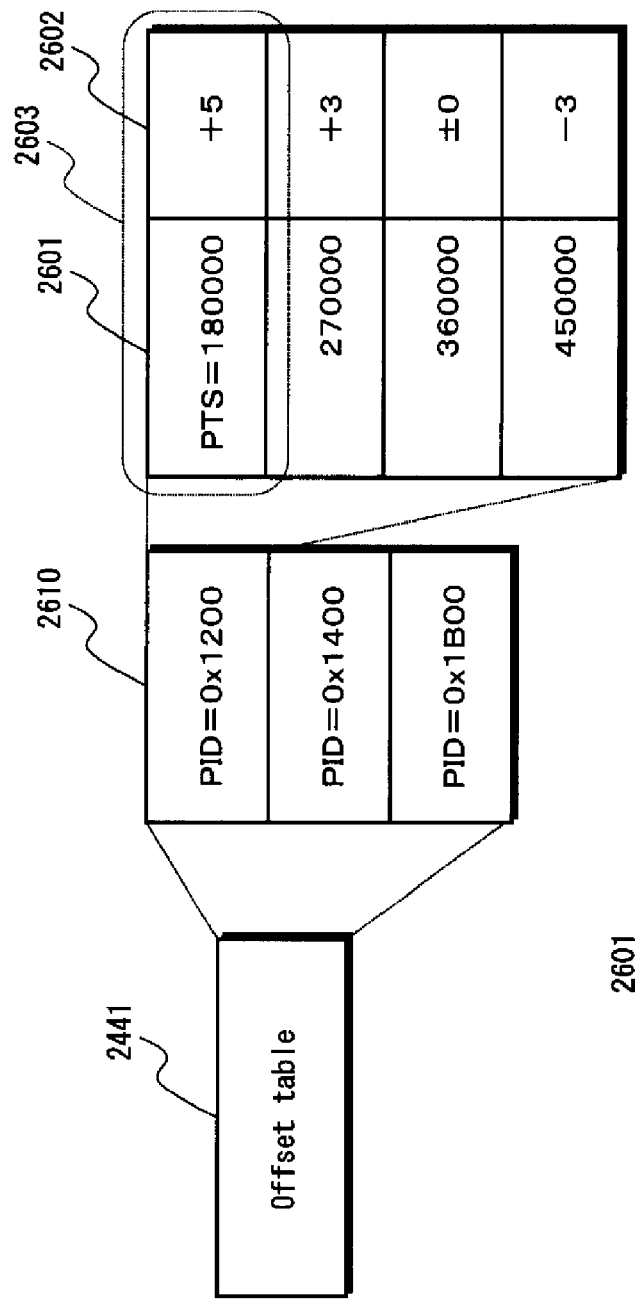
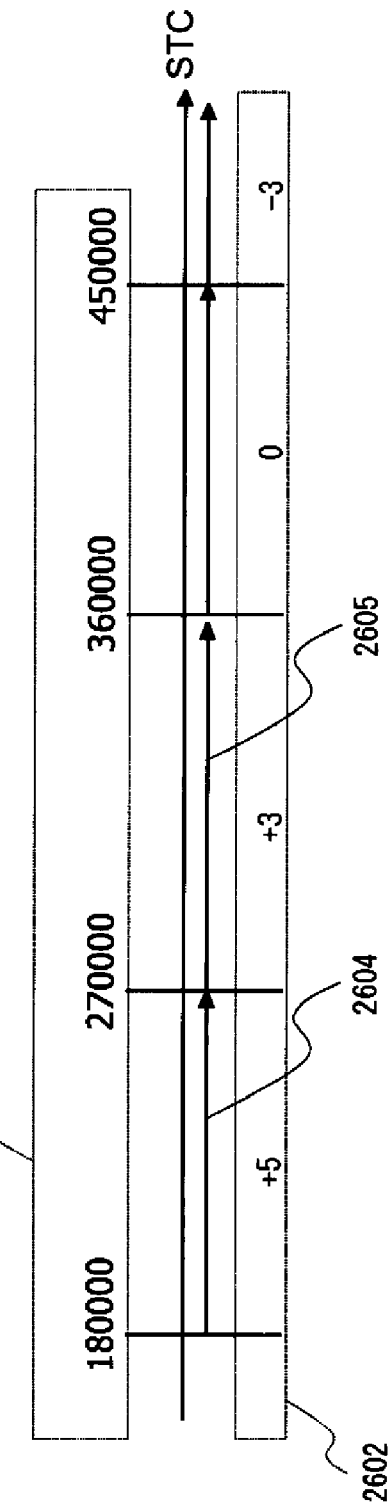
FIG. 26A
FIG. 26B

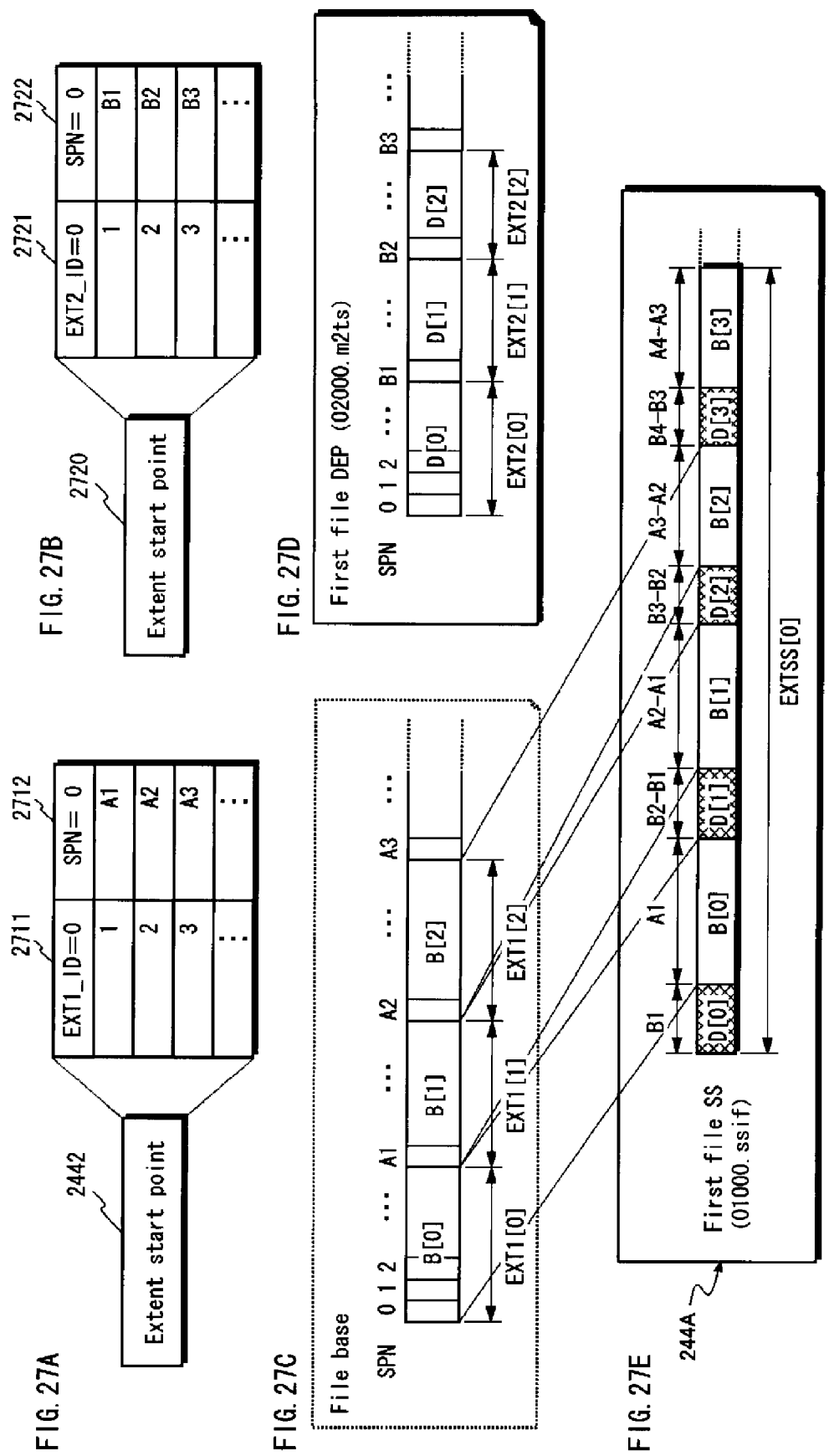

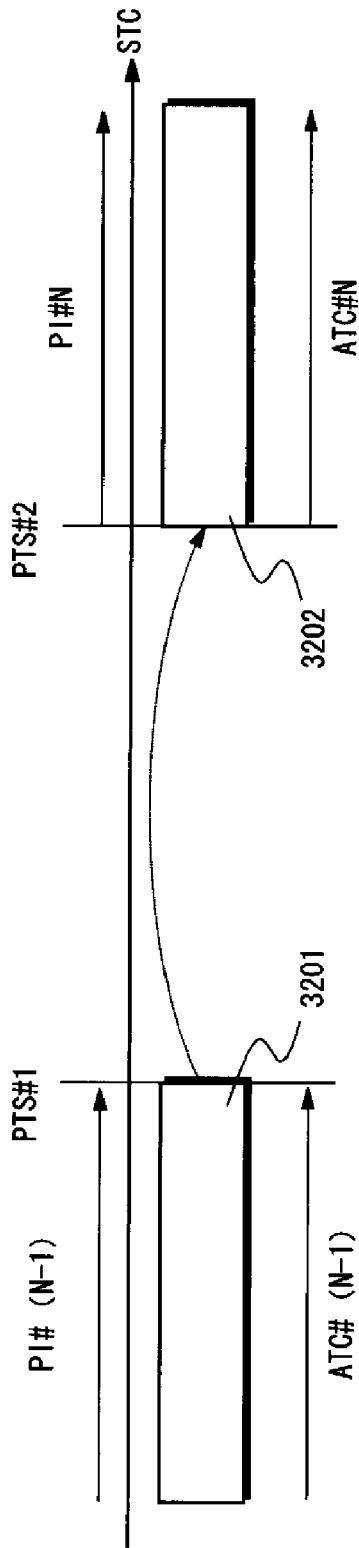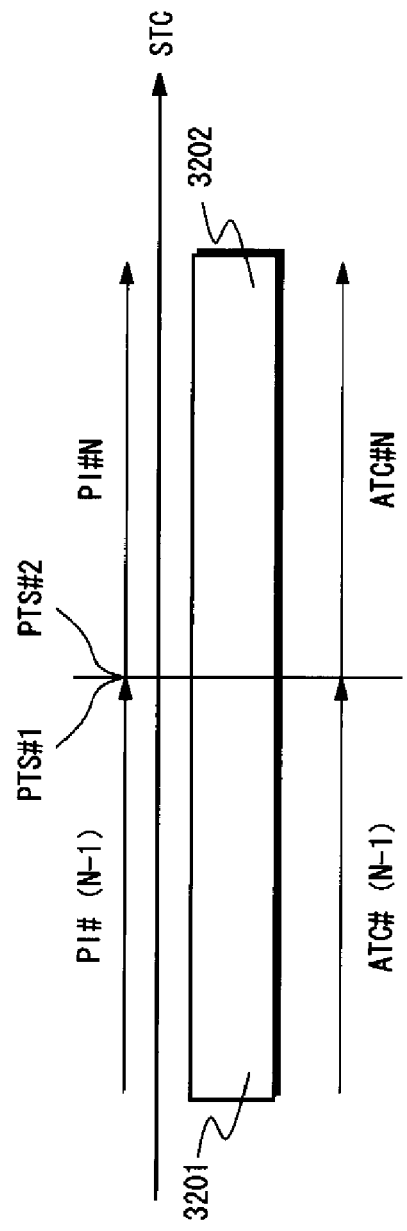

FIG. 41

| 4101 | 4102 |
|---|---|
| 0 | Language Code |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 4101 | 4102 |
|---|---|
| 11 | Player audio mixing mode for Karaoke |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 4101 | 4102 |
|---|---|
| 22 | Secondary Audio Stream number |
| 23 | Player status |
| 24 | reserved |
| 25 | reserved |
| 26 | reserved |
| 27 | reserved |
| 28 | reserved |
| 29 | reserved |
| 30 | reserved |
| 31 | reserved |
| 32 | reserved |

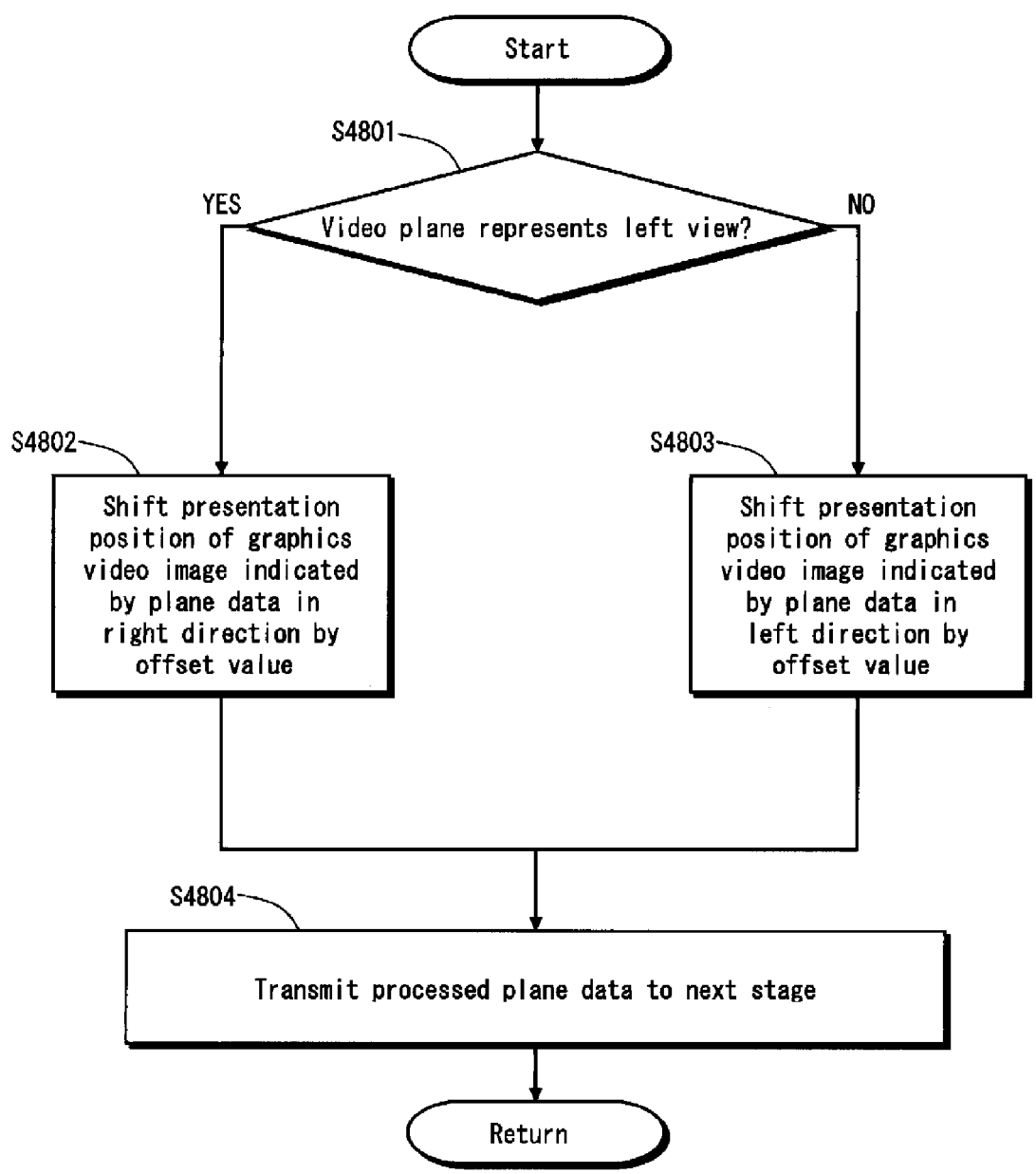

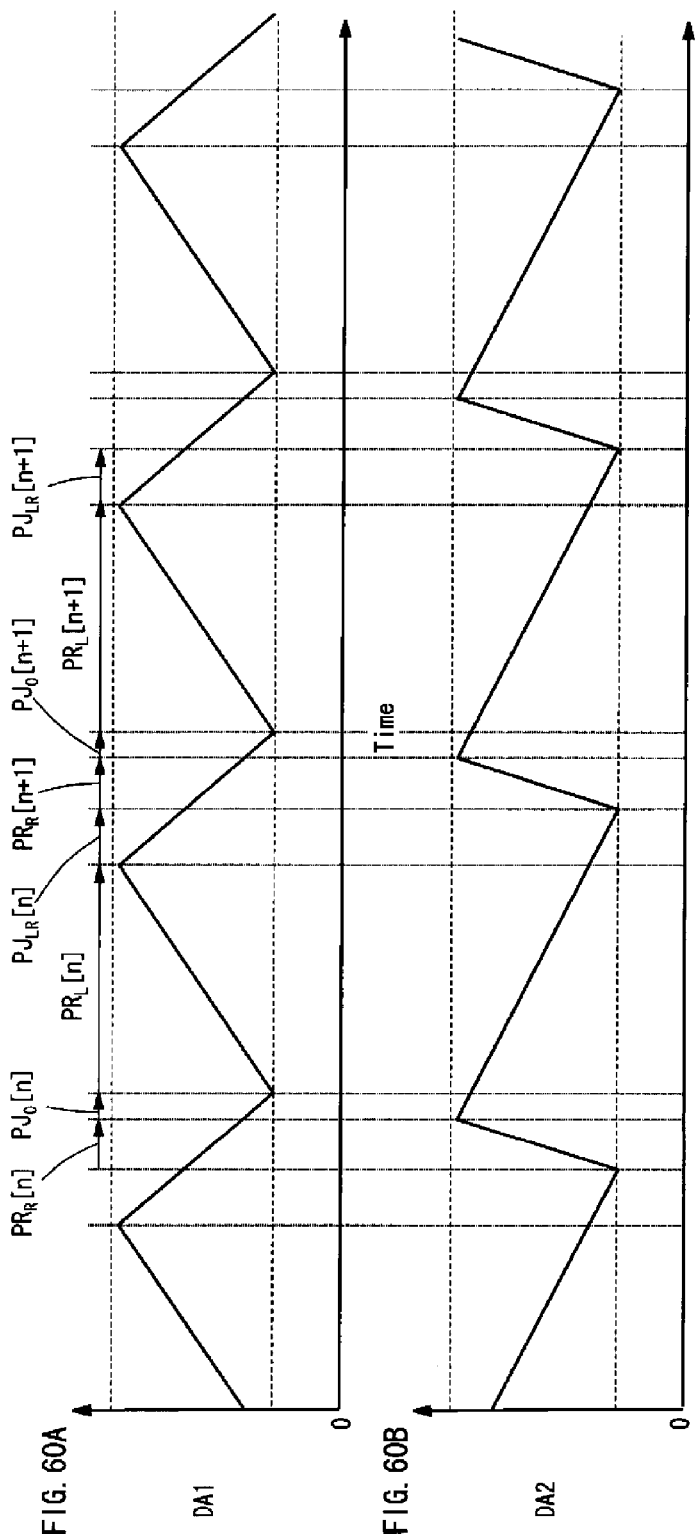
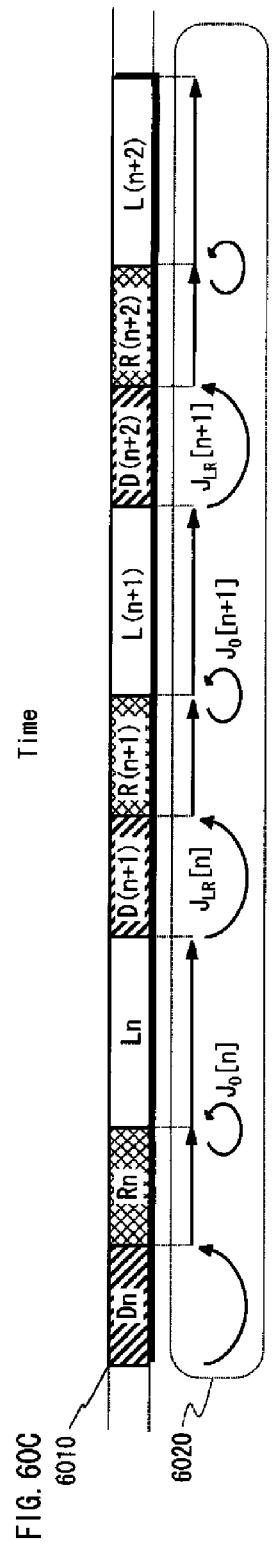
FIG. 60A
FIG. 60B
FIG. 60C

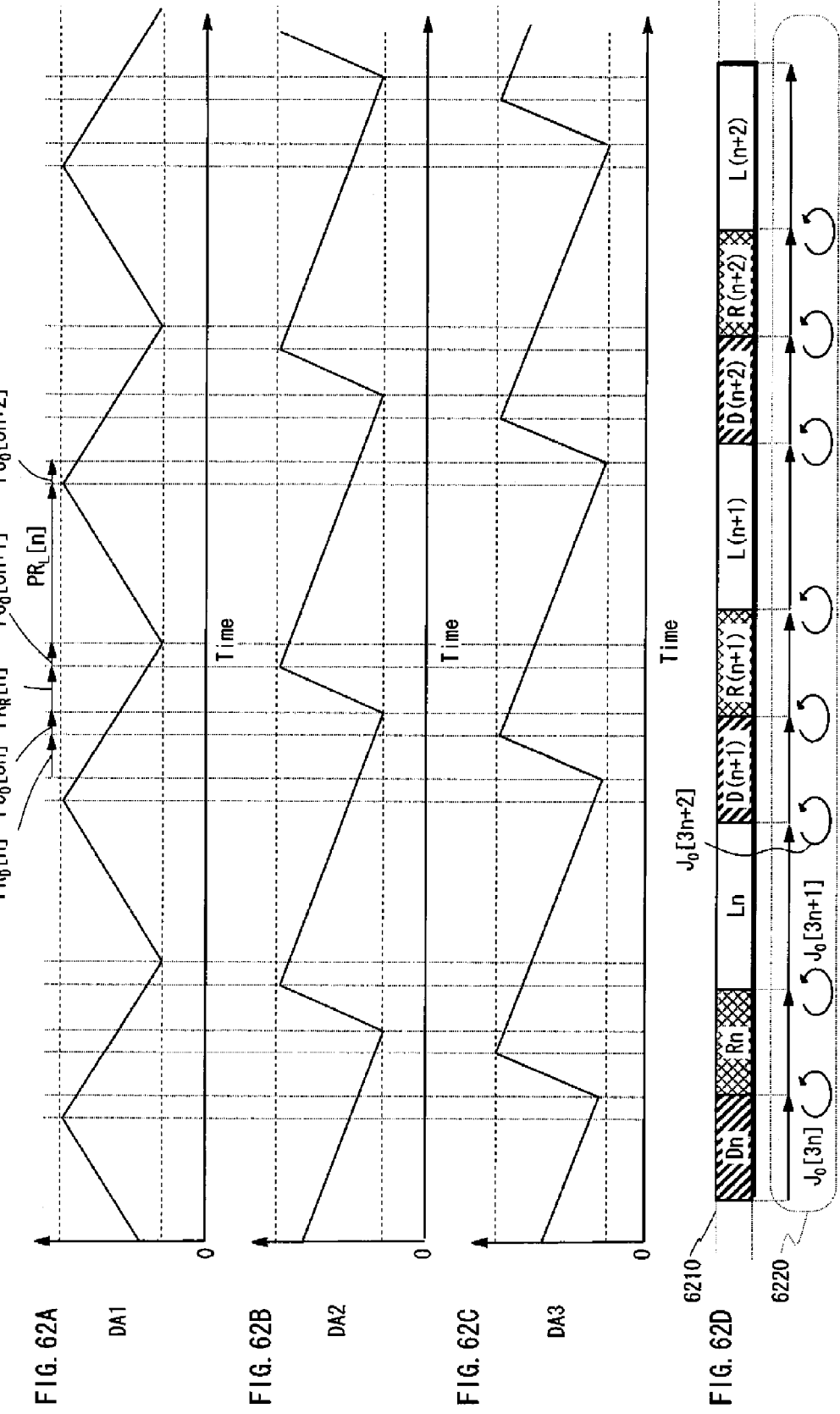

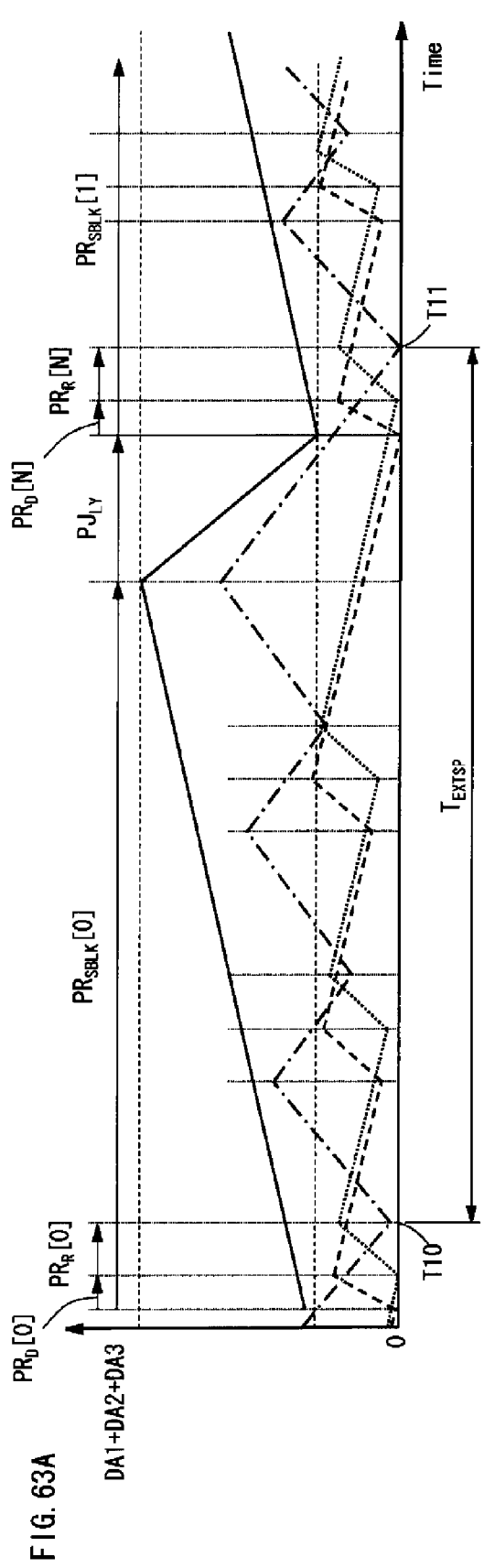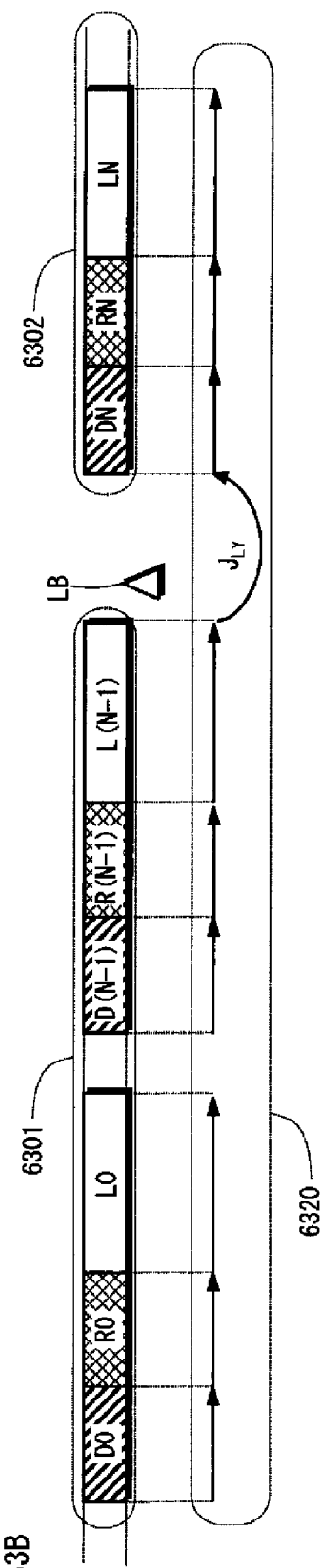
FIG. 63A
FIG. 63B

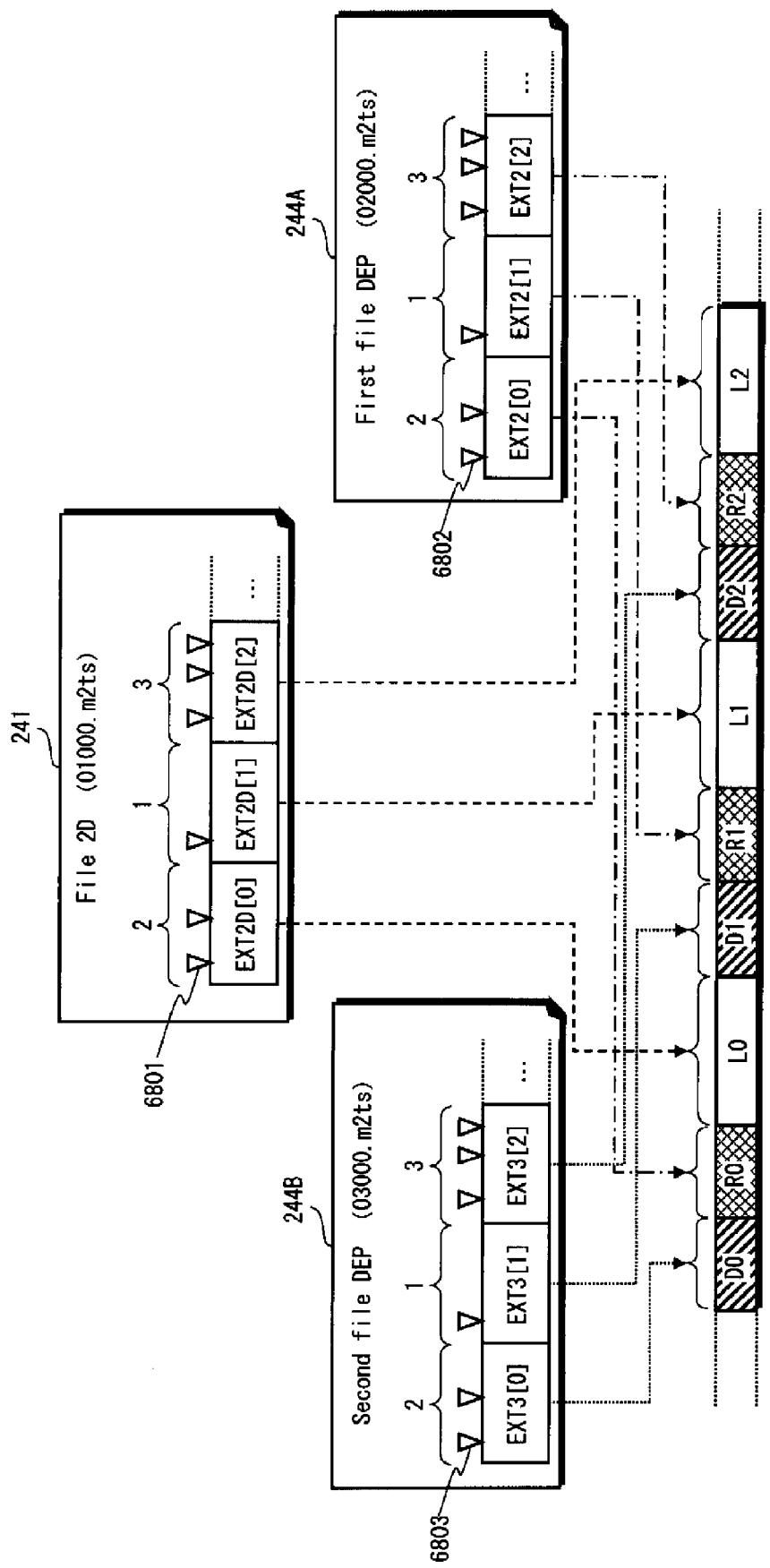

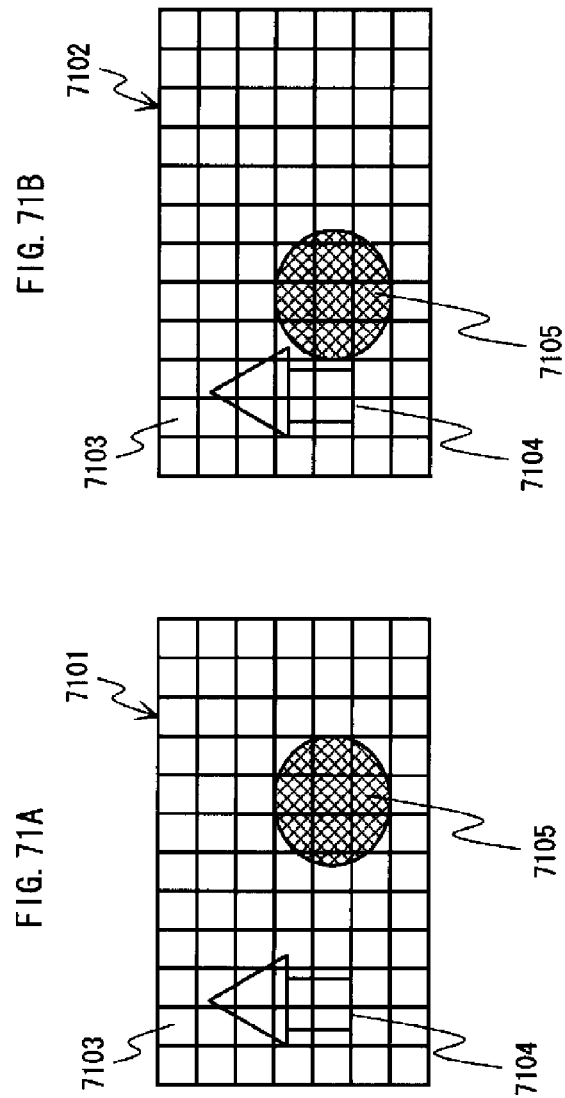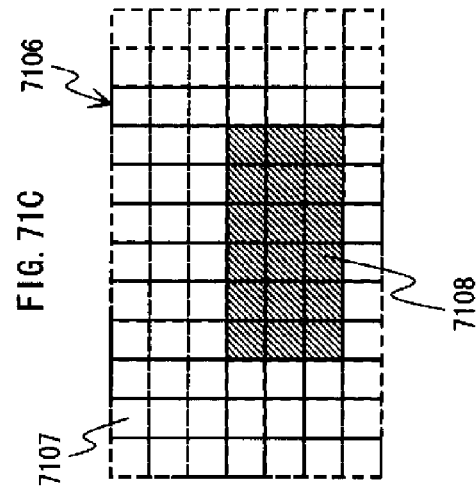

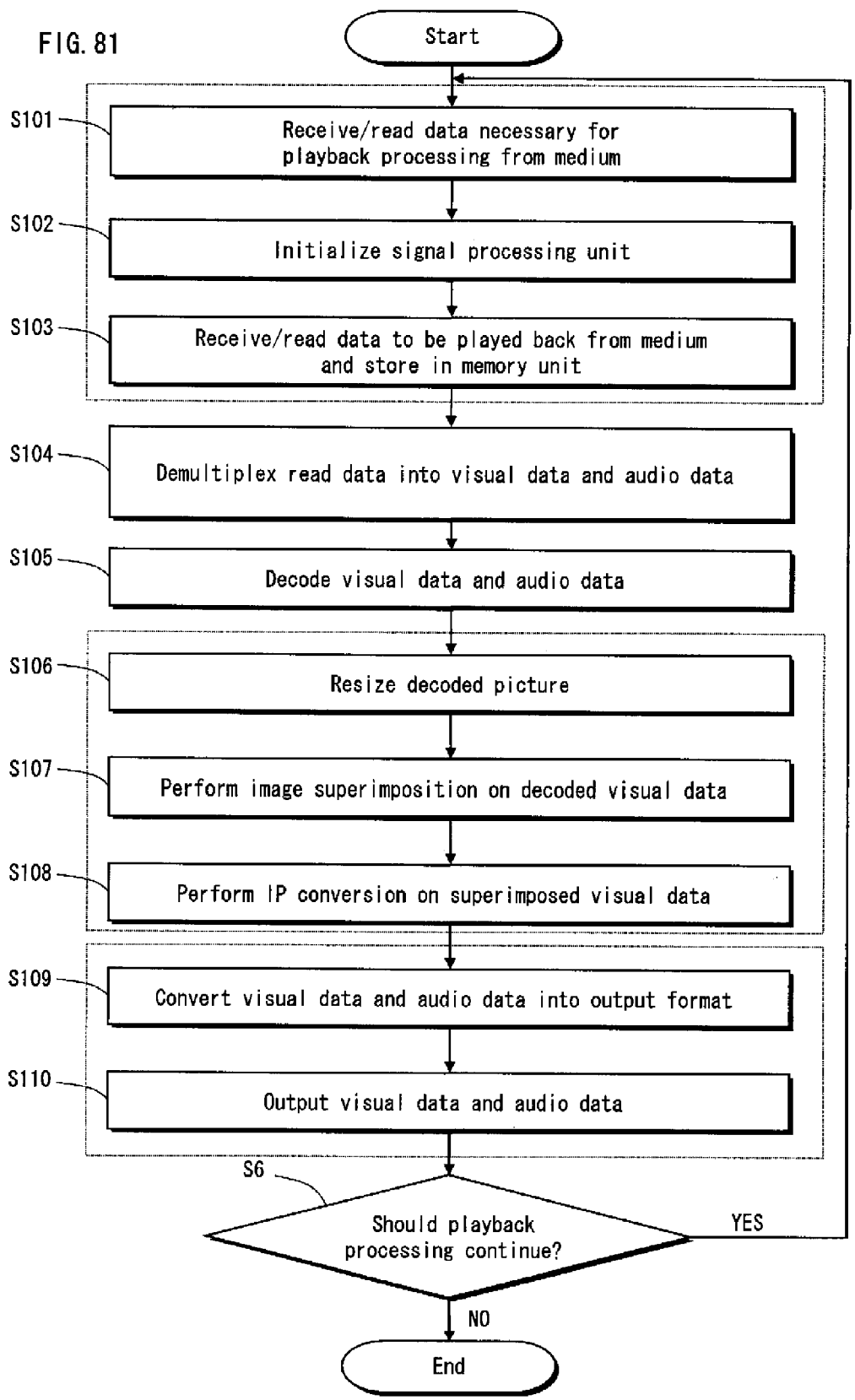

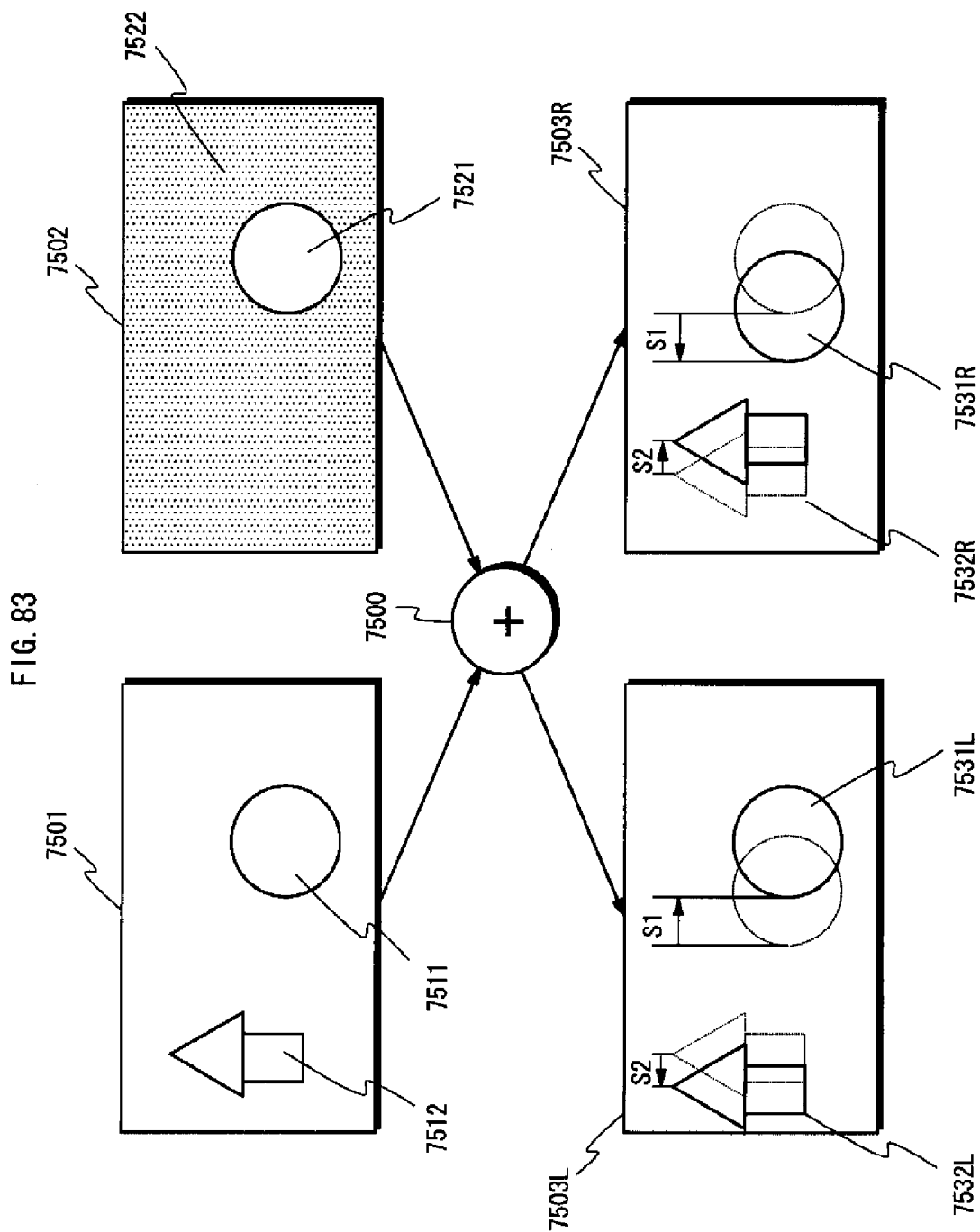

RECORDING MEDIUM, PLAYBACK APPARATUS, AND INTEGRATED CIRCUIT

This application claims benefit to the provisional U.S. Application 61/165,067, filed Mar. 31, 2009.

BACKGROUND OF THE INVENTION

1. Field of the Invention

The present invention relates to a technology for stereoscopic, i.e. three-dimensional (3D), video playback and especially to the allocation of a video stream on a recording medium.

2. Description of the Related Art

In recent years, general interest in 3D video has been increasing. For example, amusement park attractions that incorporate 3D video images are popular. Furthermore, throughout the country, the number of movie theaters showing 3D movies is increasing. Along with this increased interest in 3D video, the development of technology that enables playback of 3D video images in the home has also been progressing. There is demand for this technology to store 3D video content on a portable recording medium, such as an optical disc, while maintaining the 3D video content at high image quality. Furthermore, there is demand for the recording medium to be compatible with a two-dimensional (2D) playback device. That is, it is preferable for a 2D playback device to be able to play back 2D video images and a 3D playback device to be able to play back 3D video images from the same 3D video content recorded to a conventional playback device that can only play back monoscopic video images, i.e. 2D video images, whereas a "3D playback device" refers to a playback device that can play back 3D video images. Note that in the present description, a 3D playback device is assumed to be able to also play back conventional 2D video images.

FIG. 84 is a schematic diagram illustrating the technology for ensuring the compatibility of an optical disc storing 3D video content with 2D playback devices (see Patent Literature 1). An optical disc 7601 stores two types of video stream files. One is a 2D/left-view video stream file, and the other is a right-view video stream file. A "2D/left-view video stream" represents a 2D video image to be shown to the left eye of a viewer during 3D playback, i.e. a "left-view". During 2D playback, this stream constitutes the 2D video image. A "right-view video stream" represents a 2D video image to be shown to the right eye of a viewer during 3D playback, i.e. a "right-view". The left and right video streams have the same frame rate but different presentation times shifted from each other by half a frame period. For example, when the frame rate of each video stream is 24 frames per second, the frames of the 2/D left-view video stream and the right-view video stream are alternately displayed every ⅟48 seconds.

As shown in FIG. 84, the left-view and right-view video streams are divided into a plurality of extents 7602A-C and 7603A-C respectively on the optical disc 6701. Each extent contains at least one group of pictures (GOP), GOPs being read together from the optical disc. Hereinafter, the extents belonging to the 2D/left-view video stream are referred to as "2D/left-view extents", and the extents belonging to the right-view video stream are referred to as "right-view extents". The 2D/left-view extents 7602A-C and the right-view extents 7603A-C are alternately arranged on a track 7601A of the optical disc 7601. Each two contiguous extents 7602A-7603A, 7602B-7603B, and 7602C-7603C have the same length of playback time. Such an arrangement of extents is referred to as an interleaved arrangement. A group of extents recorded in an interleaved arrangement on a recording medium is used both in 3D video playback and 2D video image playback, as described below.

From among the extents recorded on the optical disc 7601, a 2D playback device 7604 causes an optical disc drive 7604A to read only the 2D/left-view extents 7602A-C sequentially from the start, skipping the reading of right-view extents 7603A-C. Furthermore, an image decoder 7604B sequentially decodes the extents read by the optical disc drive 7604A into a video frame 7606L. In this way, a display device 7607 only displays left-views, and viewers can watch normal 2D video images.

A 3D playback device 7605 causes an optical disc drive 7605A to alternately read 2D/left-view extents and right-view extents from the optical disc 7601. When expressed as codes, the extents are read in the order 7602A, 7603A, 7602B, 7603B, 7602C, and 7603C. Furthermore, from among the read extents, those belonging to the 2D/left-view video stream are supplied to a left video decoder 7605L, whereas those belonging to the right-view video stream are supplied to a right-video decoder 7605R. The video decoders 7605L and 7605R alternately decode each video stream into video frames 7606L and 7606R, respectively. As a result, left-views and right-views are alternately displayed on a display device 7608. In synchronization with the switching of the views by the display device 7608, shutter glasses 7609 cause the left and right lenses to become opaque alternately. Therefore, a viewer wearing the shutter glasses 7609 sees the views displayed by the display device 7608 as 3D video images.

When 3D video content is stored on any recording medium, not only on an optical disc, the above-described interleaved arrangement of extents is used. In this way, the recording medium can be used both for playback of 2D video images and 3D video images.

REFERENCES

Patent Documents

[Patent Literature 1] Japanese Patent No. 3935507

As shown in FIG. 84, when 2D video images are played back from extent groups recorded in an interleaved arrangement, the optical disc drive 7605A performs a "jump" across the recording area of each right-view extent 7603A-C to skip reading data from the recording area. Since no data is supplied from the optical disc drive 7604A to a buffer included in the 2D playback device 7604 during a jump period, data accumulated in the buffer decreases as the image decoder 7604B processes the data. Accordingly, seamless playback of 2D video images requires that each of the 2D/left-view extents 7602A-C has a data amount, that is, a size enough to prevent occurrence of underflow in the buffer during the jump period.

When 3D video images are played back from the same extent group, the right-view extents 7603A-C are not read while the 2D/left-view extents 7602A-C are being read. Data of the right-view extents 7603A-C accumulated in a buffer included in the 3D playback device 7605 decreases as the right-video decoder 7605R processes the data. Reversely, while the right-view extents 7603A-C are being read, data of the 2D/left-view extents 7602 A-C accumulated in the buffer decreases as the left-video decoder 7605L processes the data. Accordingly, seamless playback of 3D video images requires that each of the left-view extents 7602A-C and the right-view extents 7603A-C has a size enough to prevent data of one of left view and right view extents accumulated in the buffer from being exhausted while data of the other view extent is being read.

Furthermore, in order to efficiently utilize data areas on the recording medium, it is sometimes preferable to divide a recording area for a sequence of stream data into two or more recording areas and record other data between the divided two or more recording areas. In addition, some optical discs include a plurality of recording layers such as so-called double layer discs. There is a case that a sequence of stream data is recorded over two layers in such optical discs. In this case, when video images are played back from the sequence of stream data, the optical disc drive performs a jump to skip reading other data or switch between the recording layers. In order to seamlessly play back video images despite the jump, each extent needs to have a size enough to prevent occurrence of underflow in the buffer or prevent exhaustion of either data of left-view and right-view extents.

The present invention aims to provide a recording medium having recorded thereon stream data that is arranged such that underflow does not occur in a buffer included in a playback device during playback of either of monoscopic video images and stereoscopic video images in the playback device, and also aims to provide a playback device capable of seamlessly playing back either of monoscopic video images and stereoscopic video images.

SUMMARY OF THE INVENTION

The recording medium according to the embodiments of the present invention has recorded thereon a main-view stream and a sub-view stream. The main-view stream is used for monoscopic video playback. The sub-view stream is used for stereoscopic video playback in combination with the main-view stream. On the recording medium, the main-view stream is divided into a plurality of main-view data blocks, and the sub-view stream is divided into a plurality of sub-view data blocks. These data blocks include a plurality of extent blocks. Each of the plurality of extent blocks is data composed of the main-view data blocks and the sub-view data blocks that are successively recorded in an interleaved arrangement, and is referred to during stereoscopic video playback as a single extent. When a jump occurs from one extent block to a next block during stereoscopic video playback, each of the extent blocks has a lower size limit such that underflow does not occur in a buffer included in a playback device from the time when the jump starts until the time when the top data block in the next extent block is read.

The playback device according to the embodiments of the present invention includes a reading unit, a switching unit, a first read buffer, a second read buffer, and a decoding unit. The reading unit reads the extent blocks from the above recording medium according to the embodiments of the present invention. The switching unit extracts the main-view stream and the sub-view stream from the extent blocks. The first read buffer stores therein the main-view stream extracted by the switching unit. The second read buffer stores therein the sub-view stream extracted by the switching unit. The decoding unit reads and decodes the main-view stream and the sub-view stream from the first read buffer and the second read buffer, respectively. A time (t) required for the decoding unit to decode all data blocks in one extent block is greater than or equal to the sum $(t_1+t_2+t_3)$ of a time $(t_1)$ required for the reading unit to read the data blocks except for the top data block in the extent block, a time $(t_2)$ required for the reading unit to start to read the top of a next extent block from the time of finishing reading the tail of the extent block, and a time $(t_3)$ required for the reading unit to read the top data block in the next extent block.

According to the above recording medium relating to the embodiments of the present invention, a lower size limit for each extent block is definite. This makes it easy to appropriately design the size of the extent block. As a result, it is possible to easily record stream data on the recording medium such that underflow does not occur in the buffer included in the playback device during playback of either of monoscopic stereoscopic video images from the recording medium.

According to the playback device relating to the embodiments of the present invention, a time required for the decoding unit to decode all data blocks in one extent block is greater than or equal to a time required for the reading unit to read the top data block in a next extent block from the time of starting to read the $2^{nd}$ data block in the extent block. Accordingly, when the playback device continuously plays back video images from the two extent blocks, underflow does not occur in the buffer included in the playback device. This enables seamless playback of video images from these extent blocks.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 3A, 3B, and 3C are lists of elementary streams multiplexed with a main TS, a first sub-TS, and a second sub-TS respectively on the BD-ROM disc 101 shown in FIG. 1;

FIG. 19 shows an exemplary table of correspondences between a jump distance $S_{JUMP}$ and a maximum jump time $T_{JUMP\_MAX}$ pertaining to the BD-ROM disc;

FIGS. 21A and 21B are graphs showing the changes in data amounts DA1 and DA2 accumulated in read buffers 2021 and 2022 shown in FIG. 20, when 3D images are seamlessly played back from a single extent block, and FIG. 21C is a schematic diagram showing the relationship between an extent block 2110 and a playback path 2120 in 3D playback mode;

FIG. 24 is a schematic diagram showing a data structure of a first clip information file (01000.clpi) shown in FIG. 2, that is, a 2D clip information file 231;

FIG. 25A is a schematic diagram showing a data structure of an entry map 2430 shown in FIG. 24, FIG. 25B is a schematic diagram showing a portion of the source packets 2510 belonging to a file 2D 241 shown in FIG. 2 that is correlated to each EP_ID 2505 by the entry map 2430 shown in FIG. 25A, and FIG. 25C is a schematic diagram showing data blocks D[n] and B[n] (n=0, 1, 2, 3, ...) corresponding to the source packets 2510, on the BD-ROM disc 101;

FIG. 26A is a schematic diagram showing a data structure of the offset table 2441 shown in FIG. 24, and FIG. 26B is a schematic diagram showing a valid section of the offset entry shown in FIG. 26A;

FIG. 27A is a schematic diagram showing a data structure of an extent start point 2442 shown in FIG. 24, and FIG. 27B is a schematic diagram showing the data structure of an extent start point 2720 included in the second clip information file (02000.clpi) shown in FIG. 2, that is, included in the right view clip information file 232, FIG. 27C is a schematic diagram representing base-view data blocks B[0], B[1], B[2], . extracted by the playback device 102 in L/R mode from a first file SS 244A, FIG. 27D is a schematic diagram showing the relationship between the right-view extents EXT2[0], EXT2[1], ... belonging to the first file DEP (02000.m2ts) 242, and the extent start points 2720 shown by the SPN 2722, and FIG. 27E is a schematic diagram showing the relationship between the extent SS EXTSS[0] belonging to the first file SS 244A and the extent blocks on the BD-ROM disc 101;

FIGS. 32A and 32B are schematic diagrams showing the relationship between two playback sections 3201 and 3202 to be connected when a connection condition 3104, shown in FIG. 31, is "5" or "6", respectively;

FIG. 41 is a table of SPRMs stored in a player. variable storage unit 4036 shown in FIG. 40;

FIG. 48 is a flowchart of cropping processing by each of the cropping processing units 4731-4734 shown in FIG. 47;

FIGS. 60A and 60B are graphs showing changes in data amounts DA1 and DA2 accumulated in the read buffers 2021 and 2022 when the playback device seamlessly plays back 3D images from super extent block 6010 in L/R mode, and FIG. 60C is a schematic diagram showing the relationship between super extent blocks 6010 and the playback path 6020 in L/R mode;

FIGS. 62A, 62B, and 62C are graphs showing changes in data amounts DA1, DA2, and DA3 accumulated in the read buffers 6121, 6122, and 6123 shown in FIG. 61, when 3D images are seamlessly played back from a single super extent block, and FIG. 62D is a schematic diagram showing the relationship between the super extent blocks 6210 and the playback path 6220 in super mode;

FIG. 63A is a graph showing changes in data amounts DA1, DA2, and DA3 accumulated in the read buffers 6121, 6122, and 6133 shown in FIG. 61, and changes in the sum DA1+DA2+DA3 thereof, when 3D images are seamlessly played back continuously from two different super extent blocks 6301 and 6302, and FIG. 63B is a schematic diagram showing the relationship between these two super extent blocks 6301 and 6302, and the playback path 6320 in super mode;

FIG. 68 is a schematic diagram showing a relationship between entry points and data blocks when a pair of a base-view data block and a dependent-view data block that are contiguous in the super extent blocks include the same number of entry points;

FIGS. 71A and 71B are schematic diagrams showing a left-video image picture and a right-video image picture used to display one scene of a 3D video image, and FIG. 71C is a schematic diagram showing depth information calculated from these pictures by a video encoder 6301 shown in FIG. 70;

FIG. 81 is a flowchart showing details of steps S1-5 shown in FIG. 80;

FIG. 83 is a schematic diagram showing an example of constructing a left-view 7503L and a right-view 7503R from the combination of a 2D video image 7501 and a depth map 7502;

DETAILED DESCRIPTION OF THE INVENTION

The following describes a recording medium and a playback device pertaining to preferred embodiments of the present invention with reference to the drawings.

Embodiment 1

Figure 1:
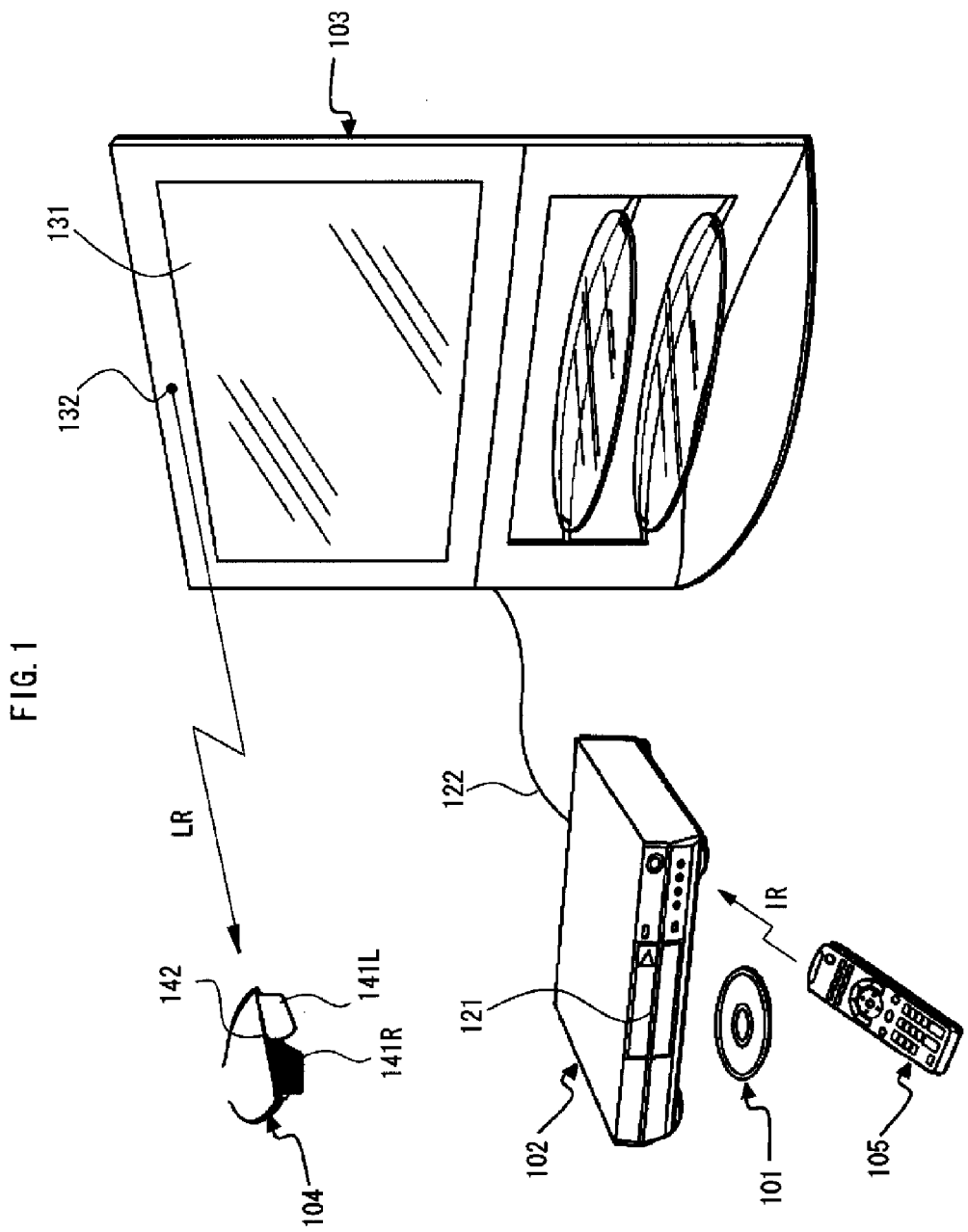
FIG. 1 is a schematic diagram showing a home theater system that uses a recording medium according to embodiment 1 of the present invention.

FIG. 1 is a schematic diagram showing a home theater system using a recording medium according to embodiment 1 of the present invention. This home theater system adopts a 3D video image (stereoscopic video image) playback method that uses parallax video images, and in particular adopts an alternate-frame sequencing method as a display method (see <Supplementary Explanation> for details). As shown in FIG. 1, this home theater system has a recording medium 101 as a playback target, and includes a playback device 102, a display device 103, shutter glasses 104, and a remote control 105.

The recording medium 101 is a read-only Blu-ray disc (BD)™, i.e. a BD-ROM disc. The recording medium 101 can be a different portable recording medium, such as an optical disc with a different format such as DVD or the like, a removable hard disk drive (HDD), or a semiconductor memory device such as an SD memory card. This recording medium, i.e. the BD-ROM disc 101, stores a movie content as 3D video images. This content includes video streams representing a left-view and a right-view for the 3D video images. The content may further include a video stream representing a depth map for the 3D video images. These video streams, as described below, are arranged on the BD-ROM disc 101 in units of data blocks and are accessed using a file structure described below. The video streams representing the left-view or the right-view are used by both a 2D playback device and a 3D playback device to play the content back as 2D video images. Conversely, a pair of video streams representing a left-view and a right-view, or a pair of video streams representing either a left-view or a right-view and a depth map, are used by a 3D playback device to play the content back as 3D video images.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. In this case, the playback device 102 is a 3D playback device and can play the content back as both 2D video images and as 3D video images. Hereinafter, the operational modes of the playback device 102 when playing back 2D video images and 3D video images are respectively referred to as "2D playback mode" and "3D playback mode". In 2D playback mode, video data only includes either a left-view or a right-view video frame. In 3D playback mode, video data includes both left-view and right-view video frames.

3D playback mode is further divided into left/right (L/R) mode and depth mode. In "L/R mode", a pair of left-view and right-view video frames is generated from a combination of video streams representing the left-view and right-view. In "depth mode", a pair of left-view and right-view video frames is generated from a combination of video streams representing either a left-view or a right-view and a depth map. The playback device 102 is provided with an L/R mode. The playback device 102 may be further provided with a depth mode.

The playback device 102 is connected to the display device 103 via an HDMI (High-Definition Multimedia Interface) cable 122. The playback device 102 converts the video data/audio data into a video signal/audio signal in the HDMI format and transmits the signals to the display device 103 via the HDMI cable 122. In 2D playback mode, only one of either the left-view or the right-view video frame is multiplexed in the video signal. In 3D playback mode, both the left-view and the right-view video frames are time-multiplexed in the video signal. Additionally, the playback device 102 exchanges CEC messages with the display device 103 via the HDMI cable 122. In this way, the playback device 102 can ask the display device 103 whether it supports playback of 3D video images.

The display device 103 is a liquid crystal display. Alternatively, the display device 103 can be another type of flat panel display, such as a plasma display, an organic EL display, etc., or a projector. The display device 103 displays video on the screen 131 in accordance with a video signal, and causes the speakers to produce audio in accordance with an audio signal. The display device 103 supports playback of 3D video images. During playback of 2D video images, either the left-view or the right-view is displayed on the screen 131. During playback of 3D video images, the left-view and right-view are alternately displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. During playback of 3D video images, the display device 103 detects switching of frames by distinguishing between a left-view frame and a right-view frame from a control signal that accompanies a video signal. Furthermore, the display device 103 changes the left/right signal LR synchronously with the detected switching of frames.

The shutter glasses 104 include two liquid crystal display panels 141L and 141R and a left/right signal receiving unit 142. Each of the liquid crystal display panels 141L and 141R constitute each of the left and right lens parts. The left/right signal receiving unit 142 receives a left/right signal LR, and in accordance with changes therein, transmits the signal to the left and right liquid crystal display panels 141L and 141R. In accordance with the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. In this way, the two liquid crystal display panels 141L and 141R alternately let light pass through in sync with the switching of frames. As a result, when a viewer looks at the screen 131 while wearing the shutter glasses 104, the left-view is shown only to the viewer's left eye, and the right-view is shown only to the right eye. At that time, the viewer is made to perceive the difference between the images seen by each eye as the binocular parallax for the same stereoscopic image, and thus the video image appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 and display device 103 each receive this signal IR, determine the button indicated by this signal IR, and execute the function associated with the button. In this way, the user can remotely control the playback device 102 or the display device 103.

<Data Structure of the BD-ROM Disc>

Figure 2:
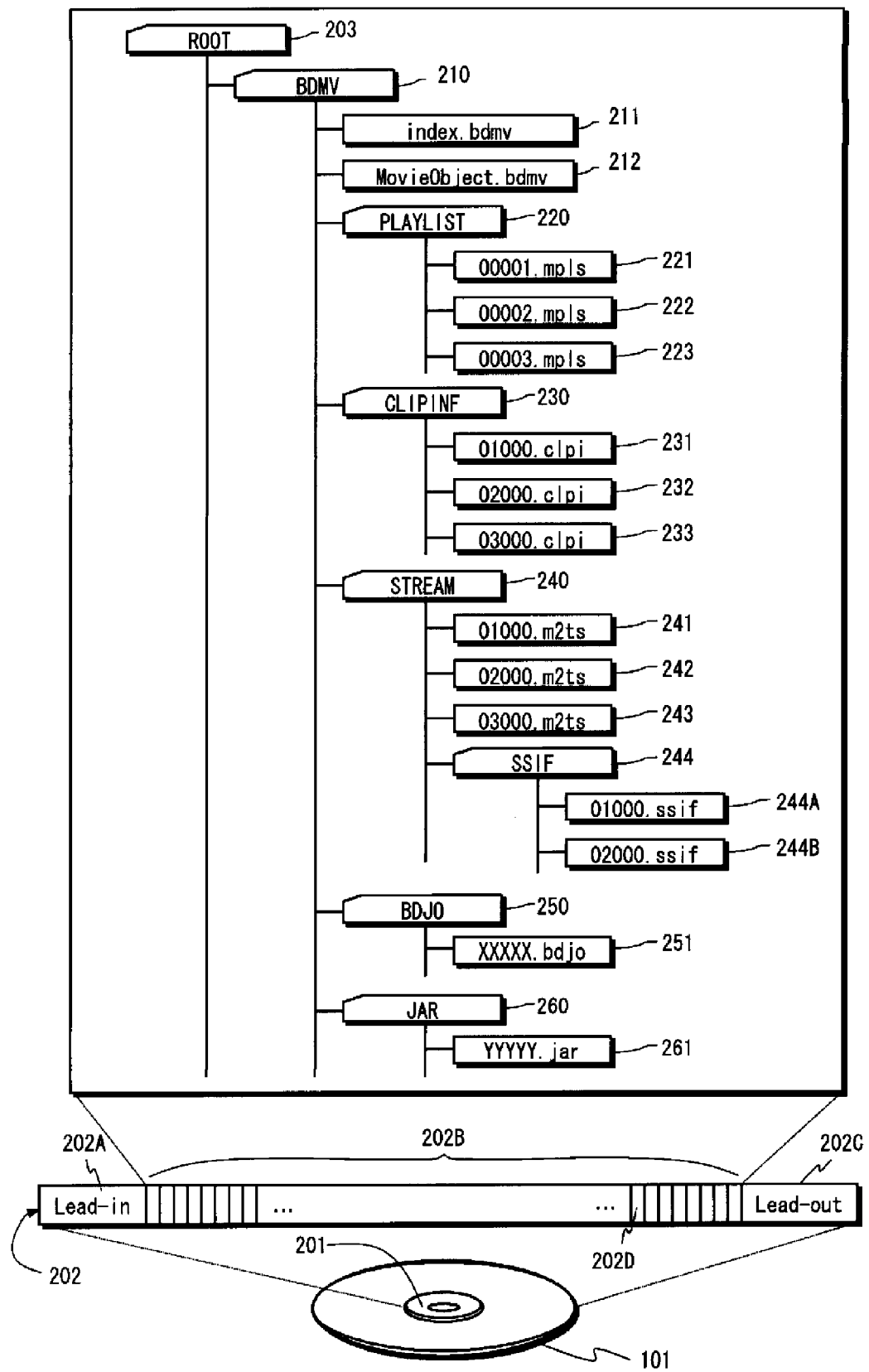
FIG. 2 is a schematic diagram showing the data structure of the BD-ROM disc 101 shown in FIG. 1.

FIG. 2 is a schematic diagram showing the data structure of the BD-ROM disc 101. As shown in FIG. 2, a BCA (Burst Cutting Area) 201 is provided at the innermost part of the data recording area on the BD-ROM disc 101. Only the BD-ROM drive 121 is permitted to access the BCA, and access by application programs is prohibited. In this way, the BCA 201 can be used as technology for copyright protection. In the data recording area outside of the BCA 201, tracks spiral from the inner to the outer circumference. In FIG. 2, the track 202 is schematically extended in a transverse direction. The left hand side represents the inner circumferential part of the disc 101, and the right hand side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary for the BD-ROM drive 121 to access the volume area 202B, such as the size, the physical address, etc. of the data recorded in the volume area 202B. The lead-out area 202C is provided on the outermost circumferential part of the data recording area and indicates the top of the volume area 202B. The volume area 202B includes application data such as video images, audio, etc.

The volume area 202B is divided into small areas 202D called "sectors". The sectors have a common size, for example 2,048 bytes. Each sector 202D is consecutively assigned a number in order from the top of the volume area 202B. These consecutive numbers are called logical block numbers (LBN) and are used in logical addresses on the BD-ROM disc 101. During reading of data from the BD-ROM disc 101, data targeted to be read is specified through designation of the LBN for the destination sector. In this way, the volume area 202B can be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data pieces having consecutive LBNs without making the optical pickup perform a seek.

The data recorded in the volume area 202B is managed under a predetermined file system. UDF (Universal Disc Format) is adopted as this file system. Alternatively, the file system may be ISO9660. The data recorded on the volume area 202B is represented in a directory/file format in accordance with the file system (see [Supplementary Explanation] for details). In other words, the data is accessible in units of directories or files.

<<Directory/File Structure on the BD-ROM Disc>>

FIG. 2 is a schematic diagram further showing the directory/file structure of the data stored in the volume area 202B on a BD-ROM disc 101. As shown in FIG. 2, in this directory/file structure, a BD movie (BDMV) directory 210 is located directly below a ROOT directory 203. Below the BDMV directory 210 are an index file (index.bdmv) 211 and a movie object file (MovieObject.bdmv) 212.

The index file 211 contains information for managing as a whole the content recorded on the BD-ROM disc 101. In particular, this information includes information to make the playback device 102 recognize the content, as well as an index table. The index table is a correspondence table between a title constituting the content and a program to control the operation of the playback device 102. This program is called an "object". Object types are a movie object and a BD-J (BD Java™) object.

The movie object file 212 generally stores a plurality of movie objects. Each movie object stores a sequence of navigation commands. A navigation command is a control command causing the playback device 102 to execute playback processes similarly to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are interpreted by an interpreter, i.e. a job control program, included in the playback device to make the control unit execute the desired job. A navigation command is composed of an opcode and an operand. The opcode describes the type of operation that the playback device is to execute, such as dividing, playing back, or calculating a title, etc. The operand indicates identification information targeted by the operation such as the title's number, etc. The control unit of the playback device 102 calls a movie object in response, for example, to a user operation and executes navigation commands included in the called movie object in the order of the sequence. Thus, in a manner similar to general DVD players, the playback device 102 first makes the display device 103 display a menu to allow the user to select a command. The playback device 102 then executes playback start/stop of a title, switches to another title, etc. in accordance with the selected command, thereby dynamically changing the progress of video playback.

As shown in FIG. 2, the BDMV directory 210 further contains a playlist (PLAYLIST) directory 220; a clip information (CLIPINF) directory 230; a stream (STREAM) directory 240; a BD-J object (BDJO: BD Java Object) directory 250; and a Java archive (JAR: Java Archive) directory 260.

Three types of AV stream files, (01000.m2ts) 241, (02000.m2ts) 242, and (03000.m2ts) 243, as well as a stereoscopic interleaved file (SSIF) directory 244 are located directly under the STREAM directory 240. Two types of AV stream files, (01000.ssif) 244A and (02000.ssif) 244B are located directly under the SSIF directory 244.

An "AV stream file" refers to a file, from among an actual video content recorded on a BD-ROM disc 101, that complies with the file format determined by the file system. Such an actual video content generally refers to stream data in which different types of stream data representing video, audio, subtitles, etc., that is, elementary streams, have been multiplexed. This multiplexed stream data can be broadly divided into a main transport stream (TS) and a sub-TS depending on the type of the internal primary video stream. A "main TS" refers to multiplexed stream data including a base-view video stream as a primary video stream. A "base-view video stream" can be played back independently, and refers to a video stream that represents 2D video images. Note that base-view is also called "main view". A "sub-TS" refers to multiplexed stream data including a dependent-view video stream as a primary video stream. A "dependent-view video stream" refers to a video stream that requires a base-view video stream for playback and represents 3D video images by being combined with the base-view video stream. Note that dependent-view is also called "sub-view". The types of dependent-view video streams are a right-view video stream, left-view video stream, and depth map stream. When the 2D video images represented by a base-view video stream are used as the left-view of 3D video images by a playback device in L/R mode, a "right-view video stream" is used as the stream data representing the right-view of the 3D video images. The reverse is true for a "left-view video stream". When the 2D video images represented by a base-view video stream are used to project 3D video images on a virtual 2D screen by a playback device in depth mode, a "depth map stream" is used as the video stream representing a depth map for the 3D video images. In particular, a depth map stream used when the base-view video stream represents a left view is referred to as a "left view depth map stream", and a depth map stream used when the base-view video stream represents a right view is referred to as a "right view depth map stream".

Depending on the type of internal multiplexed stream data, an AV stream file can be divided into three types: file 2D, dependent file (hereinafter, abbreviated as "file DEP"), and interleaved file (hereinafter, abbreviated as "file SS"). A "file 2D" is an AV stream file for playback of 2D video in 2D playback mode and includes a main TS. A "file DEP" refers to an AV stream file including a sub-TS. An "file SS" refers to an AV stream file including a pair of a main TS and a sub-TS representing the same 3D video images. In particular, a file SS shares its main TS with a certain file 2D and shares its sub-TS with a certain file DEP. In other words, in the file system on the BD-ROM disc 101, a main TS can be accessed by both a file SS and a file 2D, and a sub-TS can be accessed by both a file SS and a file DEP. This setup, whereby a sequence of data recorded on the BD-ROM disc 101 is common to different files and can be accessed by all of the files, is referred to as "file cross-link".

In the example shown in FIG. 2, the first AV stream file (01000.m2ts) 241 is a file 2D, and the second AV stream file (02000.m2ts) 242 and third AV stream file (03000.m2ts) 243 are both files DEP. In this way, files 2D and files DEP are located directly below the STREAM directory 240. The first AV stream file, i.e. the base-view video stream that includes the file 2D 241, represents a left-view of 3D video images. The second AV stream file, i.e. the dependent-view video stream that includes the first file DEP 242, is a right-view video stream. The third AV stream file, i.e. the dependent-view video stream that includes the second file DEP 243, is a depth map stream.

In the example shown in FIG. 2, the fourth AV stream file (01000.ssif) 244A and the fifth AV stream file (02000.ssif) 244B are both a file SS. In this way, files SS are located directly below the SSIF directory 244. The fourth AV stream file, i.e. the first file SS 244A, shares a main TS, and in particular a base-view video stream, with the file 2D 241 and shares a sub-TS, in particular a right-view video stream, with the first file DEP 242. The fifth AV stream file, i.e. the second file SS 244B, shares a main TS, and in particular a base-view video stream, with the file 2D 241 and shares a sub-TS, in particular a depth map stream, with the second file DEP 243.

Three types of clip information files, (01000.clpi) 231, (02000.clpi) 232, and (03000.clpi) 233 are files located in the CLIPINF directory 230. A "clip information file" refers to a file that is associated on a one-to-one basis with a file 2D and a file DEP and in particular contains the entry map for each file. An "entry map" is a correspondence table between the presentation time for each scene represented by a file 2D or a file DEP and the address within each file at which the scene is recorded. Among the clip information files, a clip information file associated with a file 2D is referred to as a "2D clip information file", and a clip information file associated with a file DEP is referred to as a "dependent-view clip information file". Furthermore, when a file DEP includes a right-view video stream, the corresponding dependent-view clip information file is referred to as a "right-view clip information file". When a file DEP includes a depth map stream, the corresponding dependent-view clip information file is referred to as a "depth map clip information file". In the example shown in FIG. 2, the first clip information file (01000.clpi) 231 is a 2D clip information file and is associated with the file 2D 241. The second clip information file (02000.clpi) 232 is a right-view clip information file and is associated with the first file DEP 242. The third clip information file (03000.clpi) 233 is a depth map clip information file and is associated with the second file DEP 243.

Three types of playlist files, (00001.mpls) 221, (00002.mpls) 222, and (00003.mpls) 223 are located in the PLAYLIST directory 220. A "playlist file" specifies the playback path of an AV stream file, i.e. the part of an AV stream file to decode, and the order of decoding. The types of playlist files are a 2D playlist file and a 3D playlist file. A "2D playlist file" specifies the playback path of a file 2D. A "3D playlist file" specifies, for a playback device in 2D playback mode, the playback path of a file 2D, and for a playback device in 3D playback mode, the playback path of a file SS. As shown in the example in FIG. 2, the first playlist file (00001.mpls) 221 is a 2D playlist file and specifies the playback path of the file 2D 241. The second playlist file (00002.mpls) 222 is a 3D playlist file that specifies, for a playback device in 2D playback mode, the playback path of the file 2D 241, and for a playback device in L/R mode, the playback path of the first file SS 244A. The third playlist file (00003.mpls) is a 3D playlist file that specifies, for a playback device in 2D playback mode, the playback path of the file 2D 241, and for a playback device in depth mode, the playback path of the second file SS 244B.

A BD-J object file (XXXXX.bdjo) 251 is located in the BDJO directory 250. The BD-J object file 251 includes a single BD-J object. The BD-J object is a bytecode program, and causes a Java virtual machine mounted on the playback device 102 to execute the processes of title playback and graphics rendering. The BD-J object is written in a compiler language such as Java or the like. The BD-J object includes an application management table and identification information for the playlist file to which is referred. The "application management table" is a correspondence table of the Java application programs to be executed by the Java virtual machine and their period of execution, that is, lifecycle. The "identification information of the playlist file to which is referred" identifies a playlist file that corresponds to a title to be played back. The Java virtual machine calls a BD-J object in accordance with a user operation or an application program, and executes the Java application program according to the application management table included in the BD-J object. Consequently, the playback device 102 dynamically changes the progress of the video for each title played back, or causes the display device 103 to display graphics independently of the title video.

A JAR file (YYYYY. jar) 261 is located in the JAR directory 260. The JAR directory 261 generally includes a plurality of actual Java application programs to be executed in accordance with the application management table shown in the BD-J object. A Java application program is a bytecode program written in a compiler language such as Java or the like, as is the BD-J object. Types of Java application programs include programs causing the Java virtual machine to execute playback of a title process and programs causing the Java virtual machine to execute graphics rendering. The JAR file 261 is a Java archive file, and when it is read by the playback device 102, it is extracted in internal memory. In this way, a Java application program is stored in memory.

<<Structure of Multiplexed Stream Data>>

FIG. 3A is a table showing the elementary streams multiplexed in a main TS on a BD-ROM disc 101. The main TS is a digital stream in MPEG-2 transport stream (TS) format and includes the file 2D 241 shown in FIG. 2. As shown in FIG. 3A, the main TS includes a primary video stream 301 and primary audio streams 302A and 302B. The main TS may additionally include presentation graphics (PG) streams 303A and 303B, an interactive graphics (IG) stream 304, a secondary audio stream 305, and a secondary video stream 306.

The primary video stream 301 represents the primary video of a movie, and the secondary video stream 306 represents secondary video of the movie. The primary video is the major video of a content, such as the main feature of a movie, and is displayed on the entire screen, for example. On the other hand, the secondary video is displayed simultaneously with the primary video with the use, for example, of a picture-in-picture method, so that the secondary video images are displayed in a smaller window presented on the full screen displaying the primary video image. The primary video stream 301 and the secondary video stream 306 are both a base-view video stream. Each of the video streams 301 and 306 is encoded by a video compression encoding method, such as MPEG-2, MPEG-4 AVC, or SMPTE VC-1.

The primary audio streams 302A and 302B represent the primary audio of the movie. In this case, the two primary audio streams 302A and 3023 are in different languages. The secondary audio stream 305 represents secondary audio to be superposed (mixed) with the primary audio, such as sound effects accompanying operations on an interactive screen. Each of the audio streams 302A, 302B, and 305 is encoded by a method such as AC-3, Dolby Digital Plus ("Dolby Digital" is a registered trademark), Meridian Lossless PackingTM (MLP), Digital Theater System™ (DTS), DTS-HD, or linear pulse code modulation (PCM).

Each of the PG streams 303A and 303B represent subtitles or the like via graphics and are graphics video images to be displayed superimposed on the video images represented by the primary video stream 301. The two PG streams 303A and 303B represent, for example, subtitles in a different language. The IG stream 304 represents graphical user interface (GUI) graphics components, and the arrangement thereof, for constructing an interactive screen on the screen 131 in the display device 103.

The elementary streams 241306 are identified by packet IDs (PIDs). PIDs are assigned, for example, as follows. Since one main TS includes only one primary video stream, the primary video stream 301 is assigned a hexadecimal value of 0x1011. When up to 32 other elementary streams can be multiplexed by type in one main TS, the primary audio streams 302A and 302B are each assigned any value from 0x1100 to 0x111F. The PG streams 303A and 303B are each assigned any value from 0x1200 to 0x121F. The IG stream 304 is assigned any value from 0x1400 to 0x141F. The secondary audio stream 305 is assigned any value from 0x1A00 to 0x1A1F. The secondary video stream 306 is assigned any value from 0x1B00 to 0x1B1F.

FIG. 3B is a graph showing the elementary streams multiplexed in the first sub-TS on a BD-ROM disc 101. The first sub-TS is multiplexed stream data in MPEG-2 TS format and is included in the first file DEP 242 shown in FIG. 2. As shown in FIG. 3B, the first sub-TS includes a primary video stream 311. The first sub-TS may additionally include left-view PG streams 312A and 312B, right-view PG streams 313A and 313B, left-view IG stream 314, right-view IG stream 315, and secondary video stream 316. The primary video stream 311 is a right-view video stream, and when the primary video stream 301 in the main TS represents the left-view for 3D video images, the primary video stream 311 represents the right-view for the 3D video images. When graphics video images for subtitles or the like are represented as 3D video images, pairs formed by the left-view or right-view and a PG stream, i.e. 312A+313A and 312B+313B, represent the corresponding left-view and right-view. When graphics video images for an interactive display are represented as 3D video images, pairs formed by the left-view or right-view and the IG streams 314 and 315 represent the corresponding left-view and right-view. The secondary video stream 316 is a right-view video stream, and when the secondary video stream 306 in the main TS represents the left-view for 3D video images, the secondary video stream 316 represents the right-view for the 3D video images.

PIDs are assigned to the elementary streams 311-316, for example, as follows. The primary video stream 311 is assigned a value of 0x1012. When up to 32 other elementary streams can be multiplexed by type in one sub-TS, the left-view PG streams 312A and 312B are assigned any value from 0x1220 to 0x123F, and the right-view PG streams 313A and 313B are assigned any value from 0x1240 to 0x125F. The left-view IG stream 314 is assigned any value from 0x1420 to 0x143F, and the right-view IG stream 315 is assigned any value from 0x1440 to 0x145F. The secondary video stream 316 is assigned any value from 0x1B20 to 0x1B3F.

FIG. 3C is a graph showing the elementary streams multiplexed in the second sub-TS on a BD-ROM disc 101. The second sub-TS is multiplexed stream data in MPEG-2 TS format and is included in the second file DEP 243 shown in FIG. 2. As shown in FIG. 3C, the second sub-TS includes a primary video stream 321. The second sub-TS may additionally include depth map PG streams 323A and 323B, depth map IG stream 324, and secondary video stream 326. The primary video stream 321 is a depth map stream and represents 3D video images in combination with the primary video stream 301 in the main TS. When the 2D video images represented by the PG streams 323A and 323B in the main TS are used to project 3D video images on a virtual 20 screen, the depth map PG streams 323A and 323B are used as the PG streams representing a depth map for the 3D video images. When the 2D video images represented by the IG stream 304 in the main TS are used to project 3D video images on a virtual 2D screen, the depth map IG stream 324 is used as the IG stream representing a depth map for the 3D video images.

The secondary video stream 326 is a depth map stream and represents 3D video images in combination with the secondary video stream 306 in the main TS.

PIDs are assigned to the elementary streams 321-326, for example, as follows. The primary video stream 321 is assigned a value of 0x1013. When up to 32 other elementary streams can be multiplexed by type in one sub-TS, the depth map PG streams 323A and 323B are assigned any value from 0x1260 to 0x127F. The depth map IG stream 324 is assigned any value from 0x1460 to 0x147F. The secondary video stream 326 is assigned any value from 0x1B40 to 0x1B5F.

Figure 4:
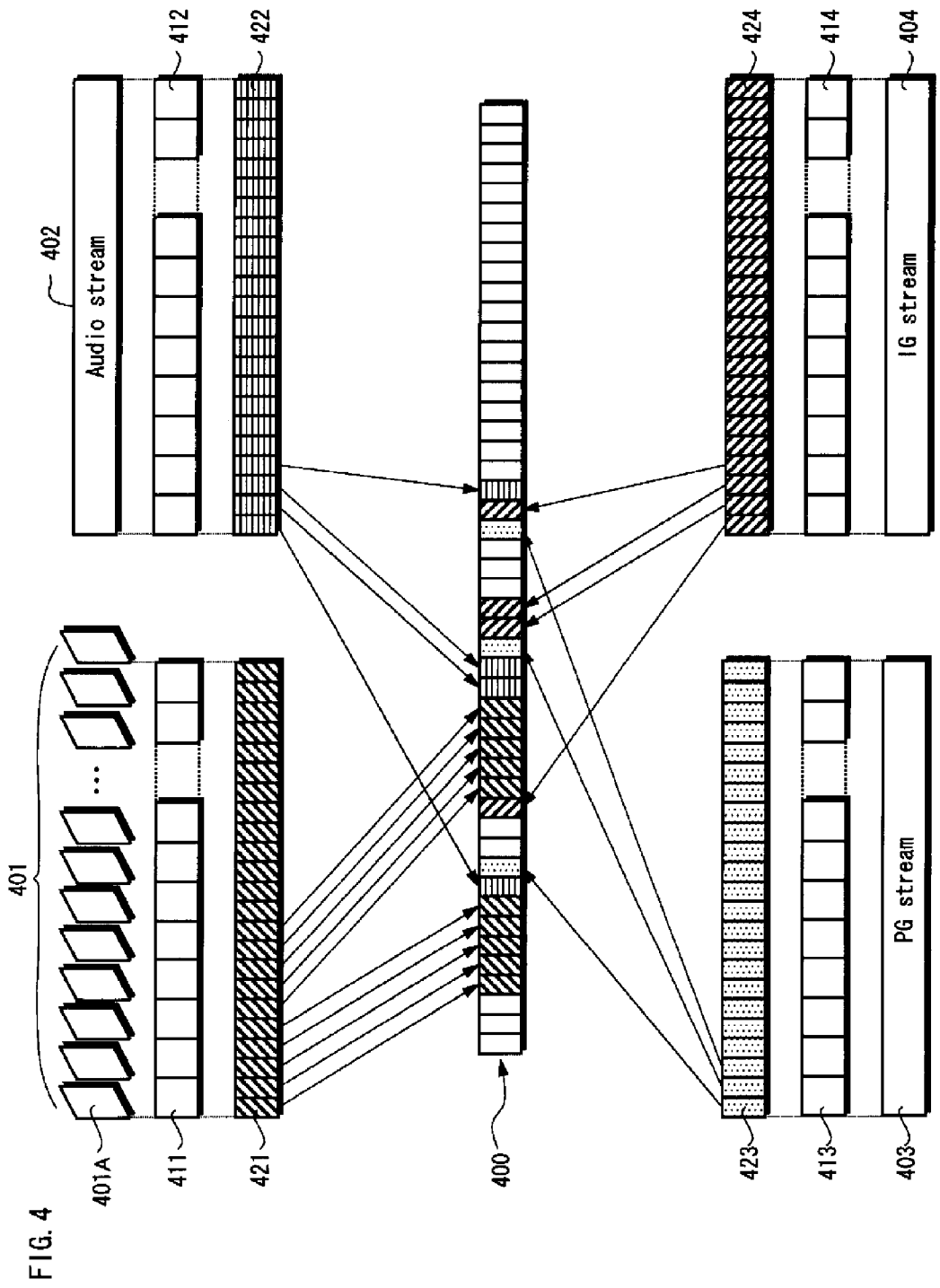
FIG. 4 is a schematic diagram showing the arrangement of TS packets in the multiplexed stream data 400.

FIG. 4 is a schematic diagram showing the arrangement of TS packets in the multiplexed stream data 400. Both the main TSs and the sub-TSs share this packet structure. The elementary streams 401, 402, 403, and 404 in the multiplexed stream data 400 are converted to the sequence of TS packets 421, 422, 423, and 424. For example, in the video stream 401, each frame 401A or each field is first converted into a packetized elementary stream (PES) packet 411. Next, each PES packet 411 is generally converted into a plurality of TS packets 421. Similarly, the audio stream 402, PG stream 403, and IG stream 404 are each first converted into a sequence of PES packets 412, 413, and 414, after which they are converted into TS packets 422, 423, and 424. Finally, the TS packets 421, 422, 423, and 424 obtained from the elementary streams 401, 402, 403, and 404 are time-multiplexed into one piece of stream data 400.

Figure 5:
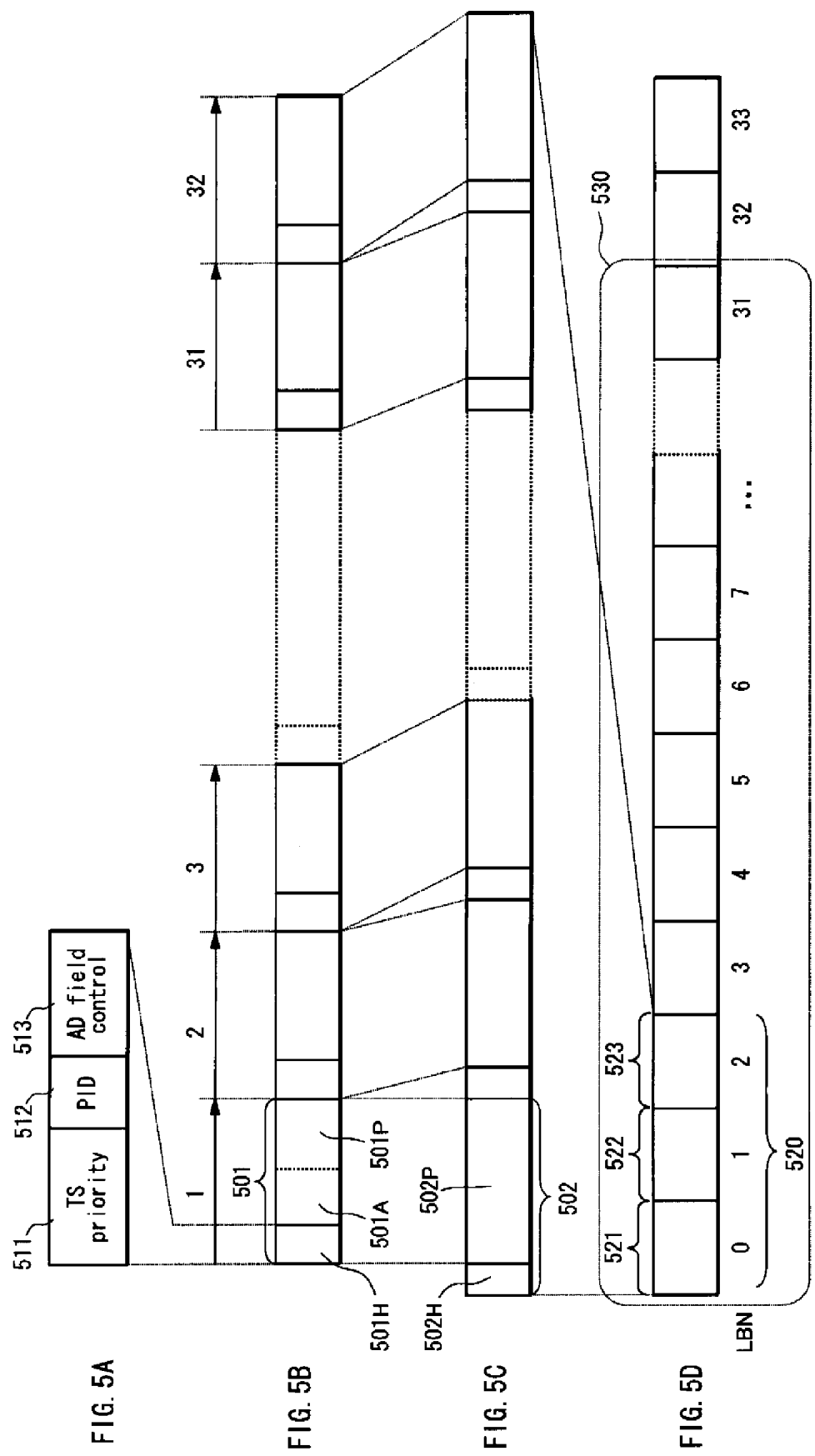
FIG. 5B is a schematic diagram showing the format of a TS packet sequence in multiplexed stream data shown in FIG. 4.
FIG. 5A is a schematic diagram of a data structure of a TS header 501H shown in FIG. 5B.
FIG. 5C is a schematic diagram showing the shape of a source packet sequence formed from the TS packet sequence shown in FIG. 5B.
FIG. 5D is a schematic diagram of a sector group on a volume area 202B of the BD-ROM disc 101 in which the series of source packets shown in FIG. 5C has been consecutively recorded.

FIG. 5B is a schematic diagram of a TS packet sequence comprising multiplexed stream data. Each TS packet 501 is a 188 byte long packet. As shown in FIG. 5B, each TS packet 501 includes at least one of a TS payload 501P and an adaptation field (hereinafter abbreviated as AD field) 501A, and includes a TS header 501H. The TS payload 501P and the AD field 501A, when combined together, make up a 184-byte length data area. The TS payload 501P is used as a storage area for PES packets. The PES packets 347414 shown in FIG. 4 are each typically divided into a plurality of sections, with each section being stored in a different TS payload 501P. The AD field 501A is an area for storing stuffing bytes (that is, dummy data) when the data amount of the TS payload 501P is less than 184 bytes. Additionally, when the TS packet 501 is a later-described PCR, for example, the AD field 501A may additionally be used as a storage area for PCR information. The TS header 501H is a four-byte long data area.

FIG. 5A is a schematic diagram of a data structure of a TS header 501H. As shown in FIG. 5A, the TS header 501H includes a TS priority (transport priority) 511, a PID 512, and an AD field control (adaption_field_control) 513. The PID 512 indicates a PID of an elementary stream to which belongs data stored in the TS payload 501P in the same TS packet 501. The TS priority 511 indicates a priority of the TS packet 501 among TS packets having a shared value indicated by the PID 512. The AD field control 513 indicates whether or not the AD field 501A exists in the TS packet 501, and whether or not the TS payload 501P exists in the TS packet 501. For example, when the AD field control 513 indicates "1", the TS packet 501 does not include the AD field 501A, and does include the TS payload 501P. The reverse is true when the AV field control 513 indicates "2". When the AD field control 513 indicates "3", the TS packet 501 includes both the AD field 501A and the TS payload 501P.

FIG. 5C is a schematic diagram showing the format of a source packet sequence composed of the TS packet sequence for the multiplexed stream data. As shown in FIG. 5C, each of the source packets 502 is a 192-byte long packet, and includes one of the TS packets 501 shown in FIG. 5B and a 4-byte long header (TP_Extra_Header) 502H. When the TS packet 501 is recorded on the BD-ROM disc 101, the source packet 502 is formed by attaching the header 502H to the TS packet 501. The header 502H includes an Arrival_Time_Stamp (ATS). "ATS" is time information, and is used as follows. When a source packet 502 is transferred from the BD-ROM disc 101 to the system target decoder in the playback device 102, the ATS in the header 502H indicates the time at which the TS packet 502P should be extracted from within the source packet 502 and should start being transferred to the PID filter in the system target decoder. Here, the "system target decoder" refers to a device that decodes multiplexed stream data for each elementary stream. Details regarding the system target decoder and use of the ATS by the system target decoder are provided below.

FIG. 5D is a schematic diagram of a sector group, in which a sequence of source packets 502 are continuously recorded, in the volume area 202B of the BD-ROM disc 101. As shown in FIG. 5D, 32 source packets 502 are recorded at a time as a sequence in three consecutive sectors 521, 522, and 523. This is because the data amount for 32 source packets, i.e. 192 bytes×32=6144 bytes, is the same as the total size of three sectors, i.e. 2,048 bytes×3=6144 bytes. 32 source packets 502 that are recorded in this way in three consecutive sectors 521, 522, and 523 are referred to as an "aligned unit" 520. The playback device 102 reads source packets 502 from the BD-ROM disc 101 by each aligned unit 520, i.e. 32 source packets at a time. Also, the sector group 521, 522, 523, . . . is divided into 32 pieces in order from the top, and each forms one error correction code block 530. The BD-ROM drive 121 performs error correction processing for each ECC block 530.

<<Data Structure for the Video Stream>>

Figure 6:
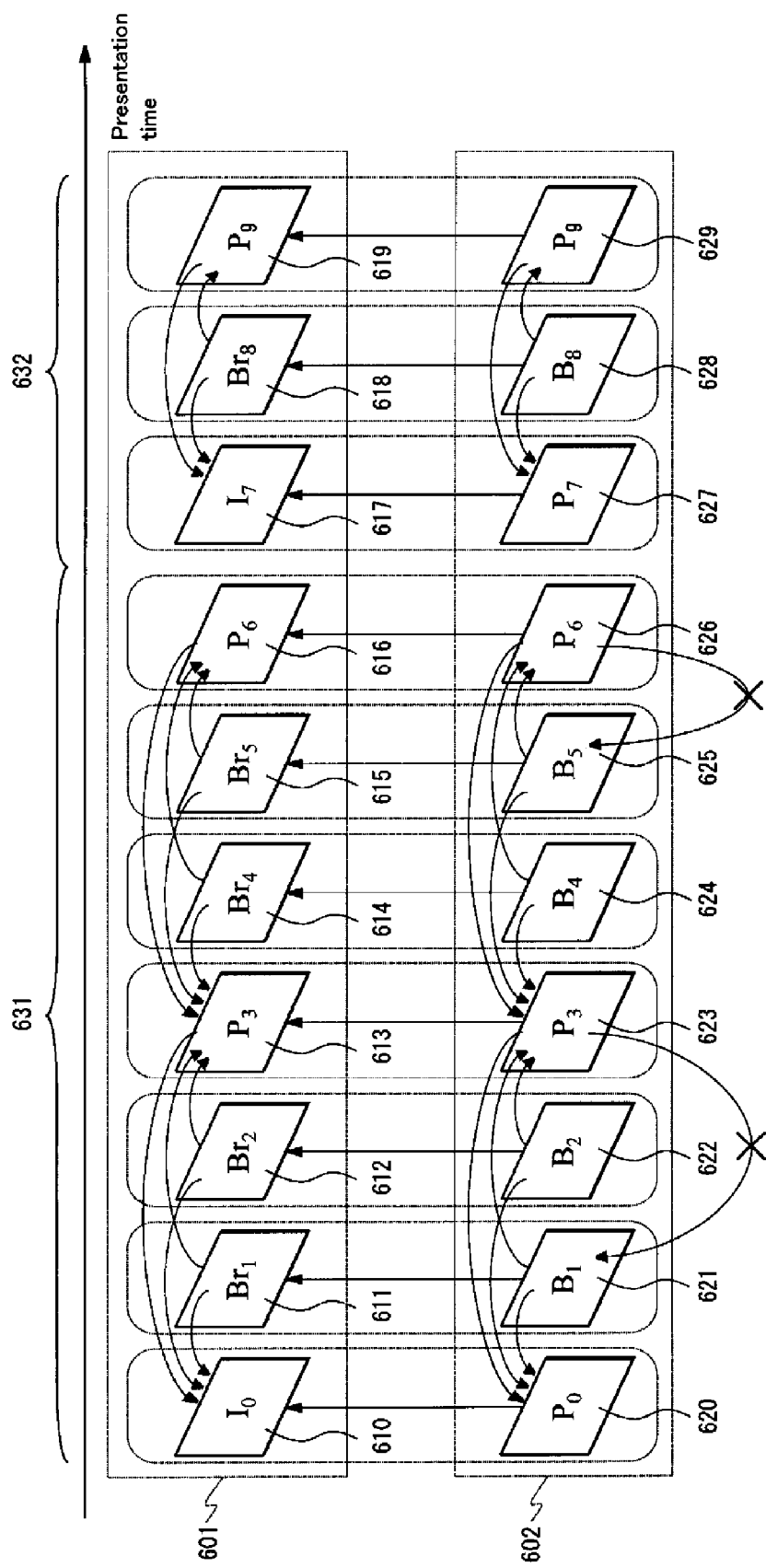
FIG. 6 is a schematic diagram showing the pictures in the base-view video stream 601 and in the right-view video stream 602 in order of presentation time.

FIG. 6 is a schematic diagram showing the pictures in the base-view video stream 601 and in the right-view video stream 602 in order of presentation time. As shown in FIG. 6, the base-view video stream 601 includes pictures 610, 611, 612, . . . , 619 (hereinafter referred to as base-view pictures), and the right-view video stream 602 includes pictures 620, 621, 622, . . . , 629 (hereinafter referred to as right-view pictures). Each of the pictures 610-619 and 620-629 represents one frame or one field and are compressed by a video compression encoding method, such as MPEG-2, MPEG-4 AVC, etc.

Compression of each picture by the above-mentioned encoding method uses the picture's spatial or temporal redundancy. Here, picture encoding that only uses the picture's spatial redundancy is referred to as "intra-picture encoding". On the other hand, picture encoding that uses the similarity between data for multiple pictures displayed sequentially is referred to as "inter-picture predictive encoding". In inter-picture predictive encoding, first, a picture earlier or later in presentation time is assigned to the picture to be encoded as a reference picture. Next, a motion vector is detected between the picture to be encoded and the reference picture, and then motion compensation is performed using the motion vector. Furthermore, the difference value between the picture after motion compensation and the picture to be encoded is sought, and temporal redundancy is removed using the difference value. In this way, the amount of data for each picture is compressed.

As shown in FIG. 6, the base-view pictures 610-619 are generally divided into a plurality of GOPs 631 and 6932. Here, a "GOP" refers to a sequence of pictures starting with an I (intra) picture. An "I Picture" refers to a picture compressed by intra-picture encoding. A GOP generally has a P (predictive) picture and a B (bi-directionally predictive) picture in addition to an I picture. A "P picture" refers to a picture compressed by inter-picture predictive encoding, having used as a reference picture either an I picture or a different P picture that are earlier in presentation time. A "B picture" refers to a picture compressed by inter-picture predictive encoding, having used two reference pictures that are I or P pictures earlier or later in presentation time. B pictures that are used as a reference picture for other pictures in inter-picture predictive encoding are particularly referred to as "Br (reference B) pictures".

In the example shown in FIG. 6, the base-view pictures in the GOPs 631 and 632 are compressed in the following order. In the first GOP 631, first the top base-view picture is compressed as $I_0$ picture 610. Here, the subscripted number indicates the sequential number allotted to each picture in the order of presentation time. Next, the fourth base-view picture is compressed as $P_3$ picture 613 using $I_0$ picture 610 as a reference picture. The arrows shown in FIG. 6 indicate that the picture at the head of the arrow is a reference picture for the picture at the tail of the arrow. Next, the second and third base-view pictures are compressed as $Br_1$ picture 611 and $Br_2$ picture 612 respectively, using $I_0$ picture 610 and $P_3$ picture 613 as reference pictures. Furthermore, the seventh base-view picture is compressed as $P_6$ picture 616 using $P_3$ picture 613 as a reference picture. Next, the fourth and fifth base-view pictures are compressed as $Br_4$ picture 614 and $Br_5$ picture 615 respectively, using $P_3$ picture 613 and $P_6$ picture 616 as reference pictures. Similarly, in the second GOP 632, the top base-view picture is first compressed as $I_7$ picture 617. Next, the third base-view picture is compressed as $P_9$ picture 619 using $I_7$ picture 617 as a reference picture. Subsequently, the second base-view picture is compressed as $Br_8$ picture 618 using $I_7$ picture 617 and $P_9$ picture 619 as reference pictures.

In the base-view video stream 601, each GOP 631 and 632 always contains an I picture at the top, and thus base-view pictures can be decoded by GOP. For example, in the first GOP 631, the $I_0$ picture 610 is first decoded independently. Next, the $P_3$ picture 613 is decoded using the decoded $I_0$ picture 610. Then the $Br_1$ picture 611 and $Br_2$ picture 612 are decoded using the decoded $I_0$ picture 610 and $P_3$ picture 613. The subsequent picture group 614, 615, . . . is similarly decoded. In this way, the base-view video stream 601 can be decoded independently and furthermore can be randomly accessed in units of GOPs.

As further shown in FIG. 6, the right-view pictures 620-629 are compressed by inter-picture encoding. However, the encoding method differs from the encoding method for the base-view pictures 610-619, since in addition to redundancy in the temporal direction of video images, redundancy between the left and right video images is also used. Specifically, the reference pictures for the right-view pictures 620-629 are selected not only from the right-view stream 602, but also from the base-view video stream 601, as shown by the arrows in FIG. 6. In particular, the presentation times for the right-view pictures 620-629 and the base-view pictures selected as the reference pictures thereof are substantially the same. These pictures represent a pair of a right-view and a left-view for the same 3D video image, i.e. a parallax video image. In this way, the right-view pictures 620-629 are in one-to-one correspondence with the base-view pictures 610-619. In particular, the GOP structure is the same between these pictures.

In the example shown in FIG. 6, the right view picture that is the top in the first GOP 631 is compressed as $P_0$ picture 620 using $I_0$ picture 610 in the base-view video stream 601 as a reference picture. These pictures 610 and 620 represent the left-view and right-view of the top frame in the 3D video images. Next, the fourth right-view picture is compressed as $P_3$ picture 623 using $P_3$ picture 613 in the base-view video stream 601 and $P_0$ picture 620 as reference pictures. Next, the second right-view picture is compressed as $B_1$ picture 621, using $Br_1$ picture 611 in the base-view video stream 601 in addition to $P_0$ picture 620 and $P_3$ picture 623 as reference pictures. Similarly, the third right-view picture is compressed as $B_2$ picture 622, using $Br_2$ picture 612 in the base-view video stream 601 in addition to $P_0$ picture 620 and $P_3$ picture 623 as reference pictures. Similarly, for subsequent right-view pictures 624-629, the right-view pictures for which the presentation time is substantially the same are used as reference pictures.

The revised standards for MPEG-4 AVC/H.264, called multiview video coding (MVC), are known as a video compression encoding method that makes use of correlation between left and right video images as described previously. MVC was created in July of 2008 by the joint video team (JVT), a joint project between ISO/IEC MPEG and ITU-T VCEG, and is a standard for collectively encoding video that can be seen from a plurality of perspectives. With MVC, not only is temporal similarity in video used for inter-video predictive encoding, but so is similarity between videos from differing perspectives. This type of predictive encoding has a higher video compression ratio than predictive encoding that individually compresses video seen from each perspective.

As described previously, base-view pictures are used as reference pictures for compression of the right-view pictures 620-629. Therefore, unlike the base-view video stream 601, the right-view video stream 602 cannot be decoded independently. On the other hand, however, the difference between parallax images is generally very small, that is, the correlation between the left-view and the right-view is high. Accordingly, the right-view pictures generally have a significantly higher compression rate than the base-view pictures, meaning that the amount of data is significantly smaller.

Figure 7:
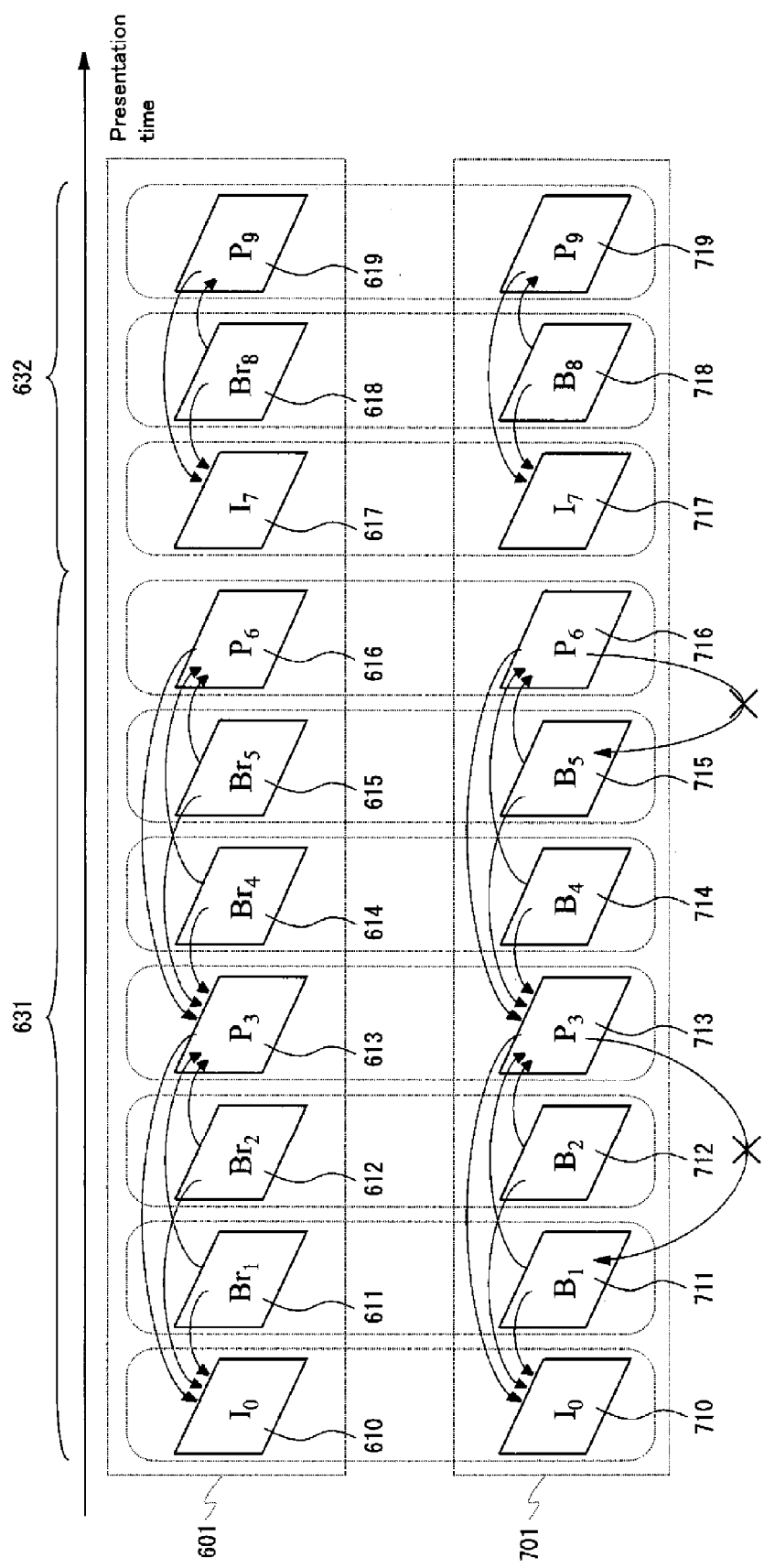
FIG. 7 is a schematic diagram showing the pictures in the base-view video stream 601 and in the depth map stream 701 in order of presentation time.
Figure 9:
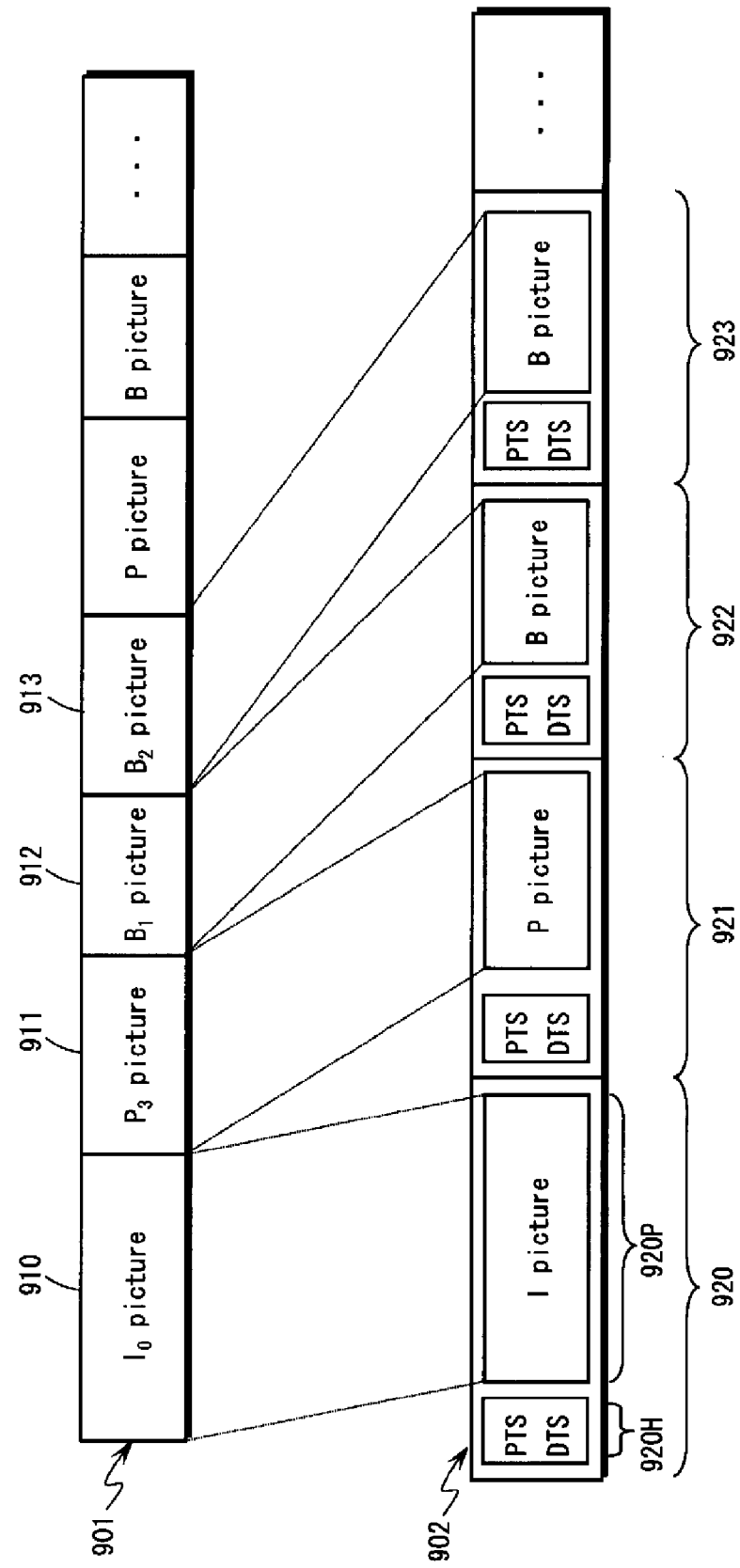
FIG. 9 is a schematic diagram showing details of a method for storing the video stream 901 into a PES packet sequence 902.

FIG. 7 is a schematic diagram showing the pictures in the base-view video stream 601 and in the depth map stream 701 in order of presentation time. As shown in FIG. 7, the base-view video stream 601 is the same as the one shown in FIG. 6. Accordingly, the description in FIG. 9 is referred to for a detailed description thereof. On the other hand, the depth map stream 701 includes depth maps 710, 711, . . . , 719. The depth maps 710-719 are in a one-to-one correspondence with the base-view pictures 610-619 and represent a depth map for the 2D video image for one frame or field shown by each base-view picture.

The depth maps 710-719 are compressed by a video compression encoding method, such as MPEG-2, MPEG-4 AVC, etc., in the same way as the base-view pictures 610-619. In particular, inter-picture encoding is used in this encoding method. In other words, each picture is compressed using another depth map as a reference picture. In the example shown in FIG. 7, first the top of the depth map group corresponding to the first GOP 631 is compressed as $I_0$ picture 710. The subscripted number indicates the sequential number allotted to each picture in the order of presentation time. Next, the fourth depth map is compressed as $P_3$ picture 713 using $I_0$ picture 710 as a reference picture. The arrows shown in FIG. 7 indicate that the picture at the head of the arrow is a reference picture for the picture at the tail of the arrow. Next, the second and third depth maps are compressed as $B_1$ picture 711 and $B_2$ picture 712 respectively, using $I_0$ picture 710 and $P_3$ picture 713 as reference pictures. Furthermore, the seventh depth map is compressed as $P_6$ picture 716 using $P_3$ picture 713 as a reference picture. Next, the fourth and fifth depth maps are compressed as $B_4$ picture 714 and $B_5$ picture 715 respectively, using P₃ picture 713 and P₆ picture 716 as reference pictures. Similarly, in the depth map group corresponding to the second GOP 632, the top depth map is first compressed as I₇ picture 717. Next, the third depth map is compressed as P₉ picture 719 using I₇ picture 717 as a reference picture. Subsequently, the second depth map is compressed as B₈ picture 718 using I₇ picture 717 and P₉ picture 719 as reference pictures.

The depth map stream 701 is divided into units of GOPs in the same way as the base-view video stream 601, and each GOP always contains an I picture at the top. Accordingly, depth maps can be decoded by GOP. For example, the I₀ picture 710 is first decoded independently. Next, the P₃ picture 713 is decoded using the decoded I₀ picture 710. Then, the B₁ picture 711 and P₃ picture 712 are decoded using the decoded I₀ picture 710 and P₃ picture 713. The subsequent picture group 714, 715, . . . is similarly decoded. However, since a depth map itself is only information representing the depth of each part of a 2D video image by pixel, the depth map stream 701 cannot be used independently for playback of video images.

The same encoding method is used for compression of the right-view video stream 602 and the depth map stream 701. For example, if the right-view video stream 602 is encoded in MVC format, the depth map stream 701 is also encoded in MVC format. In this case, during playback of 3D video images, the playback device 102 can smoothly switch between L/R mode and depth mode, while maintaining a constant encoding method.

Figure 8:
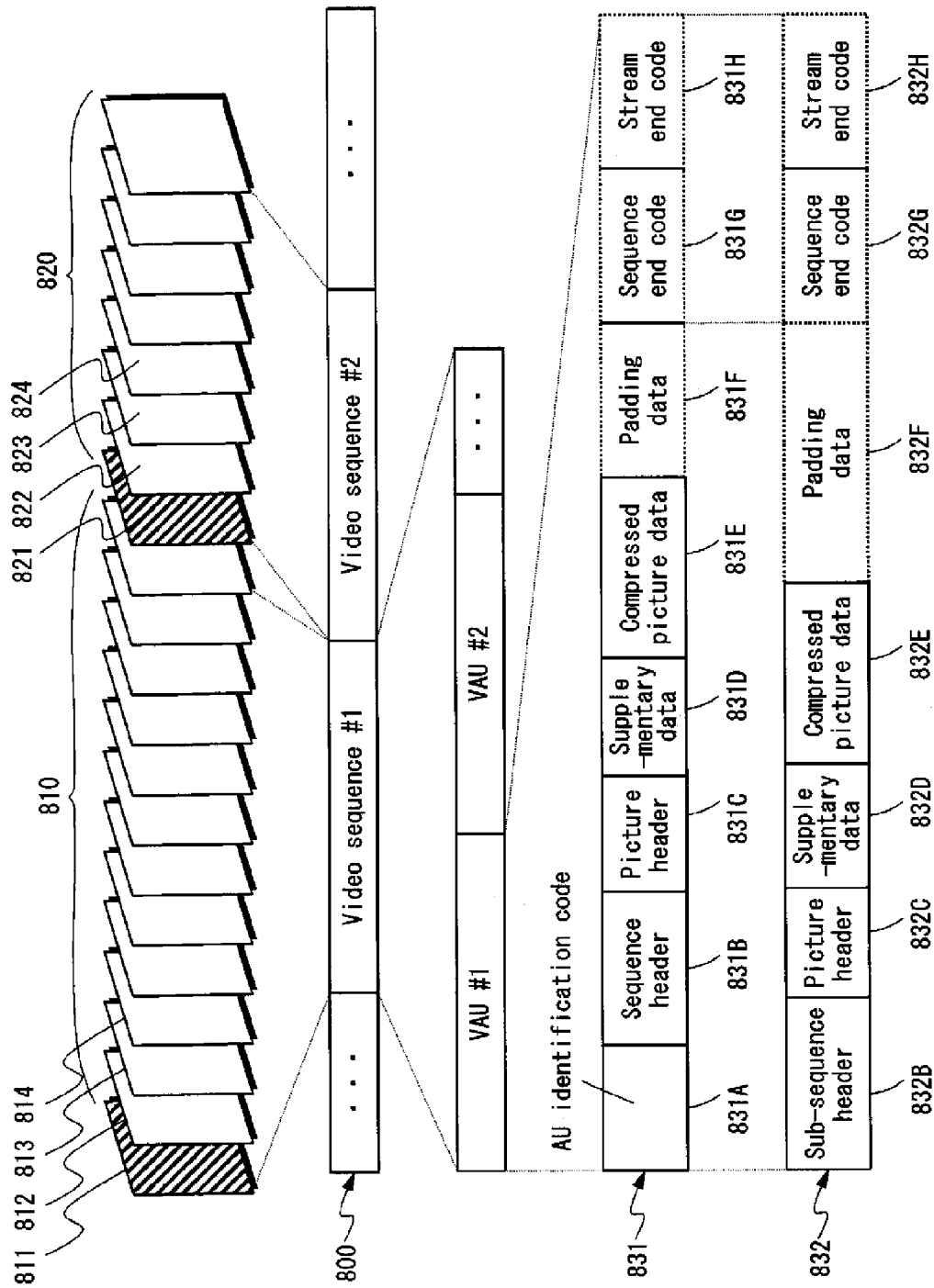
FIG. 8 is a schematic diagram showing details of a data structure of the video stream 800.

FIG. 8 is a schematic diagram showing details of the data structure of the video stream 800. This data structure is substantially the same in both the base-view video stream 601 and the dependent-view video streams 602 and 701. As shown in FIG. 8, the video stream 800 is generally made up of a plurality of video sequences #1, #2, . The "video sequences" are formed by combining additional information such as headers, etc. individually with pictures 811, 812, 813, 814 . . . included in one GOP 810. The combination of this additional information and each picture is called a "video access unit" (VAU). That is to say, one VAU, numbered VAU#1, VAU#2, . . . , is included for each picture in the GOPs 810 and 820. Each picture can be read from the video stream 800 in VAUs.

FIG. 8 further shows the structure of the VAU#1 831 located at the top of each video sequence in the base-view video stream. VAU#1 831 includes an access unit (AU) identification code 831A, a sequence header 831B, a picture header 831C, supplementary data 831D, and compressed picture data 831E. The second VAU # 2 and subsequent VAUs have the same structure as VAU#1 831 with the exception of not including the sequence header 8313. The AU identification code 831A is a predetermined code indicating the top of each VAU. The sequence header 831B, also called a GOP header, includes an identification number of a video sequence #1 including VAU#1 831. The sequence header 831B further includes information shared by the whole GOP 810, e.g. the resolution, frame rate, aspect ratio, and bit rate. The picture header 831C includes a unique identification number, an identification number of the video sequence #1, and information necessary for decoding of the picture, such as the type of encoding method. The supplementary data 831D includes additional information regarding matters other than the decoding of the picture, for example closed caption text information, information pertaining to the GOP structure, and time code information. In particular, the supplementary data 831D includes decoding switch information, described later . The compressed picture data 831E includes base-view pictures.

Additionally, the VAU#1 831 may include one or more, or all of, padding data 831F, a sequence end code 831G, and a stream end code 831H, as necessary. The padding data 831F is dummy data. By adjusting the size according to the size of the compressed picture data 831E, the bit rate of the VAU#1 831 can be maintained at a predetermined value. The sequence end code 831G indicates that the VAU#1 831 is at the tail of the video sequence #1. The stream end code 831 indicates the tail of the base-view video stream 800.

FIG. 8 also shows the structure of the VAU#1 832 located at the top of each video sequence in the dependent-view video stream. The VAU#1 832 includes a sub-sequence header 832B, a picture header 832C, supplementary data 832D, and compressed picture data 832E. The second VAU#2 and subsequent VAUs have a similar structure to the VAU#1 832 with the exception of not including the sub-sequence header 832B. The sub-sequence header 832B includes an identification number of the video sequence #1 including the VAU#1 832. The sub-sequence header 832B further includes information shared by the whole GOP 810, e.g. the resolution, frame rate, aspect ratio, and bit rate. In particular, these values are the same as the values set for the GOP corresponding to the base-view stream, that is, the value indicated in the sequence header 831B of the VAU#1 831. The picture header 832C indicates a unique identification number, an identification number of the video sequence #1, and information necessary for decoding the picture, for example, the type of encoding method. The supplementary data 832D includes additional information regarding matters other than the decoding of the picture, for example closed caption text information, information pertaining to the GOP structure, and time code information. In particular, the supplementary data 832D includes decoding switch information, described later. The compressed picture data 832E includes base-view pictures. Additionally, the VAU#1 932 may include one or more, or all of, padding data 832F, a sequence end code 832G, and a stream end code 832H, as necessary. The padding data 832F is dummy data. By adjusting the size according to the size of the compressed picture data 832E, the bit rate of the VAU#1 832 can be maintained at a predetermined value. The sequence end code 832G indicates that the VAU#1 832 is at the tail of the video sequence #1. The stream end code 832H indicates the tail of the base-view video stream 800.

The actual content of each element in the VAUs varies according to the encoding method for the video stream 800. For example, when the encoding method is MPEG-4 AVC, each element of the VAUs shown in FIG. 8 are comprised of one Network Abstraction Layer (NAL) unit. Specifically, the AU identification code 831A, sequence header 831B, picture header 831C, supplementary data 831D, compressed picture data 831E, padding data 831F, sequence end code 831G, and stream end code 831H respectively correspond to an Access Unit Delimiter (AU delimiter), sequence parameter set (SPS), picture parameter set (PPS), supplemental enhancement information (SEI), view component, filler data, end of sequence, and end of stream.

FIG. 9 is a schematic diagram showing details on the method for storing the video stream 901 into a PES packet sequence 902. This storing method is shared by the base-view video stream and the dependent-view video stream. As shown in FIG. 9, in the actual video stream 901, pictures are multiplexed in the order of encoding, not in the order of presentation time. For example, as shown in FIG. 9, in each VAU in the base-view video stream, I₀ picture 910, P₃ picture 911, B₁ picture 912, B₂ picture 913, . . . are stored in order from the top. The subscripted number indicates the sequential number allotted to each picture in the order of presentation time. The I₀ picture 910 is used as a reference picture for encoding the $P_3$ picture 911, and the $I_0$ picture 910 and the $P_3$ picture 911 are used as reference pictures for encoding the $B_1$ picture 912 and $B_2$ picture 913. Each of these VAUs is stored as a different PES packet 920, 921, 922, 923, . . . , and each PES packet 920, . . . includes a PES payload 920P and a PES header 920H. VAUs are stored in a PES payload 920P. PES headers 920H include a presentation time, that is, a presentation time-stamp (PTS), and a decoding time, that is, a decoding time-stamp (DTS), for the picture stored in the PES payload 920P in the same PES packet 920.

As with the video stream 901 shown in FIG. 9, the other elementary streams shown in FIGS. 3 and 4 are stored in PES payloads in a sequence of PES packets. Furthermore, the PES header in each PES packet includes the PTS for the data stored in the PES payload for the PES packet.

Figure 10:
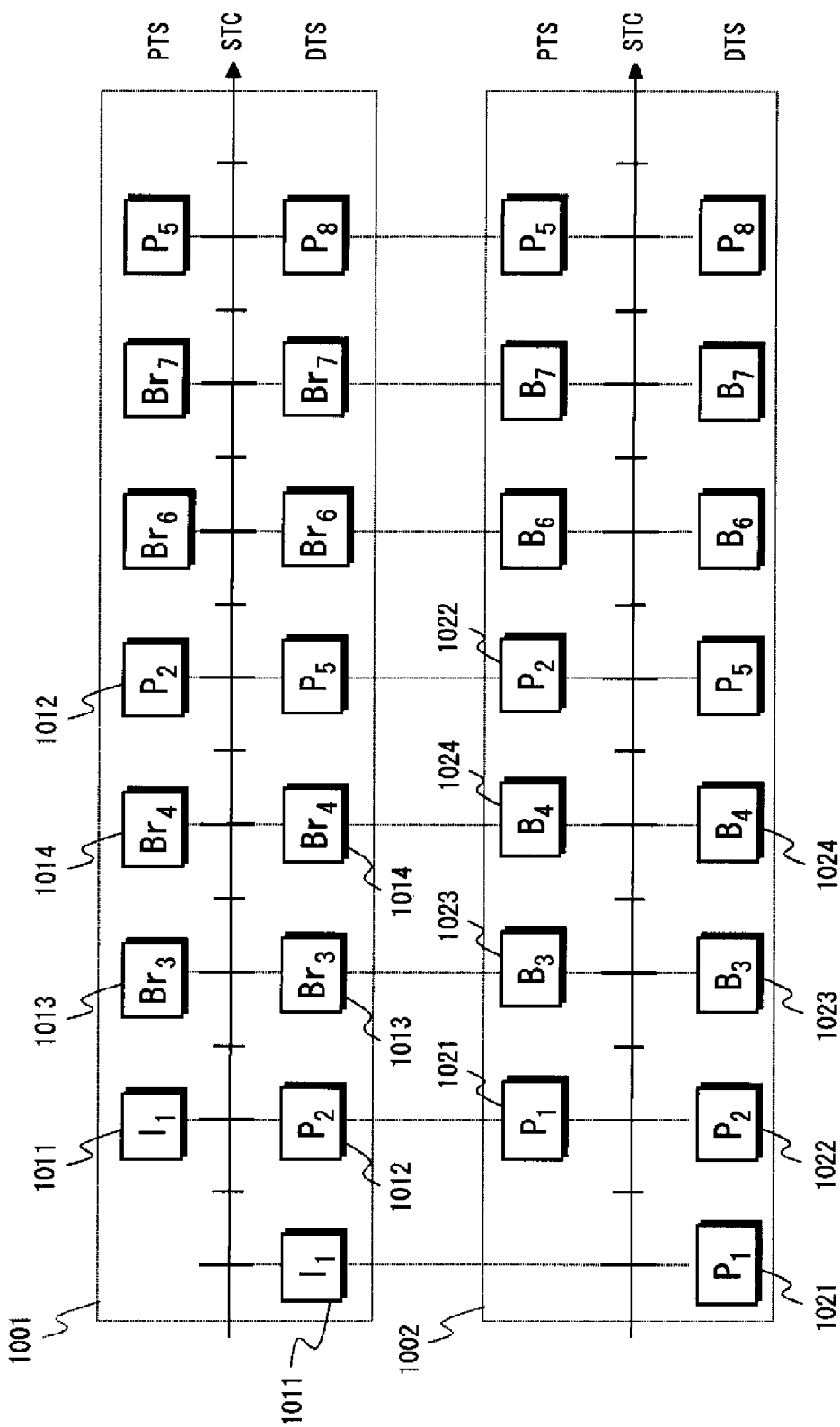
FIG. 10 is a schematic diagram showing the relationship between the PTSs and DTSs assigned to each picture in the base-view video stream 1001 and in the dependent-view video stream 1002.

FIG. 10 is a schematic diagram showing the relationship between the PTS and DTS assigned to each picture in the base-view video stream 1001 and in the dependent-view video stream 1002. As shown in FIG. 10, between the video streams 1001 and 1002, the same PTSs and DTSs are assigned to a pair of pictures representing the same frame or field in a 3D video image. For example, the top frame or field in the 3D video image is rendered from a combination of $I_1$ picture 1011 in the base-view video stream 1001 and $P_1$ picture 1021 in the dependent-view video stream 1002. Accordingly, the PTS and DTS for these two pictures 1011 and 1021 are the same. The subscripted numbers indicate the sequential number allotted to each picture in the order of DTSs. Also, when the dependent-view video stream 1002 is a depth map stream, $P_1$ picture 1021 is replaced by an I picture representing a depth map for the $I_1$ picture 1011. Similarly, the PTS and DTS for the pair of second pictures in the video streams 1001 and 1002, i.e. $P_2$ pictures 1012 and 1022, are the same. The PTS and DTS are both the same for the pair of third pictures in the video streams 1001 and 1002, i.e. $Br_3$ picture 1013 and $B_3$ picture 1023. The same is also true for the pair $Br_4$ picture 1014 and $B_4$ picture 1024.

A pair of VAUs that include pictures for which the PTS and DTS are the same between the base-view video stream 1001 and the dependent-view video stream 1002 is called a "3D VAU". Using the allocation of PTSs and DTSs shown in FIG. 10, it is easy to cause the decoder in the playback device 102 in 3D mode to process the base-view video stream 1001 and the dependent-view video stream 1302 in parallel in units of 3D VAUs. In this way, the decoder definitely processes a pair of pictures representing the same frame or field in a 3D video image in parallel. Furthermore, the sequence header in the 3D VAU at the top of each GOP includes the same resolution, the same frame rate, and the same aspect ratio. In particular, this frame rate is equal to the value when the base-view video stream 1001 is decoded independently in 2D playback mode.

Figure 11:
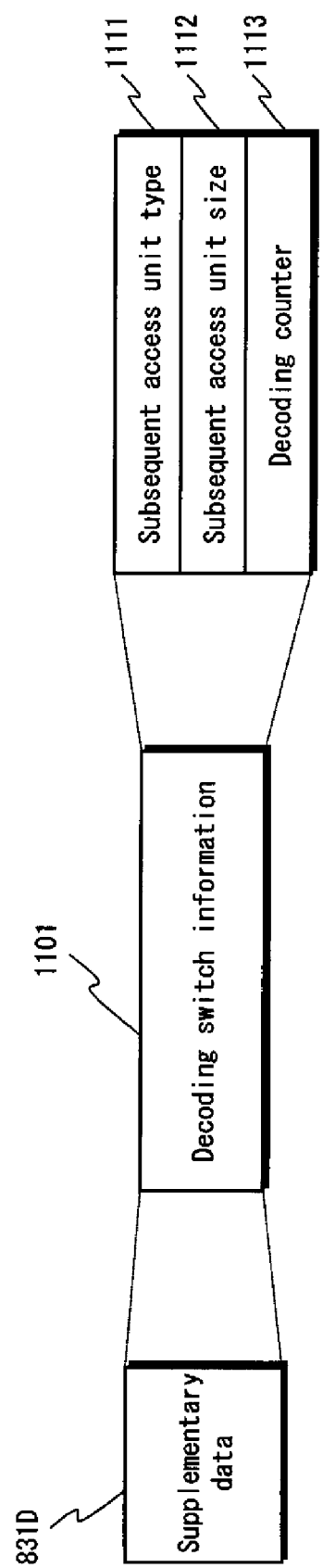
FIG. 11 is a schematic diagram showing the data structure of supplementary data 831D shown in FIG. 8.

FIG. 11 is a schematic diagram showing the data structure of supplementary data 831D shown in FIG. 8. Supplementary data 831D corresponds to a type of NAL unit, "SEI", in particular in MPEG-4 AVC. As shown in FIG. 11, supplementary data 831D includes decoding switch information 1101. The decoding switch information 1101 is included in each VAU in both the base-view video stream and the dependent-view video stream. The decoding switch information 1101 is information to cause the decoder in the playback device 102 to easily specify the next VAU to decode. As described below, the decoder alternately decodes the base-view video stream and the dependent-view video stream in units of VAUs. At that time, the decoder generally specifies the next VAU to be decoded in alignment with the time shown by the DTS assigned to each VAU. Many types of decoders, however, continue to decode VAUs in order, ignoring the DTS. For such decoders, it is preferable for each VAU to include decoding switch information 1101 in addition to a DTS.

As shown in FIG. 11, decoding switch information 1101 includes a subsequent access unit type 1111, subsequent access unit size 1112, and decoding counter 1113. The subsequent access unit type 1111 indicates whether the next VAU to be decoded belongs to a base-view video stream or a dependent-view video stream. For example, when the value of the subsequent access unit type 1111 is "1", the next VAU to be decoded belongs to a base-view video stream, and when the value of the subsequent access unit type 1111 is "2", the next VAU to be decoded belongs to a dependent-view video stream. When the value of the subsequent access unit type 1111 is "0", the current VAU is located at the top of the stream targeted for decoding, and the next VAU to be decoded does not exist. The subsequent access unit size 1112 indicates the size of the next VAU that is to be decoded. By referring to the subsequent access unit size 1112, the decoder in the playback device 102 can specify the size of a VAU without analyzing its actual structure. Accordingly, the decoder can easily extract VAUs from the buffer. The decode counter 1113 shows the decoding order of the VAU to which it belongs. The order is counted from a VAU that includes an I picture in the base-view video stream.

Figure 12A:
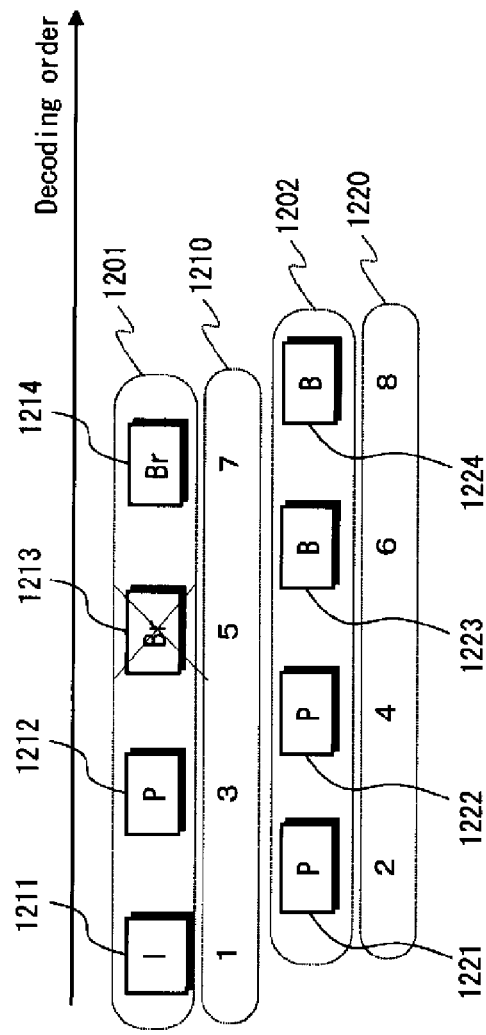
FIGS. 12A and 12B are schematic diagrams showing two different examples of decoding counters assigned to each picture in the base-view video stream 1201 and in the dependent-view video stream 1202.

FIG. 12A is a schematic diagram showing an example of decoding counters, 1210 and 1220, assigned to each picture in the base-view video stream 1201 and in the dependent-view video stream 1202. As shown in FIG. 12A, the decode counters 1210 and 1220 are incremented alternately between the two video streams 1201 and 1202. For example, for VAU 1211 that includes an I picture in the base-view video stream 1201, a value of "1" is assigned to the decode counter 1210. Next, a value of "2" is assigned to the decode counter 1220 for the VAU 1221 that includes the next P picture to be decoded in the dependent-view video stream 1202. Furthermore, a value of "3" is assigned to the decode counter 1210 for the VAU 1212 that includes the next P picture to be decoded in the base-view video stream 1201. By assigning values in this way, even when the decoder in the playback device 102 fails to read one of the VAUs due to some error, the decoder can immediately specify the missing picture using the decode counters 1210 and 1220. Accordingly, the decoder can perform error processing appropriately and promptly.

In the example shown in FIG. 12A, an error occurs during the reading of the third VAU 1213 in the base-view video stream 1201, and the Br picture is missing. During decoding processing of the P picture contained in the second VAU 1222 in the dependent-view video stream 1202, however, the decoder has read the decode counter 1220 for this VAU 1222 and retained the value. Accordingly, the decoder can predict the decode counter 1210 for the next VAU to be processed. Specifically, the decode counter 1220 in the VAU 1222 that includes the P picture is "4". Therefore, the decode counter 1210 for the next VAU to be read can be predicted to be "5". The next VAU that is actually read, however, is the fourth VAU 1219 in the base-view video stream 1201, whose decode counter 1210 is "7". The decoder thus detects that it failed to read a VAU. Accordingly, the decoder can execute the following processing: "skip decoding processing of the B picture extracted from the third VAU 1223 in the dependent-view video stream 1202, since the Br picture to be used as a reference is missing". In this way, the decoder checks the decode counters 1210 and 1220 during each decoding process. Consequently, the decoder can promptly detect errors during reading of VAUs and can promptly execute appropriate error processing. As a result, the decoder can prevent noise from contaminating the playback video.

Figure 12B:
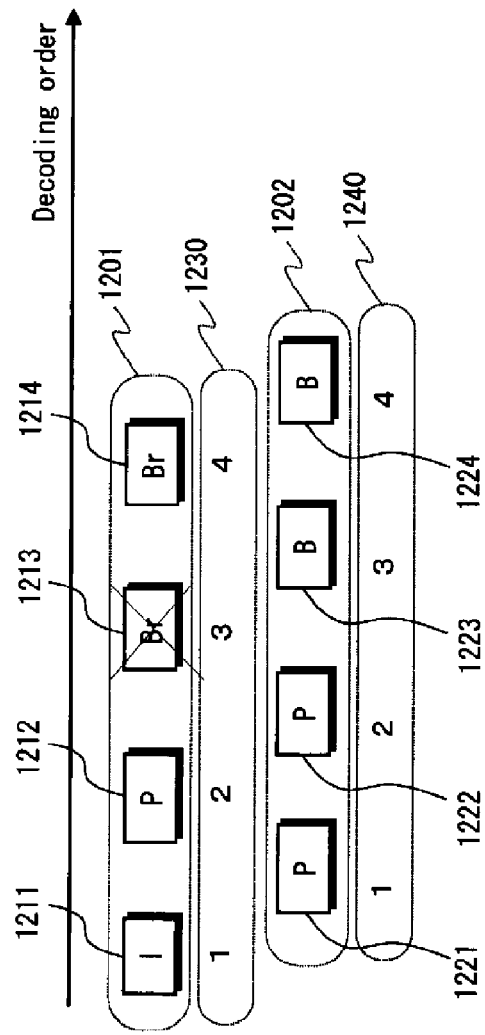

FIG. 12B is a schematic diagram showing another example of decoding counters, 1230 and 1240, assigned to each picture in the base-view video stream 1201 and in the dependent-view video stream 1202. As shown in FIG. 12B, decode counters 1230 and 1240 are incremented separately in the video streams 1201 and 1202. Therefore, the decode counters 1230 and 1240 are the same for a pair of pictures in the same 3D VAU. In this case, when the decoder has decoded a VAU in the base-view video stream 1201, it can predict that "the decode counter 1230 is the same as the decode counter 1240 for the next VAU to be decoded in the dependent-view video stream 1202". Conversely, when the decoder has decoded a VAU in the dependent-view video stream 1202, it can predict that "the decode counter 1230 for the next VAU to be decoded in the base-view video stream 1201 is the same as the decode counter 1240 plus one". Accordingly, at any point in time, the decoder can promptly detect an error in reading a VAU using the decode counters 1230 and 1240 and can promptly execute appropriate error processing. As a result, the decoder can prevent noise from contaminating the playback video.

<<Interleaved Arrangement of Multiplexed Stream Data>>

For seamless playback of 3D video images, the physical arrangement of the base-view video stream and dependent-view video stream on the BD-ROM disc 101 is important. This "seamless playback" refers to playing back video and audio from multiplexed stream data without interruption.

Figure 13:
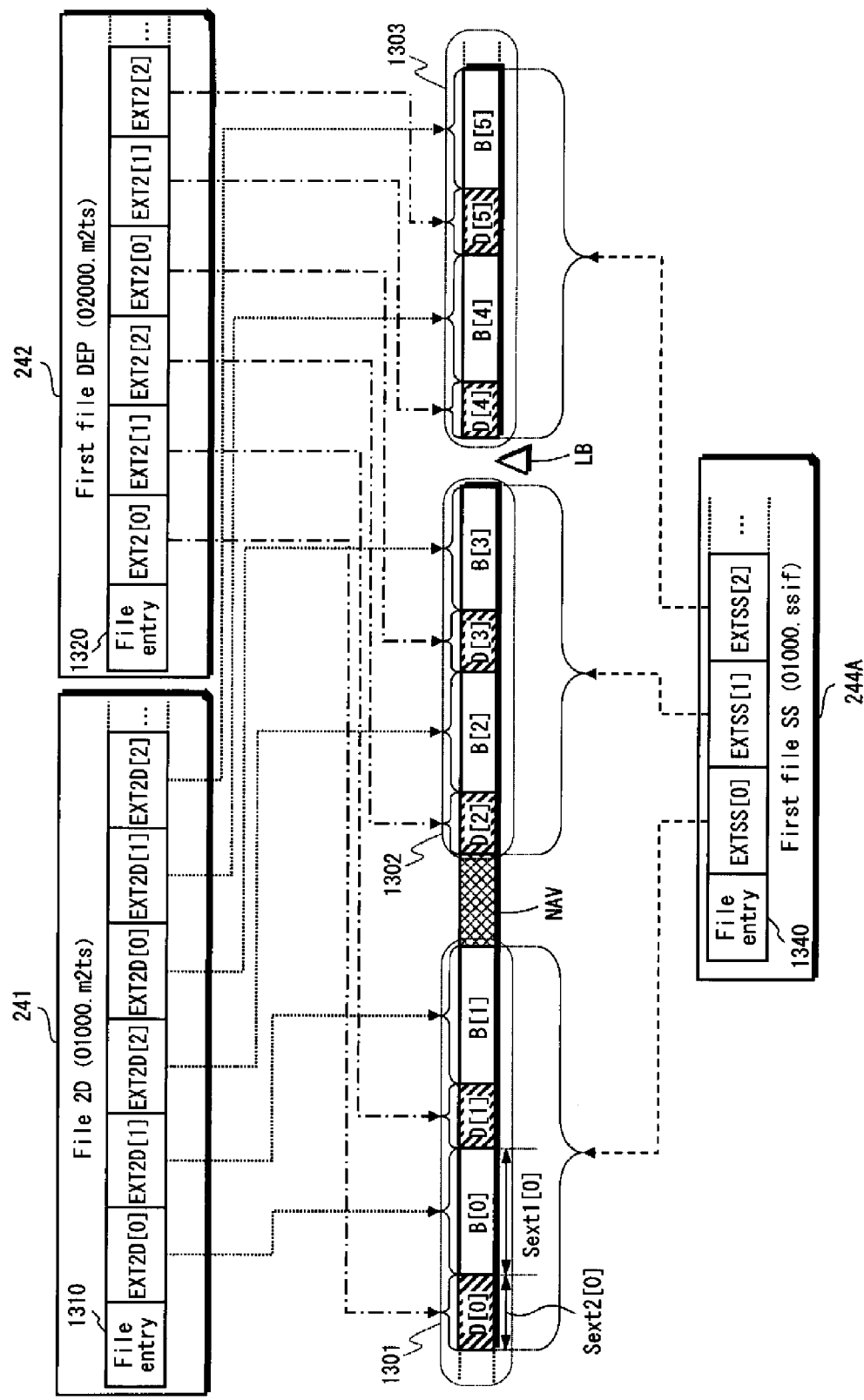
FIG. 13 is a schematic diagram showing the physical arrangement on the BD-ROM disc 101 of each of the main TS, first sub-TS, and second sub-TS shown in FIG. 3.

FIG. 13 is a schematic diagram showing the physical arrangement on the BD-ROM disc 101 of data block groups belonging to one of the main TS, first sub-TS, and second sub-TS shown in FIG. 3. As shown in FIG. 13, each TS is arranged on the BD-ROM disc 101 so as to be divided into a plurality of data blocks D[n], B[n], (n=0, 1, 2, 3, . . . ). A "data block" refers to a sequence of data recorded on a contiguous area on the BD-ROM disc 101, i.e. a plurality of physically contiguous sectors. Since physical addresses and logical addresses on the BD-ROM disc 101 are substantially the same, the LBNs within each data block are also continuous. Accordingly, the BD-ROM drive 121 can continuously read a data block without causing the optical pickup to perform a seek. Hereinafter, data blocks B[n] belonging to a main TS are referred to as "base-view data blocks", and data blocks D[n] belonging to a sub-TS are referred to as "dependent-view data blocks". In particular, the data blocks belonging to the first sub-TS are referred to as "right-view data blocks", and the data blocks belonging to the second sub-TS are referred to as "depth map data blocks".

In the file system on the BD-ROM disc 101, each data block B[n] and D[n] can be accessed as one extent in the files 2D or the files DEP. In other words, the logical address for each data block can be known from the file entry of a file 2D or a file DEP (see <Supplementary Explanation> for details).

In the example shown in FIG. 13, the file entry 1310 in the file 2D (01000.m2ts) 241 indicates the sizes of the base-view data blocks B[n] and the LBNs of their tops. Accordingly, the base-view data blocks B[n] can be accessed as an extent EXT2D[n] in the file 2D 241. Hereinafter, the extents EXT2D[n] belonging to the file 2D 241 are referred to as "2D extents". Meanwhile, the file entry 1320 of the first file DEP (02000.m2ts) 242 indicates the sizes of the dependent-view data blocks D[n] and the LBNs of their tops. Accordingly, the dependent-view data blocks D[n] are right view data blocks, and can be accessed as an extent EXT2[n] of the first file DEP 242. Hereinafter, the extent EXT2[n] belonging to the first file DEP 242 is referred to as a "right-view extent". Similarly to a case when the dependent-view data blocks D[n] are depth map data blocks, each depth map data block can be accessed as an extent of the second file DEP (03000.m2ts) 243. Hereinafter, an extent belonging to the second file DEP 243 is referred to as a "depth map extent". Furthermore, an extent belonging to one of the files DEP is generally called a "dependent-view extent", similarly to the case of the right view extents and the depth map extents.

As shown in FIG. 13, a data block group is recorded continuously along a track on the BD-ROM disc 101. Furthermore, the base-view data blocks B[n] and the dependent-view data blocks D[n] are arranged alternately one by one. This type of arrangement of data blocks is referred to as "interleaved arrangement". In particular, one series of data blocks recorded in an interleaved arrangement is referred to as an "extent block". Three extent blocks 12351302, and 1303 are shown in FIG. 13. As shown between the extent blocks 1301 and 1302 in FIG. 13, the extent blocks are separated by a storage area for data NAV other than multiplexed stream data that exists between the extent blocks. Also, when the BD-ROM disc 101 is a multi-layer disc, in other words, when the BD-ROM disc 101 includes a plurality of recording layers, the extent blocks are also separated by a layer boundary LB between the recording layers, as in the extent blocks 1302 and 1303 in FIG. 13. In this way, one series of multiplexed stream data is generally arranged so as to be divided into a plurality of extent blocks. In this case, for the playback device 102 to seamlessly play back video images from the multiplexed stream data, it is necessary for video images to be played back from the extent blocks to be seamlessly connected. Hereinafter, processing required by the playback device 102 for that purpose is referred to as "seamless connection between extent blocks".

In the extent blocks 1301-1303 according to embodiment 1 of the present invention, the number is the same between the two types of data blocks D[n] and B[n]. Furthermore, the extent ATC time is the same between an $n^{th}$ contiguous data block pair D[n] and B[n]. In this context, an "Arrival Time Clock (ATC)" refers to a clock that acts as a standard for an ATS. Also, the "extent ATC time" is defined by the value of the ATC and represents the range of the ATS assigned to source packets in an extent, i.e. the time interval from the ATS of the source packet at the top of the extent to the ATS of the source packet at the top of the next extent. In other words, the extent ATC time is the same as the time required to transfer all of the source packets in the extent from the read buffer in the playback device 102 to the system target decoder. The "read buffer" is a buffer memory in the playback device 102 where data blocks read from the BD-ROM disc 101 are temporarily stored before being transmitted to the system target decoder. The details of the read buffer are described later. In the example shown in FIG. 13, since three extent blocks 1301 to 1303 are connected together seamlessly, the extent ATC times are the same between the data block pairs D[n], B[n] (n=0, 1, 2, . . . ).

The VAUs located at the top of contiguous data blocks D[n] and B[n] belong to the same 3D VAU, and in particular include the top picture of the GOP representing the same 3D video image. For example, in FIG. 13, the top of the right-view data block D[n] includes a P picture for the right-view video stream, and the top of the base-view data block B[n] includes an I picture for the base-view video stream. The P picture for the right-view video stream represents the right-view when the 2D video image represented by the I picture in the base-view video stream is used as the left-view. In particular, the P picture, as shown in FIG. 6, is compressed using the I picture for the base-view video stream as a reference picture. Accordingly, the playback device 102 in 3D playback mode can start playback of 3D video images from any pair of data blocks D[n] and B[n]. That is to say, processing that requires random access of video streams, such as seeking playback, is possible.

Furthermore, in the interleaved arrangement according to embodiment 1 of the present invention, among pairs D[n] and B[n] of contiguous data blocks, dependent-view data blocks D[n] are positioned before the base-view data blocks B[n]. This is due to the fact that the amount of data is smaller in the dependent-view data block D[n] than the base-view data block B[n], that is, the bit rate is lower. For example, in FIG. 13, the picture included in the $n^{th}$ right view data block D[n] is compressed using the picture included in the $n^{th}$ base-view data block B[n] as a reference picture, as shown in FIG. 6. Accordingly, the size $S_{ext2}[h]$ of the right-view data block D[n] is equal to or less than the size $S_{ext1}[n]$ of the base-view data block B[n]: $S_{ext2}[n] \leqq S_{ext1}[n]$. On the other hand, the amount of data per pixel in the depth map, i.e. the number of bits of the depth value, is in general smaller than the amount of data per pixel of the base-view picture, i.e. the sum of the number of bits of the chromatic coordinate value and the α value (opacity). Furthermore, as shown in FIGS. 3A and 3C, unlike the second sub-TS, the main TS includes other elementary streams, such as a primary audio stream, in addition to the primary video stream. Therefore, the size of the depth map data block, $S_{ext3}[n]$, is less than or equal to the size of the base-view data block B[n], $S_{ext1}[n]:S_{ext3}[n] \leqq S_{ext1}[n]$.

<<Significance of Dividing Multiplexed Stream Data into Data Blocks>>

In order to play 3D video images back seamlessly from the BD-ROM disc 101, the playback device 102 has to process the main TS and sub-TS in parallel. The read buffer capacity usable in such processing, however, is generally limited. In particular, there is a limit to the amount of data that can be continuously read into the read buffer from the BD-ROM disc 101. Accordingly, the playback device 102 has to read sections of the main TS and sub-TS with the same extent ATC time by dividing the sections.

Figure 14:
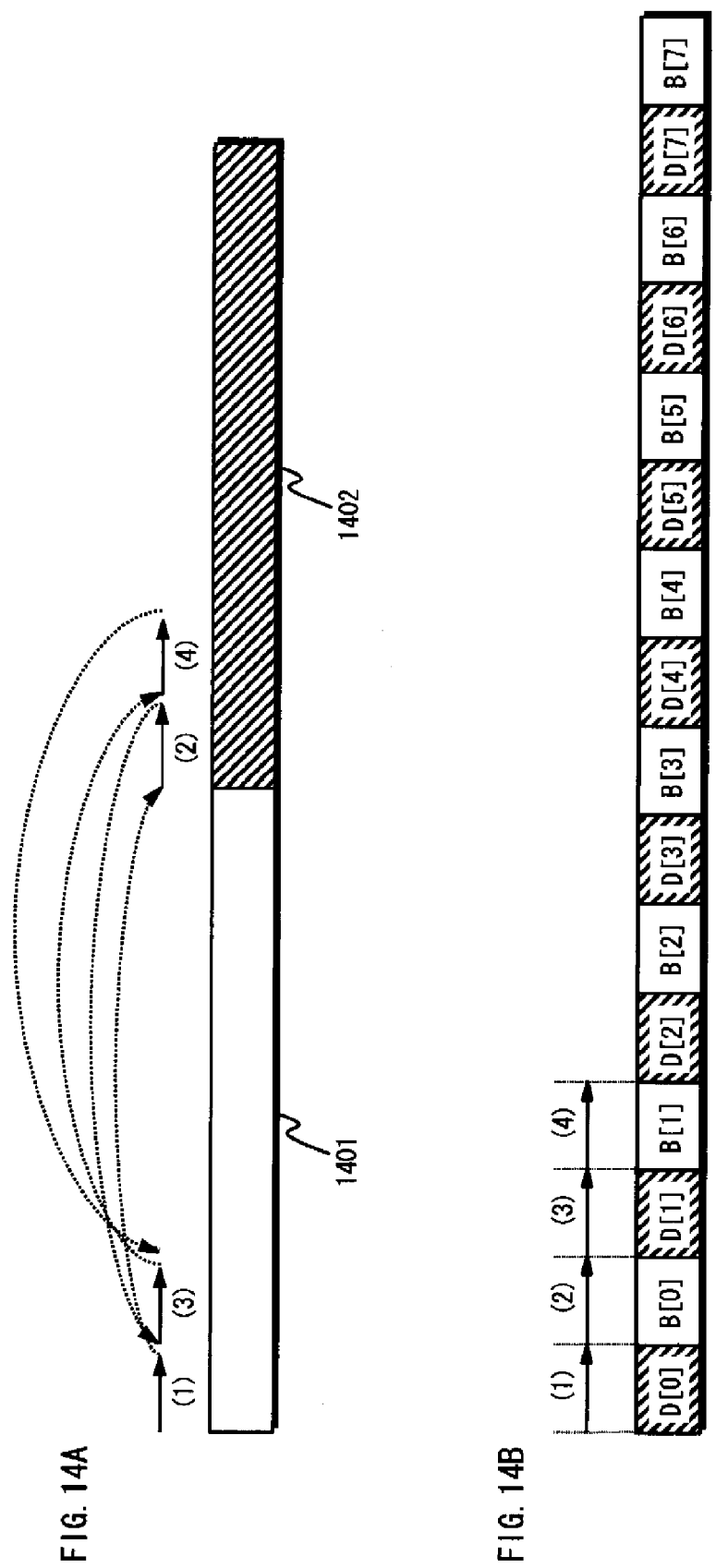
FIG. 14A is a schematic diagram showing the arrangement of a main TS 1401 and a sub-TS 1402 recorded separately and consecutively on a BD-ROM disc.
FIG. 14B is a schematic diagram showing the interleaved arrangement of the dependent-view data blocks D[0], D[1], D[2], ... and the base-view data blocks B[0], B[1], B[2], ... recorded on the BD-ROM disc 101 according to embodiment 1 of the present invention.

FIG. 14A is a schematic diagram showing the arrangement of the main TS 1401 and sub-TS 1402 recorded separately and consecutively on a BD-ROM disc. When the playback device 102 processes the main TS 1401 and sub-TS 1402 in parallel, as shown by the arrows (1)-(4) on the solid lines in FIG. 14A, the BD-ROM drive 121 alternately reads sections of the main TS 1401 and the sub-TS 1402 that have the same extent ATC time. At this time, as shown by the arrows in the dashed lines in FIG. 14A, during read processing the BD-ROM drive 121 has to make a large change in the area to be read on the BD-ROM disc. For example, after the top section of the main TS 1401 shown by arrow (1) is read, the BD-ROM drive 121 temporarily stops the read operation by the optical pickup and increases the rotation speed of the BD-ROM disc. In this way, the BD-ROM drive 121 rapidly moves the sector on the BD-ROM disc on which the top section of the sub-TS 1402 shown by arrow (2) is recorded to the position of the optical pickup. This operation to temporarily stop reading by the optical pickup and, while reading is stopped, position the optical pickup above the next area to be read is referred to as a "jump". The dashed lines with an arrow shown in FIG. 14A indicate the range of the jumps necessary during read processing. During each jump period, read processing by the optical pickup stops, and only decoding processing by the decoder progresses. Since the jump is excessive in the example shown in FIG. 14A, it is difficult to cause read processing to keep up with decoding processing. As a result, it is difficult to stably maintain seamless playback.

FIG. 14B is a schematic diagram showing the arrangement of dependent-view data blocks D[0], D[1], D[2], . . . and base-view data blocks B[0], B[1], B[2], recorded alternately on a BD-ROM disc 101 according to embodiment 1 of the present invention. As shown in FIG. 14B, the main TS and sub-TS are divided into a plurality of data blocks and are arranged alternately. In this case, during playback of 3D video images, the playback device 102 reads data blocks D[0], B[0], D[1], B[1] . . . in order from the top, as shown by arrows (1)-(4) in FIG. 14B. By simply reading these data blocks in order, the playback device 102 can smoothly read the main TS and sub-TS alternately. In particular, since no jump occurs during read processing, seamless playback of 3D video images can be stably maintained.

[Significance of Providing Contiguous Data Blocks with the Same Extent ATC Time]

FIG. 15A is a schematic diagram showing different examples of ATC times for each extent in a dependent-view block group D[n] and a base-view data block group B[n] (n=0, 1, 2) recorded in an interleaved arrangement. As shown in FIG. 15A, the extent ATC time is the same in each pair between the dependent-view data block D[n] and the immediately subsequent base-view data block B[n]. For example, the extent ATC time is equal to one second for each of D[0] and B[0] in the top data block pair. Accordingly, when the data blocks D[0] and B[0] are read by the read buffer in the playback device 102, all of the TS packets therein are sent from the read buffer to the system target decoder in the same one-second interval. Similarly, since the extent ATC time is equal to 0.7 seconds for each of D[1] and B[1] in the second data block pair, all of the TS packets in each data block are transmitted from the read buffer to the system target decoder in the same 0.7-second interval.

FIG. 15B is a schematic diagram showing different examples of ATC times for each extent in a dependent-view block group D[n] and a base-view data block group B[n] recorded in an interleaved arrangement. As shown in FIG. 15B, the extent ATC times in all of the data blocks D[n] and B[n] are equal to one second. Accordingly, in the same one-second interval in which any of the data blocks D[n] and B[n] are read by the read buffer in the playback device 102, all of the TS packets in each of those data blocks are transmitted from the read buffer to the system target decoder.

As described above, the compression rate of the dependent-view data blocks is higher than the compression rate of the base-view data blocks. Accordingly, decoding processing of the dependent-view data blocks is generally slower than decoding processing of the base-view data blocks. On the other hand, when the extent ATC times are equal, the dependent-view data blocks have a smaller amount of data than the base-view data blocks. Therefore, when the extent ATC times are the same between contiguous data blocks as in FIGS. 15A and 15B, the speed at which the data to be decoded is provided to the system target decoder can easily be maintained uniformly with the speed of processing by the decoder. In other words, the system target decoder facilitates synchronization between the decoding processing of the base-view data blocks and the decoding processing of the dependent-view data blocks, particularly in seeking playback.

[Significance of Placing Smaller-Data-Amount Data Blocks First]

When reading a data block located at the top or at the playback start position of each extent block 1301-1303, the playback device 102 in 3D playback mode first reads the entirety of the data block into the read buffer. The data block is not transferred to the system target decoder during that period. After finishing reading the data block, the playback device 102 transfers the data block to the system target decoder in parallel with the next data block. This processing is called "pre-loading".

The technical significance of pre-loading is as follows. First, in L/R mode, base-view data blocks are necessary for decoding the dependent-view data blocks. Therefore, to maintain the buffer at the minimum necessary capacity for storing the decoded data until output processing, it is preferable to simultaneously provide the data blocks to the system target decoder to be decoded. On the other hand, in depth mode, processing is necessary to generate a pair of video planes representing parallax images from a pair of a decoded base-view picture and a decoded depth-map picture. Accordingly, to maintain the buffer at the minimum necessary capacity for storing the decoded data until this processing, it is preferable to provide the base-view data blocks simultaneously with the depth-map data blocks to the system target decoder to be decoded. Therefore, pre-loading causes the entirety of the data block at the top of an extent block or at the playback start position to be read into the read buffer in advance. This enables the data block and the following data block to be transferred simultaneously from the read buffer to the system target decoder and decoded. Furthermore, the subsequent pairs of data blocks can also be simultaneously decoded by the system target decoder.

When pre-loading, the entirety of the data block that is read first is stored in the read buffer. Accordingly, the read buffer requires at least a capacity equal to the size of the data block. To maintain the capacity of the read buffer at a minimum, the size of the data block to be pre-loaded should be as small as possible. Meanwhile, for random access playback, etc., any pair of data blocks may be selected as the playback start position. For this reason, the data block having the smallest data amount is placed first in each pair of the data blocks. This enables the minimum capacity to be maintained in the read buffer.

<<Cross-Linking of AV Stream Files to Data Blocks>>

For the data block group shown in FIG. 13, the AV stream files are cross-linked as follows. The file entry 1340 of the first file SS (01000.ssif) 244A considers each extent block 1301-1303 to each be one extent, indicating the size of each and the LBN of the top thereof. Accordingly, the extent blocks 1301-1303 can be accessed as the extents EXTSS[0], EXTSS[1], and EXTSS[2] of the first file SS 244A. Hereinafter, the extents EXTSS[0], EXTSS[1], and EXTSS[2] belonging to the first file SS 244A are referred to as the "SS extents". Each of the SS extents EXTSS[0], EXTSS[1], and EXTSS[2] share the base-view data blocks B[n] with the file 2D 242, and share the right view data blocks D[n] with the first file DEP 242.

<<Playback Path for Extent Blocks>>

Figure 16:
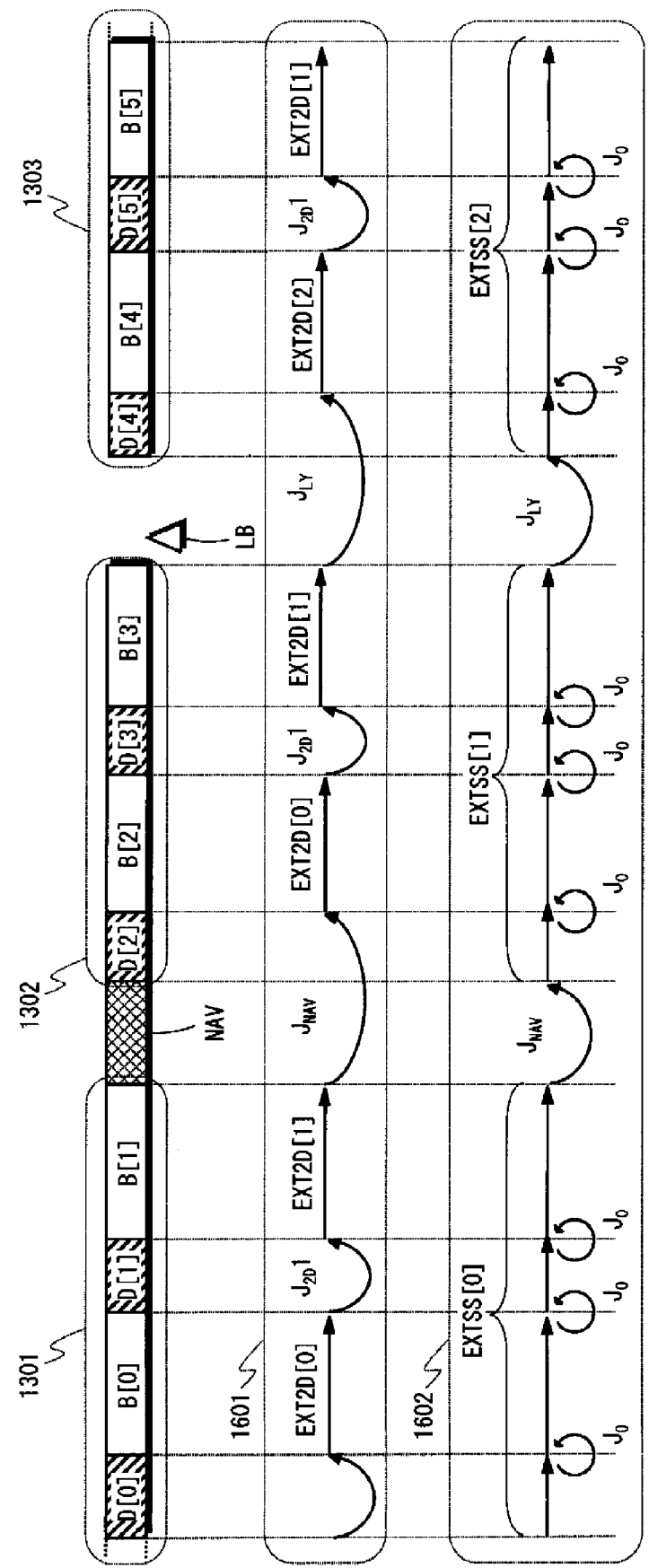
FIG. 16 is a schematic diagram showing a playback path 1601 for extent blocks 1301-1303 in 2D playback mode and a playback path 1602 for extent blocks 1301-1303 in L/R mode.

FIG. 16 is a schematic diagram showing a playback path 1601 for extent blocks 1301-1303 in 2D playback mode. The playback device 102 in 2D playback mode plays back the file 2D 241. Accordingly, as indicated by the playback path 1601 in 2D playback mode, the base-view data blocks B[n] (n=0, 1, 2, . . . ) are read in order from the extent blocks 1301-1303 as 2D extents EXT2D[0], EXT2D[1], and EXT2D[2]. Specifically, first, the top base-view data block B[0] is read from the top extent block 1301, then reading of the immediately subsequent right-view data block D[0] is skipped by a first jump $J_{2D}1$. Next, the second base-view data block B[1] is read, and then reading of the immediately subsequent data NAV and right-view data block D[1] is skipped by a second jump $J_{NAV}$. Subsequently, reading of the base-view data blocks and jumps are repeated similarly in the second and subsequent extent blocks 1302 and 1303.

A jump $J_{LY}$ occurring between the second extent block 1302 and the third extent block 1303 is a long jump across the layer boundary LB. A "long jump" is a collective term for jumps with a long seek time and specifically refers to a jump distance that exceeds a predetermined threshold value. "Jump distance" refers to the length of the area on the BD-ROM disc 101 whose reading is skipped during a jump period. Jump distance is normally expressed as the number of sectors of the corresponding section. The threshold value used to define a long jump is specified, for example, as 2220 sectors in the BD-ROM standard. This threshold value, however, depends on the type of BD-ROM disc and on the BD-ROM drive's read processing capability. Long jumps particularly include focus jumps and track jumps. A "focus jump" is a jump caused by switching recording layers, and includes processing to change the focus distance of the optical pickup. A "track jump" includes processing to move the optical pickup in a radial direction along the BD-ROM disc 101.

FIG. 16 is a schematic diagram showing a playback path 1602 for extent blocks 1301-1303 in L/R mode. The playback device 102 in L/R mode plays back the first file SS 244. Accordingly, as indicated by the playback path 1602 in L/R mode, the extent blocks 1301-1303 are read in order as the SS extents EXTSS[0], EXTSS[1], and EXTSS[2]. Specifically, first, the data blocks D[0], B[0], D[1] and B[1] are sequentially read from the top extent block 1301, then reading of the immediately subsequent data NAV is skipped by a first jump $J_{NAV}$. Next, the data blocks D[2], . . . , B[3] are sequentially read from the second extent block 1302. Immediately thereafter, a long jump $J_{LY}$ occurs at the same time as switching the recording layer, and next, the data blocks D[4], B[4], . . . are sequentially read from the third extent block 1303.

When reading the extent blocks 1301-1303 as extents of the first file SS 244A, the playback device 102 reads the top LBN of the SS extents EXTSS[0], EXTSS[1], . . . and the size thereof, and then outputs the LBNs and sizes to the BD-ROM drive 121. The BD-ROM drive 121 continuously reads data having the input size from the input LBN. In such processing, control of the BD-ROM drive 121 is easier than processing to read the data block groups as the extents in the first file DEP 242 and the file 2D 241 for the following reasons (A) and (B): (A) the playback device 102 may refer in order to extents using a file entry in one location, and (B) since the total number of extents to be read substantially halves, the total number of pairs of an LBN and a size that need to be output to the BD-ROM drive 121 halves. However, after the playback device 102 has read the 3D SS extents EXTSS[0], EXTSS[1], . . . , it needs to separate each into a right-view data block and a base-view data block and output them to the decoder. The clip information file is used for this separation processing. Details are provided below.

As shown in FIG. 13, when actually reading the extent blocks 1301-1303, the BD-ROM drive 121 performs a zero sector transition $J_0$ in the time from the top of a data block to the top of the next data block. A "zero sector transition" is a movement of the optical pickup between two consecutive data blocks. During a period in which a zero sector transition is performed (hereinafter referred to as a "zero sector transition period"), the optical pickup head temporarily suspends its read operation and waits. In this sense, the zero sector transition is considered "a jump in which the jump distance is equal to 0 sectors". The length of the zero sector transition period, that is, the zero sector transition time period, may include, in addition to the time for shifting the position of the optical pickup head via revolution of the BD-ROM disc 101, overhead caused by error correction processing. "Overhead caused by error correction processing" refers to excess time caused by performing error correction processing twice using an ECC block when the boundary between ECC blocks does not match the boundary between two data blocks. A whole ECC block is necessary for error correction processing. Accordingly, when two consecutive data blocks share a single ECC block, the whole ECC block is read and used for error correction processing during reading of either data block. As a result, each time one of these data blocks is read, a maximum of 32 sectors of excess data is additionally read. The overhead caused by error correction processing is assessed as the total time for reading the excess data, i.e. 32 sectors×2,048 bytes×8 bits/byte×2 instances/read rate. Note that by configuring each data block in ECC block units, the overhead caused by error correction processing may be removed from the zero sector transition time.

<<Sizes of Data Blocks and Extent Blocks>>

As shown in FIG. 13, to seamlessly play back any of 2D images and 3D images from a plurality of extent blocks 1301-1303 arranged separately from each other, the sizes of the data blocks and the extent blocks 1301-1303 are required to satisfy the following conditions based on the capability of the playback device 102.

[Condition Based on 2D Playback Mode Capability]

Figure 17:
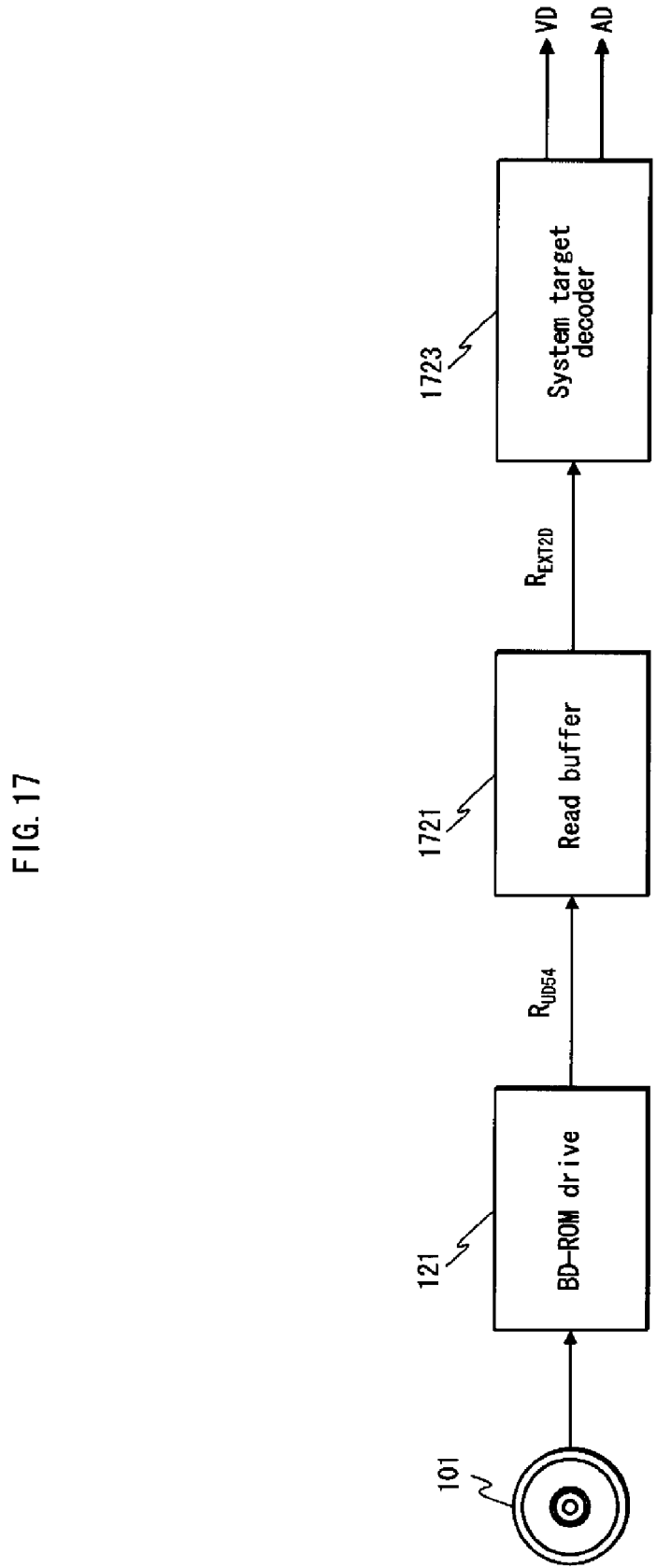
FIG. 17 is a block diagram showing a playback processing system operating in 2D playback mode in a playback device 102.

FIG. 17 is a block diagram showing a playback processing system in the playback device 102 in 2D playback mode. As shown in FIG. 17, the playback processing system includes the BD-ROM drive 121, a read buffer 1721, and a system target decoder 1723. The BD-ROM drive 121 reads 2D extents from the BD-ROM disc 101, and then transfers the 2D extents to the read buffer 1721 at a read rate $R_{UD54}$. The read buffer 1721 is a buffer memory inside the playback device 102. The read buffer 1721 receives and accumulates the 2D extents from the BD-ROM drive 121. The system target decoder 1723 reads the source packets from the 2D extents accumulated in the read buffer 1721 at a mean transfer rate $R_{EXT2D}$, and then decodes the source packets into the video image data VD and the audio data AD.

The mean transfer rate $R_{EXT2D}$ is the same as 192/188 times the mean transfer rate of processing for extraction of TS packets from the source packets by the system target decoder 1723. In general, this mean transfer rate $R_{EXT2D}$ changes for each 2D extent. The maximum value $R_{MAX2D}$ of the mean transfer rate $R_{EXT2D}$ is the same as 192/188 times the system rate $R_{TS}$ for the file 2D. In this case, "system rate" means the highest rate of the above processing by the system target decoder 1723. Also, the above coefficient 192/188 is the same as the ratio of bytes in a source packet to bytes in a TS packet. The mean transfer rate $R_{EXT2D}$ is usually represented in bits/second and specifically equals the ratio of the size of a 2D extent expressed in bits to the extent ATC time. The "size of an extent expressed in bits" is the product of the number of source packets in the extent and the number of bits per source packet (=192 [bytes]×8 [bits/bytes]).

In order to accurately calculate the extent ATC time when evaluating the mean transfer rate $R_{EXT2D}$, the size of each 2D extent can be regulated as a fixed multiple of the source packet length. Furthermore, when a particular 2D extent includes more source packets than this multiple, the extent ATC time of the 2D extent may be calculated as follows: first, the multiple is removed from the total number of source packets, then a transfer time per source packet (=188×8/system rate) is multiplied by the difference. Next, the extent ATC time corresponding to the multiple is added to the result of the multiplication. This sum is considered to be the extent ATC time for the above-described 2D extent. Additionally, the extent ATC time can be calculated as follows: first, for one 2D extent, a time interval is obtained from the ATS of the top source packet thereof to the ATS of the last source packet thereof. Next, the transfer time per source packet is added to this time interval. This sum is considered as the extent ATC time of the 2D extent. In this case, reference to the next extent is unnecessary for calculation of the extent ATC time, and thus the calculation can be simplified. Note that in the above-described calculation of extent ATC time, the occurrence of wraparound in the ATS needs to be taken into consideration.

The read rate $R_{UD54}$ is usually expressed in bits/second and is set at a higher value, e.g. 54 Mbps, than the maximum value $R_{MAX2D}$ of the mean transfer rate $R_{EXT2D}$: $R_{UD54} > R_{MAX2D}$. This prevents underflow in the read buffer 1721 due to decoding processing by the system target decoder 1723 while the BD-ROM drive 121 is reading a 2D extent from the BD-ROM disc 101.

Figure 18:
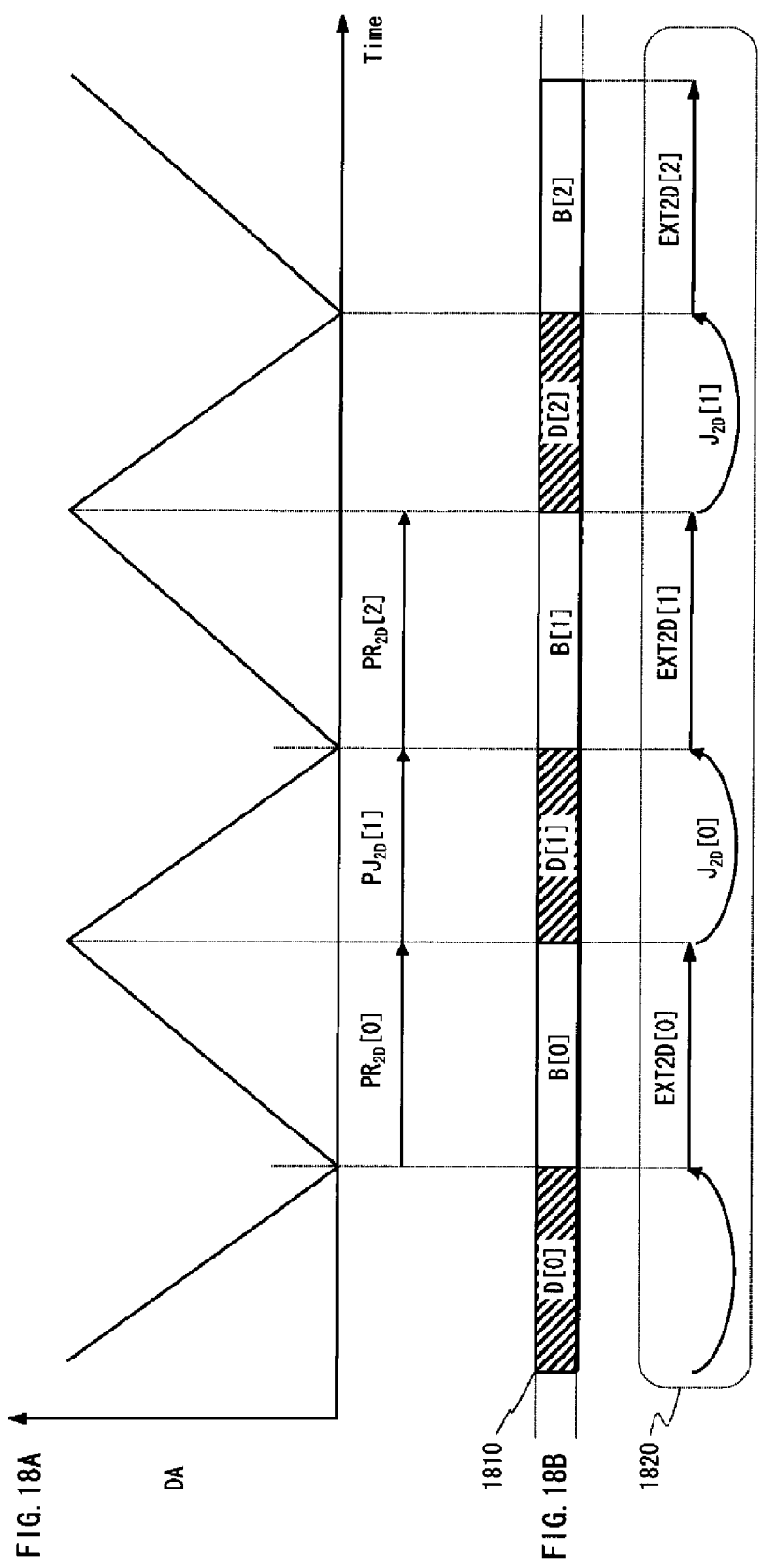
FIG. 18A is a graph showing changes in a data amount DA stored in a read buffer 1721 shown in FIG. 17 when operating in 2D playback mode.
FIG. 18B is a schematic diagram showing the relationship between an extent block 1810 to be played back and a playback path 1820 in 2D playback mode.

FIG. 18A is a graph showing the changes in the data amount DA stored in the read buffer 1721 during 2D playback mode operation. FIG. 18B is a schematic diagram showing the relationship between an extent block 1810 to be played back and a playback path 1820 in 2D playback mode. As shown in FIG. 18B, the 3D extent block 1810 includes base-view data blocks and dependent-view data blocks D[n] (n=..., 0, 1, 2, ...) in an interleaved arrangement. In accordance with the playback path 1820, the base-view data blocks B[n] are each treated as one 2D extent EXT2D[n], and are read from the BD-ROM disc 101 into the read buffer 1721. As shown in FIG. 18A, during the read period $PR_{2D}[n]$ for the base-view data block B[n], i.e. the 2D extent EXT2D[n], the accumulated data amount DA increases at a rate equal to $R_{UD54} - R_{EXT2D}[n]$ the difference between the read rate $R_{UD-2D}$ and the mean transfer rate $R_{EXT2D}[n]$.

The reading/transfer operation by the BD-ROM drive 121 is actually intermittent, and not continuous as suggested in the graph in FIG. 18A. In this way, the data amount DA accumulated in a read period $PR_{2D}[n]$ of each 2D extent is prevented from exceeding the capacity of the read buffer 1721. That is, overflow of the read buffer 1721 is prevented. In other words, the graph in FIG. 18A represents such changes approximately in a linear manner, although actually the changes are stepwise.

Meanwhile, a first jump $J_{2D}[n]$ occurs between two consecutive 2D extents EXT2D[n−1] and EXT2D[n]. During the jump period $PJ_{2D}[n]$, reading of the dependent-view data blocks D[n] is skipped, and reading of data from the BD-ROM disc 101 is suspended. Accordingly, during the jump period $PJ_{2D}[n]$, the accumulated data amount DA decreases at the mean transfer rate $R_{EXT2D}[n]$.

To seamlessly play back 2D video images from the extent blocks 1810 shown in FIG. 18B, the following Conditions [1] and [2] should be satisfied.

[1] While maintaining data supply from the read buffer 1721 to the system target decoder 1723 during each jump period $PJ_{2D}[n]$, it is necessary to ensure continual output from the system target decoder 1723. For this purpose, the following condition should be satisfied: the size $S_{EXT2D}[n]$ of each 2D extent EXT2D[n] is the same as the data amount transferred from the read buffer 1721 to the system target decoder 1723 throughout the read period $PR_{2D}[n]$ and the next jump period $PJ_{2D}[n+1]$. In this case, when the jump period $PJ_{2D}[n+1]$ ends, the accumulated data amount DA does not fall below the amount at the start of the read period $PR_{2D}[n]$, as shown in FIG. 18A. That is to say, in each jump period $PJ_{2D}[n]$, the data supply from the read buffer 1721 to the system target decoder 1723 continues, and in particular, underflow does not occur in the read buffer 1721. In this case, the length of the read period $PR_{2D}[n]$ equals the value $S_{EXT2D}[n]/R_{UD54}$, the size $S_{EXT2D}[n]$ of a 2D extent EXT2D[n] divided by the read rate $R_{UD54}$.

Accordingly, the size $S_{EXT2D}[n]$ of each 2D extent EXT2D[n] should satisfy Expression 1.

$$S_{EXT2D}[n] \geq \left(\frac{S_{EXT2D}[n]}{R_{UD54}} - T_{JUMP-2D}[n]\right) \times R_{EXT2D}[n] \quad \text{Expression 1}$$

$$\therefore S_{EXT2D}[n] \geq$$

$$CEIL\left(\frac{R_{EXT2D}[n]}{8} \times \frac{R_{UD54}}{R_{UD54} - R_{EXT2D}[n]} \times T_{JUMP-2D}[n]\right).$$

In Expression 1, the jump time $T_{JUMP-2D}[n]$ represents the length of the jump period $PJ_{2D}[n]$ in seconds. The read rate $R_{UD54}$ and the mean transfer rate $R_{EXT2D}$ are both expressed in bits per second. Accordingly, in Expression 1, the mean transfer rate $R_{EXT2D}$ is divided by 8 to convert the size $S_{EXT2D}[n]$ of the 2D extent from bits to bytes. That is, the size $S_{EXT2D}[n]$ of the 2D extent is expressed in bytes. The function CEIL( ) is an operation to round up fractional numbers after the decimal point of the value in parentheses. Hereinafter, the size expressed on the left hand side of Expression 1 is referred to as a "2D extent minimum extent size".

[2] Since the capacity of the read buffer 1721 is limited, the maximum value of the jump period $T_{JUMP-2D}[n]$ is limited. In other words, even if the accumulated data amount DA immediately before a jump period $PJ_{2D}[n]$ is the maximum capacity of the read buffer 1721, an excessively long jump time $T_{JUMP-2D}[n]$ would cause the accumulated data amount DA to reach zero during the jump period $PJ_{2D}[n]$, and there is a danger of underflow occurring in the read buffer 1721. Hereinafter, the time for the accumulated data amount DA to decrease from the maximum capacity of the read buffer 1721 to zero while data supply from the BD-ROM disc 101 to the read buffer 1721 has stopped, that is, the maximum value of the jump time $T_{JUMP-2D}$ that guarantees seamless playback, is referred to as the "maximum jump time $T_{JUMP\_MAX}$".

In standards of optical discs, the relationships between jump distances and maximum jump times are determined from the access speed of the optical disc drive and other factors. FIG. 19 is an example of a correspondence table between jump distances $S_{JUMP}$ and maximum jump times $T_{JUMP\_MAX}$ for a BD-ROM disc. In FIG. 19, jump distances $S_{JUMP}$ are represented in units of sectors, and maximum jump times $T_{JUMP\_MAX}$ are represented in milliseconds. One sector is equal to 2,048 bytes. As shown in FIG. 19, when a jump distance $S_{JUMP}$ is zero sectors or is within a range of 1-10000 sectors, 10001-20000 sectors, 20001-40000 sectors, 40001 sectors-1/10 stroke, and 1/10 stroke or greater, the corresponding maximum jump time $T_{JUMP\_MAX}$ is 0 milliseconds, 250 milliseconds, 300 milliseconds, 350 milliseconds, 700 milliseconds, and 1400 milliseconds, respectively. The maximum jump time $T_{JUMP\_MAX}$ when the jump distance $S_{JUMP}$ is equal to 0 sectors is the same as a zero sector transition time $T_{JUMP0}$. Note that in the example shown in FIG. 19, the zero sector transition time $T_{JUMP0}$ is considered to be "0".

Due to the above, the jump time $J_{JUMP-2D}[n]$ to be substituted into Expression 1 is the maximum jump time $T_{JUMP\_MAX}$ specified by jump distance in the standards of optical discs. Specifically, in the table shown in FIG. 19, the maximum jump time $T_{JUMP\_MAX}$ corresponding to the jump distance $S_{JUMP}$ between the 2D extents EXT2D[n−1] and EXT2D[n], that is, the number of sectors from the top of the $n^{th}$ 2D extent EXT2D[n] to the end of the $(n+1)^{th}$ 2D extent EXT2D[n+1], is substituted into Expression 1 as the jump time $T_{JUMP-2D}[n]$.

In the jump $J_{2D}[n]$ between the two 2D extents EXT2D[n] and EXT2D[n+1], limitation of the jump time $T_{JUMP-2D}[n]$ to the maximum jump time $T_{JUMP\_MAX}$ also limits the jump distance $S_{JUMP}$, that is, the interval between the two 2D extents EXT2D[n] and EXT2D[n+1]. For example, when the jump time $T_{JUMP-2D}[n]$ is limited to the value of the maximum jump time $T_{JUMP\_MAX}$=less than or equal to 700 milliseconds, the jump distance $S_{JUMP}$ between the two 2D extents EXT2D[n] and EXT2D[n+1] is permitted to be, at most, 1/10 stroke (approximately 1.2 GB). Like this maximum value of the jump distance $S_{JUMP}$, the jump distance $S_{JUMP}$ when the jump time $T_{JUMP}$ is the same as the maximum jump time $T_{JUMP\_MAX}$ is referred to as a "maximum jump distance $S_{JUMP\_MAX}$". Seamlessly playing back 2D images requires that, in addition to the size of 2D extents satisfying Expression 1, the distance between 2D extents be less than or equal to the maximum jump distance $S_{JUMP\_MAX}$.

When seamlessly connecting between two extent blocks arranged on different recording layers, a long jump occurs from the $n^{th}$ 2D extent EXT2D[n] located at the top of the former extent, block to the $(n+1)^{th}$ 2D extent EXT2D[n+1] located at the top of the latter extent block. The long jump is associated with operations for switching between recording layers, such as a focus jump, etc. Accordingly, in addition to the maximum jump time $T_{JUMP\_MAX}$ specified in the table in FIG. 19, the time required for the long jump further includes time required for the switching operation between layers, that is, a "layer switching time". The "layer switching time" is 350 milliseconds, for example. As a result, when Expression 1 is to be satisfied by the size of the $n^{th}$ 2D extent EXT2D[n], the jump time $T_{JUMP-2D}[n]$ is determined to be the sum of two parameters TJ[n] and TL[n]: $T_{JUMP-2D}[n]$TJ[n]+TL[n]. The first parameter TJ[n] represents the maximum jump time $T_{JUMP\_MAX}$ specified for each jump distance by BD-ROM disc standards. The first parameter TJ[n] equals, for example, the maximum jump time $T_{JUMP\_MAX}$ in the table in FIG. 19 that corresponds to the number of sectors from the tail of the $n^{th}$ 2D extent EXT2D[n] to the top of the $(n+1)^{th}$ 2D extent EXT2D[n+1], i.e. the jump distance $S_{JUMP}$ of the long jump. The second parameter TL[n] represents the layer switching time, i.e. 350 milliseconds. On the other hand, the interval between the two 2D extents EXT2D[n] and EXT2D[n+1], i.e. the interval between two extent blocks, is set to a value less than or equal to the maximum jump distance $S_{JUMP\_MAX}$ corresponding to the first parameter TJ[n]. For example, when the jump time $T_{JUMP-2D}[n]$ is limited to a value less than or equal to the maximum jump time $T_{JUMP\_hd\ MAX}$=700 milliseconds, the maximum jump distance $S_{JUMP\_MAX}$ is 40000 sectors (=approximately 78.1 MB).

[Conditions Based on 3D Playback Mode Capability]

Figure 20:
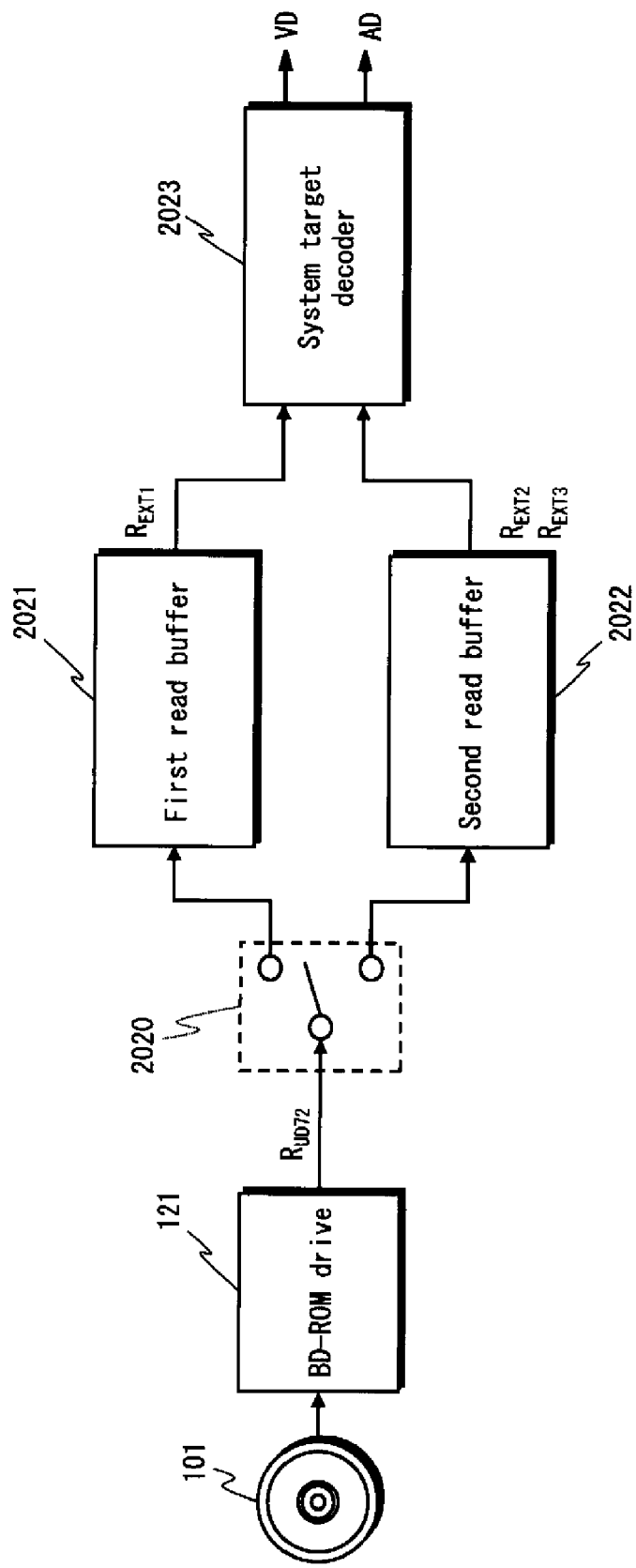
FIG. 20 shows a block diagram of the playback processing system operating in 3D playback mode in the playback device 102.

FIG. 20 is a block diagram showing the playback processing system in the playback device 102 in 3D playback mode. As shown in FIG. 20, this playback processing system includes the BD-ROM drive 121, switch 2020, pair of read buffers 2021 and 2022, and system target decoder 2023. The BD-ROM drive 121 reads extents SS from the BD-ROM disc 101 and transfers the extents SS to the switch 2020 at a read rate $R_{UD72}$. The switch 2020 separates the extents SS into base-view data blocks and dependent-view data blocks. The details of this separation are described later. The base-view data blocks are stored in the first read buffer 2021, and the dependent-view data blocks are stored in the second read buffer 2022. The read buffers 2021 and 2022 are internal buffer memories in the playback device 102. The read buffers 2021 and 2022 receive data blocks from the BD-ROM drive 121, and then accumulate the data blocks. The data accumulated in the second read buffer 2022 consists of right-view data blocks in L/R mode and of depth map data blocks in depth mode. The system target decoder 2023 reads source packets at a first mean transfer rate $R_{EXT1}$ from the base-view data blocks accumulated in the first read buffer 2021. The system target decoder 2023 in L/R mode reads source packets at a second mean transfer rate $R_{EXT2}$ from the right-view data blocks accumulated in the second read buffer 2022. The system target decoder 2023 in depth mode reads source packets at a third mean transfer rate $R_{EXT3}$ from the depth map data blocks accumulated in the second read buffer 2022. The system target decoder 2023 then decodes read pairs of base-view data blocks and dependent-view data blocks into video data VD and audio data AD.

The first mean transfer rate $R_{EXT1}$ is referred to as the "base-view transfer rate". The base-view transfer rate $R_{EXT1}$ equals 192/188 times the mean speed of processing to extract TS packets from the source packets in the base-view data blocks. In general, this base-view transfer rate $R_{EXT1}$ changes for each base-view data block. The maximum value $R_{MAX1}$ of the base-view transfer rate $R_{EXT1}$ equals 192/188 times the system rate $R_{TS1}$ for the file 2D. The 2D clip information file specifies the system rate. The base-view transfer rate $R_{EXT1}$ is usually represented in bits/second and specifically equals the ratio of the size of a base-view data block expressed in bits to the extent ATC time. The extent ATC time equals the time necessary to transfer all of the source packets in the base-view data block from the first read buffer 2021 to the system target decoder 2023.

The second mean transfer rate $R_{EXT2}$ is referred to as the "right-view transfer rate", and the third mean transfer rate $R_{EXT3}$ is referred to as the "depth map transfer rate". Furthermore, the transfer rates $R_{EXT2}$ and $R_{EXT3}$ are collectively referred to as "dependent-view transfer rates". Both of the dependent-view transfer rates $R_{EXT2}$ and $R_{EXT3}$ equal 192/188 times the mean rate of processing by the system target decoder 2023 to extract TS packets from the source packets in the dependent-view data blocks. In general, the dependent-view transfer rates $R_{EXT2}$ and $R_{EXT3}$ change for each dependent-view data block. The maximum value $R_{MAX2}$ of the right-view transfer rate $R_{EXT2}$ equals 192/188 times the system rate $R_{TS2}$ for the first file DEP, and the maximum value $R_{MAX3}$ of the depth map transfer rate $R_{EXT3}$ equals 192/188 times the system rate $R_{TS3}$ for the second file DEP. The dependent-view transfer rates $R_{EXT2}$ and $R_{EXT3}$ are usually expressed in bits per second, and specifically equal the ratio of the size of each dependent-view data block expressed in bits to an extent ATC time. The extent ATC time equals the time necessary to transfer all of the source packets in the dependent-view data block from the second read buffer 2022 to the system target decoder 2023.

The read rate $R_{UD72}$ is usually expressed in bits/second and is set at a higher value, e.g. 72 Mbps, than the maximum values $R_{MAX1}$, $R_{MAX2}$, and $R_{MAX3}$ of the first, second, and third mean transfer rates $R_{EXT1}$, $R_{EXT2}$, and $R_{EXT3}$: $R_{UD72} > R_{MAX1}$, $R_{UD72} > R_{MAX2}$, $R_{UD72} > R_{MAX3}$. This prevents underflow in the read buffers 2021 and 2022 due to decoding processing by the system target decoder 2023 while the BD-ROM drive 121 is reading one extent SS from the BD-ROM disc 101.

FIGS. 21A and 21B are graphs showing the changes in data amounts DA1 and DA2 accumulated in the read buffers 2021 and 2022 when 3D images are seamlessly being played back from one extent block 2110. FIG. 21C is a schematic diagram showing the relationship between the extent block 2110 and a playback path 2120 in 3D mode. As shown in FIG. 21C, the 3D extent block 2110 is composed of data blocks D[k], B[k], (k= ..., n−1, n, n+1, n+2 ... ) which are interleaved in the same way as the extent blocks 1810 shown in FIG. 18B. In accordance with the playback path 2120, the entirety of the extent blocks 2110 is collectively read as a single extent SS. Thereafter, the dependent-view data blocks and the base-view data blocks are separated from the extent SS by the switch 2020.

The reading/transfer operation by the BD-ROM drive 121 is actually intermittent, and not continuous as suggested in the graphs in FIG. 21A and FIG. 21B. In this way, overflow is prevented in the read buffers 2021 and 2022 during the periods $PR_D[n]$ and $PR_B[n]$ in which the data blocks D[n] and B[n] are read. In other words, the graphs in FIGS. 21A and 21B represent such changes approximately in a linear manner, although actually the changes are stepwise.

As shown in FIGS. 21A and 21B, in the read period $PR_D[n]$ for the $n^{th}$ dependent-view data block D[n], the accumulated data amount DA2 in the second read buffer 2022 increases at a rate equal to the difference $R_{UD72} - R_{EXTm}[n]$ between the read rate $R_{UD72}$ and the dependent-view transfer rate $R_{EXTm}[n]$ (m=2 or 3), and the accumulated data amount DA1 in the first read buffer 2021 decreases at the base-view transfer rate $R_{EXT1}[n-1]$. As shown in FIG. 21C, a zero sector transition $J_0[2n]$ occurs from the $n^{th}$ dependent-view data block D[n] to the $n^{th}$ base-view data block B[n]. During the zero sector transition period $PJ_0[n]$, as shown in FIGS. 21A and 21B, the accumulated data amount DA1 in the first read buffer 2021 continues to decrease at the base-view transfer rate $R_{EXT1}[n-1]$, and the accumulated data amount DA2 in the second read buffer 2022 decreases at the dependent-view transfer rate $R_{EXTm}[n]$ As further shown in FIGS. 21A and 21B, during the read period $PR_B[n]$ for the $n^{th}$ base-view data block B[n] the accumulated data amount DA1 in the first read buffer 2021 increases at a rate equal to the difference $R_{UD72} - R_{EXT1}[n]$ between the read rate $R_{UD72}$ and the base-view transfer rate $R_{EXT1}[n]$. Meanwhile, the accumulated data amount DA2 in the second read buffer 2022 continues to decrease at the dependent-view transfer rate $R_{EXTm}[n]$. As further shown in FIG. 21C, a zero sector transition $J_0[2n+1]$ occurs between the base-view data block B[n] and the next dependent-view data block D[n+1]. As shown in FIGS. 21A and 21B, during the zero sector transition period $J_0[2n+1]$, the accumulated data amount DA1 in the first read buffer 4021 decreases at the base-view transfer rate $R_{EXT1}[n]$, and the accumulated data amount DA2 in the second read buffer 4022 continues to decrease at the dependent-view transfer rate $R_{EXTm}[n]$.

To seamlessly play back 3D images from the single extent block 2110, the following Conditions [3], [4], [5], and [6] should be satisfied. For simplicity, a case of using L/R mode is assumed in the following description. Accordingly, the dependent-view data blocks D[n] are right-view data blocks. Note that the following description can similarly be applied to depth mode. For example, the "size of right-view data blocks" in the following description may be read as "the size of depth map data blocks", and the "right view transfer rate" in the following description may be read as the "depth map transfer rate".

[3] The size $S_{EXT1}$n of the $n^{th}$ base-view data block B[n] is equal to at least the data amount transferred from the first read buffer 2021 to the system target decoder 2023 from the read period $PR_B[n]$ until the time immediately before the read period $PR_B[n+1]$ of the next base-view data block B[n+1]. In this case, as shown in FIG. 21A, the accumulated data amount DA1 in the first read buffer 2021 immediately before the read period $PR_B[n+1]$ of the next base-view data block B[n+1] is not less than the amount immediately before the read period $PR_B[n]$ of the $n^{th}$ base-view data block B[n]. Note that the length of the read period $PR_B[n]$ for the $n^{th}$ base-view data block $B[n]$ is equal to the value $S_{EXT1}[n]/R_{UD72}$ of the size $S_{EXT1}[n]$ of the base-view data blocks $B[n]$ divided by the read rate $R_{UD72}$. Meanwhile, the length of the read period PR $[n+1]$ of the $(n+1)^{th}$ dependent-view data block $D[n+1]$ is equal to the value $S_{EXT2}[n+1]/R_{UD72}$, the size $S_{EXT2}[n+1]$ of the dependent-view data block $D[n+1]$ divided by the read rate $R_{UD72}$. Accordingly, the size $S_{EXT1}[n]$ of the base-view data block $B[n]$ should satisfy the following Expression 2.

$$S_{EXT1}[n] \geq \left(\frac{S_{EXT1}[n]}{R_{UD72}} + T_{JUMP0}[2n+1] + \frac{S_{EXT2}[n+1]}{R_{UD72}} + T_{JUMP0}[2n+2]\right) \times R_{EXT1}[n]$$

$$\therefore S_{EXT1}[n] \geq CEIL\left\{\frac{R_{EXT1}[n]}{8} \times \frac{R_{UD72}}{R_{UD72} - R_{EXT1}[n]} \times \left(T_{JUMP0}[2n+1] + \frac{S_{EXT2}[n+1]}{R_{UD72}} + T_{JUMP0}[2n+2]\right)\right\}.$$

Expression 2

Hereinafter, the size expressed by the right hand side of Expression 2 is referred to as a "minimum extent size of the base-view data block". Note that when the base-view data blocks are located at the tail of the extent blocks 2110, it is not necessary for the size of the data blocks to satisfy Expression 2.

[4] The size $S_{EXT2}[n]$ of the $n^{th}$ dependent-view data block $D[n]$ is at least equal to the data amount transferred from the second read buffer 2022 to the system target decoder 2023 from the read period $PR_R[n]$ until the time immediately before the read period $PR_D[n+1]$ for the next dependent-view data blocks $D[n+1]$. In this case, as shown in FIG. 21B, the accumulated data amount DA2 in the second read buffer 2022 immediately before the read period $PR_R[n+1]$ of the next dependent-view data block $D[n+1]$ is not less than the amount immediately before the read period $PR_D[n]$ of the $n^{th}$ dependent-view data block $D[n]$. Note that the length of the read period $PR_D[n]$ for the $n^{th}$ dependent-view block $D[n]$ equals the value $S_{EXT2}[n]/R_{UD72}$, the size $S_{EXT2}[n]$ of the dependent-view data block $D[n]$ divided by the read rate $R_{UD72}$. Accordingly, the size $S_{EXT2}[n]$ of the dependent-view data block $D[n]$ should satisfy Expression 3.

$$S_{EXT2}[n] \geq \left(\frac{S_{EXT2}[n]}{R_{UD72}} + T_{JUMP0}[2n] + \frac{S_{EXT1}[n]}{R_{UD72}} + T_{JUMP0}[2n+1]\right) \times R_{EXT2}[n]$$

$$\therefore S_{EXT2}[n] \geq CEIL\left\{\frac{R_{EXT2}[n]}{8} \times \frac{R_{UD72}}{R_{UD72} - R_{EXT2}[n]} \times \left(T_{JUMP0}[2n] + \frac{S_{EXT1}[n]}{R_{UD72}} + T_{JUMP0}[2n+1]\right)\right\}$$

Expression 3

Hereinafter, the size expressed by the right hand side of Expression 3 is referred to as a "minimum extent size of the dependent-view data block".

[5] As shown in FIG. 13, the base-view data blocks $B[n]$ in the extent block 2101 are shared between the file 2D and the file SS. Accordingly, the size $S_{EXT1}[n]$ of the base-view data block $B[n]$ should satisfy Expression 1. In this context, to reduce the capacity of the first read buffer 2021 as much as possible, the size $S_{EXT1}[n]$ of the base-view data block $B[n]$ should be less than or equal to the lower limit of the minimum extent size of the 2D extent. In other words, the size $S_{EXT1}[n]$ satisfies the following Expression 4.

$$S_{EXT1}[n] \leq CEIL\left(\frac{R_{EXT1}[n]}{8} \times \frac{R_{UD54}}{R_{UD54} - R_{MAX1}} \times T_{JUMP-2D\_MIN}\right)$$

Expression 4

A jump time $T_{JUMP-2D\_MIN}$ is a minimum jump time necessary for playback of 2D video images from the extent block 2101, and is 199 milliseconds, for example.

[6] The extent ATC time $T_{EXT}[n]$ is the same in the $n^{th}$ data blocks $D[n]$ and $B[n]$. Meanwhile, the extent ATC time $T_{EXT}[n]$ equals the size $S_{EXTm}[n]$ (m=1, 2, 3) of the data blocks $D[n]$ and $B[n]$ divided by a mean transfer rate $R_{EXTm}[n]$: $T_{EXT}[n] = S_{EXTm}[n]/R_{EXTm}[n]$. Accordingly, the size $S_{EXTm}[n]$ of the data blocks $D[n]$ and $B[n]$ satisfies the following Expression 5.

$$S_{EXT2}[n] \leq R_{EXT2}[n] \times \frac{S_{EXT1}[n]}{R_{EXT1}[n]}$$

Expression 5

Figures 22A, 22B:
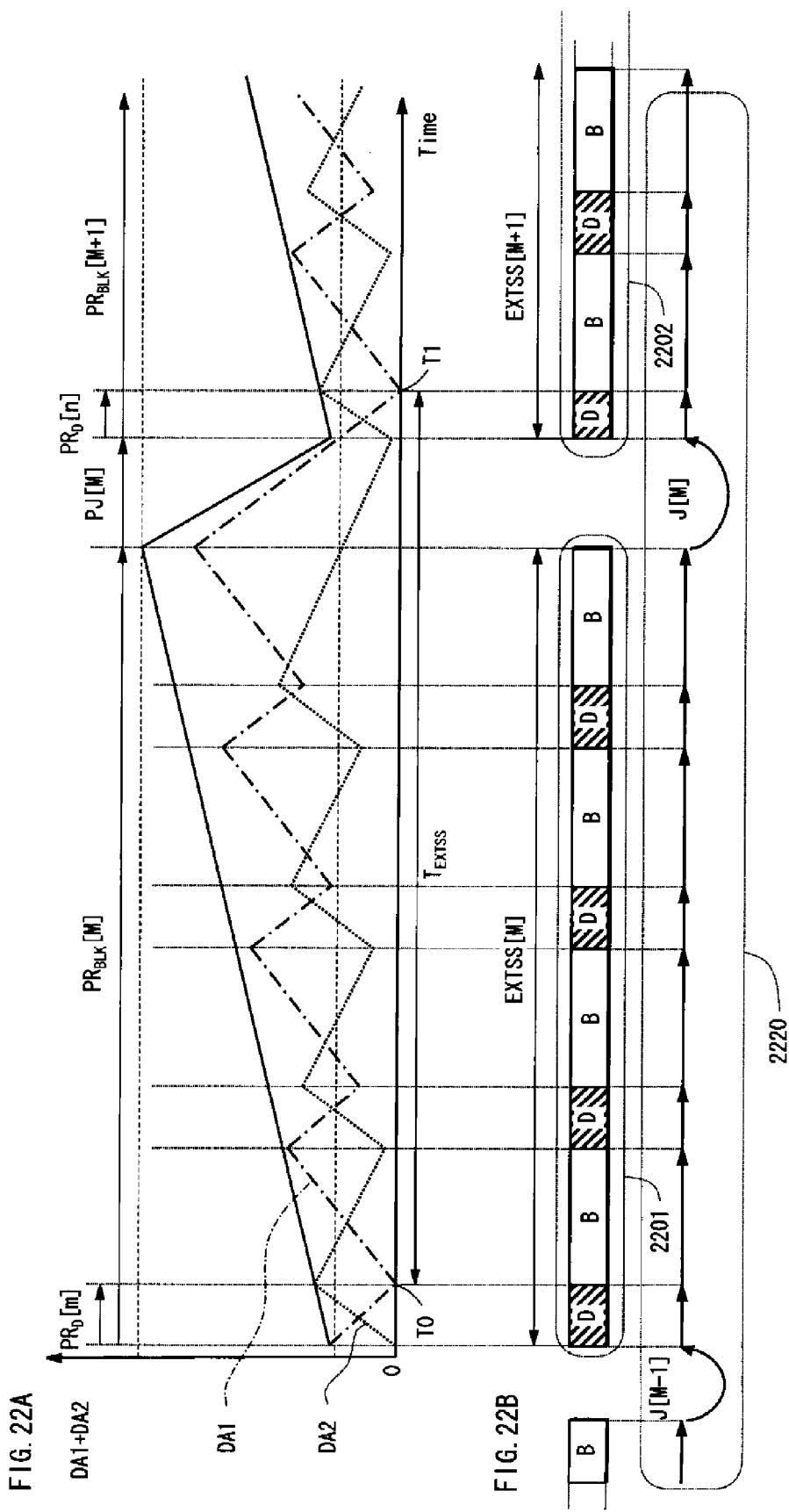
FIG. 22A is a graph showing changes in data amounts DA1 and DA2 accumulated in the read buffers 2021 and 2022 shown in FIG. 20 when 3D images are seamlessly played back continuously from a plurality of extent blocks, and changes in the sum DA1+DA2 thereof.
FIG. 22B is a schematic diagram of an $M^{th}$ (M being an integer greater than or equal to 2) extent block 2201 and an $(M+1)^{th}$ extent block 2202, and shows the relationship between the these two extent blocks 2201 and 2202 and the playback path 2220 in 3D playback mode.

FIG. 22A is a graph showing changes in data amounts DA1 and DA2 accumulated in the read buffers 2021 and 2022 when 3D images are seamlessly played back continuously from a plurality of extent blocks, and changes in the sum DA1+DA2 thereof. FIG. 22B is a schematic diagram of an $M^{th}$ (the integer M is greater than or equal to 2) extent block 2201 and an $(M+1)^{th}$ extent block 2202, and shows the relationship between these two extent blocks 2201 and 2202 and the playback path 2220 in 3D playback mode. As shown in FIG. 22B, the extent blocks 2201 and 2202 are composed of dependent-view data blocks D and base-view data blocks B that are interleaved in a similar arrangement to the extent block 1810 shown in FIG. 18B. The two contiguous extent blocks 2201 and 2202 are separated by the layer boundary LB or a storage area for other data therebetween. According to the playback path 2220, first the entirety of the $M^{th}$ extent block 2201 is read collectively from the extent SS EXTSS[M]. A jump J[M] occurs immediately thereafter. Next, the second extent block 2202 is collectively read as the $(M+1)^{th}$ extent SS EXTSS [M+1].

In FIG. 22A, the alternate-long-and-short-dash line shows changes in the data amount DA1 accumulated in the first read buffer 2021, and the broken line shows changes in the accumulated data amount DA2 in the second read buffer 2022. The solid line shows changes in the sum DA1+DA2. The sum DA1+DA2 actually changes each time one data block is read. However, the solid line is a linear approximation of those minute changes. Furthermore, since the zero sector transition time $T_{JUMP0}$ is negligible compared to the length of the read period $PR_{BLK}[M]$ for one entire extent block in FIG. 22A, the zero sector transition time $T_{JUMP0}$ is considered to be "0".

As shown in FIG. 22A, both of the data amounts DA1 and DA2 accumulated in the read buffers 2021 and 2022 increase during the read period $PR_{BLK}[M]$ in which the entirety of the $M^{th}$ extent block 2201 is read from the BD-ROM disc 101 to the read buffers 2021 and 2022. Specifically, the sum DA1+DA2 of the accumulated data amounts increase at a rate equal to the difference $R_{UD72} - R_{EXTSS}[M]$ between the read rate $R_{UD72}$ and the mean transfer rate $R_{EXTSS}[M]$ during the read period $PR_{BLK}[M]$ for the entirety of the $M^{th}$ extent block 2201. The mean transfer rate $R_{EXTSS}[M]$ is evaluated to be a value equal to the size of the entire $M^{th}$ extent block 2201, that is, the size $S_{EXTSS}[M]$ of the $M^{th}$ extent SS, EXT SS[M], divided by the extent ATC time $T_{EXTSS}$. Such increases of the accumulated data amounts DA1 and DA2 can be realized by designing the sizes of the data blocks D and B to be greater than or equal to the minimum extent size.

At the time when the base-view data block at the tail of the $M^{th}$ extent block 2201 is read into the first read buffer 2021, the sum DA1+DA2 of the accumulated data amounts reaches the maximum value. During an immediately following jump J[M] period PJ[M], the sum DA1+DA2 of the accumulated data amounts decreases at the mean transfer rate $R_{EXTSS}[M]$. Accordingly, adjusting the maximum value of the sum DA1+DA2 of the accumulated data amounts to be sufficiently large enables underflow of both the read buffers 2021 and 2022 to be prevented during the jump J[M]. As a result, the two extent blocks 2201 and 2202 can be seamlessly connected.

The maximum value of the sum DA1+DA2 of the accumulated data amounts is determined based on the size of the $M^{th}$ extent block 2201. Accordingly, to seamlessly connect the $M^{th}$ extent block 2201 to the $(M+1)^{th}$ extent block 2202, the size of the $M^{th}$ extent block 2201, that is, the size $S_{EXTSS}[M]$ of the $M^{th}$ extent SS EXTSS[M] should satisfy the following Condition [7].

[7] Preloading is performed in the read period $PR_D[m]$ of the dependent-view data block D located at the top of the $M^{th}$ extent block 2201 (the integer m is greater than or equal to 1). The dependent-view data block D cannot be transferred from the second read buffer 2022 to the system target decoder 2023 during the preload period $PR_D[m]$, since a base-view data block B corresponding to the dependent-view data block D has not yet been stored in the first read buffer 2021. Accordingly, it is necessary for the data of the $(M-1)^{th}$ extent block to be transferred from the second read buffer 2022 to the system target decoder 2023 during the preload period $PR_D[m]$ continuing from the immediately previous jump J[M−1] period. This enables the maintenance of the data supply to the system target decoder 2023. Similarly, preloading is also performed in the read period $PR_D[n]$ of the dependent-view data block D located at the top of the $(M+1)^{th}$ extent block 2202 (the integer n is greater than or equal to m+1). Accordingly, it is necessary for the data of the $M^{th}$ extent block 2201 to be transferred from the second read buffer 2022 to the system target decoder 2023 during the preload period $PR_D[n]$, continuing from the immediately previous jump J[M] period. This enables the maintenance of the data supply to the system target decoder 2023.

As described above, it is necessary to transfer the data of the $(M-1)^{th}$ extent block from the second read buffer 2022 to the system target decoder 2023 during the preloading period $PR_D[m]$ of the $M^{th}$ extent block 2201, and to transfer the data of the $M^{th}$ extent block from the second read buffer 2022 to the system target decoder 2023 during the preloading period $PR_D[n]$ for the $(M+1)^{th}$ extent block 2202. Accordingly, to prevent underflow from occurring in both the read buffers 2021 and 2022 during the jump J[M], the extent ATC time $T_{EXTSS}$ of the $M^{th}$ extent SS EXTSS[M] should be at least equal to the length of the period from the end time T0 of the preloading period $PR_D[m]$ for the $M^{th}$ extent block 2201, to the end time T1 of the preloading period $PR_D[n]$ for the $(M+1)^{th}$ extent block 2202. In other words, the size $S_{EXTSS}[M]$ of the $M^{th}$ extent SS EXTSS [M] should be at least equal to the sum of data amounts transferred from the read buffers 2021 and 2022 to the system target decoder 2023 in the period from T0 to T1.

As clarified by FIG. 22A, the length of the period from T0 to T1 is equal to the sum $t_1+t_2+t_3$, where the first factor $t_1$ is the length of the read period $PR_{BLK}[M]$ for the $M^{th}$ extent block 2201 other than the read period $PR_D[m]$ of the top dependent-view data block D, the second factor $t_2$ is the jump time $T_{JUMP}[M]$ of the jump J[M], and the third factor $t_3$ is the length of the read period $PR_D[n]$ for the top dependent-view data block D of the $(M+1)^{th}$ extent block 2201. That is to say, the length of the period from T0 to T1 is the same as the sum of the length of the read period $PR_{BLK}[M]$ for the $M^{th}$ extent block 2201, the jump time $T_{JUMP}[M]$ of the jump J[M], and the difference $T_{DIFF}[M]$ between the lengths of the preloading periods $PR_D[n]$ and $PR_D[m]$ of the extent blocks 2201 and 2202. Furthermore, the length of the read period $PR_{BLK}[M]$ for the $M^{th}$ extent block 2201 is equal to the value $S_{EXTSS}/R_{UD72}$, the size $S_{EXTSS}[M]$ of the $M^{th}$ extent SS EXTSS[M] divided by the read rate $R_{UD72}$. Accordingly, the size $S_{EXTSS}[M]$ of the $M^{th}$ extent SS EXTSS[M] should satisfy the following Expression 6.

$$S_{EXTSS}[M] \geq \left(\frac{S_{EXTSS}[M]}{R_{UD72}} + T_{JUMP}[M] + T_{DIFF}[M]\right) \times R_{EXTSS}[M]$$

$$\therefore S_{EXTSS}[M] \geq \frac{R_{UD72} \times R_{EXTSS}[M]}{R_{UD72} - R_{EXTSS}[M]} \times (T_{JUMP}[M] + T_{DIFF}[M])$$

Expression 6

The lengths of the preloading periods $PR_D[m]$ and $PR_D[n]$ are respectively equal to the values $S_{EXT2}[m]/R_{UD72}$ and $S_{EXT2}[n]/R_{UD72}$ that is, the sizes $S_{EXT2}[m]$ and $S_{EXT2}[n]$ of the dependent-view data blocks D located at the tops of the extent blocks 2201 and 2202 divided by the read rate $R_{UD72}$. Accordingly, the difference $T_{DIFF}$ between the lengths of the preloading periods $PR_D[m]$ and $PR_D[n]$ is equal to the difference between the above-mentioned values: $T_{DIFF}=S_{EXT2}[n]/R_{UD72}-S_{EXT2}[m]/R_{UD72}$. Hereinafter, the size expressed by the right hand side of Expression 6 is referred to as a "minimum extent size of an extent SS". Note that the right hand side of Expression 6, similarly to the right hand sides of Expressions 1-4, may be expressed by an integer value in byte units.

[Conclusion]

To seamlessly play back any of 2D video images and 3D video images from a plurality of extent blocks, all of the above Conditions [1] to [7] should be satisfied. In particular, the sizes of the data blocks and the extent blocks should satisfy the following Conditions 1-4.

Condition 1: the size $S_{EXT2D}$ of a 2D extent should satisfy Expression 1.

Condition 2: the size $S_{EXT1}$ of a base-view data block should satisfy Expression 2.

Condition 3: the size $S_{EXT2}$ of a dependent-view data block should satisfy Expression 3.

Condition 4: the size $S_{EXTSS}$ of an extent block should satisfy Expression 6.

In this way, in addition to the lower limit of the size of the data blocks, the lower limit to the size of the extent blocks is clearly specified for the BD-ROM disc 101 according to embodiment 1 of the present invention. Thus, the sizes of the data blocks and the extent blocks can easily be designed appropriately. As a result, it is easy to prevent underflow in the read buffers 2021 and 2022 during playback of 3D images. In particular, the difference in the lengths of the preloading periods between extent blocks to be seamlessly connected is reflected in Condition 4. This facilitates reliably realizing seamless connection between the extent blocks.

>>Other TS Packets Included in AV Stream Files>>

The types of the TS packets contained in the AV stream file include not only those that are converted from the elementary streams shown in FIG. 3, but also a program association table (PAT), program map table (PMT), and program clock reference (PCR). The PCR, PMT, and PAT are specified by the European Digital Broadcasting Standard and are intended to regulate the partial transport stream constituting a single program. By using PCR, PMT, and PAT, the AV stream file can be regulated in the same way as the partial transport stream. Specifically, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information for the elementary streams. The PMT also includes various descriptors relating to the AV stream file. The descriptors particularly include copy control information showing whether copying of the AV stream file is permitted or not. The PCR includes information indicating the value of a system time clock (STC) to be associated with the ATS assigned to the PCR itself. The "STC" referred to here is a clock used as a reference for the PTS and the DTS by a decoder in the playback device 102. The decoder uses the PCR to synchronize the STC with the ATC.

Figure 23:
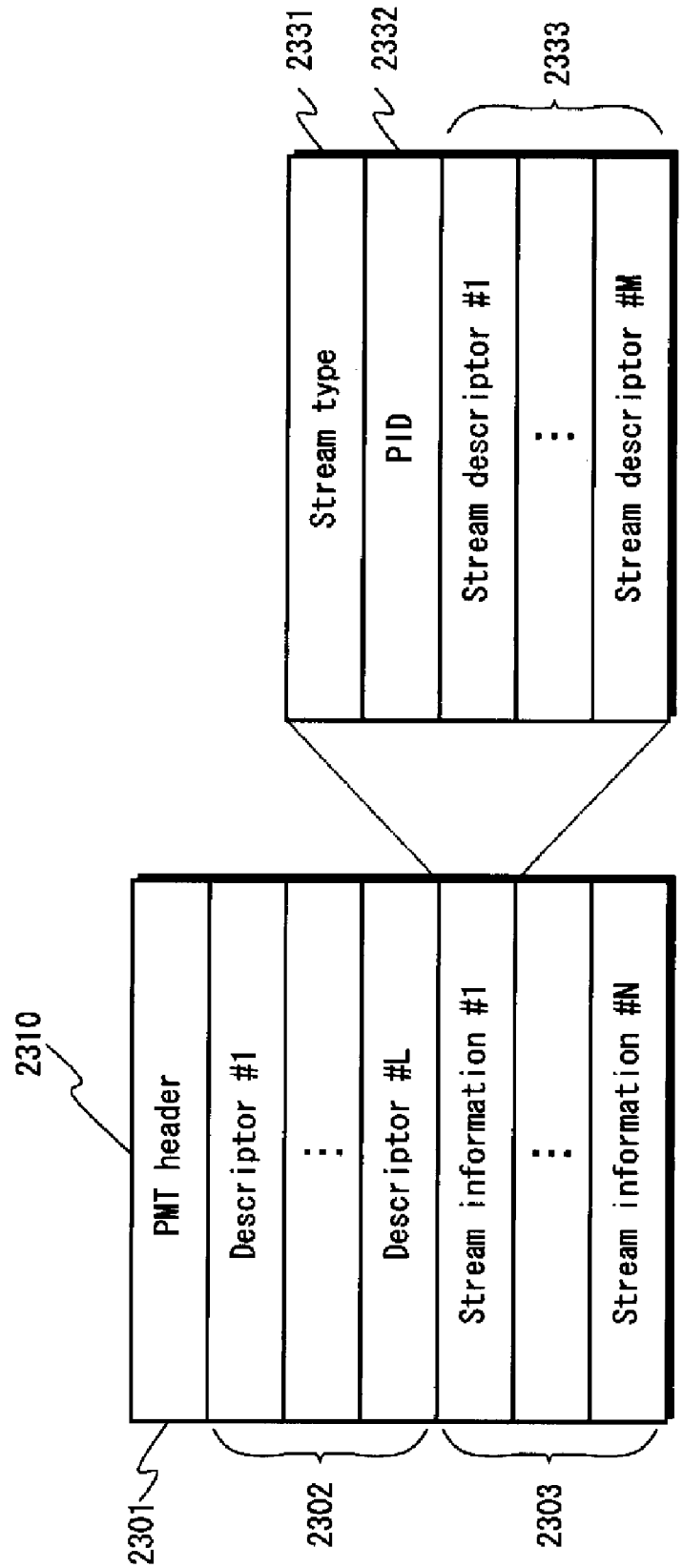
FIG. 23 is a schematic diagram showing a data structure of a PMT 2310.

FIG. 23 is a schematic diagram showing the data structure of a PMT 2310. The PMT 2310 includes a PMT header 2301, a plurality of descriptors 2302, and a plurality of pieces of stream information 2303. The PMT header 2301 indicates the length of data, etc. stored in the PMT 2310. Each descriptor 2302 relates to the entire AV stream file that includes the PMT 2310. The copy control information is included in one of the descriptors 2302. Each piece of stream information 2303 relates to one of the elementary streams included in the AV stream file and is assigned to a different elementary stream. Each piece of stream information 2303 includes a stream type 2331, a PID 2332, and a stream descriptor 2333. The stream type 2331 includes identification information for the codec used for compressing the elementary stream. The PID 2332 indicates the PID of the elementary stream. The stream descriptor 2333 includes attribute information of the elementary stream, such as a frame rate and an aspect ratio.

By using PCR, PMT, and PAT, the decoder in the playback device 102 can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<Clip Information File>>

FIG. 24 is a schematic diagram showing the data structure of the first clip information file (01000.clpi), i.e. the 2D clip information file 231. The dependent-view clip information files (02000.clip, 03000.clpi) 232 and 233 have the same data structure. Below, the data structure common to all clip information files is first described, using the data structure of the 2D clip information file 231 as an example. Afterwards, the differences in data structure between a 2D clip information file and a dependent-view clip information file are described.

As shown in FIG. 24, the 2D clip information file 231 includes clip information 2410, stream attribute information 2420, an entry map 2430, and 3D meta data 2440. The 3D meta data 2440 includes an offset table 2441 and an extent start point 2442.

As shown in FIG. 24, the clip information 2410 includes a system rate 2411, a playback start time 2412, and a playback end time 2413. The system rate 2411 specifies a system rate $R_{TS}$ for the file 2D (01000.m2ts) 241. As shown in FIG. 17, the playback device 102 in 2D playback mode transmits "TS packets" belonging to the file 2D (01000.m2ts) 241 from the read buffer 1721 in the playback device 102 to the system target decoder 1723. The interval between the ATSs of the source packets in the file 2D 241 is set so that the transfer speed of the TS packets is limited to the system rate RTS or lower. The playback start time 2412 indicates the PTS of the VAU located at the top of the file 2D 241, e.g. the PTS of the top video frame. The playback end time 2412 indicates the value of the STC delayed a predetermined time from the PTS of the VAU located at the tail of the file 2D 291, e.g. the sum of the PTS of the last video frame and the playback time of one frame.

As shown in FIG. 24, the stream attribute information 2420 is a correspondence table between the PID 2421 for each elementary stream included in the file 2D 241 with pieces of attribute information 2422. Each piece of attribute information 2422 is different for a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1100 for the primary audio stream includes a codec type used for compressing the audio stream, number of channels included in the audio stream, language, and sampling frequency. The playback device 102 uses this attribute information 2422 to initialize the decoder.

[Entry Map]

FIG. 25A is a schematic diagram showing the data structure of an entry map 2430. As shown in FIG. 25A, the entry map 2430 includes tables 2500. There is the same number of tables 2500 as there are video streams multiplexed in the main TS, and tables are assigned one-by-one to each video stream. In FIG. 25A, each table 2500 is distinguished by the PID of the video stream to which it is assigned. Each table 2500 includes an entry map header 2501 and an entry point 2502. The entry map header 2501 includes the PID corresponding to the table 2500 and the total number of entry points 2502 included in the table 2500. The entry point 2502 associates a pair of a PTS 2503 and source packet number (SPN) 2504 with one of individually differing entry points ID (EP_ID) 2505. The PTS 2503 is equivalent to the PTS for one of the I pictures included in the video stream for the PID indicated by the entry map header 2501. The SPN 2504 is equivalent to the SPN for the top of the source packet group stored in the corresponding I picture. An "SPN" refers to the number assigned consecutively from the top to a source packet group belonging to one AV stream file. The SPN is used as the address for each source packet in the AV stream file. In the entry map 2430 in the 2D clip information file 231, the SPN refers to the number assigned to the source packet group belonging to the file 2D 241, i.e. the source packet group constituting the main TS. Accordingly, the entry point 2502 expresses the relationship between the PTS and the address, i.e. the SPN, of each I picture included in the file 2D 241.

An entry point 2502 does not need to be set for all of the I pictures in the file 2D 241. However, when an I picture is located at the top of a GOP, and the TS packet that includes the top of that I picture is located at the top of a 2D extent, an entry point 2502 has to be set for that I picture.

FIG. 25B is a schematic diagram showing source packets in the source packet group 2510 belonging to the file 2D 241 that are associated with each EP_ID 2505 by the entry map 2430. FIG. 25C is a schematic diagram showing the data block group D[n], B[n] (n=0, 1, 2, 3, . . . ) corresponding to the source packet group 2510 on the BD-ROM disc 101. When the playback device 102 plays back 2D video images from the file 2D 241, it refers to the entry map 2430 to specify the SPN for the source packet that includes a frame representing an arbitrary scene from the PTS for that frame. Specifically, when for example a PTS=360,000 is indicated as the PTS for a specific entry point for the position to start playback, the playback device 102 first retrieves the SPN=3200 allocated to this PTS in the entry map 2430. Next, the playback device 102 seeks the quotient SPN×192/2,048, i.e. the value of the SPN multiplied by 192 bytes, the data amount per source packet, and divided by 2,048 bytes, the data amount per sector. As can be understood from FIGS. 5B and 5C, this value is the same as the total number of sectors recorded in the main TS prior to the source packet to which the SPN is assigned. In the example shown in FIG. 25B, this value is 3,200×192/2, 048=300, and is equal to the total number of sectors on which source packet groups 3111 are recorded from SPN 0 through 3199. Next, the playback device 102 refers to the allocation descriptor in the file entry in the file 2D 241 and specifies the LBN of the (total number+1)$^{th}$ sector, counting from the top of the sector groups in which 2D extent groups are recorded. In the example shown in FIG. 25C, within the sector groups in which the base-view data blocks B[0], 13[1], B[2], which can be accessed as 2D extents EXT2D[0], EXT2D[1], EXT2D [2], . . . are recorded, the LBN of the 301$^{st}$ sector counting from the top is specified. The playback device 102 indicates this LBN to the BD-ROM drive 121. In this way, base-view data block groups are read as aligned units in order from the sector for this LBN. Furthermore, from the first aligned unit that is read in, the playback device 102 selects the source packet indicated by the entry point for the position to start playback, extracts and decodes an I picture. From then on, subsequent pictures are decoded in order referring to already decoded pictures. In this way, the playback device 102 can play back 2D video images from the file 2D 241 from a specified PTS onwards.

Furthermore, the entry map 2430 is useful for efficient processing during trickplay such as fast forward, reverse, etc. For example, the playback device 102 in 2D playback mode first refers to the entry map 2430 to read SPNs starting at the position to start playback, e.g. to read SPN=3200, 4800, . . . in order from the entry points EP_ID=2, 3, . . . that include PTSs starting at PTS=360,000. Next, the playback device 102 refers to the file entry in the file 2D 241 to specify the LBN of the sectors corresponding to each SPN. The playback device 102 then indicates each LBN to the BD-ROM drive 121. Aligned units are thus read from the sector for each LBN. Furthermore, from each aligned unit, the playback device 102 selects the source packet indicated by each entry point, extracts and decodes an I picture. The playback device 102 can thus selectively play back an I picture from the file 2D 241 without analyzing the 2D extent group EXT2D[n] itself.

[Offset Table]

FIG. 26A is a schematic diagram showing the data structure of an offset table 2441. The offset table 2441 is information used for cropping processing by the playback device 102 in 3D playback mode. "Cropping processing" refers to processing to generate, from a table representing a 2D video image, a pair of pieces of plane data that represent a left-view and a right-view. Apiece of "plane data" refers to a two-dimensional array of pixel data. The size of the array is the same as the resolution of a video frame. A piece of pixel data consists of a chromatic coordinate value and an a value. The chromatic coordinate value is expressed as an RGB value or a YCrCb value. The target of cropping processing includes the pieces of plane data generated from the PG streams, IG streams, and secondary video streams in the main TS, as well as the pieces of image plane data generated in accordance with a BD-J object. Cropping processing changes the horizontal position of each piece of pixel data in a piece of plane data. Accordingly, in the pair of pieces of plane data obtained via cropping processing, the presentation positions in the left-view and right-view are shifted to the left and right from the original presentation position in the 2D video image. A viewer is made to perceive a pair of a left-view and a right-view as a single 3D video image due to the binocular parallax produced by these shifts.

As shown in FIG. 26A, the offset table 2441 includes a table 2610 for each PID in PG streams, IG streams, and secondary video streams. Each table 2610 is a correspondence table between PTSs 2601 and offset values 2602. The PTS 2601 represents each piece of plane data generated from PG streams, IG streams, and secondary video streams. The offset value 2602 represents the signed number of pixels by which each piece of pixel data is shifted horizontally by cropping processing. For example, a positive sign represents a shift to the right, and a negative sign a shift to the left. The sign of the offset value 2602 is determined by whether the 3D video image is deeper than the screen or closer to the viewer. Hereinafter, a pair 2603 of a PTS 2601 and an offset value 2602 is referred to as an "offset entry".

FIG. 26B is a schematic diagram showing the valid section of an offset entry. The valid section of an offset entry is, within the time measured by an STC, the interval from the time indicated by the PTS of the offset entry until the time indicated by the PTS of the next offset entry. When the PTS for a piece of plane data belongs to a valid section of a certain offset entry, then during cropping processing, the presentation position of the pixel data in that piece of plane data shifts by the offset value in the offset entry. In the example shown in FIG. 26A, the PTS of offset entry #1 is 180,000, the PTS of offset entry #2 is 270,000, and the PTS of offset entry #3 is 360,000. In this case, as shown in FIG. 26B, an offset value of "+5" in the offset entry #1 is valid in an STC range 2604 from 180,000 to 270,000, and an offset value of "+3" in the offset entry #2 is valid in an STC range 2605 from 270,000 to 360,000.

[Extent Start Point]

FIG. 27A is a schematic diagram showing the data structure of extent start points 2442. As shown in FIG. 27A, the "extent start point" 2442 includes a base-view extent ID (EXT1_ID) 2711 and an SPN 2712. The EXT1_ID 2711 is a serial number assigned consecutively from the top to the base-view data blocks belonging to the first file SS (01000. ssif) 244A. One SPN 2712 is assigned to each EXT1_ID 2711 and is the same as the SPN for the source packet located at the top of the base-view data block identified by the EXT1_ID 2711. This SPN is a serial number assigned from the top to the source packets included in the base-view data block group belonging to the first file SS 294A.

In the extent blocks 1301-1303 shown in FIG. 13, the file 2D 241 and the first file SS 249A share the base-view data blocks B[0], B[1], B[2], . . . in common. However, data block groups placed at portions requiring occurrence of a long jump, such as at boundaries between recording layers, generally include base-view data blocks belonging to only one of the file 2D 241 or the first file SS 244A (see modification [E] for details). Accordingly, the SPN 2712 that indicates the extent start point 2442 generally differs from the SPN for the source packet located at the top of the 2D extent belonging to the file 2D 241.

FIG. 27B is a schematic diagram showing the data structure of extent start points 2720 included in the second clip information file (02000.clpi), i.e. the right-view clip information file 232. As shown in FIG. 27B, the extent start point 2720 includes right-view extent IDs (EXT2_ID) 2721 and SPNs 2722. The EXT2_IDs 2721 are serial numbers assigned from the top to the right-view data blocks belonging to the first file SS 244A. One SPN 2722 is assigned to each EXT2_ID 2721 and is the same as the SPN for the source packet located at the top of the right-view data block identified by the EXT2_ID 2721. This SPN is a serial number assigned in order from the top to the source packets included in the right-view data block group belonging to the first file SS 244A.

FIG. 27D is a schematic diagram representing the relationship between right-view extents EXT2[0], EXT2[1], . . . belonging to the first file DEP (02000.m2ts) 242 and the SPNs 2722 shown by the extent start points 2720. As shown in FIG. 13, the first file DEP 242 and the first file SS 244A share right-view data blocks in common. Accordingly, as shown in FIG. 27D, each SPN 2722 shown by the extent start point 2720 is the same as the SPN for the source packet located at the top of each right-view extent EXT2[0], EXT2[1], . . . .

As described below, the extent start point 2442 in the 2D clip information file 231 and the extent start point 2720 in the right-view clip information file 232 are used to detect the boundary of data blocks included in each extent SS during playback of 3D video images from the first file SS 244A.

FIG. 27E is a schematic diagram showing an example of the relationship between an extent SS EXTSS[0] belonging to the first file SS 244A and an extent block on the BD-ROM disc 101. As shown in FIG. 27E, the extent block includes data block groups D[n] and B[n] (n=0, 1, 2, . . . ) in an interleaved arrangement. Note that the following description is also true for other arrangements. The extent block can be accessed as a single extent SS. Furthermore, in the extent SS EXTSS[0], the number of source packets included in the nth base-view data block B[n] is, in the extent start point 2442, the same as the difference A(n+1)-An between SPNs corresponding to EXT1_ID=n+1 and n (here, A0=0). On the other hand, the number of source packets included in the right-view data block D(n+1) is, in the extent start point 2720, the same as the difference B(n+1)-Bn between SPNs corresponding to EXT2_ID=n+1 and n. Here, B0=0.

When the playback device 102 in L/R mode plays back 3D video images from the first file SS 244A, in addition to the entry maps in the clip information files 231 and 232, the playback device 102 also refers to the extent start points 2442 and 2720. By doing this, the playback device 102 specifies, from the PTS for a frame representing the right-view of an arbitrary scene, the LBN for the sector on which a right-view data block that includes the frame is recorded. Specifically, the playback device 102 for example first retrieves the SPN associated with the PTS from the entry map in the right-view clip information file 232. Suppose the source packet indicated by the SPN is included in the third right-view extent EXT2[2] in the first file DEP 242, i.e. the right-vieW data block D[2]. Next, the playback device 102 retrieves "B2", the largest SPN before the target SPN, from among the SPNs 2722 shown by the extent start points 2720 in the right-view clip information file 232. The playback device 102 also retrieves the corresponding EXT2_ID "2". Then the playback device 102 retrieves the value "A2" for the SPN 2712 corresponding to the EXT1_ID which is the same as the EXT2_ID "2". The playback device 102 further seeks the sum B2+A2 of the retrieved SPNs. As can be seen from FIG. 27E, this sum B2+A2 is the same as the total number of source packets included in the data blocks located before the third right-view data block D[2] among the data blocks included in the extent SS group EXTSS[0], EXTSS[1], . . . . Accordingly, this sum B2+A2 multiplied by 192 bytes, the data amount per source packet, and divided by 2,048 bytes, the data amount per sector, i.e. (B2+A2)×192/2,048, is the same as the number of sectors from the top of the extent SS group until immediately before the third right-view data block D[2]. Using this quotient, the LBN for the sector on which the top of the right-view data block D[2] is recorded can be specified by referencing the file entry for the first file SS 244A.

After specifying the LBN via the above-described procedure, the playback device 102 indicates the LBN to the BD-ROM drive 121. In this way, the portion of the extent SS EXTSS[0] recorded starting with the sector for this LBN, i.e. the data blocks D[2], B[2], D[3], B[3], . . . starting from the third right-view data block D[2], are read as aligned units.

The playback device 102 further refers to the extent start points 2442 and 2720 to extract dependent-view data blocks and base-view data blocks alternately from the read extents SS. For example, assume that the data blocks D[n] and B[n] (n=0, 1, 2, . . . ) are read in order from the extent SS EXTSS[0] shown in FIG. 27E. The playback device 102 first extracts B1 source packets from the top of the extent SS EXTSS[0] as the dependent-view data block D[0]. Next, the playback device 102 extracts the B1$^{th}$ source packet and the subsequent (A1-1) source packets, a total of A1 source packets, as the first base-view data block B[0]. The playback device 102 then extracts the (B1+A1)$^{th}$ source packet and the subsequent (B2-B1-1) source packets, a total of (B2-B1) source packets, as the second dependent-view data block D[1]. The playback device 102 further extracts the (A1+B2)$^{th}$ source packet and the subsequent (A2-A1-1) source packets, a total of (A2-A1) source packets, as the second base-view data block B[1,]. Thereafter, the playback device 102 thus continues to detect the boundary between data blocks in the extent SS based on the number of read source packets, thereby alternately extracting dependent-view and base-view data blocks. The extracted base-view and right-view data blocks are transmitted to the system target decoder to be decoded in parallel.

In this way, the playback device 102 in L/R mode can play back 3D video images from the first file SS 244A starting at a specific PTS. As a result, the playback device 102 can in fact benefit from the above-described advantages (A) and (B) regarding control of the BD-ROM drive 121.

<<File Base>>

FIG. 27C is a schematic diagram representing the base-view data blocks B[0], B[1], B[2], . . . extracted from the first file SS 244A by the playback device 102 in L/R mode. As shown in FIG. 27C, when allocating SPNs in order from the top to source packets included in the base-view data block B[n] (n=0, 1, 2, . . . ), the SPN of the source packet located at the top of the data block B[n] is equal to the SPN 2712 indicating the extent start point 2442. The base-view data block group extracted from a single file SS by referring to extent start points, like the base-view data block group B[n], is referred to as a "file base". Furthermore, the base-view data blocks included in a file base are referred to as "base-view extents". As shown in FIG. 27E, each base-view extent EXT1[0], EXT1[1] . . . is referred to by an extent start point 2442 or 2720 in a clip information file.

A base-view extent EXT1[n] shares the same base-view data block B[n] with a 2D extent EXT2D[n]. Accordingly, the file base includes the same main TS as the file 2D. Unlike the 2D extent EXT2D[n], however, the base-view extent EXT1 [n] is not referred to by any file entry. As described above, the base-view extent EXT1[n] is extracted from the extent SS EXTSS [.] in the file SS, with use of the extent start point in the clip information file. The file base thus differs from a conventional file by not including a file entry and by needing an extent start point as a reference for a base-view extent. In this sense, the file base is a "virtual file". In particular, the file base is not recognized by the file system and does not appear in the directory/file structure shown in FIG. 2.

Figure 28:
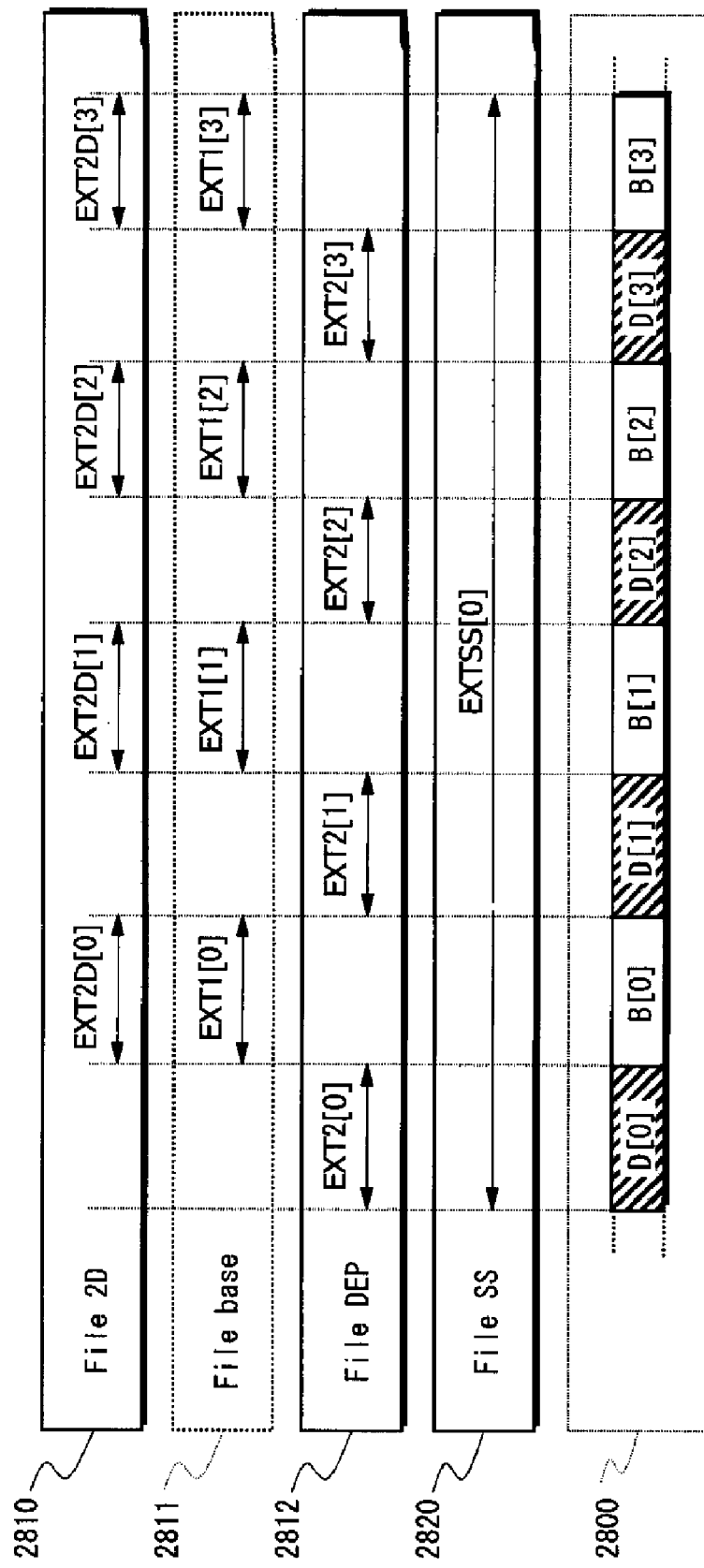
FIG. 28 is a schematic diagram showing the relationship between a single extent block 2800 recorded on the BD-ROM disc 101 and each of the extents in 2D file 2810, file base 2811, file DEP 2812, and file SS 2820.

FIG. 28 is a schematic diagram showing relationships between a single extent block 2800 recorded on the BD-ROM disc 101, and each of the extent blocks in a file 2D 2810, a file base 2811, a file DEP 2812, and a file SS 2820. As shown in FIG. 28, the extent block 2800 includes the dependent-view data block D [n] and the base-view data block B [n] (n=0, 1, 2, 3, ... ). The base-view data block B[n] belongs to the file 2D 2810 as the 2D extent EXT2D[n]. The dependent-view data block D[n] belongs to the file DEP 2812 as the dependent-view extent EXT2[n]. The entirety of the extent block 2800 belongs to the file SS 2820 as one extent SS EXTSS[0]. Accordingly, the extent SS EXTSS[0] shares the base-view data block B[n] in common with the 2D extent EXT2D[n], and shares the dependent-view data block D [n] with the dependent-view extent EXT2 [n]. After the extent SS EXTSS [0] is read into the playback device 102, the read extent SS EXTSS[0] is separated into the dependent-view data block D[n] and the base-view data block B[n]. These base-view data blocks B[n] belong to the file base 2811 as the base-view extent EXT1[n]. The boundary in the extent SS EXTSS [0] between the base-view extent EXT1[n] and the dependent-view extent EXT2[n] is specified with use of the extent start point in the clip information file corresponding to each of the file 2D 2810 and the file DEP 2812.

<<Dependent-View Clip Information File>>

The dependent-view clip information file has the same data structure as the 2D clip information file shown in FIGS. 24-27. Accordingly, the following description covers the differences between the dependent-view clip information file and the 2D clip information file, citing the above description with regard to the similarities.

A dependent-view clip information file differs from a 2D clip information file mainly in the following three points: (i) conditions are placed on the stream attribute information, (ii) conditions are placed on the entry points, and (iii) the 3D meta data does not include offset tables.

(i) When the base-view video stream and the dependent-view video stream are to be used for playback of 3D video images by a playback device 102 in L/R mode, as shown in FIG. 6, the dependent-view video stream is compressed using the base-view video stream. At this point, the video stream attributes of the dependent-view video stream are equivalent to the base-view video stream. The video stream attribute information for the base-view video stream is associated with PID=0x1011 in the stream attribute information 2420 in the 2D clip information file. Meanwhile, the video stream attribute information for the dependent-view video stream is associated with PID=0x1012 or 0x1013 in the stream attribute information in the dependent-view clip information file. Accordingly, the items shown in FIG. 24, i.e. the codec, resolution, aspect ratio, and frame rate, have to match between these two pieces of video stream attribute information. If the codec type matches, then a reference relationship between base-view pictures and dependent-view pictures is established during coding, and thus each picture can be decoded. If the resolution, aspect ratio, and frame rate all match, then on-screen-presentation of the left and right videos can be synchronized. Therefore, these videos can be shown as 3D video images without making the viewer feel uncomfortable.

(ii) The entry map in the dependent-view clip information file includes a table allocated to the dependent-view video stream. Like the table 2500 shown in FIG. 25A, this table includes an entry map header and entry points. The entry map header indicates the PID for the dependent-view video stream allocated to the table, i.e. either 0x1012 or 0x1013. In each entry point, a pair of a PTS and an SPN is associated with a single EP_ID. The PTS for each entry point is the same as the PTS for the top picture in one of the GOPs included in the dependent-view video stream. The SPN for each entry point is the same as the top SPN of the source packet group stored in the picture indicated by the PTS belonging to the same entry point. This SPN refers to a serial number assigned consecutively from the top to the source packet group belonging to the file DEP, i.e. the source packet group constituting the sub-TS. The PTS for each entry point has to match the PTS, within the entry map in the 2D clip information file, for the entry point in the table allotted to the base-view video stream. In other words, whenever an entry point is set to the top of a source packet group that includes one of a set of pictures included in the same 3D VAU, an entry point always has to be set to the top of the source packet group that includes the other picture.

Figure 29:
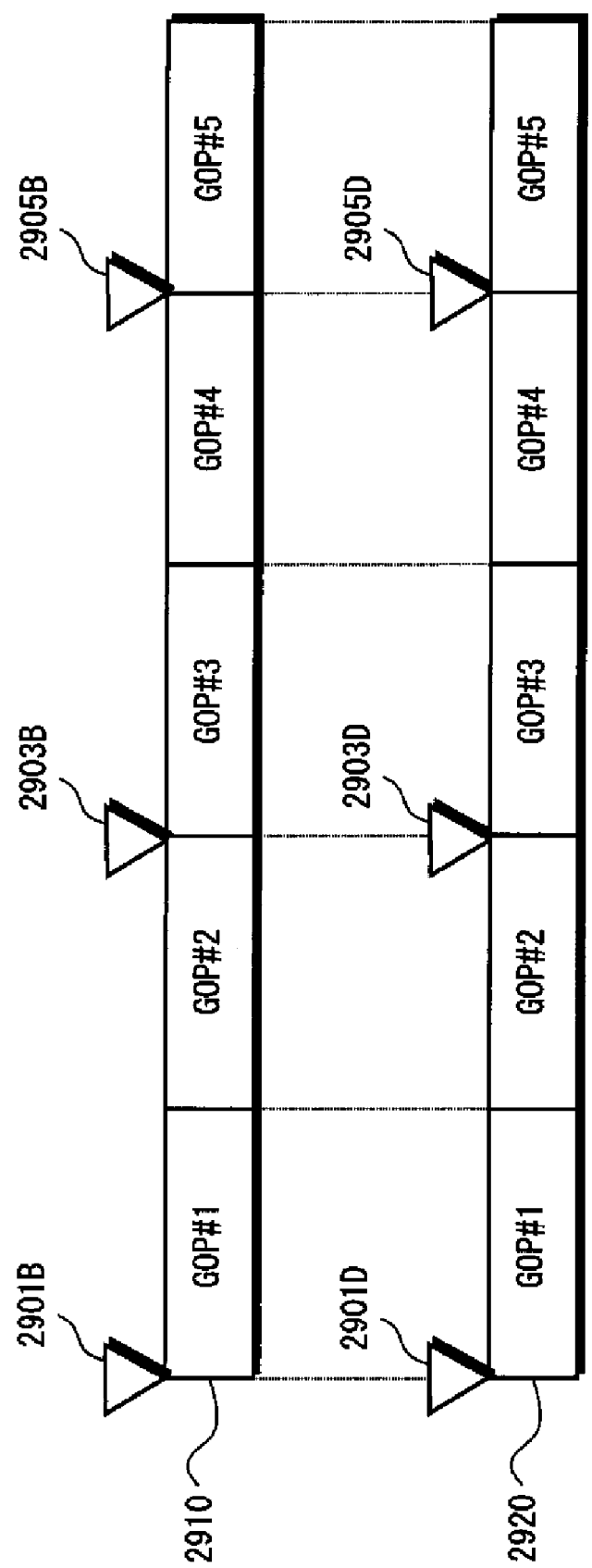
FIG. 29 is a schematic diagram showing exemplary entry points selected in a base-view video stream 2910 and a dependent-view video stream 2920.

FIG. 29 is a schematic diagram showing an example of entry points set in a base-view video stream 2910 and a dependent-view video stream 2920. In the two video streams 2910 and 2920, GOPs that are the same number from the top represent video for the same playback period. As shown in FIG. 29, in the base-view video stream 2910, entry points 2901B, 2903B, and 2905B are set to the top of the odd-numbered COPS as counted from the top, i.e. GOP #1, GOP #3, and GOP #5. Accordingly, in the dependent-view video stream 2920 as well, entry points 2901D, 2903D, and 2905D are set to the top of the odd-numbered GOPS as counted from the top, i.e. GOP #1, GOP #3, and GOP #5. In this case, when the 3D playback device 102 begins playback of 3D video images from GOP #3, for example, it can immediately calculate the address of the position to start playback in the file SS from the SPN of the corresponding entry points 2903B and 2903D. In particular, when both entry points 2903B and 2903D are set to the top of a data block, then as can be understood from FIG. 27E, the sum of the SPNs of the entry points 2903B and 2903D is the same as the SPN of the playback start position in the file SS. As described with reference to FIG. 27E, from this number of source packets, it is possible to calculate the LBN of the sector on which the part of the file SS for the position to start playback is recorded. In this way, even during playback of 3D video images, it is possible to improve response speed for processing that requires random access to the video stream, such as interrupt playback or the like.

<<2D Playlist File>>

Figure 30:
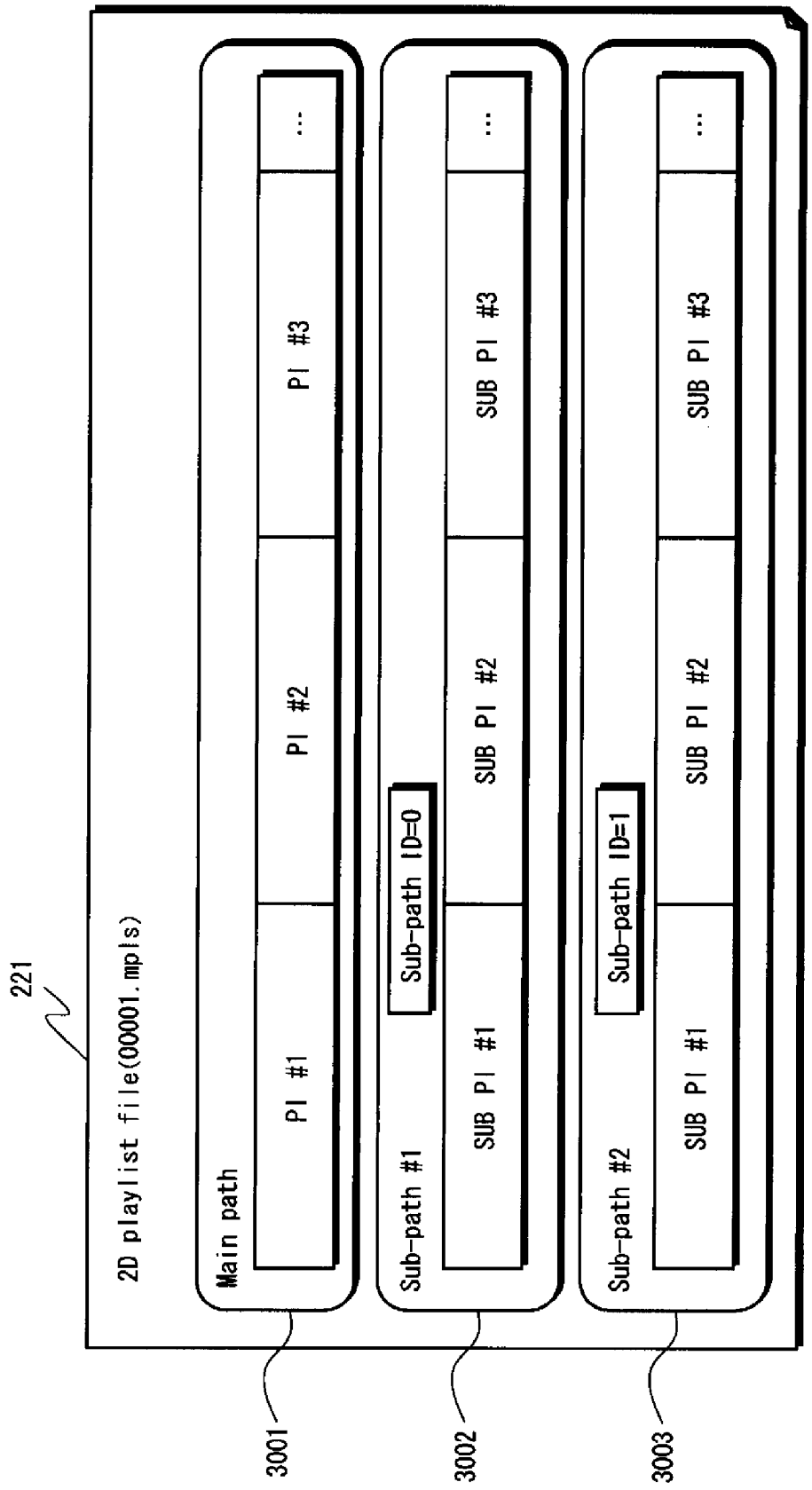
FIG. 30 is a schematic diagram showing a data structure of a 2D playlist file.

FIG. 30 is a schematic diagram showing the data structure of a 2D playlist file. The first playlist file (00001.mpls) 221 shown in FIG. 2 has this data structure. As shown in FIG. 30, the 2D playlist file 221 includes a main path 3001 and two sub-paths 3002 and 3003.

The main path 3001 is a sequence of playitem information pieces (PI) that defines the main playback path for the file 2D 241, i.e. the section for playback and the section's playback order. Each PI is identified with a unique playitem ID=#N (N=1, 2, 3 . . . ). Each PI#N defines a different playback section along the main playback path with a pair of PTSs. One of the PTSs in the pair represents the start time (In-Time) of the playback section, and the other represents the end time (Out-Time). Furthermore, the order of the PIs in the main path 3001 represents the order of corresponding playback sections in the playback path.

Each of the sub-paths 3002 and 3003 is a sequence of sub-playitem information pieces (SUB_PI) that defines a playback path that can be associated in parallel with the main playback path for the file 2D 241. Such a playback path is a different section of the file 2D 241 than is represented by the main path 3001, or is a section of stream data multiplexed in another file 2D, along with the corresponding playback order. Such stream data represents other 2D video images to be played back simultaneously with 2D video images played back from the file 2D 241 in accordance with the main path 3001. These other 2D video images include, for example, sub-video in a picture-in-picture format, a browser window, a pop-up menu, or subtitles. Serial numbers "0" and "1" are assigned to the sub-paths 3002 and 3003 in the order of registration in the 2D playlist file 221. These serial numbers are used as sub-path IDs to identify the sub-paths 3002 and 3003. In the sub-paths 3002 and 3003, each SUB_PI is identified by a unique sub-playitem ID=#M (M=1, 2, 3, . . . ). Each SUB_PI#M defines a different playback section along the playback path with a pair of PTSs. One of the PTSs in the pair represents the playback start time of the playback section, and the other represents the playback end time. Furthermore, the order of the SUB_PIs in the sub-paths 3002 and 3003 represents the order of corresponding playback sections in the playback path.

Figure 31:
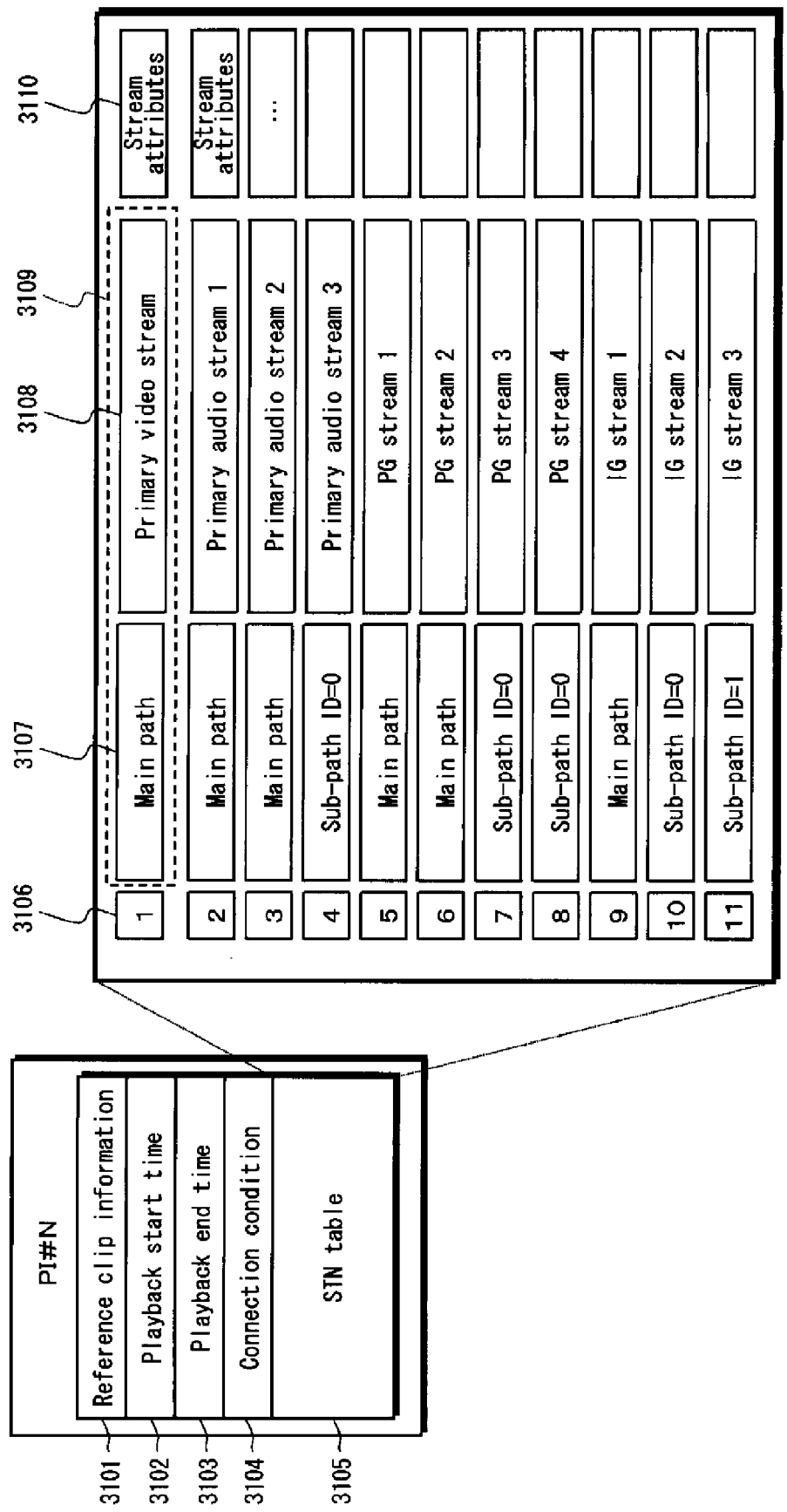
FIG. 31 is a schematic diagram showing a data structure of a PI#N shown in FIG. 30.

FIG. 31 is a schematic diagram showing the data structure of a PI#N. As shown in FIG. 31, a PI#N includes a piece of reference clip information 3101, a playback start time (In_Time) 3102, a playback end time (Out_Time) 3103, a CC 3104, and a stream selection table (hereinafter referred to as "STN table" (stream number table)) 3105. The reference clip information 3101 is information for identifying the 2D clip information file 231. The playback start time 3102 and playback end time 3103 respectively indicate PTSs for the top and the tail of the section for playback of the file 2D 241. The CC 3104 specifies a condition for connecting video in the playback section specified by a playback start time 3102 and a playback end time 3103 to video in the playback section specified by the previous PI#(N−1). The STN table 3105 is a list of elementary streams that can be selected from the file 2D 241 by the decoder in the playback device 102 from the playback start time 3102 until the playback end time 3103.

The data structure of a SUB_PI is the same as the data structure of the PI shown in FIG. 31 insofar as it includes reference clip information, a playback start time, and a playback end time. In particular, the playback start time and playback end time of a SUB_PI are expressed as values along the same time axis as a PI. The SUB_PI further includes an "SP connection condition" field. The SP connection condition has the same meaning as a PI connection condition.

[Connection Condition]

The connection condition (hereinafter abbreviated as CC) 3104 can be one of three values, for example, "1", "5", and "6". When the CC 3104 is "1", the video to be played back from the section of the file 2D 241 specified by the PI#N does not need to be seamlessly connected to the video played back from the section of the file 2D 241 specified by the immediately preceding PI#N. On the other hand, when the CC 3104 indicates "5" or "6", both video images need to be seamlessly connected.

FIGS. 32A and 32B are schematic diagrams showing the relationship between playback sections 3201 and 3202 that are to be connected when the CC 3104 respectively indicates "5" and "6". In this case, the PI#N(N−1) specifies a first section 3201 in the file 2D 241, and the PI#N specifies a second section 3202 in the file 2D 241. As shown in FIG. 32A, when the CC 3104 indicates "5", the STCs of the PI#(N−1) and PI#N may be nonconsecutive. That is, the PTS#1 at the tail of the first section 3201 and the PTS#2 at the top of the second section 3202 maybe nonconsecutive. Several constraint conditions, however, need to be satisfied. For example, the first section 3201 and second section 3202 need to be created so that the decoder can smoothly continue to decode data even when the second section 3202 is supplied to the decoder consecutively after the first section 3201. Furthermore, the last frame of the audio stream contained in the first section 3201 needs to overlap the top frame of the audio stream contained in the second section 3202. On the other hand, as shown in FIG. 32B, when the CC 3104 indicates "6", the first section 3201 and the second section 3202 need to be able to be handled as successive sections for the decoder to duly decode. That is, STCs and ATCs need to be consecutive between the first section 3201 and the second section 3202. Similarly, when the SP connection condition is "5" or "6", STCs and ATCs need to be consecutive between sections of the file 2D specified by two consecutive SUB_PIs.

[STN Table]

Referring again to. FIG. 31, the STN table 3105 is an array of stream registration information. "Stream registration information" is information individually listing the elementary streams that can be selected for playback from the main TS between the playback start time 3102 and playback end time 3103. The stream number (STN) 3106 is a serial number allocated individually to stream registration information and is used by the playback device 102 to identify each elementary stream. The STN 3106 further indicates priority for selection among elementary streams of the same type. The stream registration information includes a stream entry 3109 and stream attribute information 3110. The stream entry 3109 includes stream path information 3107 and stream identification information 3108. The stream path information 3107 is information indicating the file 2D to which the selected elementary stream belongs. For example, if the stream path information 3107 indicates "main path", the file 2D corresponds to the 2D clip information file indicated by reference clip information 3101. On the other hand, if the stream path information 3107 indicates "sub-path ID=1", the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 3102 until the playback end time 3103 specified by the PI included in the STN table 3105. The stream identification information 3108 indicates the PID for the elementary stream multiplexed in the file 2D specified by the stream path information 3107. The elementary stream indicated by this PID can be selected from the playback start time 3102 until the playback end time 3103. The stream attribute information 3110 indicates attribute information for each elementary stream. For example, the attribute information of an audio stream, a PG stream, and an IG stream indicates a language type of the stream.

[Playback of 2D Video Images in Accordance With a 2D Playlist File]

Figure 33:
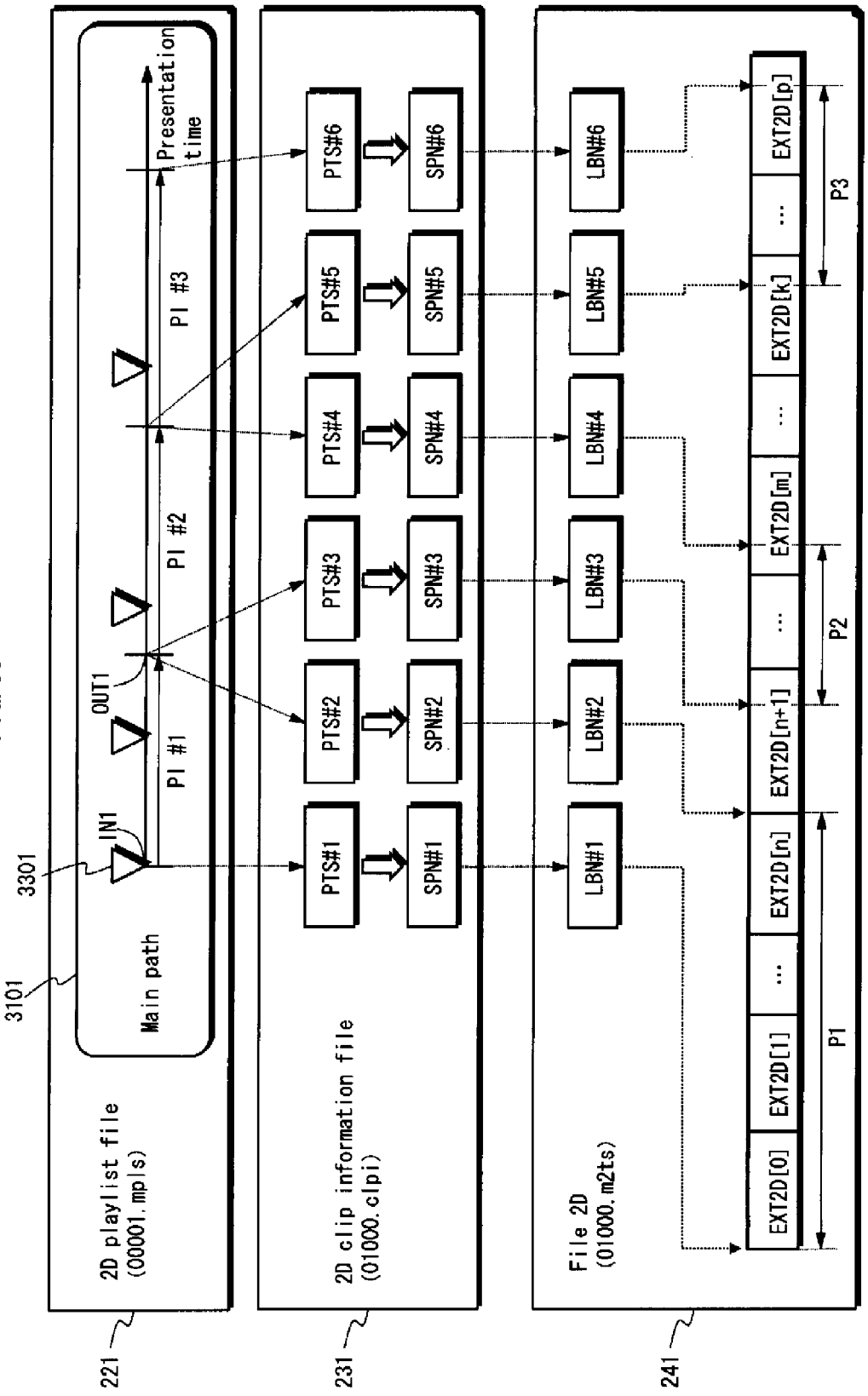
FIG. 33 is a schematic diagram showing the relationship between PTSs shown in the 2D playlist file (00001.mpls) 221, and portions to be played back from the file 2D (01000.m2ts) 241.

FIG. 33 is a schematic diagram showing the relationships between the PTSs indicated by the 2D playlist file (00001.mpls) 221 and the sections played back from the file 2D (01000.m2ts) 241. As shown in FIG. 33, in the main path 3001 in the 2D playlist file 221, the PI#1 specifies a PTS#1, which indicates a playback start time IN1, and a PTS#2, which indicates a playback end time OUT1 . The reference clip information 3101 for the PI#1 indicates the 2D clip information file (01000.clpi) 231. When playing back 2D video images in accordance with the 2D playlist file 221, the playback device 102 first reads the PTS#1 and PTS#2 from the PI#1. Next, the playback device 102 refers to the entry map in the 2D clip information file 231 to retrieve from the file 2D 241 the SPN#1 and SPN#2 that correspond to the PTS#1 and PTS#2 The playback device 102 then calculates the corresponding numbers of sectors from the SPN#1 and SPN#2. Furthermore, the playback device 102 refers to these numbers of sectors and the allocation descriptors in the file entry for the file 2D 241 to specify the LBN#1 and LBN#2 at the beginning and end, respectively, of the sector group P1 on which the 2D extent group EXT2D[0], . . . , EXT2D[n] to be played back is recorded. Calculation of the numbers of sectors and specification of the LBNs are as per the description of FIGS. 27B and 27C. Finally, the playback device 102 indicates the range from LBN#1 to LBN#2 to the BD-ROM drive 121. The source packet group belonging to the 2D extent group EXT2D[0], . . . , EXT2D[n] is thus read from the sector group P1 in this range. Similarly, the pair PTS#3 and PTS#4 indicated by the PI#2 are first converted into a pair of SPN#3 and SPN#4 by referring to the entry map in the 2D clip information file 231. Then, referring to the allocation descriptors in the file entry for the file 2D 241, the pair of SPN#3 and SPN#4 are converted into a pair of LBN#3 and LBN#4. Furthermore, a source packet group belonging to the 2D extent group is read from the sector group P2 in a range from the LBN#3 to the LBN#4. Conversion of a pair of PTS#5 and PTS#6 indicated by the PI#3 to a pair of SPN#5 and SPN#6, conversion of the pair of SPN#5 and SPN#6 to a pair of LBN#5 and LBN#6, and reading of a source packet group from the sector group P3 in a range from the LBN#5 to the LBN#6 are similarly performed. The playback device 102 thus plays back 2D video images from the file 2D 241 in accordance with the main path 3001 in the 2D playlist file 221.

The 2D playlist file 221 may include an entry mark 3301. The entry mark 3301 indicates a time point in the main path 3001 at which playback is actually to start. For example, as shown in FIG. 33, multiple entry marks 3301 can be set for the PI#1. The entry mark 3301 is particularly used for searching for a position to start playback during random access. For example, when the 2D playlist file 221 specifies a playback path for a movie title, the entry marks 3301 are assigned to the top of each chapter. Consequently, the playback device 102 can play back the movie title by chapters.

<<3D Playlist File>>

Figure 34:
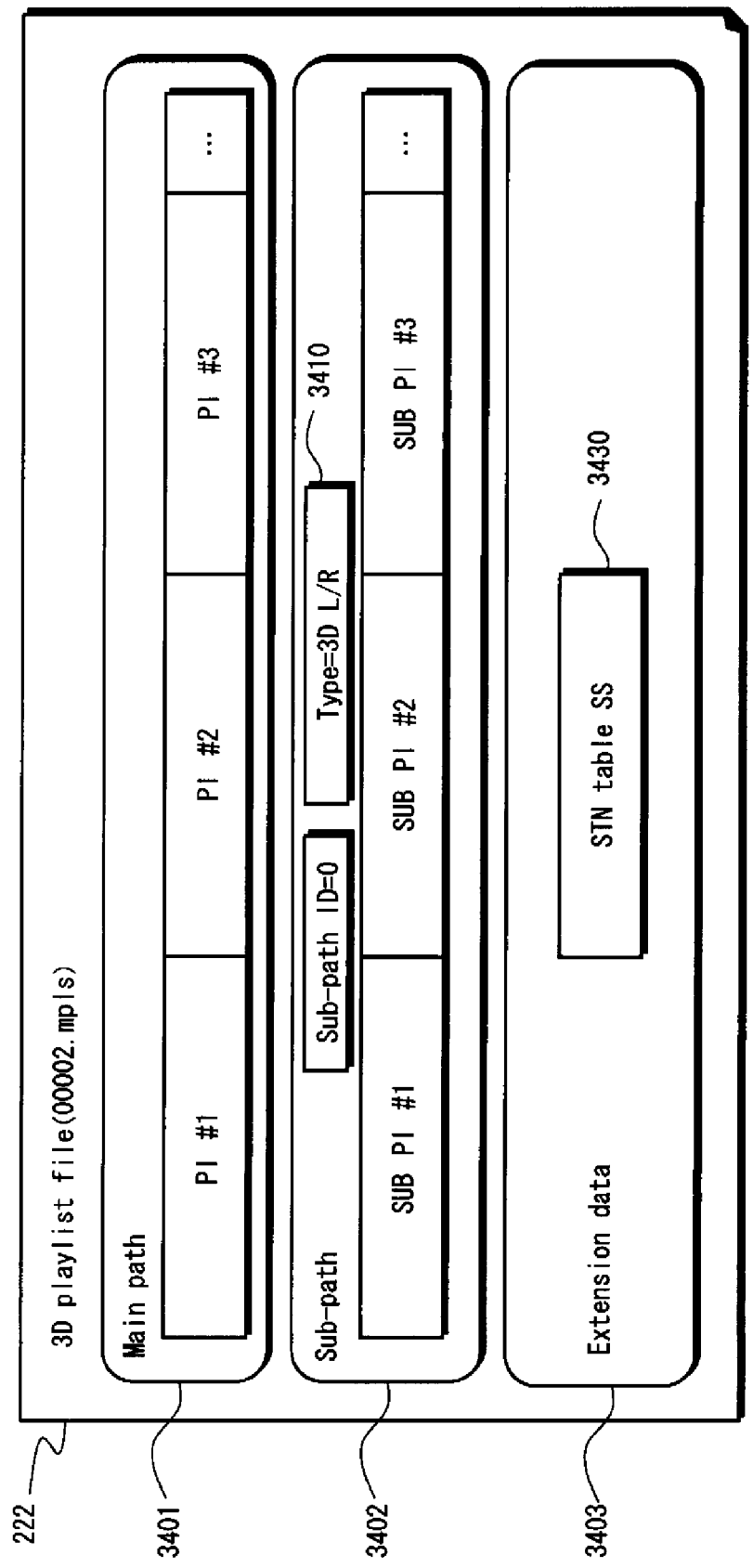
FIG. 34 is a schematic diagram showing a data structure of a 3D playlist file.

FIG. 34 is a schematic diagram showing the data structure of the 3D playlist file. The second playlist file (00002.mpls) 222 shown in FIG. 2 has this data structure. The second playlist file (00003.mpls) 223 is also similar. As shown in FIG. 34, the 3D playlist file 222 includes a main path 3401, sub-path 3402, and extension data 3403.

The main path 3401 specifies the playback path of the main TS shown in FIG. 3A. Accordingly, the main path 3401 is the same as the main path 3001 for the 2D playlist file 221 shown in FIG. 30. The playback device 102 in 2D playback mode can play back 2D video images from the file 2D 241 in accordance with the main path 3401 in the 3D playlist file 222.

The sub-path 3402 specifies the playback path for the sub-TSs shown in FIGS. 3B and 6C, i.e. the playback path for both the first file DEP 242 and the second file DEP 243. The data structure of the sub-path 3402 is the same as the data structure of the sub-paths 3002 and 3003 in the 2D playlist file shown in FIG. 30. Accordingly, the description of FIG. 30 is cited regarding details on this similar data structure, in particular regarding details on the data structure of the SUB_PI.

The SUB_PI#N (N=1, 2, 3, . . . ) in the sub-path 3402 are in one-to-one correspondence with the PI#N in the main path 3401. Furthermore, the playback start time and playback end time specified by each SUB_PI#N is the same as the playback start time and playback end time specified by the corresponding PI#N. The sub-path 3402 additionally includes a sub-path type 3410. The "sub-path type" generally indicates whether playback processing should be synchronized between the main path and the sub-path. In the 3D playlist file 222, the sub-path type 3410 in particular indicates the type of the 3D playback mode, i.e. the type of the dependent-view video stream to be played back in accordance with the sub-path 3402. In FIG. 34, the value of the sub-path type 3410 is "3D L/R", thus indicating that the 3D playback mode is L/R mode, i.e. that the right-view video stream is targeted for playback. On the other hand, a value of "3D depth" for the sub-path type 3410 indicates that the 3D playback mode is depth mode, i.e. that the depth map stream is targeted for playback. When the playback device 102 in 3D playback mode detects that the value of the sub-path type 3410 is "3D L/R" or "3D depth", the playback device 102 synchronizes playback processing in accordance with the main path 3401 with playback processing in accordance with the sub-path 3402.

Figure 85:
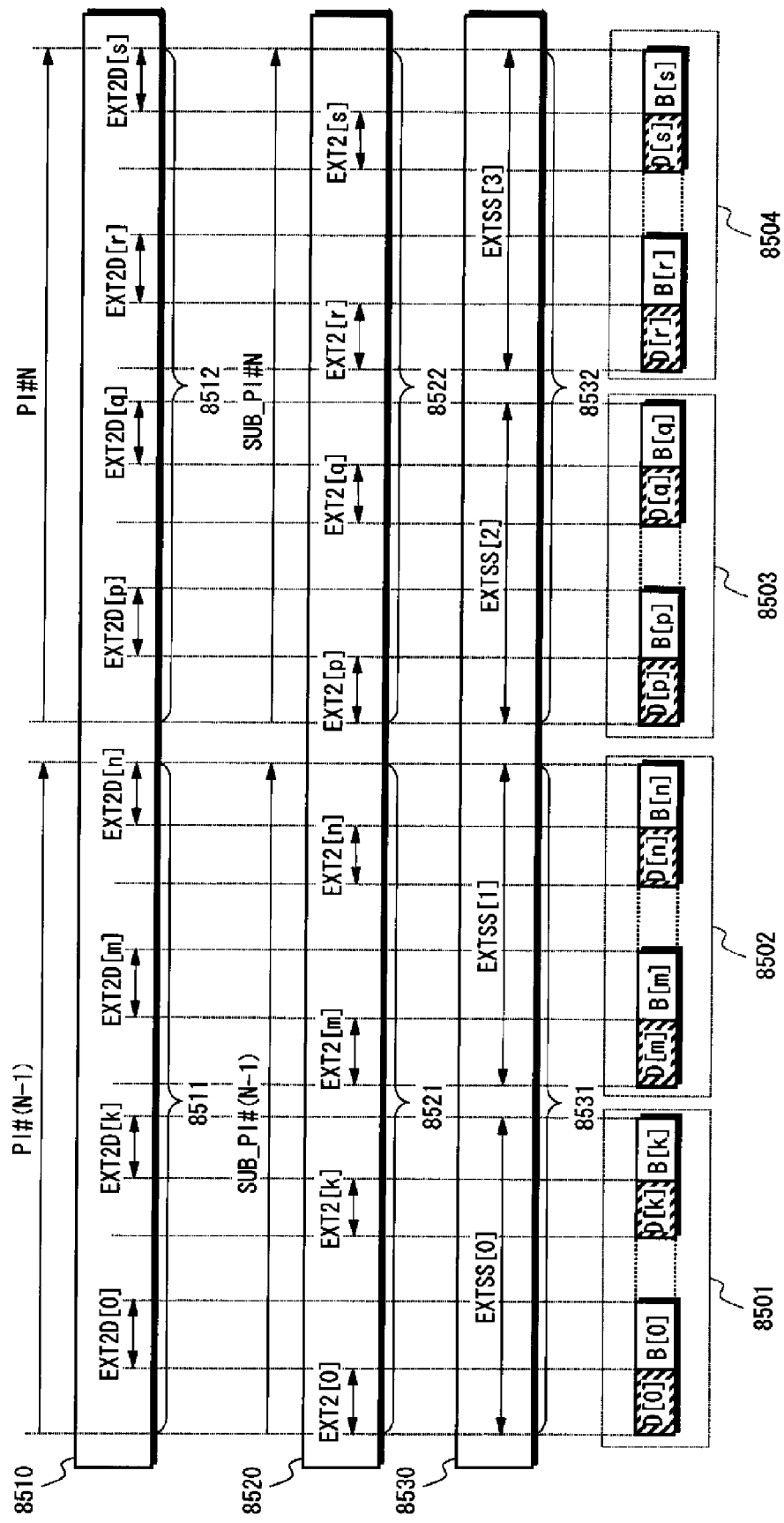
FIG. 85 is a schematic diagram showing the relationship between portions of a file 2D specified by two consecutive PIs shown in FIG. 34, portions of a file DEP specified by the corresponding SUB_PI, portions of a file SS belonging to these portions, and extent blocks referenced by each of these files.

FIG. 85 is a schematic diagram showing the relationship between portions of a file 2D specified by two consecutive PIs, portions of a file DEP specified by the corresponding SUB_PI, portions of a file SS belonging to these portions, and extent blocks referenced by each of these files. In FIG. 85, "N" is an integer greater than or equal to 1, and "k" is an integer greater than or equal to 0. Integers k, n, q, and s are listed in increasing order. The integer "m" is 1 larger than the integer "k", the integer "p" is 1 larger than the integer "n", and the integer "r" is 1 larger than the integer "q":m=k+1, p=n+1, and r=q+1. As shown in FIG. 85, the PI#(N−1) specifies a first portion 8511 of the file 2D 8510, and the PI#N specifies a second portion 8512 of the file 2D 8510. The SUB_PI# (N−1) corresponding to the PI#(N−1) specifies the first portion 8521 of the file DEP 8520, and the SUB_PI#N corresponding to the PI#N specifies the second portion 8522 of the file DEP 8520. The first portions 8511 and 8521 in the files 8510 and 8520 belong to the first portion 8531 of the file SS 8530, and the second portions 8512 and 8522 of the files 8510 and 8520 belong to the second portion 8532 of the file SS 8530. Specifically, for example, the 2D extents EXT2D[0], . . . , EXT2D[k] in the first portion 8511 of the file 2D 8510 share the base-view data blocks B[0], . . . , B[k] in the extent block 8501 with the extent SS EXTSS[0] in the first portion 8531 of the file SS 8530 ("k" is an integer greater than or equal to 0). Meanwhile, the dependent-view extents EXT2[0], . . . , EXT2[k] in the first portion 8521 of the file DEP 8520 shares the dependent-view data blocks D[0], . . . , D[k] in the extent block 8501 with the extent SS EXTSS[0] in the first portion 8531 in the file SS 8530.

When the connection condition (CC) of a PI#N is "5" or "6", the first portion 8511 and the second portion 8512 of the file 2D 8510 are seamlessly connected. Furthermore, the SPCC of the corresponding SUB_PI#N is also "5" or "6". Accordingly, the first portion 8521 and the second portion 8522 of the file DEP 8520 are seamlessly connected. In this case, in the first portion 8531 of the file SS 8530, with the exception of the top extent block 8501, the second and subsequent extent blocks 8502 should satisfy the above Condition 4. Seamless connection between the top extent block 8501 and the second extent block 8502 can easily be realized by designing the top dependent-view block D[0] in the top extent block 8501 to have a sufficient size, for example. Meanwhile, in the second portion 8532 of the file SS 8530, with the exception of the last extent block 8504, the extent blocks 8503 up to the second from the last should satisfy the above-described Condition 4.

Only the playback device 102 in 3D playback mode interprets the extension data 3403; the playback device 102 in 2D playback mode ignores the extension data 3403. In particular, the extension data 3403 includes an extension stream selection table 3430. The "extension stream selection table (STN_table_SS)" (hereinafter abbreviated as STN table SS) is an array of stream registration information to be added to the STN tables indicated by each PI in the main path 3401. This stream registration information indicates elementary streams that can be selected for playback from the main TS.

Figure 35:
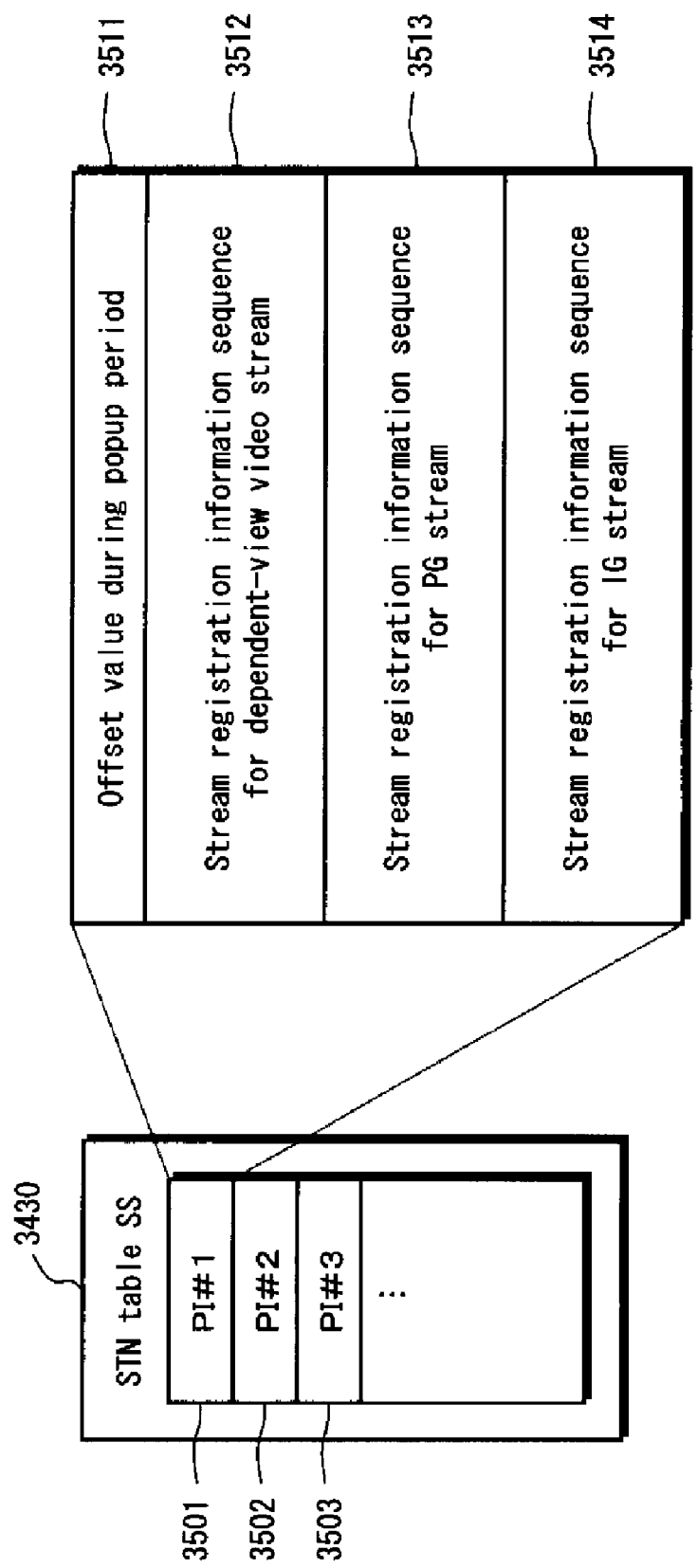
FIG. 35 is a schematic diagram showing a data structure of an STN table SS 3430 shown in FIG. 34.

FIG. 35 is a schematic diagram showing the data structure of an STN table SS 3430. As shown in FIG. 35, an STN table SS 3930 includes stream registration information sequences 3501, 3503, . . . . The stream registration information sequences 3502, 3503, . . . individually correspond to the PI#1, PI#2, PI#3, . . . in the main path 3401 and are used by the playback device 102 in 3D playback mode in combination with the stream registration information sequences included in the STN tables in the corresponding PIs. The stream registration information sequence 3501 corresponding to each PI includes an offset during popup (Fixed_offset_during_Popup) 3511, stream registration information sequence 3512 for the dependent-view video streams, stream registration information sequence 3513 for the PG stream, and stream registration information sequence 3514 for the IG stream.

The offset during popup 3511 indicates whether a popup menu is played back from the IG stream. The playback device 102 in 3D playback mode changes the presentation mode of the video plane and the PG plane in accordance with the value of the offset 3511. There are two types of presentation modes for the video plane: base-view (B)-dependent-view (D) presentation mode and B-B presentation mode. There are three types of presentation modes for the PG plane and IG plane: 2 plane mode, 1 plane+offset mode, and 1 plane+zero offset mode. For example, when the value of the offset during popup 3511 is "0", a popup menu is not played back from the IG stream. At this point, B-D presentation mode is selected as the video plane presentation mode, and 2 plane mode or 1 plane+offset mode is selected as the presentation mode for the PG plane. On the other hand, when the value of the offset during popup 3511 is "1", a popup menu is played back from the IG stream. At this point, B-B presentation mode is selected as the video plane presentation mode, and 1 plane+zero offset mode is selected as the presentation mode for the PG plane.

In "B-D presentation mode", the playback device 102 alternately outputs plane data decoded from the left-view and right-view video streams. Accordingly, since left-view and right-view video frames representing video planes are alternately displayed on the screen of the display device 103, a viewer perceives these frames as 3D video images. In "B-B presentation mode", the playback device 102 outputs plane data decoded only from the base-view video stream twice for a frame while maintaining the operational mode in 3D playback mode (in particular, maintaining the frame rate at the value for 3D playback, e.g. 48 frames/second). Accordingly, only either the left-view or right-view frames are displayed on the screen of the playback device 103, and thus a viewer perceives these frames simply as 2D video images.

In "2 plane mode", when the sub-TS includes both left-view and right-view graphics streams, the playback device 102 decodes and alternately outputs left-view and right-view graphics plane data from the graphics streams. In "1 plane+offset mode", the playback device 102 generates a pair of left-view plane data and right-view plane data from the graphics stream in the main TS via cropping processing and alternately outputs these pieces of plane data. In both of these modes, left-view and right-view PG planes are alternately displayed on the screen of the display device 103, and thus a viewer perceives these frames as 3D video images. In "1 plane+zero offset mode", the playback device 102 temporarily stops cropping processing and outputs plane data decoded from the graphics stream in the main TS twice for a frame while maintaining the operational mode in 3D playback mode. Accordingly, only either the left-view or right-view PG planes are displayed on the screen of the playback device 103, and thus a viewer perceives these planes simply as 2D video images.

The playback device 102 in 3D playback mode refers to the offset during popup 3511 for each PI and selects B-B presentation mode and 1 plane+zero offset mode when a popup menu is played back from an IG stream. While a pop-up menu is displayed, other 3D video images are thus temporarily changed to 2D video images. This improves the visibility and usability of the popup menu.

The stream registration information sequence 3512 for the dependent-view video stream, the stream registration information sequence 3513 for the PG streams, and the stream registration information sequence 3514 for the IG streams each include stream registration information indicating the dependent-view video streams, PG streams, and IG streams that can be selected for playback from the sub-TS. These stream registration information sequences 3512, 3513, and 3514 are each used in combination with stream registration information sequences, located in the STN table of the corresponding PI, that respectively indicate base-view streams, PG streams, and IG streams. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

Figure 36:
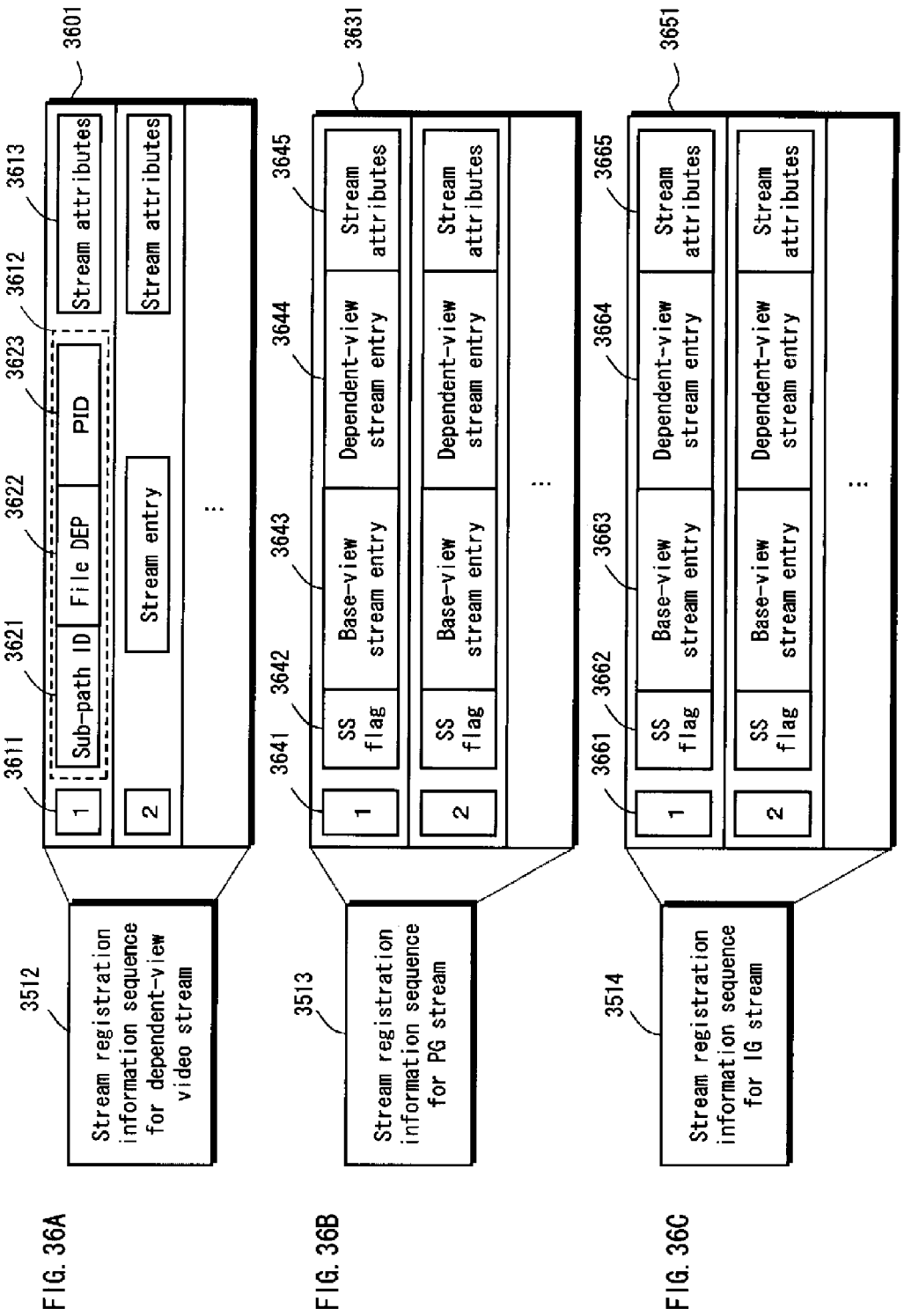
FIGS. 36A, 36B, and 36C are schematic diagrams showing the data structures of a stream registration information sequence 3512 in a dependent-view video stream, a stream registration information sequence 3513 in a PG stream, and a stream registration information sequence 3514 in an IG stream, all of which are shown in FIG. 35.

FIG. 36A is a schematic diagram showing the data structure of a stream registration information sequence 3512 for dependent-view video streams. As shown in FIG. 36A, this stream registration information sequence 3512 generally includes a plurality of pieces of stream registration information (SS_dependent_view_block) 3601. These are the same in number as the pieces of stream registration information in the corresponding PI that indicate the base-view video stream. Each piece of stream registration information 3601 includes an STN 3611, stream entry 3612, and stream attribute information 3613. The STN 3611 is a serial number assigned individually to pieces of stream registration information 3601 and is the same as the STN of the piece of stream registration information, located in the corresponding PI, with which each piece of stream registration information 3601 is combined. The stream entry 3612 includes sub-path ID reference information (ref_to_subpath_id) 3621, stream file reference information (ref_to_subclip_entry_id) 3622, and PID (ref_to_stream_PID_subclip) 3623. The sub-path ID reference information 3621 indicates the sub-path ID of the sub-path that specifies the playback path of the dependent-view video stream. The stream file reference information 3622 is information to identify the file DEP storing this dependent-view video stream. The PID 3623 is the PID for this dependent-view video stream. The stream attribute information 3613 includes attributes for this dependent-view video stream, such as frame rate, resolution, and video format. In particular, these attributes are the same as those for the base-view video stream shown by the piece of stream registration information, located in the corresponding PI, with which each piece of stream registration information 3601 is combined.

FIG. 36B is a schematic diagram showing the data structure of a stream registration information sequence 3513 for PG streams. As shown in FIG. 36B, this stream registration information sequence 3513 generally includes a plurality of pieces of stream registration information 3631. These are the same in number as the pieces of stream registration information in the corresponding PI that indicates the PG streams. Each piece of stream registration information 3631 includes an STN 3641, stereoscopic flag (is_SS_PG) 3642, base-view stream entry (stream_entry_for_base_view) 3643, dependent-view stream entry (stream_entry_for_dependent_view) 3644, and stream attribute information 3645. The STN 3641 is a serial number assigned individually to pieces of stream registration information 3631 and is the same as the STN of the piece of stream registration information, located in the corresponding PI, with which each piece of stream registration information 3631 is combined. The stereoscopic flag 3642 indicates whether both base-view and dependent-view, e.g. left-view and right-view, PG streams are included on a BD-ROM disc 101. If the stereoscopic flag 3642 is on, both PG streams are included in the sub-TS. Accordingly, the playback device reads all of the fields in the base-view stream entry 3643, the dependent-view stream entry 3644, and the stream attribute information 3645. If the stereoscopic flag 3642 is off, the playback device ignores all of these fields 3643-3645. Both the base-view stream entry 3643 and the dependent-view stream entry 3644 include sub-path ID reference information, stream file reference information, and a PID. The sub-path ID reference information indicates the sub-path IDs of the sub-paths that specify the playback paths of the base-view and dependent-view PG streams. The stream file reference information is information to identify the file DEP storing the PG streams. The PIDs are the PIDs for the PG streams. The stream attribute information 3645 includes attributes for the PG streams, e.g. language type.

FIG. 36C is a schematic diagram showing the data structure of a stream registration information sequence 3514 for IG streams. As shown in FIG. 36C, this stream registration information sequence 3514 generally includes a plurality of pieces of stream registration information 3651. These are the same in number as the pieces of stream registration information in the corresponding PI that indicates the IG streams. Each piece of stream registration information 3651 includes an STN 3661, stereoscopic flag (is_SS_IG) 3662, base-view stream entry 3663, dependent-view stream entry 3664, and stream attribute information 3662. The STN 3661 is a serial number assigned individually to pieces of stream registration information 3651 and is the same as the STN of the piece of stream registration information, located in the corresponding PI, with which each piece of stream registration information 3651 is combined. The stereoscopic flag 3662 indicates whether both base-view and dependent-view, e.g. left-view and right-view, IG streams are included on a BD-ROM disc 101. If the stereoscopic flag 3662 is on, both IG streams are included in the sub-TS. Accordingly, the playback device reads all of the fields in the base-view stream entry 3663, the dependent-view stream entry 3664, and the stream attribute information 3662. If the stereoscopic flag 3662 is off, the playback device ignores all of these fields 3663-3662. Both the base-view stream entry 3663 and the dependent-view stream entry 3664 include sub-path ID reference information, stream file reference information, and a PID. The sub-path ID reference information indicates the sub-path IDs of the sub-paths that specify the playback paths of the base-view and dependent-view IG streams. The stream file reference information is information to identify the file DEP storing the IG streams. The PIDs are the PIDs for the IG streams. The stream attribute information 3662 includes attributes for the IG streams, e.g. language type.

[Playback of 3D Video Images in Accordance With a 3D Playlist File]

Figure 37:
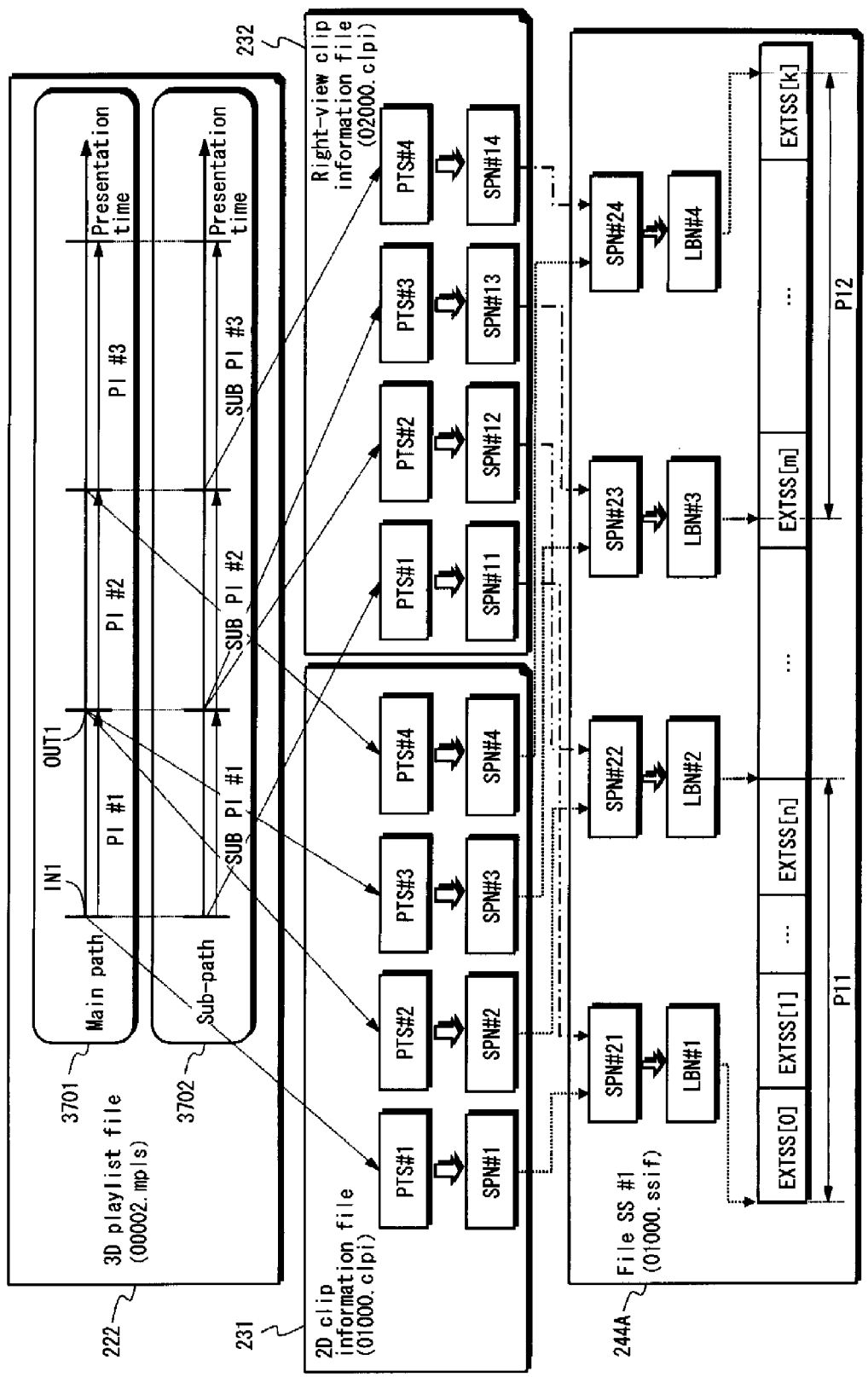
FIG. 37 is a schematic diagram showing the relationship between PTSs in a 3D playlist file (00002.mpls) 222 and portions to be played back from the first file SS (01000.ssif) 244A.

FIG. 37 is a schematic diagram showing the relationships between the PTSs indicated by the 3D playlist file (00002.mpls) 222 and the sections played back from the first file SS (01000.ssif) 244A. As shown in FIG. 37, in the main path 3701 of the 3D playlist file 222, the PI#1 specifies a PTS#1, which indicates a playback start time IN1, and a PTS#2, which indicates a playback end time OUT1. The reference clip information for the PI#1 indicates the 2D clip information file (01000.clpi) 231. In the sub-path 3702, which indicates that the sub-path type is "3D L/R", the SUBPI#1 specifies the same PTS#1 and PTS#2 as the PI#1. The reference clip information for the SUB_PI#1 indicates the right-view clip information file (02000.clpi) 232.

When playing back 3D video images in accordance with the 3D playlist file 222, the playback device 102 first reads PTS#1 and PTS#2 from the PI#1 and SUB_PI#1. Next, the playback device 102 refers to the entry map in the 2D clip information file 231 to retrieve from the file 2D 241 the SPN#1 and SPN#2 that correspond to the PTS#1 and PTS#2. In parallel, the playback device 102 refers to the entry map in the right-view clip information file 232 to retrieve from the first file DEP 242 the SPN#11 and SPN#12 that correspond to the PTS#1 and PTS#2. As described with reference to FIG. 27E, the playback device 102 then uses the extent start points 2442 and 2720 in the clip information files 231 and 232 to calculate, from SPN#1 and SPN#11, the number of source packets SPN#21 from the top of the first file SS 244A to the position to start playback. Similarly, the playback device 102 calculates, from SPN#2 and SPN#12, the number of source packets SPN#22 from the top of the first file SS 244A to the position to start playback. The playback device 102 further calculates the numbers of sectors corresponding to the SPN#21 and SPN#22. Next, the playback device 102 refers to these numbers of sectors and the allocation descriptors in the file entry for the file SS 244A to specify the LBN#1 and LBN#2 at the beginning and end, respectively, of the sector group P11 on which the extent SS group EXTSS[0], . . . , EXTSS[n] to be played back is recorded. Calculation of the numbers of sectors and specification of the LBNs are as per the description of FIG. 33E. Finally, the playback device 102 indicates the range from LBN#1 to LBN#2 to the BD-ROM drive 121. The source packet group belonging to the extent SS group EXTSS[0], . . . , EXTSS[n] is thus read from the sector group P11 in this range. Similarly, the pair PTS#3 and PTS#4 indicated by the PI#2 and SUB_PI#2 are first converted into a pair of SPN#3 and SPN#4 and a pair of SPN#13 and SPN#14 by referring to the entry maps in the clip information files 231 and 232. Then, the number of source packets SPN#23 from the top of the first file SS 244A to the position to start playback is calculated from SPN#3 and SPN#13, and the number of source packets SPN#24 from the top of the first file SS 244A to the position to end playback is calculated from SPN#4 and SPN#14. Next, referring to the file entry for the first file SS 244A, the pair of SPN#23 and SPN#24 are converted into a pair of LBN#3 and LBN#4. Furthermore, a source packet group belonging to the extent SS group is read from the sector group P12 in a range from the LBN#3 to the LBN#4.

In parallel with the above-described read processing, as described with reference to FIG. 27E, the playback device

102 refers to the extent start points 2442 and 2720 in the clip information files 231 and 232 to extract base-view extents from each 3D extent and decode the base-view extents in parallel with the remaining right-view extents. The playback device 102 can thus play back 3D video images from the first file SS 244A in accordance with the 3D playlist file 222.

<<Index Table>>

Figure 38:
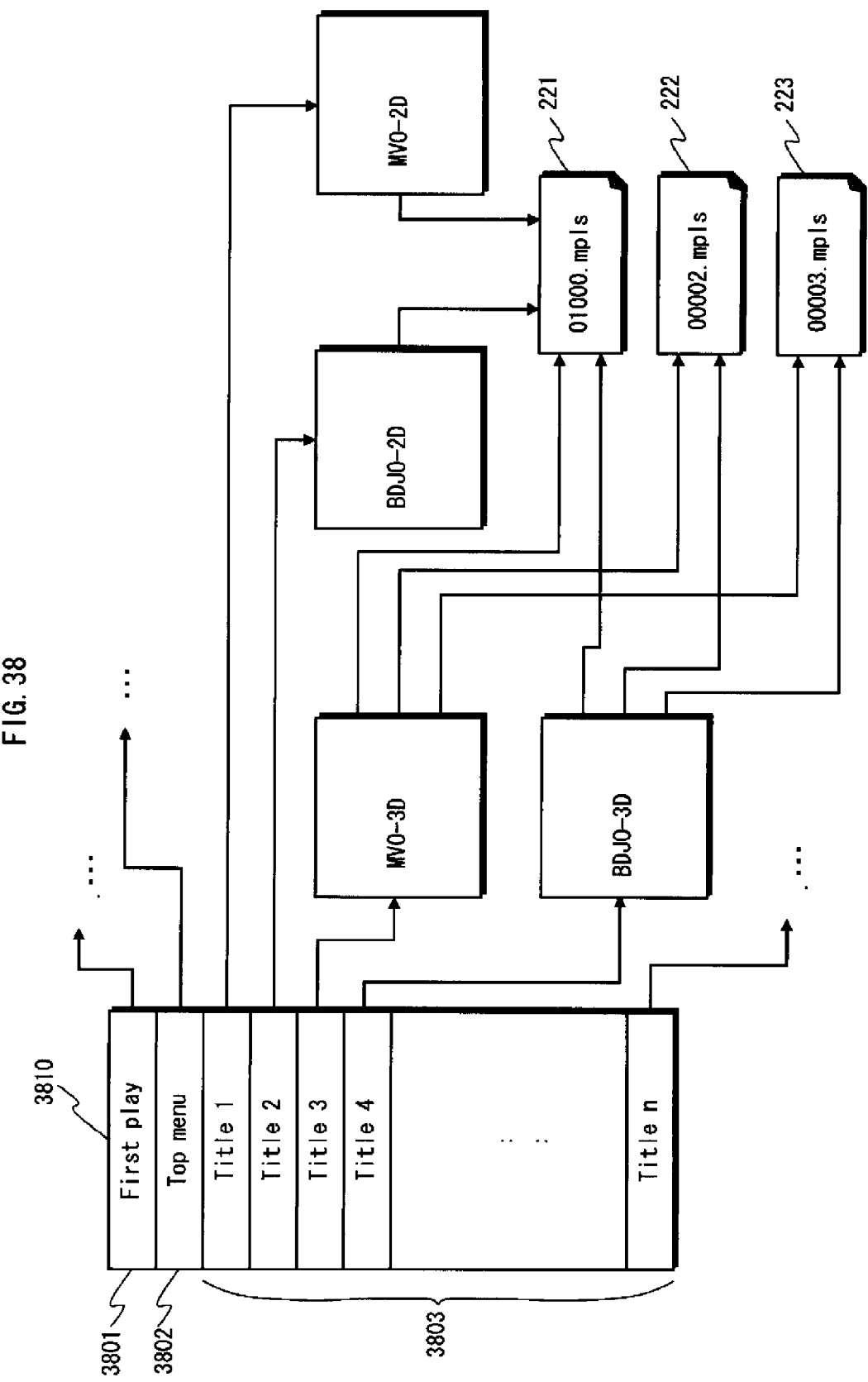
FIG. 38 is a schematic diagram showing an index table 3810 in an index file (index.bdmv) 211 shown in FIG. 2.

FIG. 38 is a schematic diagram showing an index table 3810 in the index file (index.bdmv) 211 shown in FIG. 2. As shown in FIG. 38, the index table 3810 stores the items "first play" 3801, "top menu" 3802, and "title k" 3803 (k=1, 2, ..., n; an integer n is equal to or greater than one). Each item is associated with either a movie object MVO-2D, MVO-3D, ..., or with a BD-J object BDJO-2D, BDJO-3D, .... Each time a title or a menu is called in response to a user operation or an application program, a control unit in the playback device 102 refers to a corresponding item in the index table 3810. Furthermore, the control unit calls an object associated with the item from the BD-ROM disc 101 and accordingly executes a variety of processes. Specifically, the "first play" 3801 specifies an object to be called when the disc 101 is loaded into the BD-ROM drive 121. The "top menu" 3802 specifies an object for displaying a menu on the display device 103 when a command "go back to menu" is input, for example, by user operation. In the "title k" 3803, the titles that constitute the content on the disc 101 are individually allocated. For example, when a title for playback is specified by user operation, in the item "title k" in which the title is allocated, the object for playing back a video from the AV stream file corresponding to the title is specified.

In the example shown in FIG. 38, the items "title 1" and "title 2" are allocated to titles of 2D video images. The movie object associated with the item "title 1", MVO-2D, includes a group of commands related to playback processes for 2D video images using the 2D playlist file (00001.mpls) 221. When the playback device 102 refers to the item "title 1", then in accordance with the movie object MVO-2D, the 2D playlist file 221 is read from the disc 101, and playback processes for 2D video images are executed in accordance with the playback path specified therein. The BD-J object associated with the item "title 2", BDJO-2D, includes an application management table related to playback processes for 2D video images using the 2D playlist file 221. When the playback device 102 refers to the item "title 2", then in accordance with the application management table in the BD-J object BDJO-2D, a Java application program is called from the JAR file 261 and executed. In this way, the 2D playlist file 221 is read from the disc 101, and playback processes for 2D video images are executed in accordance with the playback path specified therein.

Furthermore, in the example shown in FIG. 38, the items "title 3" and "title 4" are allocated to titles of 3D video images. The movie object associated with the item "title 3", MVO-3D, includes, in addition to a group of commands related to playback processes for 2D video images using the 2D playlist file 221, a group of commands related to playback processes for 3D video images using either 3D playlist file (00002.mpls) 222 or (00003.mpls) 223. In the BD-J object associated with the item "title 4", BDJO-3D, the application management table specifies, in addition to a Java application program related to playback processes for 2D video images using the 2D playlist file 221, a Java application program related to playback processes for 3D video images using either 3D playlist file 522 or 523.

When the playback device 102 refers to item "title 3", the following four determination processes are performed in accordance with the movie object MVO-3D: (1) Does the playback device 102 itself support playback of 3D video images? (2) Has the user selected playback of 3D video images? (3) Does the display device 103 support playback of 3D video images? and (4) Is the 3D video playback mode of the playback device 102 in L/R mode or depth mode? Next, in accordance with the results of these determinations, one of the playlist files 221-223 is selected for playback. When the playback device 102 refers to item "title 4", a Java application program is called from the JAR file 261, in accordance with the application management table in the BD-J object BDJO-3D, and executed. The above-described determination processes are thus performed, and a playlist file is then selected in accordance with the results of determination.

[Selection of Playlist File When Selecting a 3D Video Title]

Figure 39:
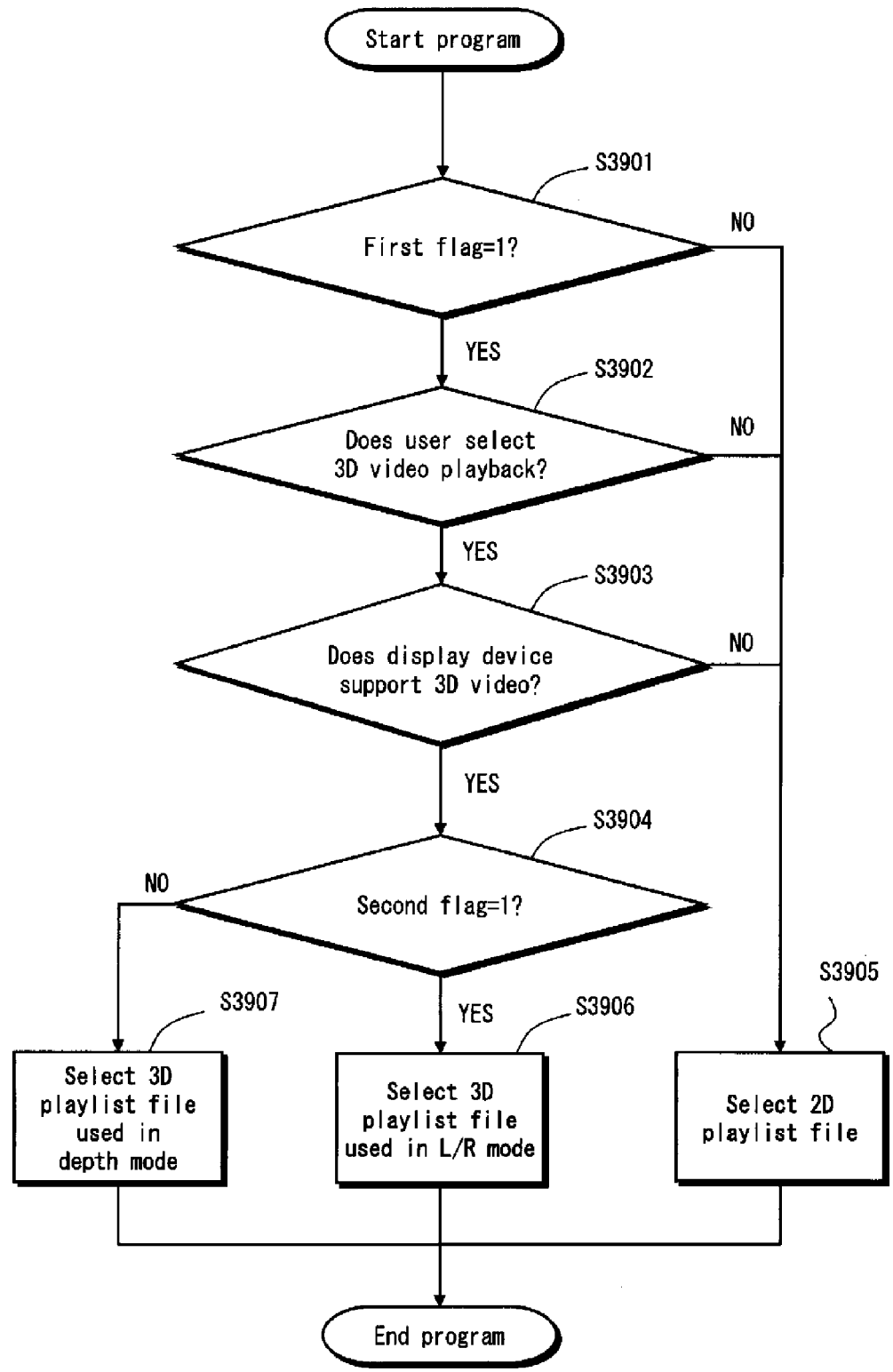
FIG. 39 is a flowchart of a process of selecting a playlist file to be played back, the process being performed when a 3D video title is selected.

FIG. 39 is a flowchart of selection processing for a playlist file to be played back, the processing being performed when a 3D video title is selected. In the index table 3810 shown in FIG. 38, selection processing is performed in accordance with the movie object MVO-3D when referring to the item "title 3", and selection processing is performed in accordance with the Java application program specified by the BD-J object BDJO-3D when referring to the item "title 4".

In light of this selection processing, it is assumed that the playback device 102 includes a first flag and a second flag. A value of "0" for the first flag indicates that the playback device 102 only supports playback of 2D video images, whereas "1" indicates support of 3D video images as well. A value of "0" for the second flag indicates that the playback device 102 is in L/R mode, whereas "1" indicates depth mode.

In step S3901, the playback device 102 checks the value of the first flag. If the value is "0", processing proceeds to step S3905. If the value is "1", processing proceeds to step S3902.

In step S3902, the playback device 102 displays a menu on the display device 103 for the user to select playback of either 2D or 3D video images. If the user selects playback of 2D video images via operation of the remote control 105 or the like, processing proceeds to step S3905, whereas if the user selects 3D video images, processing proceeds to step S3903.

In step S3903, the playback device 102 checks whether the display device 103 supports playback of 3D video images. Specifically, the playback device 102 exchanges CEC messages with the display device 103 via an HDMI cable 122 to check with the display device 103 as to whether it supports playback of 3D video images. If the display device 103 does support playback of 3D video images, processing proceeds to step S3904. If not, processing proceeds to step S3905.

In step S3904, the playback device 102 checks the value of the second flag. If this value is "0", processing proceeds to step S3906. If this value is "1", processing proceeds to step S3907.

In step S3905, the playback device 102 selects for playback the 2D playlist file 221. Note that, at this time, the playback device 102 may cause the display device 103 to display the reason why playback of 3D video images was not selected. Thereafter, processing ends.

In step S3906, the playback device 102 selects for playback the 3D playlist file 222 used in L/R mode. Thereafter, processing ends.

In step S3907, the playback device 102 selects for playback the 3D playlist file 223 used in depth mode . Thereafter, processing ends.

<Structure of 2D Playback Device>

Figure 40:
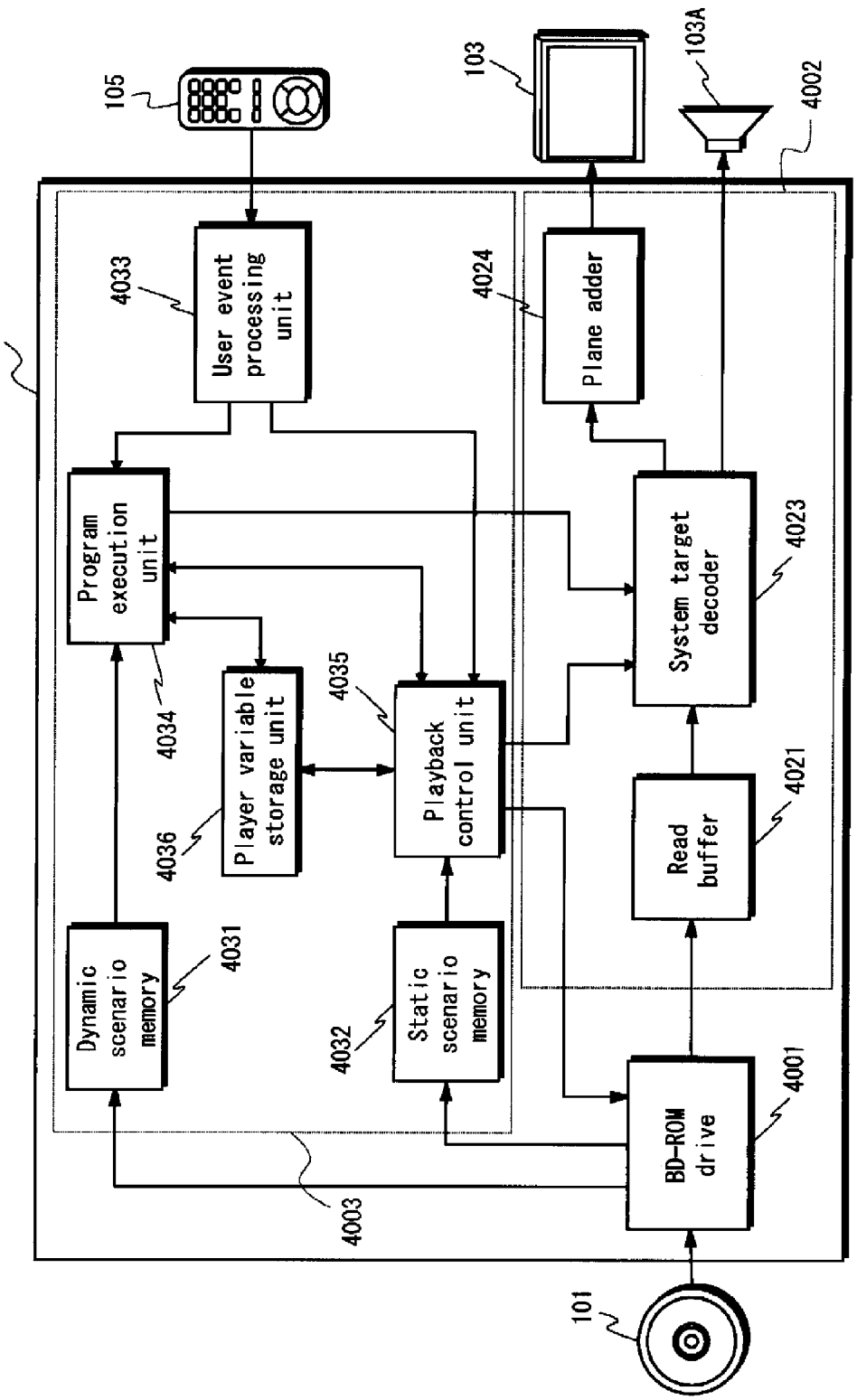
FIG. 40 is a functional block diagram of a 2D playback device 4000.

When playing back 2D video contents from a BD-ROM disc 101 in 2D playback mode, the playback device 102 operates as a 2D playback device. FIG. 40 is a functional block diagram of a 2D playback device 4002, the 2D playback device 4000 has a BD-ROM drive 4001, a playback unit 4002, and a control unit 4003. The playback unit 4002 has a read buffer 4021, a system target decoder 4023, and a plane adder 4024. The control unit 4003 has a dynamic scenario memory 4031, a static scenario memory 4032, a program execution unit 4034, a playback control unit 4035, a player variable storage unit 4036, and a user event processing unit 4033. The playback unit 4002 and the control unit 4003 are each implemented on a different integrated circuit, but may alternatively be implemented on a single integrated circuit.

When the BD-ROM disc 101 is loaded into the BD-ROM drive 4001, the BD-ROM drive 4001 radiates laser light to the disc 101 and detects change in the light reflected from the disc 101. Furthermore, using the change in the amount of reflected light, the BD-ROM drive 4001 reads data recorded on the disc 101. Specifically, the BD-ROM drive 4001 has an optical pickup, i.e. an optical head. The optical head has a semiconductor laser, a collimate lens, a beam splitter, an objective lens, a collecting lens, and an optical detector. A beam of light radiated from the semiconductor laser sequentially passes through the collimate lens, the beam splitter, and the objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 4001 reads data from the BD-ROM disc 101 based on a request from the playback control unit 4035. Out of the read data, the extents in the file 2D, i.e. the 2D extents, are transferred to the read buffer 4021; dynamic scenario information is transferred to the dynamic scenario memory 4031; and static scenario information is transferred to the static scenario memory 4032. "Dynamic scenario information" includes an index file, movie object file, and BD-J object file. "Static scenario information" includes a 2D playlist file and a 2D clip information file.

The read buffer 4021, the dynamic scenario memory 4031, and the static scenario memory 4032 are each a buffer memory. A memory device in the playback unit 4002 is used as the read buffer 4021. Memory devices in the control unit 4003 are used as the dynamic scenario memory 9031 and the static scenario memory 4032. In addition, different areas in a single memory device may be used as one or more of these buffer memories 9021, 4031 and 4032. The read buffer 9021 stores 2D extents, the dynamic scenario memory 4031 stores dynamic scenario information, and the static scenario memory 4032 stores static scenario information.

The system target decoder 4023 reads 2D extents from the read buffer 4021 in units of source packets and demultiplexes the 2D extents. The system target decoder 4023 then decodes each of the elementary streams obtained by the demultiplexing. At this point, information necessary for decoding each elementary stream, such as the type of codec and attribute of the stream, is transferred from the playback control unit 4035 to the system target decoder 4023. For each VAU, the system target decoder 4023 outputs a primary video stream, a secondary video stream, an IG stream, and a PG stream as primary video plane data, secondary video plane data, IG plane data, and PG plane data, respectively. On the other hand, the system target decoder 4023 mixes the decoded primary audio stream and secondary audio stream and transmits the resultant data to an audio output device, such as an internal speaker 103A of the display device 103. In addition, the system target decoder 4023 receives graphics data from the program execution unit 4034. The graphics data is used for rendering graphics such as a GUI menu on a screen and is in a raster data format such as JPEG and PNG. The system target decoder 4023 processes the graphics data and outputs the data as image plane data. Details of the system target decoder 4023 are described below.

The plane adder 4024 receives primary video plane data, secondary video plane data, IG plane data, PG plane data, and image plane data from the system target decoder 4023, superposes the received data with each other, and composites the superposed data into a single video image frame or field. The composited video data is output to the display device 103, and is displayed on the screen thereof.

The user event processing unit 4033 detects a user operation via the remote control 105 or the front panel of the playback device 102. Based on the user operation, the user event processing unit 4033 requests the program execution unit 4034 or the playback control unit 4035 to perform a relevant process. For example, when a user instructs to display a pop-up menu by pushing a button on the remote control 105, the user event processing unit 4033 detects the push and identifies the button. The user event processing unit 4033 further requests the program execution unit 4034 to execute a command corresponding to the button, i.e. a command to display the pop-up menu. On the other hand, when a user pushes a fast-forward or a rewind button on the remote control 105, for example, the user event processing unit 4033 detects the push, identifies the button, and requests the playback control unit 4035 to fast-forward or rewind the playlist currently being played back.

The program execution unit 4034 is a processor, and reads and executes programs from a movie object file or a BD-J object file stored in the dynamic scenario memory 4031. The program execution unit 4034 further executes the following controls in accordance with the programs. (1) The program execution unit 4034 instructs the playback control unit 4035 to perform playlist playback processing. (2) The program execution unit 4034 generates graphics data for a menu or a game as PNG or JPEG raster data, and transfers the generated data to the system target decoder 4023 to be composited with other video data. Specific contents of these controls can be designed relatively flexibly through program designing. That is, the contents of the controls are determined by the programming procedure of the movie object file and the BD-J object file in the authoring procedure of the BD-ROM disc 101.

The playback control unit 4035 controls transfer of different types of data, such as 2D extents, an index file, etc. from the BD-ROM disc 101 to the read buffer 4021, the dynamic scenario memory 4031, and the static scenario memory 4032. A file system managing the directory file structure shown in FIG. 2 is used for this control. That is, the playback control unit 4035 causes the BD-ROM drive 4001 to transfer the files to each of the buffer memories 4021, 4031 and 4032 using a system call for opening files. The file opening is composed of a series of the following processes. First, a file name to be detected is provided to the file system by a system call, and an attempt is made to detect the file name from the directory/file structure. When the detection is successful, the file entry for the target file is first transferred to memory in the playback control unit 4035, and an FCB (File Control Block) is generated in the memory. Subsequently, a file handle for the target file is returned from the file system to the playback control unit 4035. After this, the playback control unit 4035 can transfer the target file from the BD-ROM disc 101 to each of the buffer memories 4021, 4031 and 4032 by showing the file handle to the BD-ROM drive 4001.

The playback control unit 4035 decodes the file 2D to output video data and audio data by controlling the BD-ROM drive 4001 and the system target decoder 4023. Specifically, the playback control unit 4035 first reads a 2D playlist file from the static scenario memory 4032, in response to an instruction from the program execution unit 4034 or a request from the user event processing unit 4033, and interprets the content of the file. In accordance with the interpreted content, particularly with the playback path, the playback control unit 4035 then specifies a file 2D to be played back and instructs the BD-ROM drive 4001 and the system target decoder 4023 to read and decode this file. Such playback processing based on a playlist file is called "playlist playback processing". In addition, the playback control unit 4035 sets various types of player variables in the player variable storage unit 4036 using the static scenario information. With reference to the player variables, the playback control unit 4035 further specifies to the system target decoder 4023 elementary streams to be decoded and provides the information necessary for decoding the elementary streams.

The player variable storage unit 4036 is composed of a group of registers for storing player variables. Types of player variables include system parameters (SPRM) and general parameters (GPRM). FIG. 41 is a list of SPRMs. Each SPRM is assigned a serial number 4101, and each serial number 4101 is associated with a unique variable value 4102. The contents of major SPRMs are shown below. Here, the numbers in parentheses indicate the serial numbers 4101.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for Karaoke
SPRM(12): Country code for parental management
SPRM(13): Parental level
SPRM(14): Player configuration for Video
SPRM(15): Player configuration for Audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24): Reserved
SPRM(25): Reserved
SPRM(26): Reserved
SPRM(27): Reserved
SPRM(28): Reserved
SPRM(29): Reserved
SPRM(30): Reserved
SPRM(31): Reserved The SPRM(10) indicates the PTS of the picture currently being decoded and is updated every time a picture is decoded and written into the primary video plane memory. Accordingly, the current playback point can be known by referring to the SPRM(10).

The language code for the audio stream of the SPRM(16) and the language code for the subtitle stream of the SPRM (18) show default language codes of the playback device 102.

These codes may be changed by a user with use of an OSD (On Screen Display) or the like for the playback device 102, or may be changed by an application program via the program execution unit 4034. For example, if the SPRM(16) shows "English", in playback processing of a playlist, the playback control unit 4035 first searches the STN table in the PI for a stream entry having the language code for "English". The playback control unit 4035 then extracts the PID from the stream identification information of the stream entry and transmits the extracted PID to the system target decoder 4023. As a result, an audio stream having the same PID is selected and decoded by the system target decoder 4023. These processes can be executed by the playback control unit 4035 with use of the movie object file or the BD-J object file.

During playback processing, the player variables are updated by the playback control unit 4035 in accordance with the status of the playback. The playback control unit 4035 updates the SPRM(1), the SPRM(2), the SPRM(21) and the SPRM(22) in particular. These SPREE respectively show, in the stated order, the STN of the audio stream, the subtitle stream, the secondary video stream, and the secondary audio stream that are currently being processed. As an example, assume that the audio stream number SPRM(1) has been changed by the program execution unit 4034. In this case, the playback control unit 4035 first, using the STN indicating by the changed SPRM (1), searches the STN in the PI currently being played back for a stream entry that includes the STN. The playback control unit 4035 then extracts the PID from the stream identification information in the stream entry and transmits the extracted PID to the system target decoder 4023. As a result, the audio stream having the same PID is selected and decoded by the system target decoder 4023. This is how the audio stream targeted for playback is switched. The subtitle stream and the secondary video stream to be played back can be similarly switched.

<<2D Playlist Playback Processing>>

Figure 42:
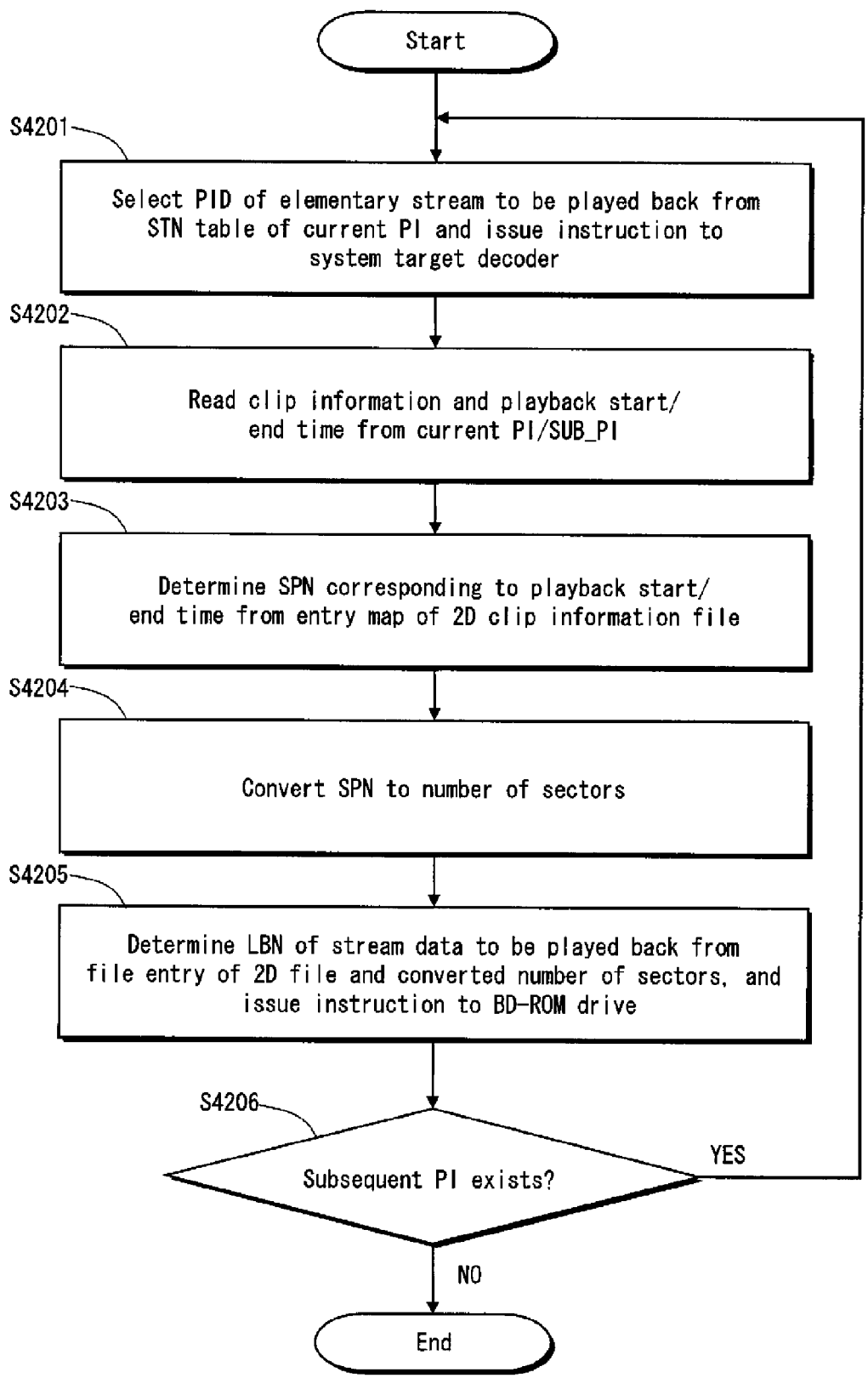
FIG. 42 is a flowchart of a 2D playlist playback process by a playback control unit 4035 shown in FIG. 40.

FIG. 42 is a flowchart of a 2D playlist playback process by the playback control unit 4035. The 2D playlist playback process is performed according to a 2D playlist file, and is started by the playback control unit 4035 reading a 2D playlist file from the static scenario memory 9032.

In step S4201, first, the playback control unit 4035 reads a single PI from a main path in the 2D playlist file, and sets the single PI as the current PI. Next, the playback control unit 4035 selects a PID of an elementary stream to be played back, and specifies attribute information necessary for decoding the elementary stream. The selected PID and attribute information are instructed to the system target decoder 4023. The playback control unit 9035 further specifies a SUB_PI associated with the current PI from the sub-paths in the 2D playlist file. Thereafter, the processing proceeds to step S9202.

In step S9202, the playback control unit 4035 reads reference clip information, a PTS#1 indicating a playback start time IN1, and a PTS#2 indicating a playback end time OUT1 from the current PI. From this reference clip information, a 2D clip information file corresponding to the file 2D to be played back is specified. Furthermore, when a SUB_PI exists that is associated with the current PI, similar information is also read from the SUB_PI. Thereafter, processing proceeds to step S4203.

In step S4203, with reference to the entry map of the 2D clip information file, the playback control unit 4035 retrieves the SPN#1 and the SPN#2 in the file 2D corresponding to the PTS#1 and the PTS#2. The pair of PTSs indicated by the SUB_PI .are also converted to a pair of SPNs. Thereafter, the processing proceeds to step S4204.

In step S4204, from the SPN#1 and the SPN#2, the playback control unit 4035 calculates a number of sectors corresponding to each of the SPN#1 and the SPN#2. Specifically, first, the playback control unit 4035 obtains a product of each of the SPN#1 and the SPN#2 multiplied by the data amount per source packet that is 192 bytes. Next, the playback control unit 4035 obtains a quotient by dividing each product by the data amount per sector that is 2048 bytes: N1=SPN#1×192/2048, N2=SPN#2×192/2048. The quotients N1 and N2 are the same as the total number of sectors, in the main TS, recorded in portions previous to the source packets to which SPN#1 and SPN#2 are allocated, respectively. The pair of SPNs converted from the pair of PTSs indicated by the SUB_PI is similarly converted to a pair of numbers of sectors. Thereafter, the processing proceeds to step S4205.

In step S4205, the playback control unit 4035 specifies, from the numbers of sectors N1 and N2 obtained in step S4204, LBNs of the head and tail of the 2D extents to be played back. Specifically, with reference to the 2D file entry of the file 2D to be played back, the playback control unit 4035 counts from the heads of the sectors in which the 2D extents are recorded so that the LBN of the $(N1+1)^{th}$ sector=LBN#1, and the LBN of the $(N2+1)^{th}$ sector=LBN#2. The playback control unit 4035 further specifies a range from the LBN#1 to the LBN#2 to the BD-ROM drive 121. The pair of numbers of sectors converted from the pair of PTSs indicated by the SUB_PI is similarly converted to a pair of LBNs, and specified to the BD-ROM drive 121. As a result, from the sectors in the specified range, a source packet group belonging to a 2D extent group is read in aligned units. Thereafter, the processing proceeds to step S4206.

In step S4206, the playback control unit 4035 checks whether an unprocessed PI remains in the main path. When an unprocessed PI remains, the processing repeats from step S4201. When no unprocessed PI remains, the processing ends.

<<System Target Decoder>>

Figure 43:
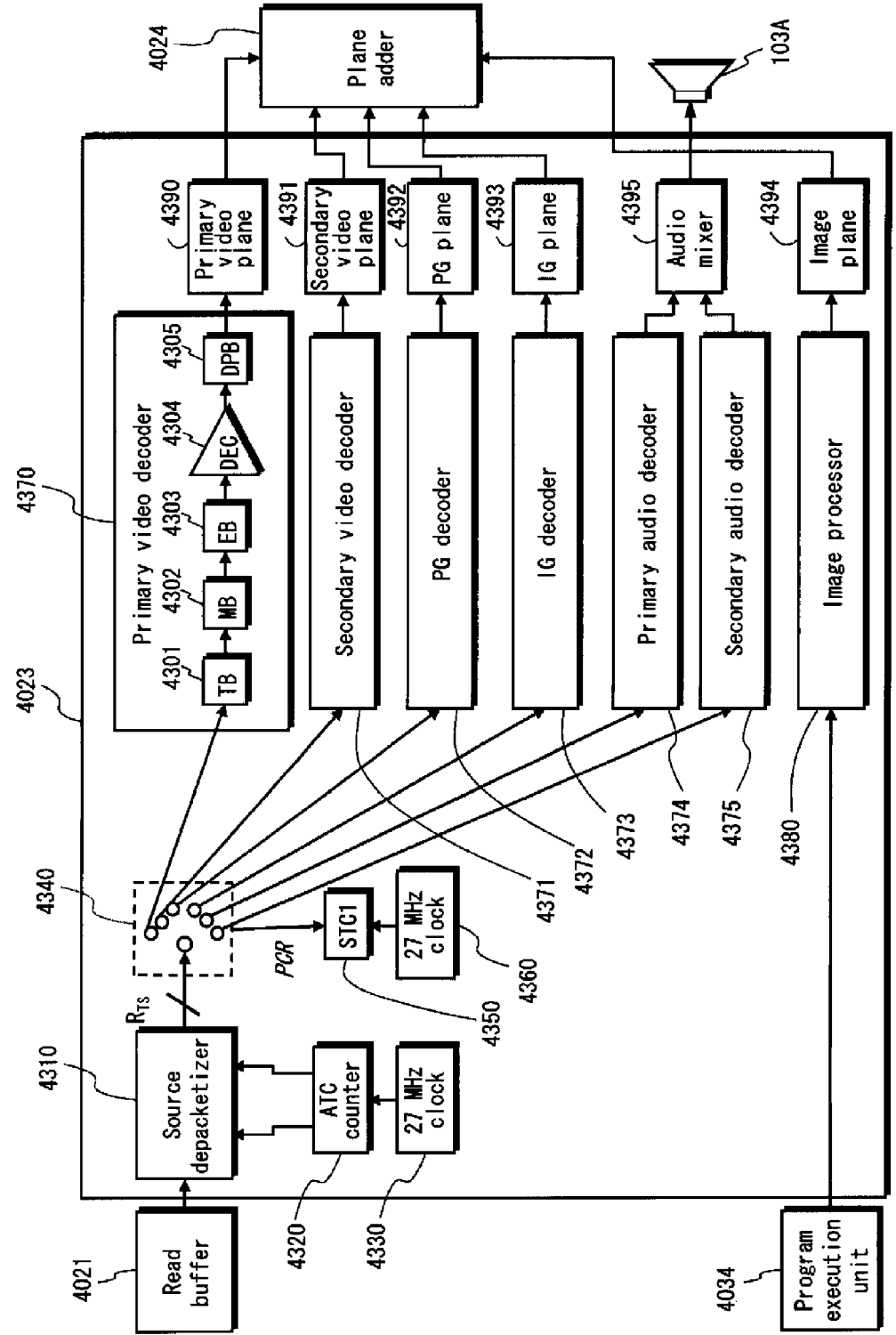
FIG. 43 is a functional block diagram of a system target decoder 4023 shown in FIG. 40.

FIG. 43 is a functional block diagram of the system target decoder 4023. As shown in FIG. 43, the system target decoder 4023 includes a source depacketizer 4310, ATC counter 4320, first 27 MHz clock 4330, PID filter 4340, STC counter (STC1) 4350, second 27 MHz clock 4360, primary video decoder 4370, secondary video decoder 4371, PG decoder 4372, IG decoder 4373, primary audio decoder 4374, secondary audio decoder 4375, image processor 4380, primary video plane memory 4390, secondary video plane memory 4391, PG plane memory 4392, IG plane memory 4393, image plane memory 4394, and audio mixer 4395.

The source depacketizer 4310 reads source packets from the read buffer 4021, extracts the TS packets from the read source packets, and transfers the TS packets to the PID filter 4340. The source depacketizer 4310 further matches the time of the transfer with the time indicated by the ATS of each source packet. Specifically, the source depacketizer 9310 first monitors the value of the ATC generated by the ATC counter 4320. In this case, the value of the ATC depends on the ATC counter 4320, and is incremented in accordance with a pulse of the clock signal of the first 27 MHz clock 9330. Subsequently, at the instant the value of the ATC matches the ATS of a source packet, the source depacketizer 4310 transfers the TS packets extracted from the source packet to the PID filter 4340. By adjusting the time of transfer in this way, the mean transfer rate of TS packets from the source depacketizer 4310 to the PID filter 4340 does not surpass the value $R_{TS}$ specified by the system rate 2411 shown by the 2D clip information file in FIG. 24.

The PID filter 4340 first monitors PIDs that include the TS packets output by the source depacketizer 4310. When a PID matches a PID pre-specified by the playback control unit 4035, the PID filter 4340 selects the TS packets and transfers them to the decoder 4370-4375 appropriate for decoding of the elementary stream indicated by the PID. For example, if a PID is 0x1011, the TS packets are transferred to the primary video decoder 4370, whereas TS packets with PIDs ranging from 0x1B00-0x1B1F, 0x1100-0x111F, 0x1A00-0x1A1F, 0x1200-0x121F, and 0x1400-0x141F are transferred to the secondary video decoder 4371, the primary audio decoder 4374, the secondary audio decoder 4375, the PG decoder 4372, and the IG decoder 4373, respectively.

The PID filter 4340 further detects PCRs from each TS packet using the PID of the TS packet. At this point, the PID filter 4340 sets the value of the STC counter 4350 to a predetermined value. In this case, the value of the STC counter 4350 is incremented in accordance with a pulse of the clock signal of the second 27 MHz clock 4360. In addition, the value to which the STC counter 4350 is set to is indicated to the PID filter 4340 from the playback control unit 4035 in advance. The decoders 4370-4375 each use the value of the STC counter 4350 as the STC. That is, the decoders 4370-4375 adjust the timing of decoding processing of the TS packets output from the PID filter 4340 in accordance with the time indicated by the PTS or the DTS included in the TS packets.

The primary video decoder 4370, as shown in FIG. 43, includes a transport stream buffer (TB) 4301, multiplexing buffer (MB) 4302, elementary stream buffer (EB) 4303, compressed video decoder (DEC) 4304, and decoded picture buffer (DPB) 4305.

The TB 4301, MB 4302, EB 4303, and DPB 4305 are each a buffer memory and use an area of a memory device internally provided in the primary video decoder 4370. Alternatively, some or all of the TB 4301, the MB 4302, the EB 4303, and the DPB 4305 may be separated in different memory devices. The TB 4301 stores the TS packets received from the PID filter 4340 as they are. The MB 4302 stores PES packets reconstructed from the TS packets stored in the TB 4301. Note that when the TS packets are transferred from the TB 4301 to the MB 4302, the TS header is removed from each TS packet. The EB 4303 extracts encoded VAUs from the PES packets and stores the extracted, encoded VAUs therein. A VAU includes compressed pictures, i.e., an I picture, B picture, and P picture. Note that when data is transferred from the MB 4302 to the EB 4303, the PES header is removed from each PES packet.

The DEC 4304 is a hardware decoder specialized for performing decoding processing on compressed pictures, and in particular is constituted from an LSI equipped with an accelerator function for the decoding processing. The DEC 4304 decodes pictures from each VAU in the EB 4303 at the time shown by the DTS included in the original TS packet. The DEC 4304 may also refer to the decoding switch information 1101 shown in FIG. 11 to decode pictures from each VAU sequentially, regardless of the DTS. To perform this decoding processing, the DEC 4304, in advance, analyzes each VAU header, specifies a compression encoding method and a stream attribute for the compressed pictures stored in the VAU, and selects a decoding method based on these. Here, for example, the compression encoding method includes MPEG-2, MPEG-4 AVC, and VC1. The DEC 4304 further transmits decoded uncompressed pictures to the DPB 4305.

Similarly to the TB 4301, the MB 4302, and the EB 4303, the DPB 4305 is a buffer memory, and uses one area of a memory element in the primary video decoder 4370. In addition, the DPB 4305 may be separated into different memory elements from the other buffer memories 4301, 4302, and 4303. The DPB 4305 temporarily stores the decoded pictures. When a P picture or a B picture is decoded by the DEC 4304, the DPB 4305 retrieves a reference picture among the decoded stored pictures according to an instruction from the DEC 4304, and provides the reference picture to the DEC 4304. The DPB 4305 further writes each of the stored pictures into the primary video plane memory 4390 at the time shown by the PTS included in the original TS packet.

The secondary video decoder 4371 includes the same structure as the primary video decoder 4370. The secondary video decoder 4371 first decodes the TS packets of the secondary video stream received from the PID filter 4340 into uncompressed pictures. Subsequently, the secondary video decoder 4371 writes the resultant uncompressed pictures into the secondary video plane memory 4391 at the time shown by the PTS included in the TS packet.

The PG decoder 4372 decodes the TS packets received from the PID filter 4340 into uncompressed graphics data and writes the resultant uncompressed graphics data to the PG plane memory 4392 at the time shown by the PTS included in the TS packet.

The IG decoder 4373 decodes the TS packets received from the PID filter 9340 into uncompressed graphics data and writes the resultant uncompressed graphics data to the IG plane memory 4393 at the time shown by the PTS included in the TS packet.

The primary audio decoder 4374 first stores the TS packets received from the PID filter 4340 in a buffer provided therein. Subsequently, the primary audio decoder 4374 removes the TS header and the PES header from each TS packet in the buffer, and decodes the remaining data into uncompressed LPCM audio data. Furthermore, the primary audio decoder 4374 transmits the resultant audio data to the audio mixer 4395 at the time shown by the PTS included in the TS packet. The primary audio decoder 4374 selects a decoding scheme of the uncompressed audio data in accordance with the compression encoding method, and the stream attribute of the primary audio stream, which are included in the TS packets. Compression encoding methods that can be used in this case include AC-3 and DTS, for example.

The secondary audio decoder 4375 has the same structure as the primary audio decoder 4374. The secondary audio decoder 4375 first decodes the TS packets of the secondary audio stream received from the PID filter 4340 into uncompressed LPCM audio data. Subsequently, the secondary audio decoder 4375 transmits the uncompressed LPCM audio data to the audio mixer 4395 at the time shown by the PTS included in the TS packet. The secondary audio decoder 4375 selects a decoding scheme of the uncompressed audio data in accordance with the compression encoding method, and the stream attribute of the primary audio stream, included in the TS packets. Compression encoding methods that can be used in this case include Dolby Digital Plus and DTS-HD LBR, for example.

The audio mixer 4395 receives uncompressed audio data from both the primary audio decoder 4374 and from the secondary audio decoder 4375 and then mixes the received data. The audio mixer 4395 also transmits the resultant composited audio to an internal speaker 103A of the display device 103 or the like.

The image processor 4380 receives graphics data, i.e., PNG or JPEG raster data, along with the PTS thereof from the program execution unit 4034. Upon the reception of the graphics data, the image processor 4380 renders the graphics data and writes the graphics data to the image plane memory 4394.

<Structure of 3D Playback Device>

When playing back 3D video content from the BD-ROM disc 101 in 3D playback mode, the playback device 102 operates as a 3D playback device. The fundamental part of the device's structure is identical to the 2D playback device shown in FIGS. 40 and 43. Therefore, the following is a description of sections of the structure of the 2D playback device that are enlarged or modified, incorporating by reference the above description of the 2D playback device for details on the fundamental parts thereof. Regarding the playback processing of the 2D playlist, the 3D playback device has the same structure as the 2D playback device. Accordingly, the details on this structure are hereby incorporated from the description of the 2D playback device by reference. The following description assumes playback processing of 3D video images in accordance with 3D playlist files, i.e. 3D playlist playback processing.

Figure 44:
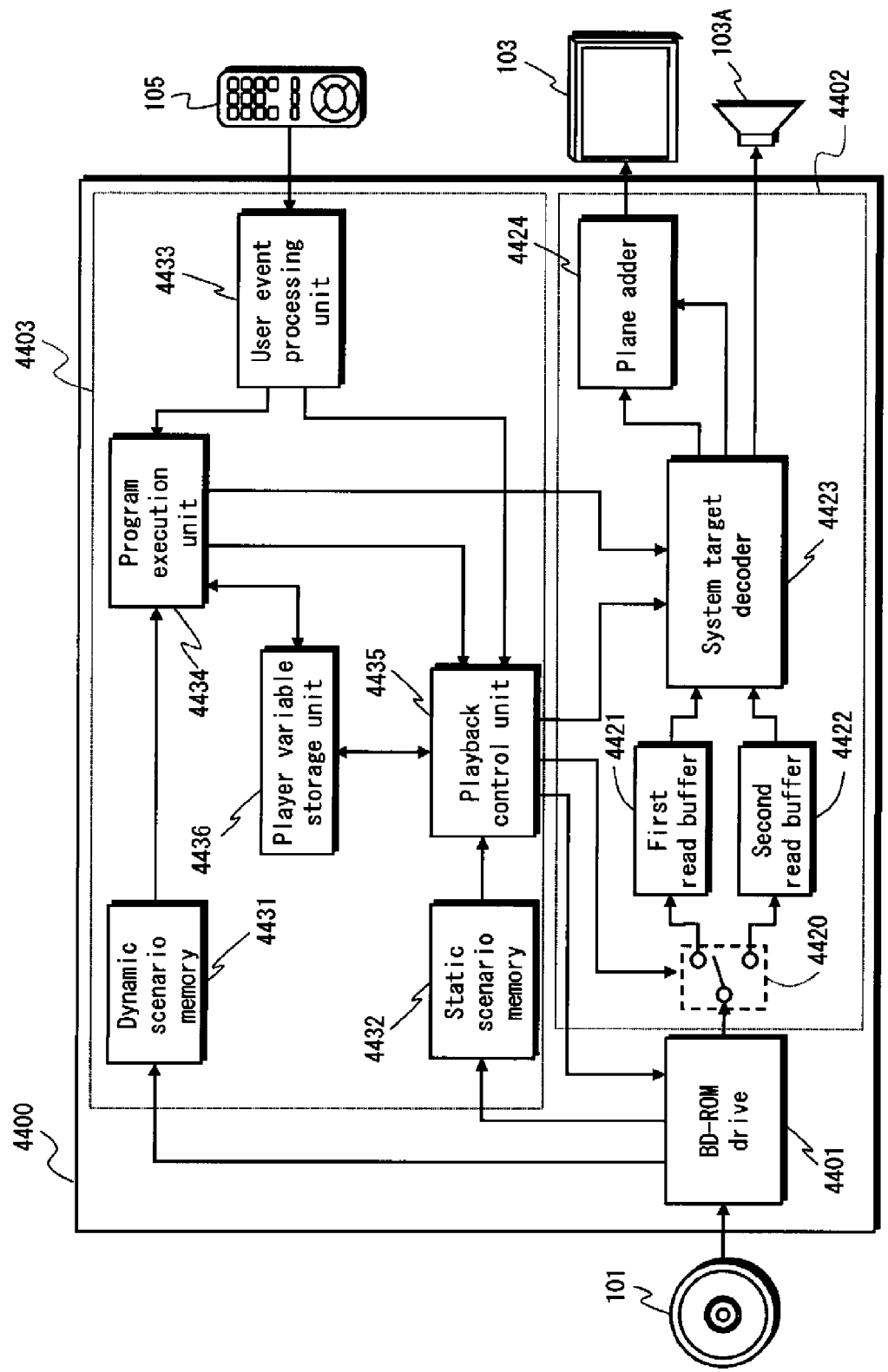
FIG. 44 is a functional block diagram of a 3D playback device 4400.

FIG. 44 is a functional block diagram of the 3D playback device 4400. The 3D playback device 4400 includes a BD-ROM drive 4401, a playback unit 4402, and a control unit 4403. The playback unit 4402 includes a switch 9420, a first read buffer 4421, a second read buffer 4422, a system target decoder 4423, and a plane adder 4424. The control unit 4403 includes a dynamic scenario memory 9431, a static scenario memory 4405, a program execution unit 4434, a playback control unit 4435, a player variable storage unit 4436, and a user event processing unit 4433. The playback unit 4402 and the control unit 4403 are mounted on a different integrated circuit, but may alternatively be mounted on a single integrated circuit. In particular, the dynamic scenario memory 4431, the static scenario memory 4405, the program execution unit 4434, and the user event processing unit 4433 have an identical structure with the 2D playback device shown in FIG. 40. Accordingly, details thereof are incorporated by reference to the above explanation of the 2D playback device.

The BD-ROM drive 4401 includes elements identical to the BD-ROM drive 4001 in the 2D playback device shown in FIG. 40. When the playback control unit 4435 indicates a range of LBN, the BD-ROM drive 4401 reads data from the sector group on the BD-ROM disc 101 indicated by the range. In particular, a source packet group belonging to extents in the file SS, i.e. extents SS, is transferred from the BD-ROM drive 4401 to the switch 4420. In this case, each extent SS includes one or more pairs of a base-view and dependent-view data block, as shown in FIG. 13. These data blocks need to be transferred in parallel to different read buffers, i.e. read buffers 4421 and 4422. Accordingly, the BD-ROM drive 9401 needs to have at least the same access speed as the BD-ROM drive 4001 in the 2D playback device.

The switch 4420 receives extents SS from the BD-ROM drive 9401. On the other hand, the switch 4420 receives, from the playback control unit 4435, information indicating the boundary in each data block included in the extents SS. This information indicates the number of source packets from the beginning of the extent SS to each boundary, for example. In this case, the playback control unit 4435 generates this information by referring to the extent start point in the clip information file. The switch 4420 further refers to this information to extract base-view extents from each extent SS, then transmitting the data blocks to the first read buffer 4421. Conversely, the switch 4420 transmits the remaining dependent-view extents to the second read buffer 4422.

The first read buffer 4421 and the second read buffer 4422 are buffer memories that use a memory element in the playback unit 4402. In particular, different areas in a single memory element are used as the read buffers 4421 and 4422. Alternatively, different memory elements maybe used as the read buffers 4421 and 4422. The first read buffer 4421 receives base-view data blocks from the switch 4420 and stores these extents. The second read buffer 4422 receives dependent-view extents from the switch 4420 and stores these data blocks.

First, the system target decoder 4423 alternately reads base-view extents stored in the first read buffer 4421 and dependent-view extents stored in the second read buffer 4422. Next, the system target decoder 4423 separates elementary streams from each source packet via demultiplexing and furthermore, from the separated streams, decodes the data shown by the PID indicated by the playback control unit 4435. The system target decoder 4423 then writes the decoded elementary streams in internal plane memory according to the type thereof. The base-view video stream is written in the left-view video plane memory, and the dependent-view video stream is written in the right-view plane memory. On the other hand, the secondary video stream is written in the secondary video plane memory, the IG stream in the IG plane memory, and the PG stream in the PG plane memory. When stream data other than the video stream is composed of a pair of base-view stream data and dependent-view stream data, a pair of corresponding plane memories are prepared for the left-view plane data and right-view plane data. The system target decoder 4423 also performs rendering processing on graphics data from the program execution unit 4434, such as JPEG or PNG raster data, and writes this data in the image plane memory.

The system target decoder 4423 associates the output of plane data from the left-video and right-video plane memories with B-D presentation mode and B-B presentation mode respectively, as follows. When the playback control unit 4435 indicates B-D presentation mode, the system target decoder 4423 alternately outputs plane data from the left-video and right-video plane memories. On the other hand, when the playback control unit 4435 indicates B-B presentation mode, the system target decoder 4423 outputs plane data from only the left-video or right-video plane memory twice per frame while maintaining the operational mode in 3D playback mode.

Furthermore, the system target decoder 4423 associates the output of the graphics plane memories, i.e. various types of graphics plane data from the PG plane memory, IG plane memory, and image plane memory, with 2 plane mode, 1 plane mode+offset mode, and 1 plane+zero offset mode, respectively, as follows. The graphics plane memory includes a PG plane memory, an IG plane memory, and an image plane memory. When the playback control unit 4435 indicates 2 plane mode, the system target decoder 4423 alternately outputs left-view and right-view graphics plane data from each of the graphics plane memories. When the playback control unit 4435 indicates 1 plane+offset mode or 1 plane+zero offset mode, the system target decoder 4423 outputs graphics plane data from each of the graphics plane memories while maintaining the operational mode in 3D playback mode. When the playback control unit 4435 indicates 1 plane+offset mode, the system target decoder 4423 furthermore outputs the offset value designated by the playback control unit 4435 to the plane adder 4424. On the other hand, when the playback control unit 4435 indicates 1 plane+zero offset mode, the system target decoder 4423 outputs "0" as the offset value to the plane adder 4424.

Upon receiving a request from, for example, the program execution unit 4434 for performing 3D playlist playback processing, the playback control unit 4435 first refers to the 3D playlist file stored in the static scenario memory 4405. Next, in accordance with the 3D playlist file and following the sequence shown in FIG. 27, the playback control unit 4435 indicates to the BD-ROM drive 4401 the ranges of the LBN for the sector group on which the 3D extent to be read is recorded. The playback control unit 4435 also, with use of the extent start point in the clip information file stored in the static scenario memory 4405, generates information that indicates the boundary of the data blocks included in each 3D extent and then transmits this information to the switch 4420.

Additionally, the playback control unit 4435 refers to the STN table and STN table SS in the 3D playlist file to control the operation requirements of the system target decoder 4423 and the plane adder 4424. For example, the playback control unit 4435 selects the PID for the elementary stream to be played back and outputs the PID to the system target decoder 4423. The playback control unit 4435 also selects the presentation mode for each plane in accordance with the offset during popup 3511 in the STN table SS and indicates these presentation modes to the system target decoder 4423 and plane adder 4424.

As in the player variable storage unit 4436 in the 2D playback device, the player variable storage unit 4436 includes the SPRM shown in FIG. 41. However, any two of the SPRM (24)-(32) that were reserved in FIG. 41 include the first flag and second flag shown in FIG. 39. For example, the SPRM (24) may include the first flag, and the SPRM(25) may include the second flag. In this case, when the SPRM(24) is "0", the playback device 102 only supports playback of 2D video images, and when it is "1", the playback device 102 also supports 3D video image playback. When the SPRM(25) is "0", the 3D video image playback mode of the playback device 102 is L/R mode, and when it is "1", the 3D video image playback mode is depth mode.

The plane adder 4424 receives each type of plane data from the system target decoder 4423 and superimposes the pieces of plane data to create one composite frame or field. In particular, in L/R mode, the left-video plane data represents the left-view video plane, and the right-video plane data represents the right-view video plane. Accordingly, from among the other pieces of plane data, the plane adder 4424 superimposes pieces that represent the left-view on the left-view plane data and pieces that represent the right-view on the right-view plane data. On the other hand, in depth mode, the right-video plane data represents a depth map for a video plane representing the left-video plane data. Accordingly, the plane adder 4424 first generates a pair of left-view video plane data and right-view video plane data from both pieces of video plane data. Subsequently, the plane adder 4424 performs the same composition processing as in L/R mode.

When receiving an indication of 1 plane+offset mode or 1 plane+zero offset mode from the playback control unit 4435 as the presentation mode for the secondary video plane, PG plane, IG plane, or image plane, the plane adder 4424 performs cropping processing on the plane data received from the system target decoder 4423. A pair of left-view plane data and right-view plane data is thus generated. In particular, when 1 plane+offset mode is indicated, the cropping processing refers to the offset value indicated by the system target decoder 4423 or the program execution unit 4434. On the other hand, when 1 plane+zero offset mode is indicated, the offset value is set to "0" during cropping processing. Accordingly, the same plane data is output repeatedly to represent the left-view and right-view. Subsequently, the plane adder 4424 performs the same composition processing as in L/R mode. The composited frame or field is output to the display device 103 and displayed on the screen.

<<3D Playlist Playback Processing>>

Figure 45:
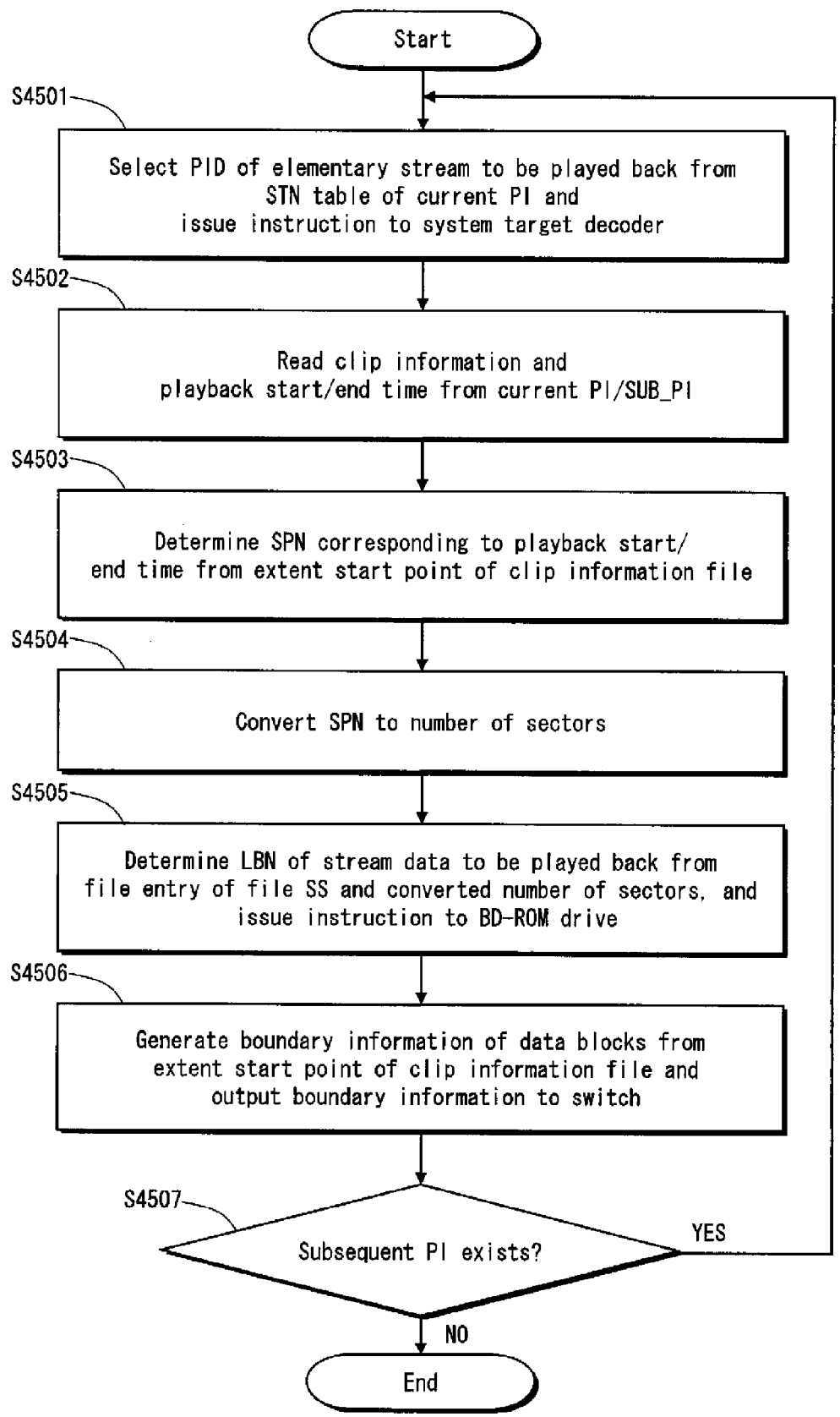
FIG. 45 is a flowchart of a 3D playlist playback process by a playback control unit 4435.

FIG. 45 is a flowchart of a 3D playlist playback process by the playback control unit 4435. The 3D playlist playback process is performed according to a 3D playlist file, and is started by the playback control unit 4435 reading a 3D playlist file from the static scenario memory 4432.

In step S4501, first, the playback control unit 4435 reads a single PI from a main path in the 3D playlist file and sets the single PI as the current PI. Next, the playback control unit 4435 selects a PID of an elementary stream to be played back, and specifies attribute information necessary for decoding the elementary stream. The playback control unit 4435 further selects, from among the elementary streams corresponding to the current PI in the STN table SS 3430 in the 3D playlist file, a PID of an elementary stream to be added, as an elementary stream to be played back, and specifies attribute information necessary for decoding the elementary stream. The selected PID and attribute information are instructed to the system target decoder 4423. The playback control unit 4435 additionally specifies, from among sub-paths in the 3D playlist file, a SUB_PI to be referenced at the same time as the current PI. Thereafter, the processing proceeds to step S4502.

In step S4502, the playback control unit 4435 reads reference clip information, a PTS#1 indicating a playback start time IN1, and a PTS#2 indicating a playback end time OUT1 from each of the current PI and the SUB_PI. From this reference clip information, a 2D clip information file corresponding to each of the file 2D and the file DEP to be played back is specified. Thereafter, processing proceeds to step S4503.

In step S4503, as described in the description of FIG. 37, with reference to the entry maps of the clip information file specified in step S4502, the playback control unit 4435 retrieves the SPN#1 and the SPN#2 in the file 2D corresponding to the PTS#1 and the PTS#2, and the SPN#11 and the SPN#12 in the file DEP. As described in the description of FIG. 27E, with use of an extent start point of each clip information file, the playback control unit 4435 further calculates, from the SPN#1 and the SPN#11, the number of source packets SPN#21 from the top of the file SS to the playback start position. The playback control unit 4435 also calculates, from the SPN#2 and the SPN#12, the number of source packets SPN#22 from the top of the file SS to the playback end position. Specifically, first, the playback control unit 4435 retrieves, from among SPNs shown by extent start points of the 2D clip information files, a value "Am" that is the largest value less than or equal to SPN#1, and retrieves, from among the SPNs shown by extent start points of dependent-view clip information files, a value "Bm" that is the largest value less than or equal to the SPN#11. Next, the playback control unit 4435 obtains the sum of the retrieved SPNs Am+Bm and determines the sum to be SPN#21. Next, the playback control unit 4435 retrieves, from among SPNs shown by the extent start points of the 2D clip information files, a value "An" that is the smallest value that is larger than the SPN#2. The playback control unit 4435 then retrieves, from the SPNs of the extent start points of the dependent-view clip information files, a value "Bn" that is the smallest value that is larger than the SPN#12. Next, the playback control unit 4435 obtains the sum An+Bn of the retrieved SPNs, and determines the sum to be the SPN#22. Thereafter, processing proceeds to step S4504.

In step S4504, the playback control unit 4435 converts the SPN#21 and the SPN#22, determined in step S4503, into a pair of numbers of sectors N1 and N2. Specifically, first, the playback control unit 4435 obtains a product by multiplying the SPN#21 by the data amount per source packet that is 192 bytes. Next, the playback control unit 4435 obtains a quotient by dividing the product by the data amount per sector that is 2048 bytes: SPN#21×192/2048. The quotient is the same as the number of sectors N1 from the head of the file SS to immediately before the playback start position. Similarly, the playback control unit 4435 obtains, from the SPN#22, a quotient by dividing the SPN#22×192/2048. This quotient is the same as the number of sectors N2 from the head of the file SS to immediately before the playback end position. Thereafter, the processing proceeds to step S4505.

In step S4505, the playback control unit 4435 specifies, from the numbers of sectors N1 and N2 obtained in step S4504, LBNs of the head and tail of the extents SS to be played back. Specifically, with reference to the file entry of the file SS to be played back, the playback control unit 4435 counts from the heads of the sectors in which the extents SS are recorded, and specifies that the LBN of the $(N1+1)^{th}$ sector=LBN#1, and the LBN of the $(N2+1)^{th}$ sector=LBN#2. The playback control unit 4435 further specifies the range from LBN#1 to LBN#2 to the BD-ROM drive 121. As a result, from the specified range of sectors, the source packets belonging to the extents SS are read in aligned units. Thereafter, processing proceeds to step S4506.

In step S4506, with use of the extent start point of the clip information file used in step S4503, the playback control unit 4435 generates information (hereinafter referred to as "data block boundary information") indicating a boundary between dependent-view blocks and base-view data blocks included in the extents SS, and transmits the data block boundary information to the switch 4420. As a specific example, assume that the SPN#21 indicating the playback start position is the same as the sum of SPNs indicating the extent start points, An+Bn, and that the SPN#22 indicating the playback end position is the same as the sum of SPNs indicating the extent start points, Am+Bm. In this case, the playback control unit 4435 obtains a sequence of differences between SPNs from the respective extent start points, A(n+1)-An, B(n+1)-Bn, A(n+2)-A(n+1), B(n+2)-B(n+1), . . . , Am-A(m−1), Bm-B(m−1), and transmits the sequence to the switch 4420 as the data block boundary information. As shown in FIG. 27E, this sequence indicates the number of source packets of data blocks included in the extent SS. The switch 4420 counts, from zero, the number of source packets of the extents SS received from the BD-ROM drive 4401. Each time the count is the same as the difference between SPNs indicated by the data block boundary information, the switch 4420 switches the destination for outputting the source packets between the two read buffers 4421 and 4422, and resets the count to zero. As a result, {B(n+1)-Bn} source packets from the head of the extent SS are output to the second read buffer 4422 as the first dependent-view extent, and the following {A(n+1)-An} source packets are transmitted to the first read buffer 4421 as the first base-view extent. Thereafter in the same way, dependent-view extents and base-view extents are extracted from the extent SS alternately, switching each time the number of source packets received by the switch 4420 is the same as the difference between SPNs indicated by the data block boundary information.

In step S4507, the playback control unit 4435 checks whether the an unprocessed PI remains in the main path. If an unprocessed PI remains, the processing repeats from step S4501. If no unprocessed PI remains, the processing ends.

<<System Target Decoder>>

Figure 46:
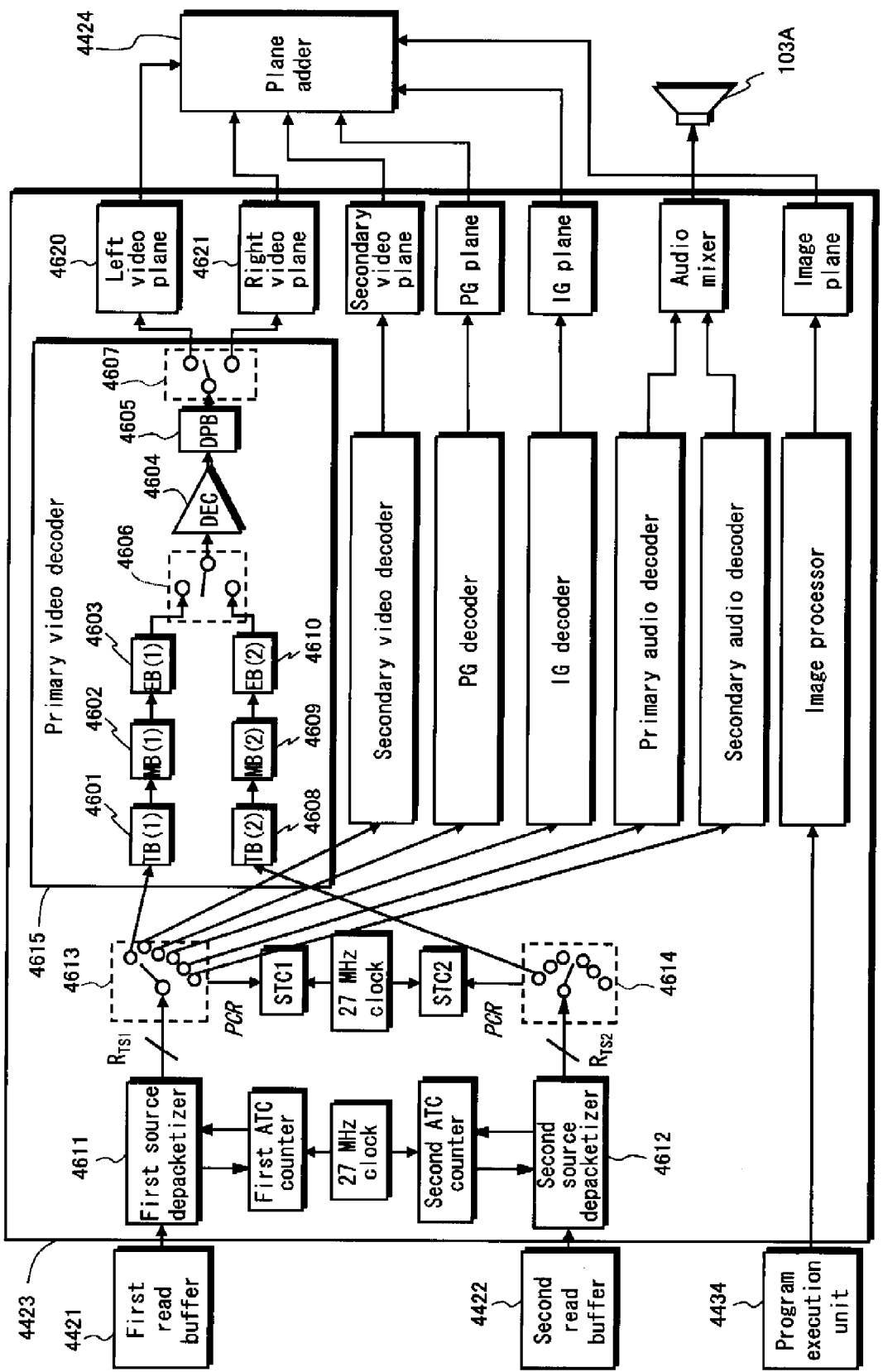
FIG. 46 is a functional block diagram of a system target decoder 4423 shown in FIG. 44.

FIG. 46 is a functional block diagram of the system target decoder 4423. The structural elements shown in FIG. 46 differ from the 2D playback.device 4023 shown in FIG. 40 in the following two points: 1) the input channel from the read buffer to each decoder is doubled, and 2) the main video decoder supports 3D playback mode, and the secondary video decoder, PG decoder, and IG decoder support 2 plane mode. That is, these video decoders can all alternately decode a base-view video stream and a dependent-view video stream. On the other hand, the primary audio decoder, secondary audio decoder, audio mixer, image processor, and plane memories are similar to those in the 2D playback device shown in FIG. 40. Accordingly, among the structural elements shown in FIG. 46, those differing from the structural elements shown in FIG. 40 are described below, and details about similar structural elements are incorporated by reference to the description of FIG. 40. Furthermore, since the video decoders each have a similar structure, only the structure of the primary video decoder 4615 is described below. This description is also true with regards to the structure of other video decoders.

The first source depacketizer 4611 reads source packets from the first read buffer 4921. The first source depacketizer 9611 further retrieves TS packets included in the source packets, and transmits the TS packets to the first PID filter 4613. The second source depacketizer 4612 reads source packets from the second read buffer 4422. The second source depacketizer 4612 further retrieves TS packets included in the source packets, and transmits the TS packets to the second PID filter 4614. Each of the source depacketizers 9611 and 4612 further causes the time of transferring the TS packets to match the ATS of the source packets. This synchronization method is the same method as the source depacketizer 4310 shown in FIG. 43. Accordingly, the description thereof provided for FIG. 43 is hereby incorporated by reference. With this sort of transmission time adjustment, the mean transfer rate $R_{TS1}$ of TS packets from the first source depacketizer 4611 to the first PID filter 4613 does not exceed the system rate 3011 indicated by the 2D clip information file. Similarly, the mean transfer rate $R_{TS2}$ of TS packets from the second source depacketizer 4612 to the second PID filter 4614 does not exceed the system rate indicated by the dependent-view clip information file.

The first PID filter 4613 compares the PID of each TS packet received from the first source depacketizer 4611 with the selected PID. The playback control unit 4435 designates the selected PID beforehand in accordance with the STN table in the 3D playlist file. When the two PIDs match, the first PID filter 4613 transfers the TS packets to the decoder assigned to the PID. For example, if a PID is 0x1011, the TS packets are transferred to TB(1) 4601 in the primary video decoder 4615, whereas TS packets with PIDs ranging from 0x1B00-0x1B1F, 0x1100-0x111F, 0x1A00-0x1A1F, 0x1200-0x121F, and 0-1400-0x141F are transferred to the secondary video decoder, primary audio decoder, secondary audio decoder, PG decoder, or IG decoder respectively.

The second PID filter 4614 compares the PID of each TS packet received from the second source depacketizer 4612 with the selected PID. The playback control unit 4435 designates the selected PID beforehand in accordance with the STN table SS in the 3D playlist file. Specifically, when the two PIDs match, the second PID filter 4614 transfers the TS packet to the decoder assigned to the PID. For example, if a PID is 0x1012 or 0x1013, the TS packets are transferred to TB(2) 4608 in the primary video decoder 4615, whereas TS packets with PIDs ranging from 0x1B20-0x1B3F, 0x1220-0x127F, and 0x1420-0x147F are transferred to the secondary video decoder, PG decoder, or IG decoder respectively.

The primary video decoder 4615 includes a TB(1) 4601, MB(1) 4602, EB(1) 4603, TB(2) 4608, MB(2) 4609, EB(2) 4610, buffer switch 4606, DEC 4604, DPB 4605, and picture switch 4607. The TB(1) 4601, MB(1) 4602, EB(1) 4603, TB(2) 4608, MB(2) 4609, EB(2) 4610 and DPB 4605 are all buffer memories, each of which uses an area of the memory elements included in the primary video decoder 4615. Note that some or all of these buffer memories may be separated on different memory elements.

The TB(1) 4601 receives TS packets that include a base-view video stream from the first PID filter 9613 and stores the TS packets as they are. The MB (1) 4602 stores PES packets reconstructed from the TS packets stored in the TB (1) 4601. The TS headers of the TS packets are removed at this point. The EB (1) 4603 extracts and stores encoded VAUs from the PES packets stored in the MB(1) 4602. The PES headers of the PES packets are removed at this point.

The TB (2) 4608 receives TS packets that include a dependent-view video stream from the second PID filter 4614 and stores the TS packets as they are. The MB (2) 4609 stores PES packets reconstructed from the TS packets stored in the TB (2) 4608. The TS headers of the TS packets are removed at this point. The EB(2) 4610 extracts and stores encoded VAUs from the PES packets stored in the MB (2) 4609. The PES headers of the PES packets are removed at this point.

The buffer switch 4606 transfers the headers of the VAUs stored in the EB (1) 9603 and the EB(2) 4610 in response to a request from the DEC 4604. The buffer switch 4606 further transfers the compressed picture data of the VAUs at the times indicated by the DTSs included in the original TS packets. In this case, the DTSs for a pair of pictures belonging to the same 3D VAU between the base-view video stream and dependent-view stream are the same. Accordingly, from among the pairs of VAUs that have the same DTSs, the buffer switch 4606 first transmits a pair stored in the EB (1) 4603 to the DEC 4604. Additionally, the buffer switch 4606 may receive the decoding switch information 1101 in the VAU back from the DEC 4604. In such a case, the buffer switch 4606 can determine if it should transfer the next VAU to the EB(1) 4603 or to the EB(2) 4610 by referring to the decoding switch information 1101.

Similarly to the DEC 4304 shown in FIG. 43, the DEC 4604 is a hardware decoder specialized for performing decoding processing on compressed pictures, and in particular is constituted from an LSI equipped with an accelerator function for the decoding processing. The DEC 4604 sequentially decodes compressed picture data transferred from the buffer switch 4606. To perform this decoding processing, the DEC 4604, in advance, analyzes each VAU header, specifies a compression encoding method and a stream attribute of the compressed pictures stored in the VAU, and selects a decoding method based on these. Here, for example, the compression encoding method includes MPEG-2, MPEG-4 AVC, and VC1. The DEC 4604 further transmits decoded uncompressed pictures to the DPB 4605.

The DPB 4605 temporarily stores the decoded, uncompressed pictures. When the DEC 4604 decodes a P picture or a B picture, the DPB 4605 searches for reference pictures from among the stored, uncompressed pictures in accordance with a request from the DEC 4604, and provides the reference pictures to the DEC 4604.

The picture switch 4607 writes the uncompressed pictures from the DPB 4605 to either the left-video plane memory 4620 or the right-video plane memory 4621 at the time indicated by the PTS included in the original TS packet. In this case, the PTSs for a base-view picture and a dependent-view picture belonging to the same 3D VAU are the same. Accordingly, from among the pairs of pictures that have the same PTSs and that are stored by the DPB 4605, the picture switch 4607 first writes the base-view picture in the left-video plane memory 4620 and then writes the dependent-view picture in the right-video plane memory 4621.

<<Plane Adders>>

Figure 47:
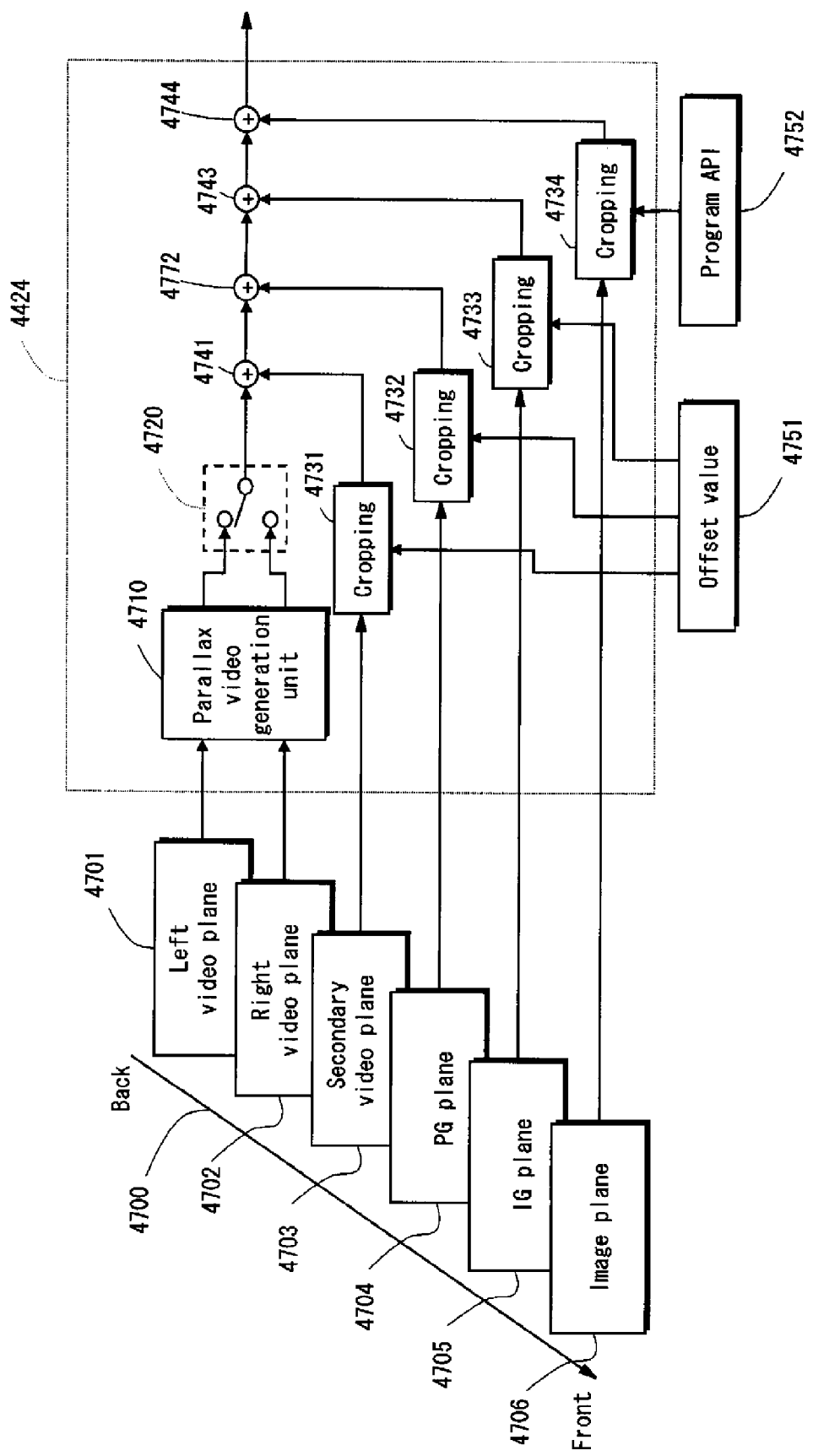
FIG. 47 is a functional block diagram of a plane adder 4424 shown in FIG. 44.

FIG. 47 is a functional block diagram of the plane adder 4424. As shown in FIG. 47, the plane adder 4424 includes a parallax video generation unit 4710, a switch 4720, four cropping processing units 4731-4734, and four adders 4741-4744.

The parallax video generation unit 4710 receives left-video plane data 4701 and right-video plane data 4702 from the system target decoder 4423. When the playback device 102 is in L/R mode, the left-video plane data 4701 represents the left-view video plane, and the right-video plane data 4702 represents the right-view video plane. At this point, the parallax video generation unit 4710 transmits the left-video plane data 4701 and the right-video plane data 4702 as they are to the switch 4720. On the other hand, when the playback device 102 is in depth mode, the left-video plane data 4701 represents the video plane for 2D video images, and the right-video plane data 4702 represents a depth map for the 2D video images. In this case, the parallax video generation unit 4710 first calculates the binocular parallax for each element in the 2D video images using the depth map. Next, the parallax video generation unit 4710 processes the left-video plane data 4701 to shift the presentation position of each element in the video plane for 2D video images to the left or right according to the calculated binocular parallax. This generates a pair of video planes representing the left-view and right-view. The parallax video generation unit 4710 further transmits the pair of video planes to the switch 4720 as a pair of pieces of left-video and right-video plane data.

When the playback control unit 4435 indicates B-D presentation mode, the switch 4720 transmits left-video plane data 4701 and right-video plane data 4702 with the same PTS to the first adder 4741 in that order. When the playback control unit 4435 indicates B-B presentation mode, the switch 4720 transmits one of the left-video plane data 4701 and right-video plane data 4702 with the same PTS twice per frame to the first adder 4741, discarding the other piece of plane data.

The cropping processing units 4731-4734 include the same structure as a pair of the parallax video generation unit 4710 and switch 4720. These structures are used in 2 plane mode. When the playback device 102 is in depth mode, each piece of plane data from the system target decoder 4423 is converted into a pair of left-view and right-view pieces of plane data by the parallax video generation unit in each of the cropping processing units 4731-4734. When the playback control unit 4435 indicates B-D presentation mode, the left-view and right-view pieces of plane data are alternately transmitted to each of the adders 4741-4744. On the other hand, when the playback control unit 4435 indicates B-B presentation mode, one of the left-view and right-view pieces of plane data is transmitted twice per frame to each of the adders 4741-4744, and the other piece of plane data is discarded.

In 1 plane+offset mode, the first cropping processing unit 4731 receives an offset value 4751 from the system target decoder 4423 and refers to this value to perform cropping on the secondary video plane data 4703. The secondary video plane data 4703 is thus converted into a pair of pieces of secondary video plane data that represent a left-view and a right-view and are alternately transmitted. On the other hand, in 1 plane+zero offset mode, the secondary video plane data 4703 is transmitted twice. Similarly, the second cropping processing unit 4732 performs cropping processing on the PG plane data 4704, and the third cropping processing unit 4733 performs cropping processing on the IG plane data 4705.

The image plane data 4706 is graphics data transmitted from the program execution unit 4434 to the system target decoder 4423 and decoded by the system target decoder 4423. The graphics data is raster data such as JPEG data or PNG data, and shows a GUI graphics component such as a menu. The fourth cropping processing unit 4734 performs the cropping processing on the image plane data 4706 as do the other cropping processing units 4731-4733. However, unlike the other cropping processing units 4731-4733, the fourth cropping processing unit 4734 receives the offset value from a program API 4752 instead of from the system target decoder 4423. In this case, the program API 4752 is executed by the program execution unit 4434. In this way, the offset information corresponding to the depth of the image represented by the graphics data is calculated and output to the fourth cropping processing unit 4734.

FIG. 48 is a flowchart of cropping processing by the cropping processing units 4731-4734. The cropping processing units 4731-4734 start cropping processing upon receiving plane data to be played back. The following describes an example of a case in which the second cropping processing unit 4732 performs cropping processing on the PG plane data 4704. The other cropping processing units 4731, 4733, and 4734 perform similar processing respectively on the secondary plane data 4703, the IG plane data 4705, and the image plane data 4706. Furthermore, when the sign of the offset value is positive, "depth of 3D images represented by the plane data is forward from the screen".

In step S4801, first, the second cropping processing unit 4732 searches for an offset allocated to the PG plane from among the offset values 4751. Next, the second cropping processing unit 4732 checks whether the video plane data selected by the switch 4720 represents the left view. When the video plane data represents the left view, the processing proceeds to step S4802. When the video plane data represents the right view, the processing proceeds to step S4803.

In step S4802, the second cropping processing unit 4732 shifts the presentation position of each graphics video image indicated by the PG plane data 4704 in the right direction by the offset value. When the sign of the offset value is negative, the presentation position is shifted to the left. Also, since the offset in 1 plane+zero offset mode is "0", the original PG plane data 4704 is preserved as is. Thereafter, processing proceeds to step S4804.

In step 4803, the second cropping processing unit 4732 shifts the presentation position of each graphics video image indicated by the PG plane data 4704 in the left direction by the offset value. When the sign of the offset value is negative, the presentation position is shifted to the right. Also, since the offset in 1 plane+zero offset mode is "0", the original PG plane data 4704 is preserved as is. Thereafter, processing proceeds to step S4804.

In step S4804, the second cropping processing unit 4732 outputs the processed PG plane data 4704 to the third cropping processing unit 4734. Thereafter, processing ends.

Figure 49A:
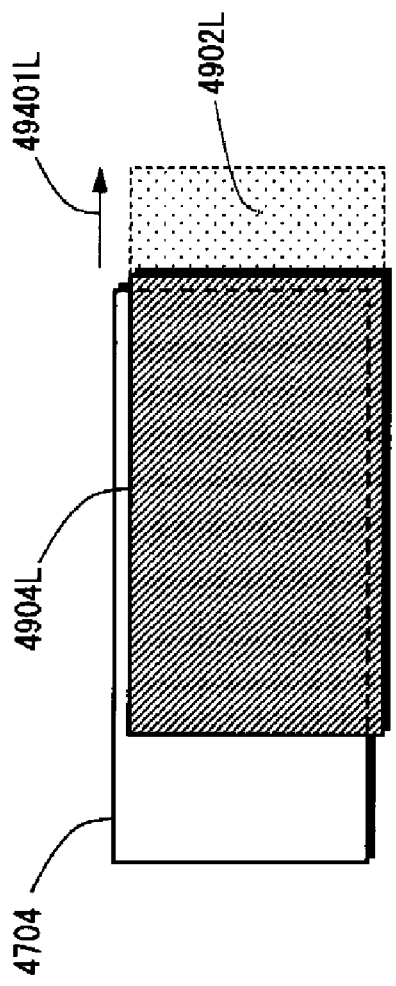
FIGS. 49A and 49B are schematic diagrams showing cropping processing by a second cropping processing unit 4732.
Figure 49B:
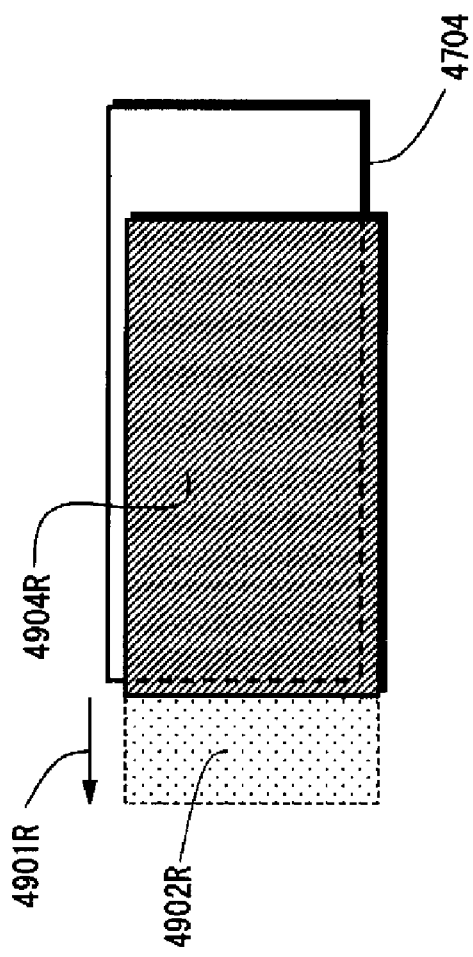

FIGS. 49A and 49B are schematic diagrams showing cropping processing by a second cropping processing unit 4732. FIGS. 49A and 49B represent, respectively, left-view PG plane data 4902L and right-view PG plane data 4902R generated from the PG plane data 4704 based on a positive offset value. When the depth of 3D video images representing PG plane data 4704 is closer than the screen, the sign of the offset value is positive.

As shown in FIG. 49A, the second cropping processing unit 4732 first shifts each piece of pixel data in the PG plane data 4704 from its original position to the right by a number of pixels 4901L, which is the same as the offset value. When the sign of the offset value is negative, the second cropping processing unit 4732 shifts pixel data to the left. Next, the second cropping processing unit 4732 removes the section of pixel data 4902L that falls outside the range of the PG plane data 4704 to the right (or left). In this way, the remaining pixel data 4904L is output as the left-view PG plane data.

As shown in FIG. 49B, the second cropping processing unit 4732 first shifts each piece of pixel data in the PG plane data 4704 from its original position to the left by a number of pixels 4901R, which is the same as the offset value. When the sign of the offset value is negative, the pixel data is shifted to the right. Next, the second cropping processing unit 4732 removes the section of pixel data 4902R that falls outside the range of the PG plane data 4704 to the left (or right). In this way, the remaining pixel data 4904R is output as the right-view PG plane data.

Figure 50A:
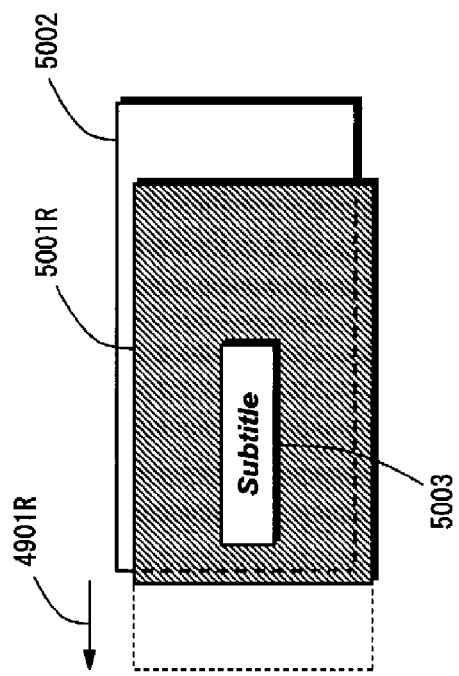
FIGS. 50A, 50B and 50C are schematic diagrams showing, respectively, 2D images representing PG plane data of a left view and a right view shown in FIGS. 49A and 49B, that is, left view and right view PG planes and 3D images perceived therefrom by a viewer.
Figure 50B:
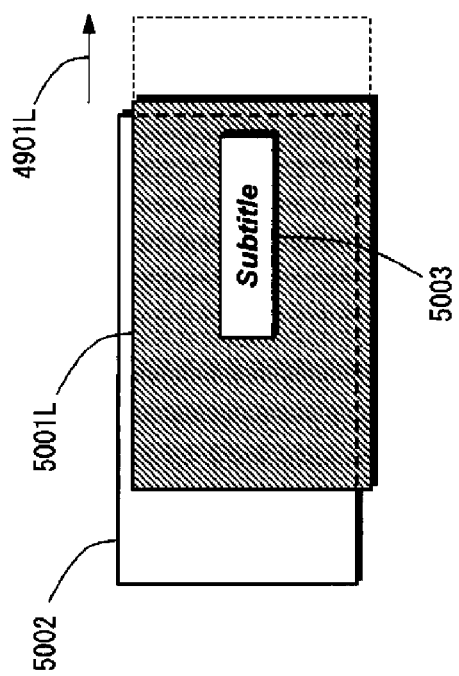
Figure 50C:
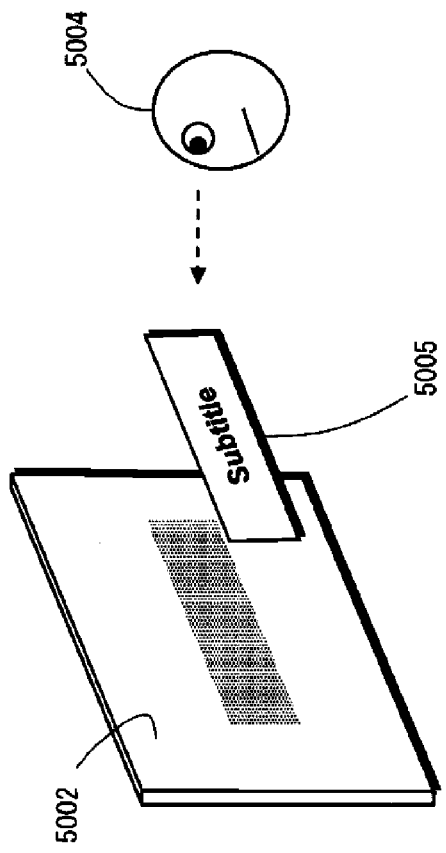

FIGS. 50A, 50B, and 50C are schematic diagrams showing, respectively, 2D images representing PG plane data of a left view and a right view shown in FIGS. 49A and 49B, that is, left-view and right-view PG planes and 3D images perceived therefrom by a viewer. As shown in FIG. 50A, the left-view PG plane 5001L is shifted to the right from the range of the screen 5002 by an offset value 4901L. As a result, the subtitle 2D video image 5003 in the left-view PG plane 5001L appears shifted to the right from its original position by the offset value 4901L. As shown in FIG. 50B, conversely, the right-view PG plane 5001R is shifted to the left from the range of the screen 5002 by an offset value 4901R. As a result, the subtitle 2D video image 5003 in the right-view PG plane 5001R appears shifted to the left from its original position by the offset value 4901R. When these PG planes 5001L and 4901R are alternately displayed on the screen 5002, then as shown in FIG. 50C, a viewer 5004 perceives the subtitle 3D video image 5005 as closer than the screen 5002. The distance between the 3D video image 5005 and the screen 5002 can be adjusted with the offset values 4901L and 4901R. When the position of each piece of pixel data in the PG plane data 4904 is shifted in the opposite direction than is shown in FIGS. 50A and 50B, the viewer 5004 perceives the subtitle 3D video image 5005 to be further back than the screen 5002.

In 1 plane+offset mode, cropping processing is thus used to generate a pair of a left-view and right-view pieces of plane data from a single piece of plane data. This allows a parallax video image to be displayed from just one piece of plane data. In other words, a sense of depth can be given to a monoscopic image. In particular, a viewer can be made to perceive this monoscopic image as closer or further back than the screen. Note that in 1 plane+zero offset mode, the offset value is "0", and thus the monoscopic image is preserved as is.

Again referring to FIG. 47, the first adder 4741 receives video plane data from the switch 4720 and receives secondary plane data from the first cropping processing unit 4731. Then the first adder 4741 superimposes one set of video plane data and secondary plane data at a time, outputting the result to the second adder 4742. The second adder 4742 receives PG plane data from the second cropping processing unit 4732, superimposes the PG plane data on the plane data from the first adder 4741, and outputs the result to the third adder 4743. The third adder 4743 receives IG plane data from the third cropping processing unit 4733, superimposes the IG plane data on the plane data from the second adder 4742, and outputs the result to the fourth adder 4744. The fourth adder 4744 receives image plane data from the fourth cropping processing unit 4734, superimposes the image plane data on the plane data from the third adder 4743, and outputs the result to the display device 103. As a result, the left-video plane data 4701 or right-video plane data 9702, the secondary plane data 4703, the PG plane data 4709, the IG plane data 4705, and the image plane data 4706 are superimposed in the order shown by the arrow 4700 in FIG. 47. Via this composition processing, for each video image shown by plane data, the left-video image plane or right-video image plane, secondary video plane, IG plane, PG plane, and image plane appear to overlap in this order on the screen of the display device 103.

In addition to the above-stated processing, the plane adder 4724 performs processing to convert an output format of the plane data composited by the four adders 4791-4744 into a format that complies with the 3D display method adopted in a device such as the display device 103 to which the data is output. If an alternate-frame sequencing method is adopted in the device, for example, the plane adder 4729 outputs the composited plane data pieces as one frame or one field. On the other hand, if a method that uses a lenticular lens is adopted in the device, the plane adder 4724 composites a pair of left-view and right-view pieces of plane data as one frame or one field of video data with use of the built-in buffer memory. Specifically, the plane adder 4724 temporarily stores and holds in the buffer memory the left-view plane data that has been composited first. Subsequently, the plane adder 4724 composites the right-view plane data, and further composites the resultant data with the left-view plane data held in the buffer memory. During composition, the left-view and right-view pieces of plane data are each divided, in a vertical direction, into small rectangular areas that are long and thin, and the small rectangular areas are arranged alternately in the horizontal direction in one frame or one field so as to re-constitute the frame or the field. In this way, the pair of left-view and right-view pieces of plane data is composited into one video frame or field, which the plane adder 4724 then outputs to the corresponding device.

<Modifications>

(A) In embodiment 1 of the present invention, the base-view video stream represents the left-view, and the dependent-view video stream represents the right-view. Conversely, however, the base-view video stream, may represent the right-view and the dependent-view video stream the left-view.

(B) In AV stream files of 3D images, a 3D descriptor may be added to the PMT 2310 shown in FIG. 23. A 3D descriptor is information pertaining to the playback method of 3D images common to all of the AV stream files, and in particular, includes 3D method information. The 3D method information indicates a playback method for AV stream files of 3D images, such as L/R mode or depth mode. Furthermore, a 3D stream descriptor may be added to the stream information 2303. The 3D stream descriptor indicates information pertaining to the playback method of the 3D images separately for each elementary stream included in an AV stream file. In particular, the 3D stream descriptor of the video streams includes a 3D display type. The 3D display type indicates, when displaying images of the video stream in L/R mode, whether the images are left-view or right view. The 3D display type also, when displaying the images of the video stream in depth mode, whether the images are 2D images or depth map images. In this way, when the PMT 2310 includes information pertaining to the playback method of the 3D images, the playback system of the images is capable of acquiring the information from the AV stream files alone. Accordingly, this type of data structure is effective for distributing 3D video image content by broadcast wave, for example.

(C) The offset table 2441 shown in FIG. 26A includes a table 2610 of offset entries 2603 for each PID. The offset table may additionally include a table of offset entries for each plane. In this case, analysis of the offset table by the 3D playback device can be simplified. Furthermore, a lower limit, such as one second, may be placed on the length of the valid section of an offset entry in conjunction with the capabilities of the 3D playback device with regards to plane composition.

(D) The 3D playlist file shown in FIG. 34 includes one sub-path indicating the playback path of the sub-TS. Alternatively, the 3D playlist file may include sub-paths indicating playback paths for different sub-TSs. For example, the sub-path type of one sub-path may be "3D L/R", and the sub-path type of another sub-path may be "3D depth". When 3D video images are played back in accordance with this 3D playlist file, the playback device 102 can easily switch between L/R mode and depth mode by switching the sub-path for playback between these two types of sub-paths. In particular, this switching processing can be performed faster than switching the 3D playlist file itself.

The 3D playlist file may include multiple sub-paths of the same sub-path type. For example, when 3D video images for the same scene are represented with different binocular parallaxes by using multiple right-views that share the same left-view, a different file DEP is recorded on the BD-ROM disc 101 for each different right-view video stream. The 3D playlist file then contains multiple sub-paths with a sub-path type of "3D L/R". These sub-paths individually specify the playback path for the different files DEP. Additionally, one file 2D may include two or more types of depth map stream. In this case, the 3D playlist file includes multiple sub-paths with a sub-path type of "3D depth". These sub-paths individually specify the playback path for the files DEP that include the depth map streams. When 3D video images are played back in accordance with such a 3D playlist file, the sub-path for playback can quickly be switched, for example in accordance with user operation, and thus the binocular parallax for 3D video images can be changed without substantial interruption. In this way, users can easily be allowed to select a desired binocular parallax for 3D video images.

(E) Separation of Playback Paths Before and After the Layer Boundary

Figure 51A:
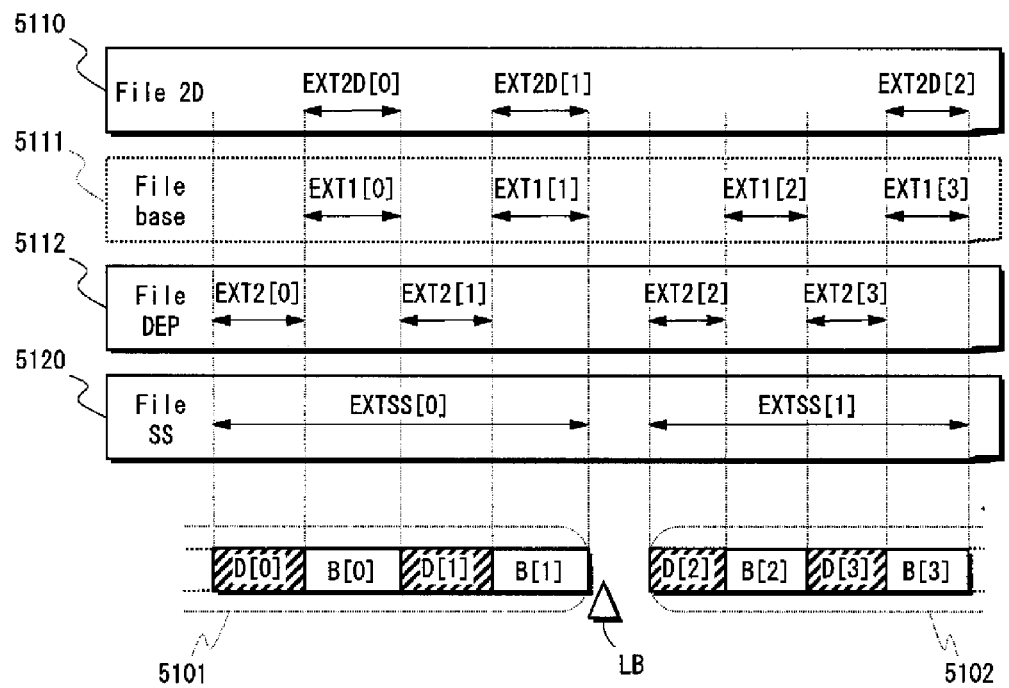
FIG. 51A is a schematic diagram showing extent blocks 5101 and 5102 recorded before and after a layer boundary LB.

FIG. 51A is a schematic diagram showing extent blocks 5101 and 5102 recorded before and after a layer boundary LB. As shown in FIG. 51A, the first extent block 5101 located before the layer boundary LB includes dependent-view blocks . . . , D[0], D[1], and base-view data blocks . . . , B[0], B[1]. Meanwhile, the second extent block 5102 located after the layer boundary LB includes the dependent-view data blocks D[2], D[3], . . . , and the base-view data blocks B[2], B[3], . . . . The content of the stream data is continuous between (i) a pair D[1] and B[1] of data blocks located at the tail of the first extent block 5101 and (ii) a pair D[2] and B[2] of data blocks located at the head of the second extent block 5102. To seamlessly connect between these, the sizes of the data blocks and the first extent block 5101 should satisfy the above Conditions 1-4.

As shown in FIG. 51A, each of the data blocks can be accessed as an extent of one of the file 2D 5100, the file DEP 5112, and the file SS 5120. In particular, the base-view data block B[n] (n= . . . , 0, 1, 2, 3, . . . ) is shared between the file 2D 5110 and the file SS 5120. In this case, the playback device 102 in 2D playback mode plays back the file 2D 5110, and the playback device 102 in 3D playback mode plays back the file SS 5120. Accordingly, the base-view data block B[n] can also be accessed from the playback device 102 in any playback mode.

Figure 51B:
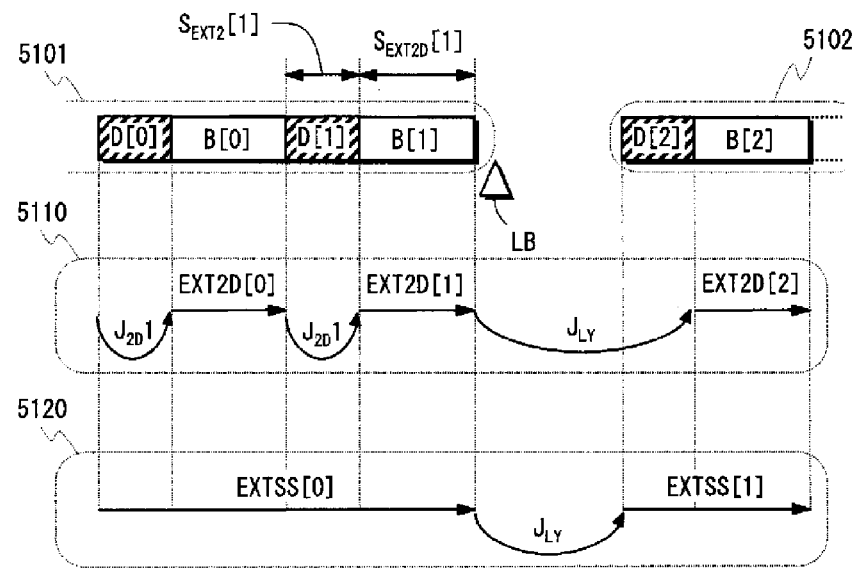
FIG. 51B is a schematic diagram showing a playback path 5130 in 2D playback mode and a playback path 5140 in 3D playback mode corresponding to the extent blocks 5101 and 5102.

FIG. 51B is a schematic diagram showing a playback path 5130 of the extent blocks 5101 and 5102 in 2D playback mode and a playback path 5140 in 3D playback mode. As shown in FIG. 51B, both of the playback paths 5130 and 5140 pass through the last base-view data block B[1] in the first extent block 5101 immediately before the long jump $J_{LY}$. That is to say, the base-view data block B[1] is read, as the second 2D extent EXT2D[1], by the playback device 102 in 2D playback mode, and is read as the last data block in the extent SS EXTSS[0] by the playback device 102 in 3D playback mode. Accordingly, in order for the playback device 102 to seamlessly play back both the 2D video images and the 3D video images before and after the long jump $J_{LY}$, the base-view data block B[1] should satisfy Condition 1 as a 2D extent EXT2D[1], and also should satisfy Condition 2 as a base-view extent EXT1[1].

In 2D playback mode according to Condition 1, the data amount to be processed by the system target decoder during the long jump $J_{LY}$ is reserved as the size of a single base-view data block B[1]. On the other hand, in 3D playback mode according to Condition 4, the data amount is reserved as the size of the entirety of the first extent block 5101. Accordingly, the minimum extent size $minS_{EXT2D}[1]$ required for a base-view data block B[1] according to Condition 1 is generally larger than the minimum extent size $minS_{EXT1}[1]$ according to Condition 2. For this reason, the capacity of the first read buffer 4421 should be larger than the value of the minimum lower limit necessary for seamless playback in 3D playback mode. Furthermore, the extent ATC time is the same between the base-view data block B[1] and the immediately previous dependent-view data block D[1]. Accordingly, the size $S_{EXT2}[1]$ of the dependent-view data block D[1] is generally larger than the minimum extent size $minS_{EXT2}[1]$ required for the data block D[1] according to Condition 2. For this reason, the capacity of the second read buffer 4422 is generally larger than the value of the minimum lower limit necessary for seamless playback in 3D playback mode. In this way, although a seamless connection between the two extent blocks 5101 and 5102 is possible in the arrangement shown in FIG. 51A, a sufficiently large capacity should be reserved in the read buffers 4421 and 4422.

To further reduce the capacity of the read buffers 4921 and 4422 while seamless playback of images is enabled during the long jump $J_{LY}$, the arrangement of the data blocks should be changed, from the interleaved arrangement, in the vicinity where the long jump $J_{LY}$, such as the layer boundary LB, and the playback path should be separated for the 2D playback mode and the 3D playback mode. Two patterns for this type of change are the two types of Arrangement 1 and Arrangement 2 described below, for example. In both Arrangements 1 and 2, the playback path immediately before the long jump $J_{LY}$ passes by a different base-view data block different for each operational mode. As a result, as described later, it is possible to cause the playback device 102 to easily realize seamless playback of video images during the long jump $J_{LY}$ while maintaining the capacity of the read buffers 4421 and 4422 at the minimum necessary lower limit.

(E-1) Arrangement 1

Figure 52:
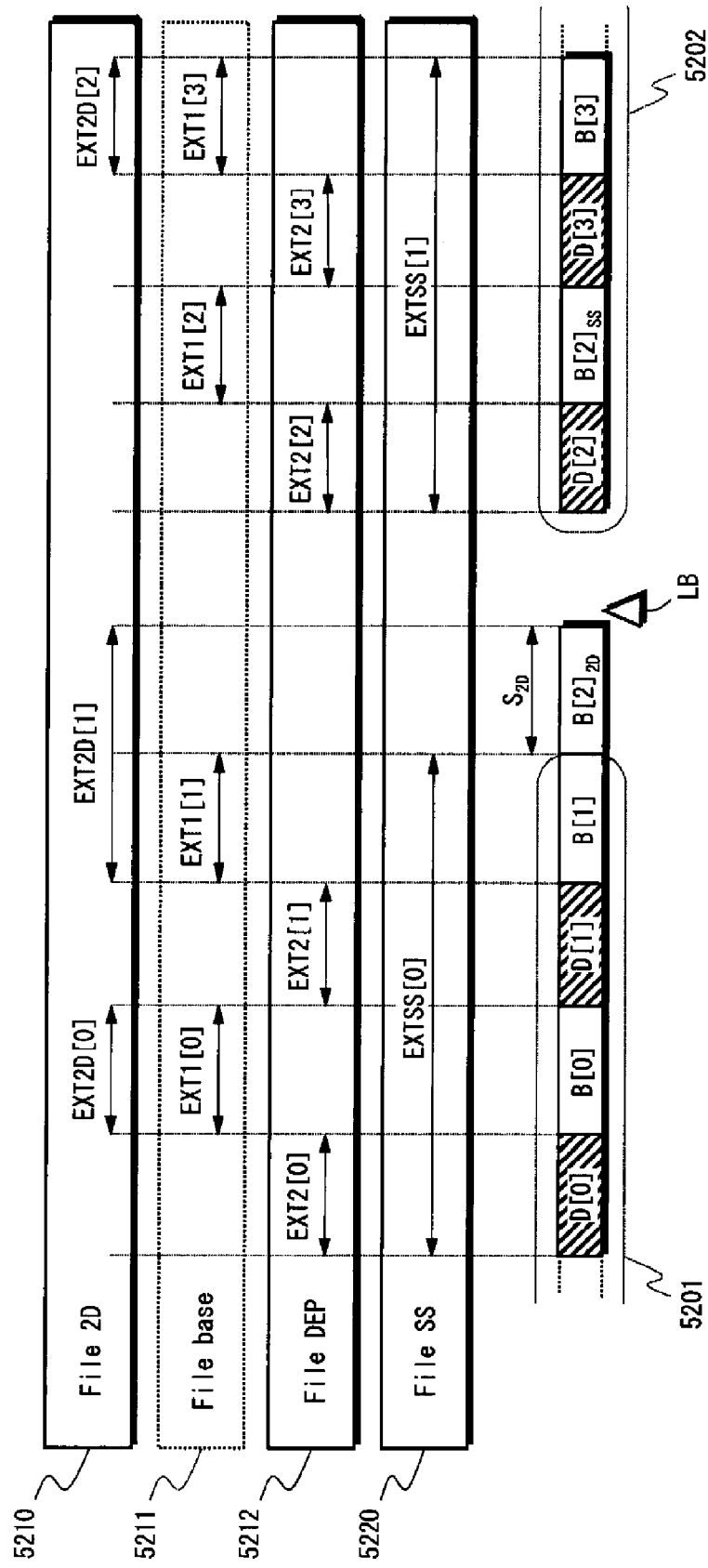
FIG. 52 is a schematic diagram showing an Arrangement 1 of data blocks recorded on the BD-ROM disc 101 before and after the layer boundary LB.

FIG. 52 is a schematic diagram showing a first example of a physical arrangement of data blocks recorded on the BD-ROM disc 101 before and after the layer boundary LB. Hereinafter, this arrangement is referred to as "Arrangement 1". As shown in FIG. 52, the first extent block 5201 is arranged before the layer boundary LB, and the second extent block 5202 is arranged after the layer boundary LB. In the extent blocks 5201 and 5202, a dependent-view data block D[n] and a base-view data block B [n] form an interleaved arrangement (n= . . . , 0, 1, 2, 3, . . . ). In particular, the extent ATC times are the same between a pair of $n^{th}$ data blocks D[n] and B[n]. In Arrangement 1, further, one base-view data block $B[2]_{2D}$ is arranged between the tail B[1] of the first extent block 5201 and the layer boundary LB. This base-view data block $B[2]_{2D}$ is a bit-for-bit match with the base-view data block $B[2]_{SS}$ of the head in the second extent block 5202. Hereinafter, the former $B[2]_{2D}$ is referred to as a "block exclusively for 2D playback", and the latter $B[2]_{SS}$ is referred to as a "block exclusively for SS playback".

With the exception of the blocks exclusively for SS playback $B[2]_{SS}$, the base-view data blocks shown in FIG. 52 can be accessed as extents of a file 2D 5210, that is, as 2D extents EXT2D[.]. For example, the base-view data block B[0] that is second from the end in the first extent block 5201, the pair $B[1]+B[2]_{21}$) of the last base-view data block B[1] and the block exclusively for 2D playback $B[2]_{2D}$, and the base-view data block B[3] that is second in the second extent block 5202 can be accessed, respectively, as singular 2D extents EXT2D [0], EXT2D[1], and EXT2D[2]. On the other hand, the dependent-view data blocks D[n] (n= . . . , 0, 1, 2, 3, . . . ) shown in FIG. 52 can be accessed as singular extents of the file DEP 5212, that is, as the dependent-view extent EXT2[n].

In the data blocks shown in FIG. 52, cross-linking between AV stream files is realized as follows. The entirety of the extent blocks 5201 and 5202 can be accessed as singular extents EXTSS[0] and EXTSS[1] of the file SS 5220. Accordingly, the base-view data blocks B[0], B[1], and B[3] are shared between the file 2D 5210 and the file SS 5220. In contrast, the block exclusively for 2D playback $B[2]_{20}$ can only be accessed as a part of the 2D extent EXT2D[1] located immediately before the layer boundary LB. On the other hand, the block exclusively for SS playback $B[2]_{SS}$ can only be accessed as a part of the extent SS EXTSS[1] located immediately after the layer boundary LB. For this reason, with the exception of the blocks exclusively for 2D playback $B[2]_{2D}$, the base-view data blocks. B[0], B[1], $B[2]_{SS}$, and B[3] can be extracted from the extents SS EXTSS[0] and EXTSS[1] as extents of the file base 5211, that is as the base-view extents EXT1[n] (n=0, 1, 2, 3).

Figure 53:
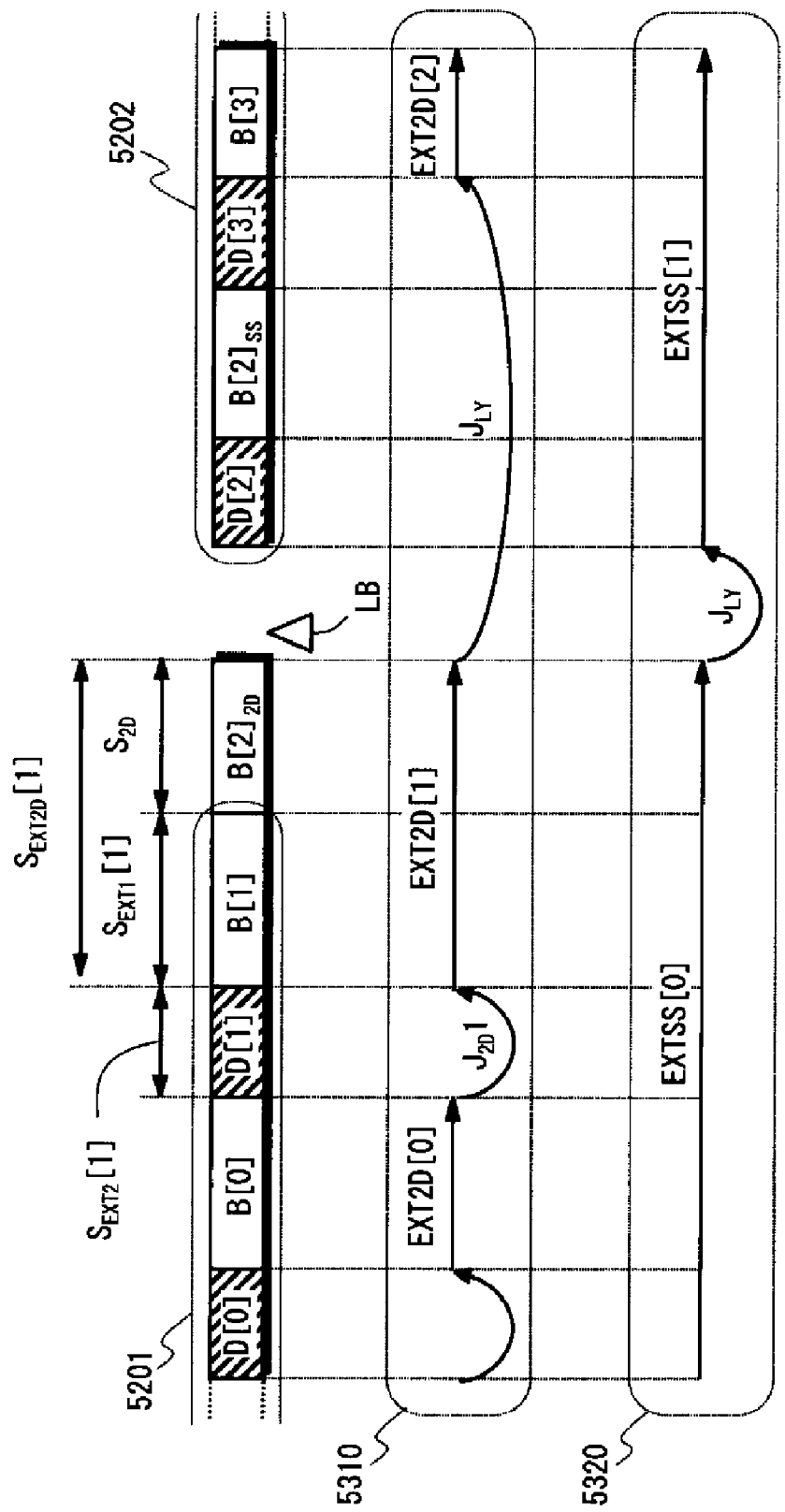
FIG. 53 is a schematic diagram showing a playback path 5310 in 2D playback mode and a playback path 5320 to data blocks in 3D playback mode in the Arrangement 1 shown in FIG. 52.

FIG. 53 is a schematic diagram showing a playback path 5310 in 2D playback mode and a playback path 5320 in 3D playback mode, to data blocks in the Arrangement 1 shown in FIG. 52.

The playback device 102 in 2D playback mode plays back the file 2D 5210. Accordingly, as shown by the playback path 5310 in 2D playback mode, the base-view data block B[0] that is second from the end of the first extent block 5201 is first read as the first 2D extent EXT2D[0], and the reading of the immediately following dependent-view data block D[1] is skipped by the jump $J_{2D}1$. Next, a pair $B[1]+B[2]_{2D}$, where B[1] is the last base-view data block in the first extent block 5210, and $B[2]_{2D}$ is the immediately following block exclusively for 2D playback, is continuously read as the second 2D extent EXT2D[1]. A long jump $J_{LY}$ occurs at the immediately following layer boundary LB, and the reading of the three data blocks D[2], $B[2]_{SS}$ and D[3] located at the top of the second extent block 5202 is skipped. Next, the second base-view data block B[3] in the second extent block 5202 in the second extent block EXT is read as the third 2D extent EXT2D [2].

The playback device 102 in 3D playback mode plays back a file SS 5220. Accordingly, as shown by the playback path 5320 in 3D playback mode, the entirety of the first extent block 5201 is first continuously read as the first extent SS EXTSS[0]. The long jump $J_{LY}$ occurs immediately thereafter, and the reading of the block exclusively for 2D playback $B[2]_{2D}$ is skipped. Next, the entirety of the second extent block 5202 is continuously read as the second extent SS EXTSS[1].

As shown in FIG. 53, in 2D playback mode, the block exclusively for 2D playback $B[2]_{2D}$ is read, and the reading of the block exclusively for SS playback $B[2]_{SS}$ is skipped. In contrast, in 3D playback mode, the reading of the block exclusively for 2D playback $B[2]_{2D}$ is skipped, and the block exclusively for SS playback $B[2]_{SS}$ is read. However, since both the data blocks $B[2]_{2D}$ and $B[2]_{SS}$ match bit-for-bit, the base-view video frames to be played back are the same in any playback mode. In this way, in Arrangement 1, the playback path 5310 in 2D playback mode and the playback path 5320 in 3D playback mode are separated in the vicinity of the long jump $J_{LY}$. Accordingly, unlike the arrangement shown in FIG. 51A, the size $S_{EXT2D}[1]$ of the 2D extent EXT2D[1] located immediately before the layer boundary LB and the size $S_{EXT2}[1]$ of the immediately previous dependent-view data block D[1] can be determined separately as described below.

The size $S_{EXT2D}[1]$ of the 2D extent EXT2D[1] is the same as the sum $S_{EXT1}[1]+S_2D$, where $S_{EXT1}[1]$ is the size of the base-view data block B[1] and $S_{2D}$ is the size of the block exclusively for 2D playback $B[2]_{2D}$. Accordingly, to seamlessly play back 2D video images, first the sum $S_{EXT1}[1]+S_{2D}$ should satisfy Condition 1. Here, the maximum jump time $T_{jump\_max}$ of the long jump $J_{LY}$ is substituted into the right hand side of Expression 1 as the jump time $T_{jump-2D}$. Next, the number of sectors from the tail of the block exclusively for 2D playback $B[2]_{2D}$ until the base-view data block B[3], which is the first 2D extent EXT 2D in the second extent block, should be less than or equal to the maximum jump distance $S_{jump\_max}$ of the long jump $J_{LY}$ specified according to the capability of the 2D playback device.

On the other hand, to seamlessly play back 3D images, first, the sizes $S_{EXT2}[1]$ and $S_{EXT1}[1]$ of the dependent-view data block D[1] and the base-view data block B[1] located at the tail of the first extents SS EXTSS[0] should satisfy Conditions 3 and 2. Regardless of whether the long jump $J_{LY}$ occurs, a typical value for a zero sector transition time should be substituted into the right hand sides of Expression 3 and Expression 2 as zero sector transition times $T_{JUMP0}[2n+1]$ and $T_{JUMP0}[2n+2]$. Next, the size of the first extent SS EXTSS[0] should satisfy Condition 4. Furthermore, the number of sectors from the tail of the extent SS EXTSS[0] to the top of the next extent SS EXTSS[1] should be less than or equal to the maximum jump distance $S_{jump\_max}$ of the long jump $J_{LY}$ specified according to the capability of the 3D playback device.

Among the 2D extents EXT2D[1] located immediately before the layer boundary LB, only the base-view data block B[1] located toward the front is in common with the first extent SS EXTSS [0]. Accordingly, by appropriately expanding the size $S_2D$ of the block exclusively for 2D playback $B[2]_{2D}$ while maintaining a constant size for $S_{EXT2}D[1]$ of the 2D extent EXT2D[1] so that the size $S_{EXT2D}[1]= S_{EXT1\ [1]+S2D}$, the size $S_{EXT1}[1]$ of the base-view data block B[1] can be limited to a smaller size. In this case, the extent ATC time of the base-view data block B[1] is reduced. For this reason, the size $S_{EXT2}[1]$ of the dependent-view data block D[1] located immediately before the base-view data block B[1] can be restricted still smaller.

Since the block $B[2]_{SS}$ exclusively for SS playback is a bit-for-bit match with the block exclusively for 2D playback $B[2]_{2D}$, expanding the size $S_{2D}$ of the block exclusively for 2D playback $B[2]_{2D}$ causes expanding the size of the dependent-view data block D[2] located immediately before the block exclusively for SS playback $B[2]_{SS}$. However, the size of the dependent-view data block D[2] can be made sufficiently smaller than the size of the dependent-view data block D[1] located immediately before the layer boundary shown in FIG. 51A. In this way, the capacity of the read buffers 4421 and 4422 to be reserved in the playback device 102 in 3D playback mode can be brought further toward the value of the minimum lower limit necessary for seamless playback of 3D video images. As a result, in Arrangement 1, the size of the data blocks can be designed to be able to play back both the 2D video images and the 3D images seamlessly during the long jump, while suppressing the capacity of the read buffer to be reserved in the playback device 102 to the lowest limit necessary.

In Arrangement 1, duplicate data of the block exclusively for 2D playback $B[2]_{2D}$ is arranged as a singular block exclusively for SS playback $B[2]_{SS}$ in the second extent block 5202. Additionally, the duplicate data may be arranged so as to be divided into two or more blocks exclusively for SS playback.

(E-2) Arrangement 2

Figure 54:
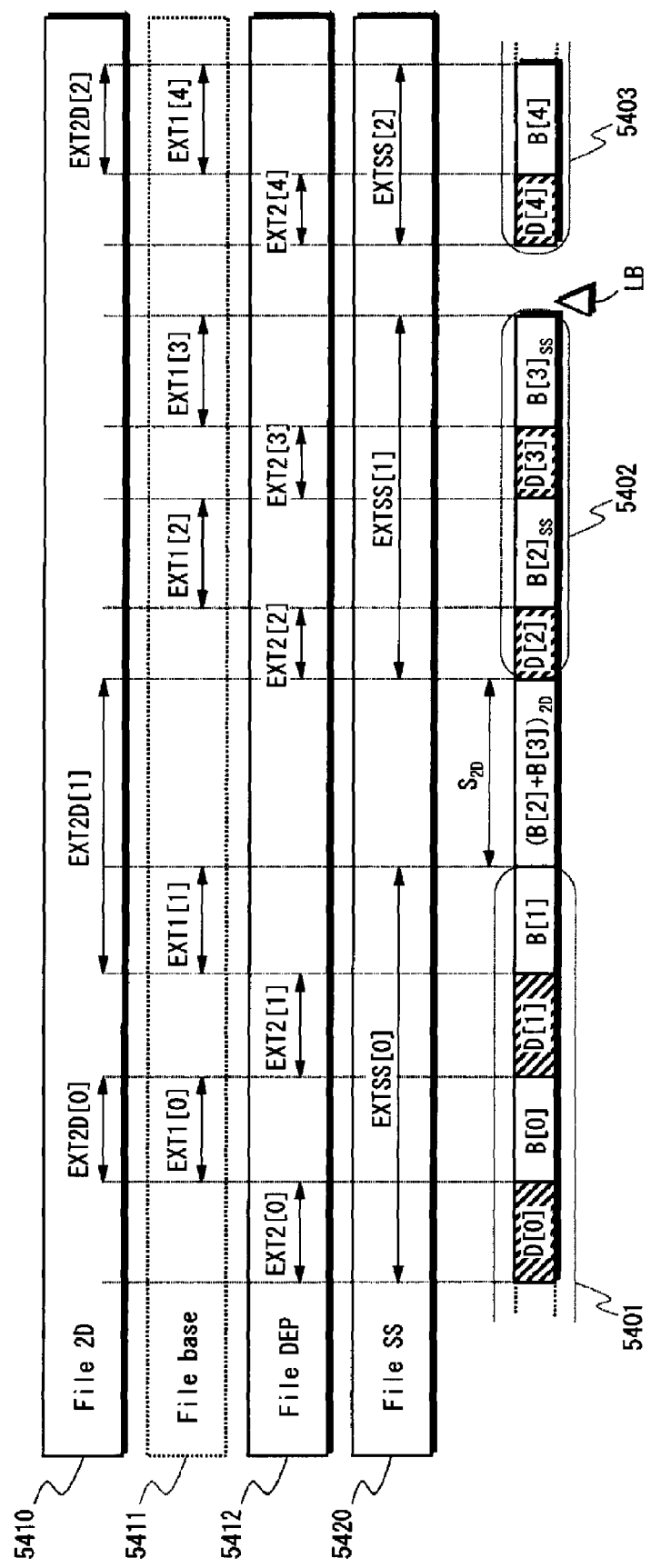
FIG. 54 is a schematic diagram showing an Arrangement 2 of data blocks recorded on the BD-ROM disc 101 before and after the layer boundary LB.

FIG. 54 is a schematic diagram showing a second example of a physical arrangement of the data block groups recorded before and after a layer boundary LB in the BD-ROM disc 101. Hereinafter, this arrangement is referred to as "Arrangement 2". As seen by comparing FIG. 54 to FIG. 52, Arrangement 2 differs from Arrangement 1 primarily in that the extent blocks 5402 including blocks exclusively for SS playback $B[2]_{SS}$ and $B[3]_{SS}$ are provided immediately before the layer boundary LB.

As shown in FIG. 54, the first extent block 5401, blocks exclusively for 2D playback $(B[2]+B[3])_{2D}$, and the second extent block 5402 are sequentially arranged before the layer boundary LB, and the third extent block 5203 is arranged after the layer boundary LB. Dependent-view data blocks D[n] and base-view data blocks B[n] are interleaved in each extent block 5201, 5202, and 5203 (n= . . . , 0, 1, 2, 3, 4, . . . ). In particular, the extent ATC time is the same in the pair D[n], and B[n] of the $n^{th}$ data block. The content of the stream data in the second extent block 5402 continues from the data blocks D[1] and B[1] located at the tail of the first extent block 5401, and continues to the data blocks D[4] and B[4] located at the head of the third extent block 5403. The base-view data blocks included in the second extent block 5402 are the blocks exclusively for SS playback $B[2]_{SS}$ and $B[3]_{SS}$, and the entirety thereof $B[2]_{SS}+B[3]_{SS}$ is a bit-for-bit match with the blocks $(B[2]+B[3])_{2D}$ exclusively for 2D playback located immediately previously.

With the exception of the blocks exclusively for SS playback $B[2]_{SS}$ and $B[3]_{SS}$, the base-view data blocks shown in FIG. 54 can be accessed as the extents EXT2D[0], EXT2D[1], and EXT2D[2] in the file 2D 5410. In particular, the last base-view data block B[1] in the first extent block 5401, the block exclusively for 2D playback $(B[2]+B[3])_{2D}$, and the pair $B[1]+(B[2]+B[3])_{2D}$ can be accessed as a singular 2D extent EXT2D[1]. Furthermore, the base-view data blocks B[0], B[1], and B[4] in the extent blocks 5401 and 5403 other than the second extent block 5402 can be extracted from the extents EXTSS[0] and EXTSS[1] in the file SS 5420 as the extents EXT1[0], EXT1[1], and EXT[4] of the file base 5411. In contrast, the blocks exclusively for 2D playback $(B[2]+B[3])_{2D}$ can only be accessed as a portion of the 2D extent EXT2D[1]. Meanwhile, the blocks exclusively for SS playback $B[2]_{SS}$ and $B[3]_{SS}$ can be extracted from the extent SS EXTSS[1] as the base-view extents EXT1[2] and EXT1[3], respectively.

Figure 55:
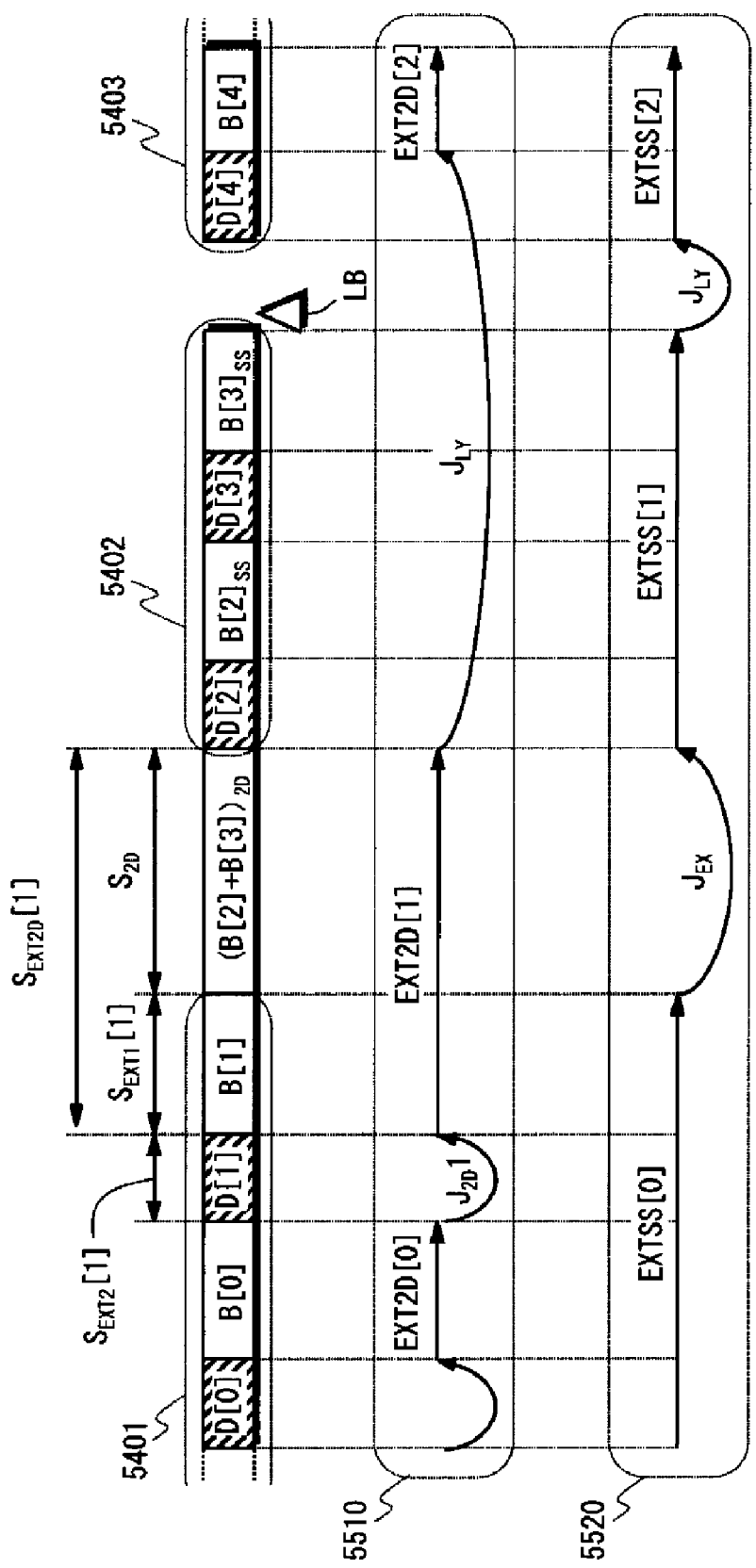
FIG. 55 is a schematic diagram showing a playback path 5510 in 2D playback mode and a playback path 5520 in 3D playback mode to data blocks in the Arrangement 2 shown in FIG. 54.

FIG. 55 is a schematic diagram showing the playback path 5510 in 2D playback mode and the playback path 5520 in 3D playback mode, to the data blocks in Arrangement 2 shown in FIG. 54.

The playback device 102 in 2D playback mode plays back the file 2D 5410. Accordingly, as shown by the playback path 5510 in 2D playback mode, first the base-view data block B[0], which is second from the end of the first extent block 5401, is read as the first 2D extent EXT2D[0], and reading of the immediately subsequent dependent-view data block D[1] is skipped by a first jump $J_{2D}1$. Next, a pair $B[1]+(B[2]+B[3])_{2D}$ of the base-view data block B[1], which are located last in the first extent block 5401, and the immediately subsequent block exclusively for 2D playback $(B[2]+B[3])_{2D}$ is continuously read as the second 2D extent EXT2D[1]. A long jump $J_{LY}$ occurs immediately thereafter, the second extent block 5402 is read, and reading of the dependent-view data block D4, which is located at the top of the third extent block 5403, is skipped. Next, the first base-view data block B[4] in the third extent block 5403 is read as the third 2D extent EXT2D[2].

The playback device 102 in 3D playback mode plays back a file SS 5420. Accordingly, as shown by the playback path 5520 in 3D playback mode, the entirety of the first extent block 5401 is first continuously read as the first extent SS EXTSS[0]. A jump JEx occurs immediately thereafter, and the reading of the block exclusively for 2D playback $(B[2]+B[3])_{2D}$ is skipped. Next, the entirety of the second extent block 5402 is continuously read as the second extent SS EXTSS[1]. Immediately thereafter, the long jump $J_{LY}$ across the layer boundary LB occurs. Next, the entirety of the third extent block 5403 is continuously read as the third extent SS EXTSS[2].

As shown in FIG. 55, in 2D playback mode, the block exclusively for 2D playback $(B[2]+B[3])_{2D}$ is read, and the reading of the blocks exclusively for SS playback $B[2]_{SS}$ and $B[3]_{SS}$ is skipped. In contrast, in 3D playback mode, the reading of the block exclusively for 2D playback $(B[2]+B[3])_{2D}$ is skipped, and the blocks exclusively for SS playback $B[2]_{SS}$ and $B[3]_{SS}$ are read. However, since both the block exclusively for 2D playback $(B[2]+B[3])_2D$ and the entirety of blocks exclusively for SS playback $B[2]_{SS}$ and $B[3]_{SS}$ match bit-for-bit, the base-view video frames to be played back are the same in any playback mode. In this way, in Arrangement 2, the playback path 5510 in 2D playback mode and the playback path 5520 in 3D playback mode are separated in the vicinity of the long jump $J_{LY}$. Accordingly, the size $S_{EXT2D}[1]$ of the 2D extent EXT2D[1] located immediately before the layer boundary LB and the size $S_{EXT1}[1]$ of the immediately previous dependent-view data block D[1] can be determined separately as described below.

The size $S_{EXT2D}[1]$ of the 2D extent EXT2D[1] is the same as the sum $S_{EXT1}[1]+S_{2D}$, where $S_{EXT1}[1]$ is the size of the base-view data block B[1] and $S_{2D}$ is the size of the block exclusively for 2D playback $(B[2]+B[3])_{2D}$. Accordingly, to seamlessly play back 2D video images, first the sum $S_{EXT1}[1]+S_{2D}$ should satisfy Condition 1. Here, the maximum jump time $T_{jump\_max}$ of the long jump $J_{LY}$ is substituted into the right hand side of Expression 1 as the jump time $T_{jump-2D}$. Next, the number of sectors from the tail of the block exclusively for 2D playback $(B[2]+B[3])_{2D}$ until the base-view data block B[4], which is the first 2D extent EXT2D[2] in the third extent block 5403, should be less than or equal to the maximum jump distance $S_{jump-max}$ of the long jump $J_{LY}$ specified according to the capability of the 2D playback device.

On the other hand, to seamlessly play back 3D images, the sizes $S_{EXT2}[1]$ and $S_{EXT1}[1]$ of the dependent-view data block D[1] and the base-view data block B[1] located at the tail of the first extents SS EXTSS[0] should satisfy Conditions 3 and 2. Regardless of whether the jump $J_{EX}$ occurs, a typical value for a zero sector transition time should be substituted into the right hand sides of Expression 3 and Expression 2 as zero sector transition times $T_{JUMP0}[2n+1]$ and $T_{JUMP0}[2n+2]$. Next, the sizes $S_{EXT2}m[3]$ and $S_{EXT1}m[3]$ of the dependent-view data block D[3] and the block exclusively for SS playback $B[3]_{SS}$ located at the tail of the second extent SS EXTSS [1] should satisfy Conditions 3 and 2. Regardless of whether the long jump $J_{LY}$ occurs, a typical value for a zero sector transition time should be substituted into the right hand sides of the Expressions 3 and 2 as the zero sector transition times $T_{JUMP0}[2n+1]$ and $T_{JUMP0}[2n+2]$.

Among the 2D extents EXT2D[1], only the base-view data block B[1] located toward the front is in common with the extent SS EXTSS [1]. Accordingly, by appropriately expanding the size $S_{2D}$ of the block exclusively for 2D playback $(B[2]+B[3])_{2D}$, while maintaining the size $S_{EXT2D}[1]$ of the 2D extent $EXT2D[1]=S_{EXT1}[1]+S_{2D}$ as a constant, the size $S_{EXT1}[1]$ of the base-view data block B[1] can be limited to a smaller size. For this reason, the size $S_{EXT2}[1]$ of the dependent-view data block D[1] located immediately before the base-view data block B[1] can be limited to a smaller size.

The entirety of the blocks exclusively for 3D playback $B[2]_{SS}+B[3]$ ss is a bit-for-bit match with the blocks exclusively for 2D playback $(B[2]+B[3])_{2D}$. Accordingly, when the size $S_2D$ of the blocks exclusively for 2D playback $(B[2]+B[3])_{2D}$ is expanded, the size of the dependent-view data blocks D[2] and D[3] located immediately before the blocks exclusively for 3D playback $B[2]_{SS}$ and $B[3]_{SS}$ also expanded. However, the blocks exclusively for 3D playback are divided into two, $B[2]_{ss}$ and $B[3]_{SS}$, in contrast to the singular block exclusively for 2D playback $(B[2]+B[3])_{2D}$. As a result, the sizes of the blocks exclusively for 3D playback $B[2]_{SS}$ and $B[3]_{SS}$ can be made sufficiently smaller. In this way, the capacity of the lead buffers 4421 and 4422 can be further reduced to the minimum lower limit necessary for seamless playback of 3D video images.

To seamlessly play back 3D images, the size $S_{EXTSS}[0]$ of the first extent SS EXTSS[0] and the size $S_{EXTSS}[1]$ of the second extent SS EXTSS[1], instead of satisfying Condition 4, should satisfy Conditions A1 and A2 described below.

Figure 56:
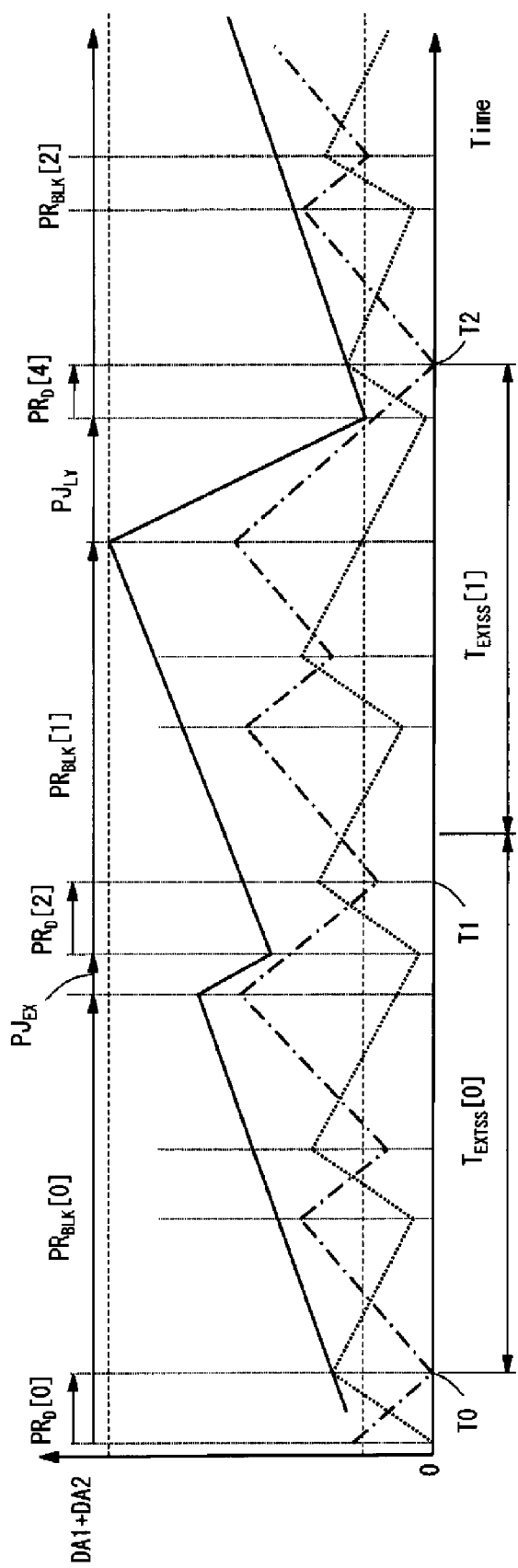
FIG. 56 is a graph showing changes in data amounts DA1 and DA2 accumulated in the read buffers 4421 and 4422 when 3D images are seamlessly played back continuously from the extent blocks 5401-5403 shown in FIG. 54, and changes in the sum DA1+DA2 thereof.

FIG. 56 is a graph showing changes in data amounts DA1 and DA2 accumulated in the read buffers 4421 and 4422 when 3D images are seamlessly played back continuously from the extent blocks 5401-5403 shown in FIG. 54, and changes in the sum DA1+DA2 thereof. In FIG. 56, the alternate-long-and-short-dash line graph shows changes in the data amount DA1 accumulated in the first read buffer 4421, and the broken line graph shows changes in the data amount DA2 accumulated in the second read buffer 2022. The sum DA1+DA2 actually changes minutely each time one data block is read. However, the solid line graph is a linear approximation of those minute changes. Furthermore, since the zero sector transition time $T_{JUMP0}$ is negligible compared to the length of the read period $PR_{BLK}[0]$ of one entire extent block, in FIG. 56, the zero sector transition time $T_{JUMP0}$ is considered to be "0".

As shown in FIG. 56, in the period $PR_{BLK}[0]$ in which the first extent block 5401 is read, the sum DA1+DA2 of the accumulated data amounts increases at a rate equal to the difference $R_{UD72}-R_{EXTSS}[0]$ between the read rate $R_{UD72}$ and the mean transfer rate $R_{EXTSS}[0]$. Here, the mean transfer rate $R_{EXTSS}[0]$ is evaluated to be a value equal to the size of the first entire extent block 5401, that is, the size $S_{EXTSS}[0]$ of the extent SS, EXT SS, divided by the extent ATC time $T_{EXTSS}$.

[A jump $J_{EX}$ occurs immediately after the base-view data block B[1] at the tail of the first extent block 5901 is read into the first read buffer 4921, and the reading of the blocks exclusively for 2D playback $(B[2]+B[3])_{2D}$ is skipped. In the period $PJ_{EX}$ of the jump $J_{EX}$, the total DA1+DA2 of the accumulated data amounts decrease at the mean transfer rate $R_{EXTSS}[0]$. Next, the total DA+DA2 of the data amounts accumulated in the period $PR_{BLK}[1]$ in which the second extent block 5402 is read increases at a rate equal to the difference $R_{UD72}-R_{EXTSS}[1]$ between the read rate $R_{UD72}$ and the mean transfer rate $R_{EXTSS}[1]$. The mean transfer rate $R_{EXTSS}[1]$ is evaluated as the value of the size of the entirety of the second extent block 5402, that is the size $S_{EXTSS}[1]$ of the extent SS EXT SS, divided by the extent ATC time $T_{EXTSS}[1]$. A long jump LILY occurs immediately after the block exclusively for SS playback $B[3]_{SS}$ of the tail of the second extent block 5402 is read into the first read buffer 4421. In the period $PJ_{LY}$, the sum DA1+DA2 of the accumulated data amounts reduces at the mean transfer rate $R_{EXTSS}[1]$. Here, the sum DA1+DA2 of the accumulated data amounts reaches the maximum value either immediately before the jump $J_{EX}$, immediately after the long jump $J_{LY}$, or both. By adjusting the maximum value to be sufficiently large, it is possible to prevent underflow in the read buffers 4421 and 4422 during both the period $PJ_{EX}$ in the jump $J_{EX}$ and the period $PJ_{LY}$ in the long jump $J_{LY}$. As a result, the three extent blocks 5401, 5402, and 5403 can be seamlessly connected.

The maximum value of the sum DA1+DA2 of the accumulated data amounts is determined depending on the size of the extent blocks 5401 and 5402 located before the jumps $J_{EX}$ and $J_{LY}$. Accordingly, to seamlessly connect the three extent blocks 5401-5403, the sizes of the former two extent blocks 5401 and 5402 should satisfy the following conditions.

Preloading is performed in the read periods $PR_D[0]$, $PR_D[2]$ and $PR_D[4]$ of dependent-view data blocks D[0], D[2], and D[4] located at the tops of the extent blocks 5401, 5402, and 5403. Accordingly, first, to prevent underflow in both the read buffers 4421 and 4422 during the jump $J_{EX}$, the extent ATC time $T_{EXTSS}[0]$ of the first extent SS EXTSS[0] should be at least equal to the length of the period from the end time T0 of the preload period $PR_D[0]$ for the first extent block 5401 to the end time T1 of the preload period $PR_D[2]$ for the second extent block 5402. As clarified by FIG. 56, the length of the period T0-T1 is equal to the sum of the length $S_{EXTSS}[0]/R_{UD72}$ of the read period $PR_{BLK}[0]$ for the first extent block 5401, the jump time $T_{JUMP-EX}$ of the jump $J_{EX}$, and the difference $T_{DIFF}[0]=S_{EXT2}[2]/R_{UD72}-S_{EXT2}[0]/R_{UD72}$ in length of the preload periods $PR_D[0]$ and $PR_D[2]$ between the extent blocks 5401 and 5402. Accordingly, the size $S_{EXTSS}[0]$ of the first extent SS EXTSS[0] should satisfy the following Expression 7:

$$T_{EXTSS}[0] = \frac{S_{EXTSS}[0]}{R_{EXTSS}[0]} \geq \frac{S_{EXTSS}[0]}{R_{UD72}} + T_{JUMP-EX} + T_{DIFF}[0] \quad \text{Expression 7}$$

Next, to prevent underflow in both the read buffers 4421 and 4422 during the long jump $J_{LY}$, the sum $T_{EXTSS}[0]+T_{EXTSS}[1]$ of the extent ATC times of the first extent SS EXTSS[0] and the second extent SS EXTSS[1] should be at least equal to the length of the period from the end time T0 of the preload period $PR_D[0]$ for the first extent block 5401 to the end time T2 of the preload period $PR_D[4]$ for the third extent block 5403. As clarified by FIG. 56, the length of the period T0-T2 is equal to the sum of the period T0-T1, the length $S_{EXTSS}[1]/R_{UD72}$ of the read period $PR_{BLK}[1]$ of the second extent block

5402, the jump time $T_{JUMP-LY}$ of the long jump $J_{LY}$, and the difference $T_{DIFF}[1]=S_{EXT2}[4]/R_{UD72}-S_{EXT1}[2]/R_{UD72}$ in length of the preload periods $PR_D[2]$ and $PR_D[4]$ between the extent blocks 5402 and 5403. Accordingly, the sizes $S_{EXTSS}[0]$ and $S_{EXTSS}[1]$ of the two extents SS EXTSS[0] and EXTSS[1] should satisfy the following Expression 8.

$$T_{EXTSS}[0]+T_{EXTSS}[1]= \quad \text{Expression 8}$$
$$\frac{S_{EXTSS}[0]}{R_{EXTSS}[0]}+\frac{S_{EXTSS}[1]}{R_{EXTSS}[1]} \geq \frac{S_{EXTSS}[0]}{R_{UD72}}+T_{JUMP-EX}+$$
$$T_{DIFF}[0]+\frac{S_{EXTSS}[1]}{R_{UD72}}+T_{JUMP-LY}+T_{DIFF}[1]$$

Here, the entirety of the blocks exclusively for 3D playback $B[2]_{SS}+B[3]_{SS}$ are a bit-for-bit match with the blocks for 2D playback (B[2]+B[3]). Accordingly, it is preferable for the size $S_{EXTSS}[1]$ of the second extent SS EXTSS[1] to be a minimum lower limit, from the standpoint of effective use of the recording area on the BD-ROM disc 101. The following Conditions A1 and A2 are conditions for satisfying both Expression 7 and Expression 8, and for suppressing the size $S_{EXTSS}[1]$ of the second extent SS EXTSS[1] to a minimum lower limit. Condition A1 is that "the size $S_{EXTSS}[0]$ of the first extent SS EXTSS[0] satisfies the following Expression 9". Condition A2 is that "the size $S_{EXTSS}[1]$ of the second extent SS EXTSS[1] satisfies the following Expression 10".

$$\frac{S_{EXTSS}[0]}{R_{EXTSS}[0]} \geq \quad \text{Expression 9}$$
$$\frac{S_{EXTSS}[0]}{R_{UD72}}+\max(T_{JUMP-EX},T_{JUMP-LY})+T_{DIFF}[0]$$
$$\therefore S_{EXTSS}[0] \geq CEIL\left\{\frac{R_{EXTSS}[0]}{8} \times \frac{R_{UD72}}{R_{UD72}-R_{EXTSS}[0]} \times\right.$$
$$\left.(\max(T_{JUMP-EX},T_{JUMP-LY})+T_{DIFF}[0])\right\}$$

$$\frac{S_{EXTSS}[1]}{R_{EXTSS}[1]} \geq \quad \text{Expression 10}$$
$$\frac{S_{EXTSS}[1]}{R_{UD72}}+\min(T_{JUMP-EX},T_{JUMP-LY})+T_{DIFF}[1]$$
$$\therefore S_{EXTSS}[1] \geq CEIL\left\{\frac{R_{EXTSS}[1]}{8} \times \frac{R_{UD72}}{R_{UD72}-R_{EXTSS}[1]} \times\right.$$
$$\left.(\min(T_{JUMP-EX},T_{JUMP-LY})+T_{DIFF}[1])\right\}$$

Additionally, the number of sectors from the tail of the first extent SS EXTSS[0] to the top of the second extent SS EXTSS[1] should be less than or equal to the maximum jump distance $S_{jump\_max}$ of the jump $J_{EX}$ specified to meet the capability of the 3D playback device. Similarly, the number of sectors from the tail of the second extent SS EXTSS[1] to the top of the third extent SS EXTSS[2] should be less than or equal to the maximum jump distance $S_{jump\_max}$ of the jump $J_{LY}$ specified to meet the capability of the 3D playback device.

In this way, in Arrangement 2, the size of the data blocks can be designed to be able to play back both the 2D video images and the 3D images seamlessly, while suppressing the capacity of the read buffers to be reserved in the playback device 102 to a minimum limit.

In Arrangement 2, duplicate data of the block exclusively for 2D playback $(B[2]+B[3])_{2D}$ is divided into two blocks exclusively for SS playback $B[2]_{SS}$ and $B[3]_{SS}$. Additionally, the duplicate data may be a singular block exclusively for SS playback, or may be divided into three or more blocks exclusively for SS playback.

(F) Super Extent Blocks

In the extent blocks 1301, 1302, and 1303 shown in FIG. 13, two types of data blocks D[n] and B[n] (n=0, 1, 2, 3, ...) form an interleaved arrangement. Additionally, one type of base-view data block may form an interleaved arrangement with two or more types of dependent-view data blocks.

Figure 57:
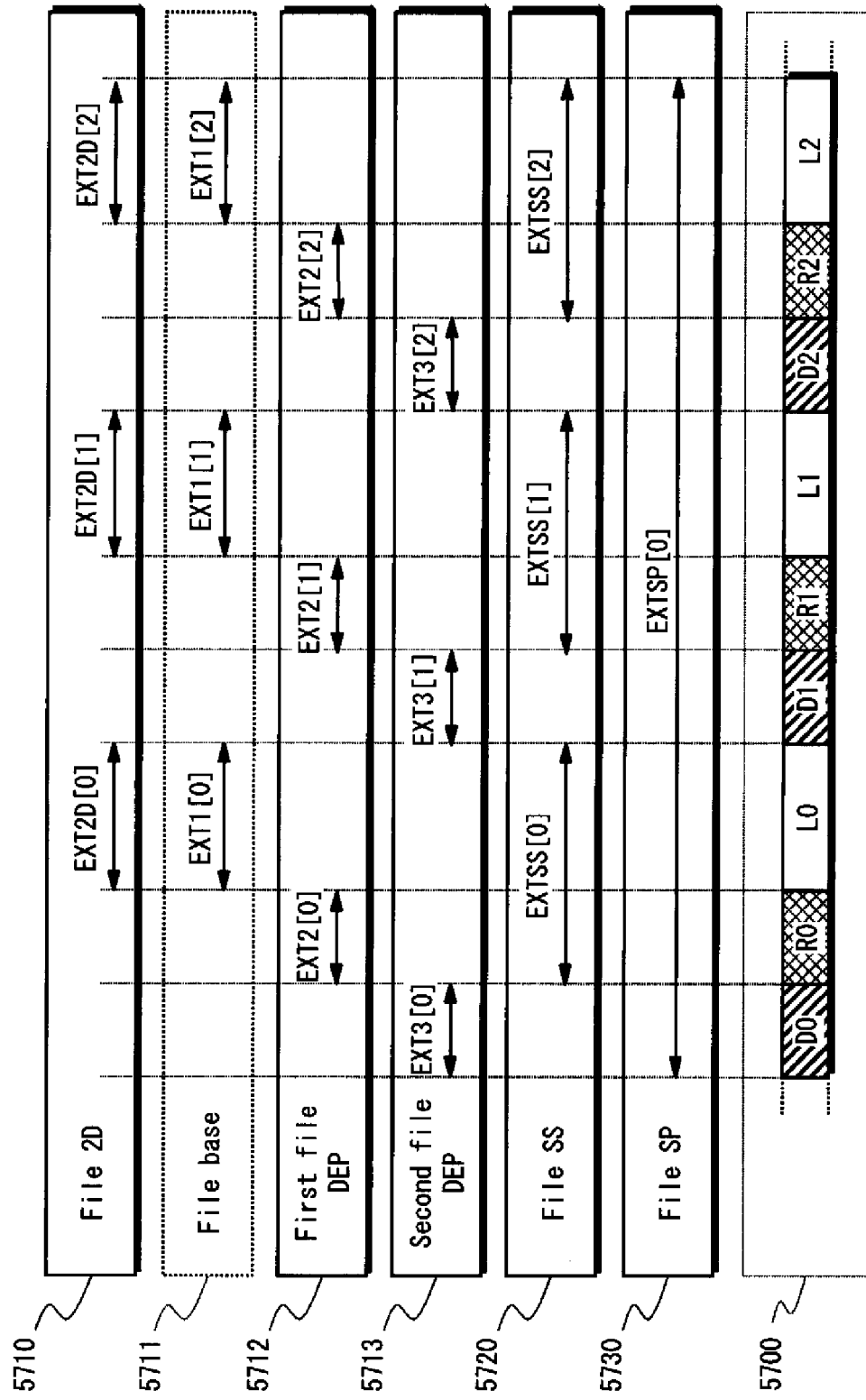
FIG. 57 is a schematic diagram showing a relationship between three types of data blocks Dn, Rn, and Ln (n=0, 1, 2, . . . ) arranged on the BD-ROM disc 101, and AV stream files that reference the data blocks.

FIG. 57 is a schematic diagram showing a relationship between three types of data blocks Dn, Rn, and Ln (n=0, 1, 2, ...) arranged on the BD-ROM disc 101, and AV stream files that reference the data blocks. As shown in FIG. 57, the three types of data blocks Dn, Rn, and Ln are arranged so as to alternate continuously one-by-one along a track on the BD-ROM disc 101. The base-view data block Ln includes a main TS, and in particular the primary video stream expresses a left view of 3D video images. The right-view data block Rn includes a first sub-TS, and in particular, the primary video stream expresses a right view of 3D video images. The depth map data block Dn includes a second sub-TS, and in particular the primary video stream expresses a depth map of a left view of 3D video images. The extent ATC time is the same between contiguous ones of the three types of data block Dn, Rn, and Ln. Furthermore, in a combination of data blocks in which the extent ATC time is the same, the data blocks are arranged in ascending order by data amount. That is to say, the blocks are arranged in the order of the depth map data block Dn, the right-view data block Rn, and the base-view data block Ln. Hereinafter, a group of data blocks Dn, Rn, and Ln in this type of arrangement is referred to as a "super extent block" 5700.

Each base-view data block Ln can be accessed as one extent of the file 2D 5710, that is, as the 2D extent EXT2D[n]. Each right-view data block Rn can be accessed as one extent of the first file DEP 5712, that is, as a right-view extent EXT2[n]. Each depth-map data block Dn can be accessed as one extent of the second file DEP 5713, that is, as a depth map extent EXT3[n]. Furthermore, each contiguous pair of a right-view data block Rn and a base-view data block Ln forms one extent block, and can be accessed as a singular extent of a file SS 5720, that is, an extent SS EXTSS[n]. In particular, the VAU located at the head of each data block Rn and Ln belongs to the same 3D VAU. In addition, the entire series of the super extent block 5700 can be accessed as one extent EXTSP[0] of the new AV stream file 5730. That is to say, the LBN of the head of the super extent block 5700 can be known from the file entry of the new AV stream file 5730. Hereinafter, this file 5730 is referred to as a "file super (SP)", and the extent EXTSP[0] is referred to as an "extent SP".

(F-1) Playback Path for Super Extent Blocks

Figure 58:
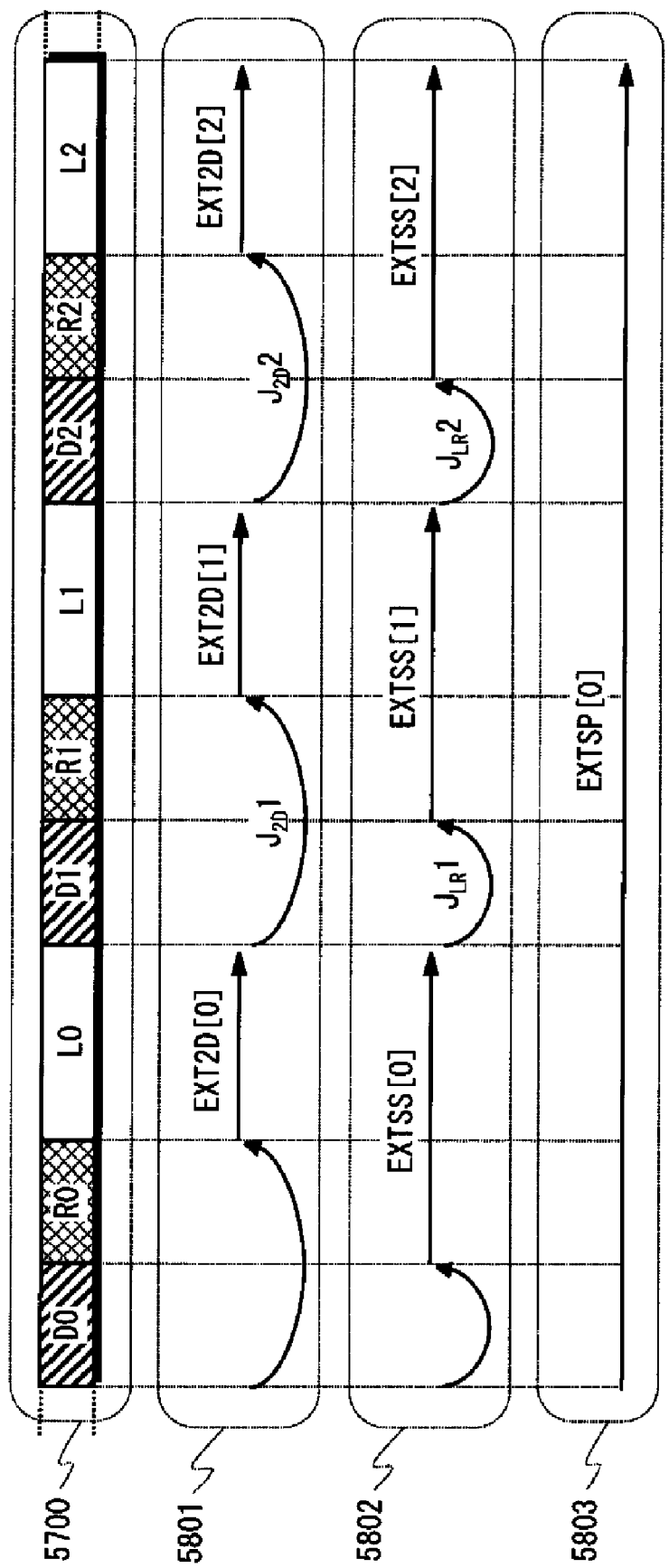
FIG. 58 is a schematic diagram of playback paths 5801, 5802, and 5803 respectively corresponding to a 2D playback mode, L/R mode, and super mode corresponding to super extent blocks 5700 shown in FIG. 57.

FIG. 58 is a schematic diagram of playback paths 5801, 5802, and 5803 respectively corresponding to a 2D playback mode, L/R mode, and super mode corresponding to super extent blocks 5700. "Super mode" refers to a type of 3D playback mode that is an operational mode capable of quickly switching between L/R mode and depth mode with use of a file SP. The playback device 102 shown in FIG. 1 may be adapted for super mode.

The playback device 102 in 2D playback mode plays back a file 2D 5710. Accordingly, as shown by the playback path 5801 in 2D playback mode, the base-view data blocks Ln (n= ..., 0, 1, 2, ...) are read in order from the super extent block 5800 as the 2D extent EXT2D[n]. On the other hand, reading of the depth-map data block Dn and the right-view data block Rn is skipped by the jump $J_{2D}$n.

The playback device 102 in L/R mode plays back a file SS 5720. Accordingly, as shown by the playback path 5802 in L/R mode, each extent block Rn+Ln is read in order from the super extent block 5800 as the extent SS EXTSS [n]. On the other hand, reading of the depth map data block Dn is skipped by the jump $J_{LR}n$.

The playback device 102 in super mode plays back the file SP 5730. Accordingly, as shown by the playback path 5803 in super mode, the entirety of the super extent block 5800 can be read continuously as the extent SP EXTSP[0]. Similarly to the playback path 1602 in 3D mode shown in FIG. 16, in the playback path 5803, a zero sector transition may be performed between the tail of each data block and the top of the next data block.

When the super extent block 5700 is read as the extent SP EXTSP[0], the playback device 102 reads the LBN and the size of the top of the extent SP EXTSS from the file entry of the file SP 5730 and transfers the read LBN and size to the BD-ROM drive. The BD-ROM drive reads data of that size in order continuously from that LBN. Similarly to the processing for reading the data blocks with use of the file SS, in this processing, the control by the BD-ROM drive is simplified by the following two points (A) and (B): (A) the playback device 102 should reference the extents in order with use of a file entry at one spot; (B) since the total number of extents to be read is small, the total number of pairs of LBNs and sizes to be transferred to the BD-ROM drive is also small.

After reading the extent SP EXTSP[0], the playback device 102 in super mode separates the extent SP EXTSP[0] into three data blocks and stores the three data blocks separately. In this way, the three data blocks are maintained so as to be suppliable to the decoder. As a result, the playback device 102 can quickly switch between L/R mode and depth mode. The extent start point in the clip information file is used for the processing to separate the data blocks. Specifically, extent start points similar to the extent start points shown in FIG. 27A and FIG. 27B are included in a 2D clip information file corresponding to the file 2D 5710, a right-view clip information file corresponding to the first file DEP 5712, and a depth map clip information file corresponding to the second file DEP 5713. Next, with use of a similar method to the method shown in FIG. 27E, these extent start points of the extents of the file base 5711, that is, the base-view extent EXT1[n], the right-view extent EXT[n], and the depth map extent EXT3 [n] are extracted from the extent SP EXTSP[0].

(F-2) Size of Data Blocks

To seamlessly play back either 2D video images or 3D video images from the super extent block 5700, the sizes of the data blocks Dn, Rn, Ln, the extent blocks Rn+Ln, and the super extent block 5700 should satisfy the following condition based on the capability of the playback device 102.

[Condition based on Capability in 2D Playback Mode]

Figures 59A, 59B:
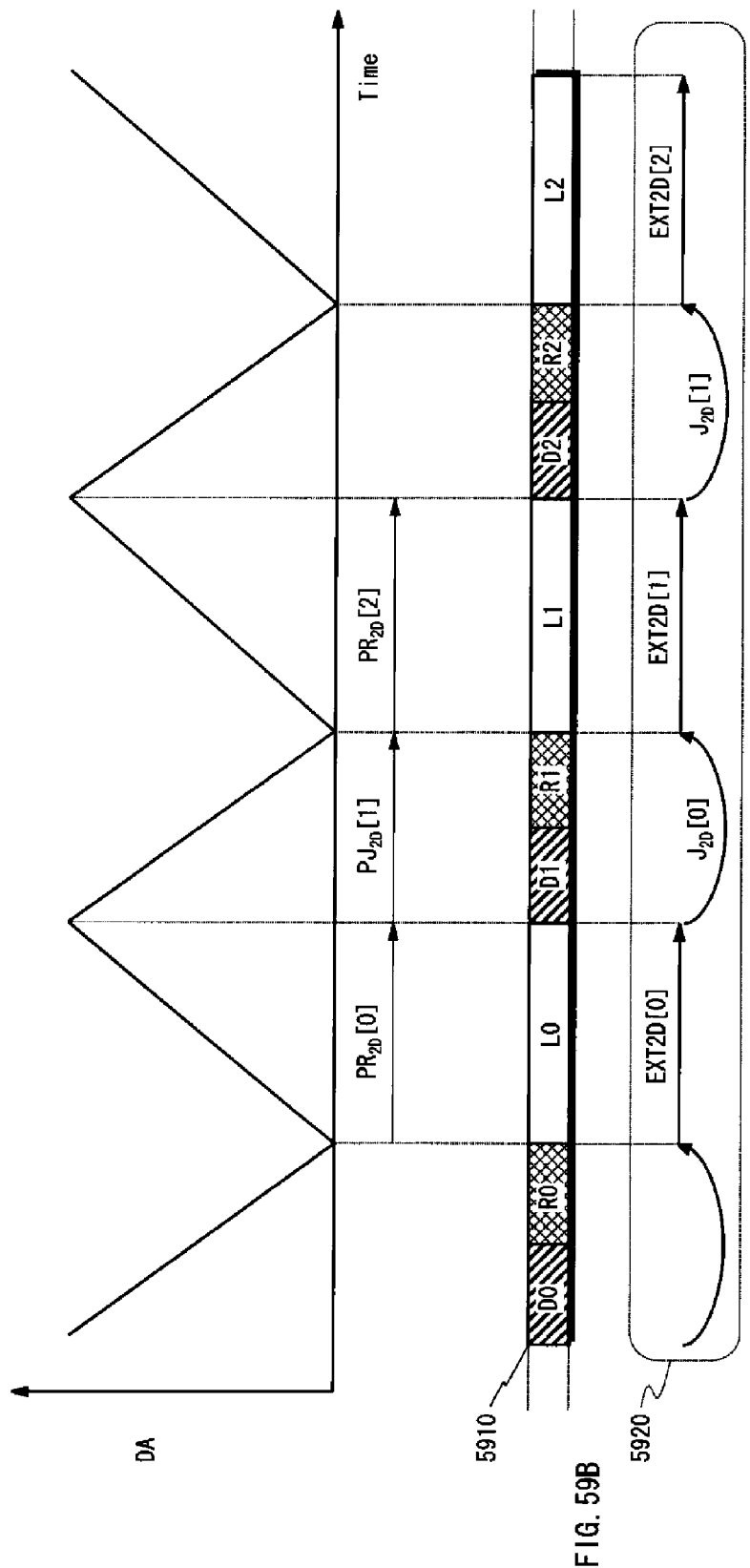
FIG. 59A is a graph showing changes in a data amount DA accumulated in a read buffer 1721 during operation in 2D playback mode.
FIG. 59B is a schematic diagram showing a relationship between super extent blocks 5910 to be played back and a playback path 5920 in 2D mode.

As a playback device in 2D playback mode, the playback processing system shown in FIG. 17 is assumed. FIG. 59A is a graph showing changes in a data amount DA accumulated in a read buffer 1721 while the 2D playback mode is operating, and FIG. 59B is a schematic diagram showing a relationship between super extent blocks 5910 to be played back and a 2D playback path 5920. As shown in FIG. 59B, following the playback path 5920 from the super extent block 5910, each base-view data block Ln is read from the BD-ROM disc 101 to the read buffer 1721 as a singular 2D extent EXT2D[n]. As shown in FIG. 59A, the accumulated data amount DA in the read period $PR_{2D}[n]$ of each 2D extent EXT2D[n] increases at a rate that is the same as the difference $R_{UD54}$-$R_{EXT2D}[n]$ between the read speed $R_{UD54}$ and the mean transfer rate $R_{EXT2D}[n]$. Meanwhile, a jump $J_{2D}[n]$ occurs between two consecutive 2D extents EXT2D[n−1] and EXT2D[n]. In this jump period $PJ_{2D}[n]$, since the reading of the dependent-view data blocks Dn and Rn is skipped, the accumulated data amount DA decreases at the mean transfer rate $R_{EKT2D}[n]$. Accordingly, to seamlessly read 2D video images from the super extent block 5910, first, the above-described Condition 1 should be satisfied. That is to say, the size $S_{EXT2D}[n]$ of the 2D extent EXT2D[n] should satisfy Expression 1.

$$S_{EXT2D}[n] \geq CEIL\left(\frac{R_{EXT2D}[n]}{8} \times \frac{R_{UD54}}{R_{UD54} - R_{EXT2D}[n]} \times T_{JUMP-2D}[n]\right) \quad \text{Expression 1}$$

The jump time $T_{JUMP-2D}[n]$ to be substituted into Expression 1 is determined by obtaining the sum of two parameters TJ[n] and TL[n]: $T_{JUMP-2D}[n]$=TJ[n]+TL[n]. The first parameter TJ[n] is equal to, for example in the graph in FIG. 19, the number of sectors from the tail of the $n^{th}$ 2D extent EXT2D[n] to the top of the $(n+1)^{th}$ 2D extent EXT2D[n+1], that is, the maximum jump time $T_{JUMP\_MAX}$ corresponding to the jump distance of the jump $J_{2D}[n]$. The second parameter TL[n] is expressed as 0 if a layer boundary LB does not exist between the 2D extents EXT2D[n] and EXT2D[n+1], and is expressed as the layer switching time, for example, 350 ms, if the layer boundary LB does exist.

Next, the interval between the two 2D extents EXT2D[n] and EXT2D[n+1] should be less than or equal to the maximum jump distance $S_{JUMP\_MAX}$ corresponding to the first parameter TJ[n].

[Condition based on Capability in 3D Playback Mode]

As a playback device in 3D playback mode, the playback processing system shown in FIG. 20 is assumed. FIGS. 60A and 60B are graphs showing changes in data amounts DA1 and DA2 accumulated in the read buffers 2021 and 2022 when the playback device seamlessly plays back 3D images from super extent block 6010 in L/R mode, and FIG. 60C is a schematic diagram showing the relationship between super extent blocks 6010 and the playback path 6020 in L/R mode. Note that the following description also holds true for depth mode. For example, the size of the right-view data block Rk should be read as the "size of the depth map data block Dk", and to read the right-view transfer rate $R_{EXT2}[k]$ as the "depth map transfer rate $R_{EXT3}[k]$".

As shown in FIG. 60C, each contiguous pair of a right-view data block Rk and a base-view data block Lk (k= . . . , n, n+1, n+2, . . . ) forms a single extent block Rk+Lk. Following playback path 6020 from the super extent block 6010, each extent block Rk+Lk is read collectively from the BD-ROM 101 to the switch 2020 as a single extent SS EXTSS [k]. Furthermore, the right-view extent Rk and the base-view extent Lk are separated from each extent SS EXTSS[k] by the switch 2020, and are alternately transmitted to the read buffer 2021 and the read buffer 2022. As shown in FIG. 60A and FIG. 60B, in the read period $PR_D[k]$ of the right-view extent EXT2[k], the accumulated data amount DA1 in the first read buffer decreases at the base-view transfer rate $R_{EXT1}[k]$, and the accumulated data amount DA2 in the second read buffer 2022 increases at a rate equal to the difference $R_{UD72}$-$R_{EXT2}$[k] between the read rate $R_{UD72}$ and the right-view transfer rate $R_{EXT2}[k]$. In contrast, in the read period $PR_B[k]$ of the base-view extent EXT1[k], the accumulated data amount DA1 in the first read buffer 2021 increases at a rate equal to the difference $R_{UD72}$-$R_{EXT1}[k]$ between the read rate $R_{UD72}$ and the base-view transfer rate $R_{EXT1}[k]$, and the accumulated data amount DA2 in the second read buffer 2022 decreases at the right-view transfer rate $R_{EXT2}[k]$.

Meanwhile, a jump $J_{LR}[n]$ occurs between contiguous extents SS EXTSS[n] and EXTSS[n+1]. In the jump period $PJ_{LR}[n]$, since reading the depth map data block D(n+1) is skipped, the accumulated data amounts DA2 and DA2 decrease at the mean transfer rates $R_{EXT1}[n]$ and $R_{EXT12}[n]$.

To seamlessly play back 3D images from each extent SS EXTSS[n], the above Conditions 2-4 should be satisfied. That is to say, the size $S_{EXT1}[n]$ of each base-view extent EXT1[n] satisfies Expression 2, the size $S_{EXT2}[n]$ in the right-view extent EXT2[n] satisfies Expression 3, and the size $S_{EXTSS}[n]$ of each extent SS EXTSS[n] satisfies Expression 6.

$$S_{EXT1}[n] \geq CEIL\left\{ \frac{R_{EXT1}[n]}{8} \times \frac{R_{UD72}}{R_{UD72} - R_{EXT1}[n]} \times \right.$$
$$\left. \left( T_{JUMP0}[2n+1] + \frac{S_{EXT2}[n+1]}{R_{UD72}} + T_{JUMP0}[2n+2] \right) \right\} \quad \text{Expression 2}$$

$$S_{EXT2}[n] \geq CEIL\left\{ \frac{R_{EXT2}[n]}{8} \times \frac{R_{UD72}}{R_{UD72} - R_{EXT2}[n]} \times \right.$$
$$\left. \left( T_{JUMP0}[2n] + \frac{S_{EXT1}[n]}{R_{UD72}} + T_{JUMP0}[2n+1] \right) \right\} \quad \text{Expression 3}$$

$$S_{EXTSS}[n] \geq CEIL\left\{ \frac{R_{EXTSS}[n]}{8} \times \right.$$
$$\left. \frac{R_{UD72}}{R_{UD72} - R_{EXTSS}[n]} \times (T_{JUMP}[n] + T_{DIFF}[n]) \right\} \quad \text{Expression 6}$$

The jump time $T_{JUMP}[n]$ to be substituted into the right hand side of Expression 6 is equal to, for example in the graph in FIG. 19, a number of sectors from the tail of the $n^{th}$ extent SS EXTSS[n] to the top of the $(n+1)^{th}$ extent SS EXTSS[n+1], that is, the maximum jump time $T_{JUMP\_MAX}$ corresponding to the jump distance $S_{JUMP}$ of the jump $J_{LR}[n]$. Furthermore, a variable $T_{DIFF}[n]$ is equal to the difference in length between the preload periods $PR_R[n]$ and $PR_R[n+1]$: $T_{DIFF}[n] = S_{EXT2}[n+1]/R_{UD72} - S_{EXT2}[n]/R_{UD72}$.

Additionally, to decrease the capacity of the first read buffer 2021 as much as possible, the size $S_{EXT1}[n]$ of the base-view block Ln should be less than or equal to the minimum lower limit of the size of the minimum extent of the 2D extent EXT2D[n]. That is to say, the size $S_{EXP1}[n]$ satisfies Expression 4.

$$S_{EXT1}[n] \leq \quad \text{Expression 4}$$
$$CEIL\left\{ \frac{R_{EXT1}[n]}{8} \times \frac{R_{UD54}}{R_{UD54} - R_{MAX1}} \times T_{JUMP\_2D\_MIN} \right\}$$

Also, since the extent ATC time is the same in the combination Dn, Rn, Ln of $n^{th}$ data blocks, the size $S_{EXTm}[n]$ of the data blocks Dn, Rn, and Ln (m=3, 2, 1) satisfies Expression 5.

$$S_{EXT2}[n] \leq R_{EXT2}[n] \times \frac{S_{EXT1}[n]}{R_{EXT1}[n]}, \quad \text{Expression 5}$$
$$S_{EXT3}[n] \leq R_{EXT3}[n] \times \frac{S_{EXT1}[n]}{R_{EXT1}[n]}$$

[Condition based on Capability in Super Mode]

Figure 61:
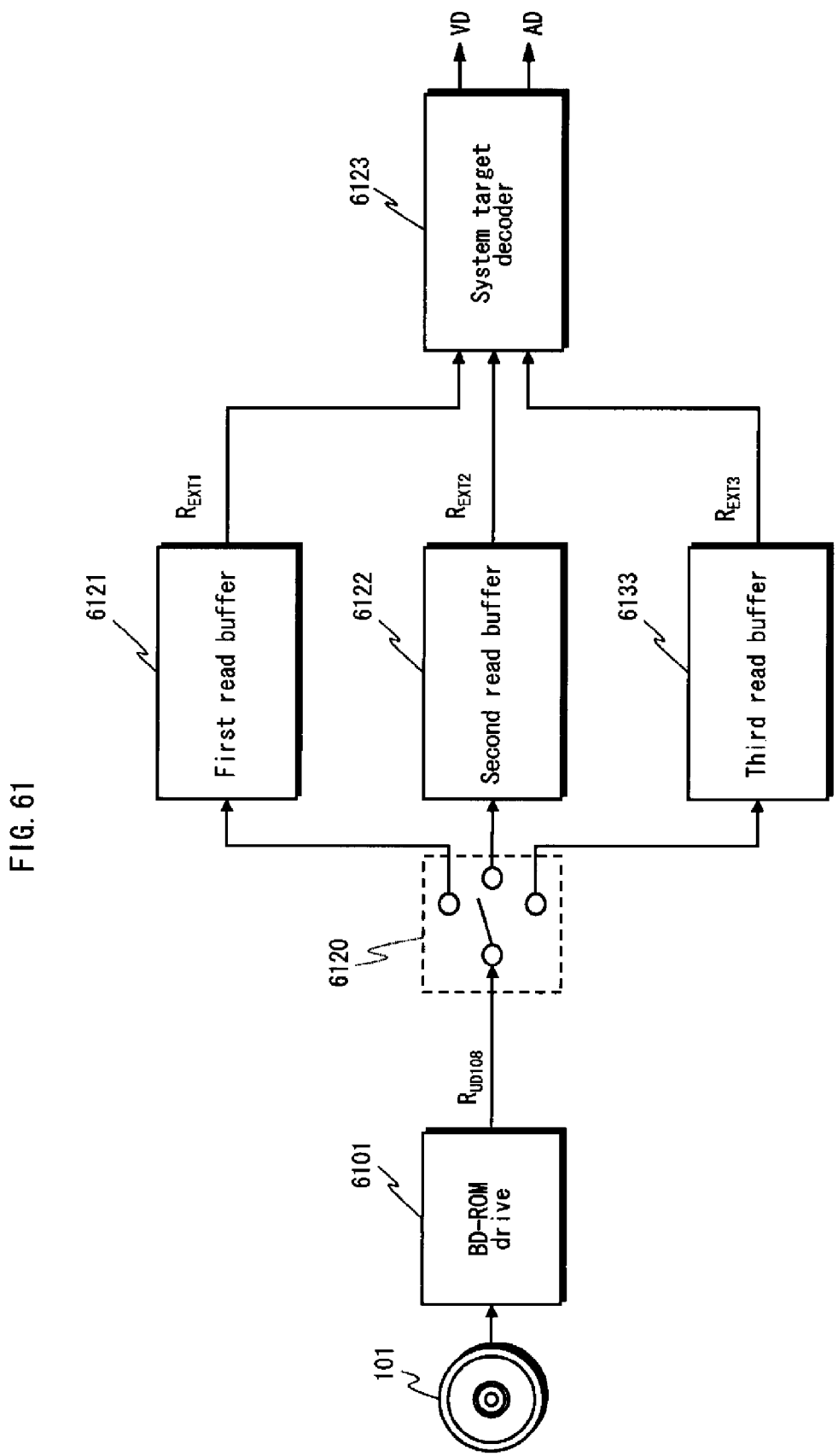
FIG. 61 is a block diagram showing a playback processing system in the playback device in super mode.

FIG. 61 is a block diagram showing a playback processing system in the playback device in super mode. As shown in FIG. 61, the playback processing system includes a BD-ROM drive 6101, a switch 6120, three read buffers 6121, 6122, and 6123, and a system target decoder 6124. The BD-ROM drive 6101 reads an extent SP from the BD-ROM disc 101, and transfers the extent SP to the switch 6120 at the read rate $R_{UD108}$. With reference to the extent start point, the switch 6120 separates each extent SP into three types of data blocks Dn, Rn, and Ln. The base-view data block Ln is stored in the first read buffer 6121, the right-view data block Rn is stored in the second read buffer 6122, and the depth map data block Dn is stored in the third read buffer 6123. The read buffers 6121, 6122, and 6123 are buffer memories in the playback device. The read buffers 6121, 6122, and 6123 receive the data blocks from the BD-ROM drive 6101, and store the data blocks. The system target decoder 6124' reads source packets from each base-view data block stored in the first read buffer 6121 at the base-view transfer rate $R_{EXT1}$. The system target decoder 6124 reads source packets from each right-view data block stored in the second read buffer 6122 at the right-view transfer rate $R_{EXT2}$. The system target decoder 6124 reads source packets from each depth map data block stored in the third read buffer 6123 at the depth map transfer rate $R_{EXT3}$. The system target decoder 6124 further decodes the combination of read data blocks into video data VD and audio data AD.

The read rate $R_{UD10872}$ is conventionally expressed in bits/second and is set at a higher value, e.g. 108 Mbps, than the maximum values $R_{MAX1}$-$R_{MAX}$ of any of the mean transfer rates $R_{EXT1}$-$R_{EXT3}$: $R_{UD108} > R_{MAX1}$, $R_{UD108} > R_{MAX2}$, $R_{UD108} > R_{MAX3}$. This prevents underflow in the read buffers 6121, 6122, and 6123 due to decoding processing by the system target decoder 6124 while the BD-ROM drive 6101 is reading an SP extent from the BD-ROM disc 101.

FIGS. 62A, 62B, and 62C are graphs showing changes in data amounts DA1, DA2, and DA3 accumulated in the read buffers 6121, 6122, and 6123, when 3D images are seamlessly played back from a single super extent block. FIG. 62D is a schematic diagram showing the relationship between the super extent blocks 6210 and the playback path 6220 in super mode. Note that in the graphs in FIGS. 62A-62C, changes that are actually stepwise are represented approximately in a linear manner.

As shown in FIGS. 62A-62C, in the read period $PR_D[n]$ of the $n^{th}$ depth map data block Dn, the accumulated data amount DA3 of the third read buffer 6123 increases at a rate equal to the difference $R_{UD108}$-$R_{EXT3}[n]$ between the read rate $R_{UD108}$ and the depth map transfer rate $R_{EXT3}[n]$. The accumulated data amount DA1 of the first read buffer 6121 decreases at the base-view transfer rate $E_{EXT1}[n-1]$, and the accumulated data amount DA2 in the second read buffer 6122 decreases at the right-view transfer rate $E_{EXT2}2[n-1]$. As shown in FIG. 62D, a zero sector transition $J_0[3n]$ occurs from the $n^{th}$ depth map data block Dn to the $n^{th}$ right-view data block Rn. As shown in FIGS. 62A-62C, in the zero sector transition time $PJ_0[3n]$, the accumulated data amount DA1 of the first read buffer 6121 decreases at the base-view transfer rate $R_{EXT1}[n-1]$, the accumulated data amount DA2 of the second read buffer 6122 decreases at the right-view transfer rate $R_{EXT2}[n-1]$, and the accumulated data amount DA3 in the third read buffer 6123 decreases at the depth map transfer rate $R_{EXT1}[n]$.

As further shown in FIGS. 62A-62C, in the read period $PR_R[n]$ of the $n^{th}$ right-view data block Rn, the accumulated data amount DA2 of the second read buffer 6122 increases at a same rate as the difference $R_{UD108}$-$R_{EXT2}[n]$ between the read rate $R_{UD108}$ and the depth map transfer rate $R_{EXT2}[n]$. The accumulated data amount DA3 in the third read buffer 6123 decreases at the depth map transfer rate $E_{EXT1}[n]$, and the accumulated data amount DA1 in the first read buffer 6121 decreases at the base-view transfer rate $R_{EXT1}[n-1]$. As shown in FIG. 62D, a zero sector transition $J_0[3n+1]$ occurs from the $n^{th}$ right-view data block Rn to the $n^{th}$ base-view data block Ln. As shown in FIGS. 62A-62C, in the zero sector transition period $PJ_0[3n+1]$ the accumulated data amount DA1 in the first read buffer 6121 decreases at the base-view transfer rate $R_{EXT1}[n-1]$, the accumulated data amount DA2 in the second read buffer 6122 decreases at the right-view transfer rate $R_{EXT2}[n]$, and the accumulated data amount DA3 in the third read buffer 6123 decreases at the depth map transfer rate $R_{EXT3}[n]$.

As shown by FIGS. 62A-62C, in the read period $PR_L[n]$ of the $n^{th}$ base-view view data block Ln, the accumulated data amount DA1 in the first read buffer 6121 increases at a rate equal to the difference $R_{UD108}-R_{EXT1}[n]$ between the read rate $R_{UD108}$ and the base-view transfer rate $R_{EXT1}[n]$. The accumulated data amount DA2 in the second read buffer 6122 decreases at the right-view transfer rate $R_{EXT2}[n]$, and the accumulated data amount DA3 in the third read buffer 6123 decreases at the depth map transfer rate $R_{EXT1}[n]$. As shown in FIG. 62D, a zero sector transition $J_0[3n+2]$ occurs from the $n^{th}$ base-view data block Ln to the $(n+1)^{th}$ depth map data block D(n+1). As shown in FIGS. 62A-62C, in the zero sector transition period $PJ_0[3n+2]$, the accumulated data amount DA1 in the first read buffer 6121 decreases at the base-view transfer rate $R_{EXT1}[n]$, the accumulated data amount DA2 in the second read buffer 6122 decreases at the right-view transfer rate $R_{EXT2}[n]$, and the accumulated data amount DA3 in the third read buffer 6123 decreases at the depth map transfer rate $R_{EXT3}[n]$.

For the playback device in super mode to seamlessly play back 3D images from the super extent blocks 6210, the following conditions should be satisfied.

The size $S_{EXT1}[n]$ of the $n^{th}$ base-view data block Ln is equal to the data amount transferred from the first read buffer 6121 to the system target decoder 6124 in the period from the read period $PR_L[n]$ to at least immediately before the read period $PR_L[n+1]$ of the next base view data block L (n+1). In this case, as shown in FIG. 62A, immediately before the read period $PR_L[n+1]$ of the next base-view data block L(n+1), the accumulated data amount DA1 in the first read buffer 6121 is not less than the amount immediately before the read period $PR_L[n]$ in the $n^{th}$ base-view data block Ln. The length of the read period $PR_L[n]$ of the $n^{th}$ base-view data block Ln is the same as a value obtained by dividing the size $S_{EXT1}[n]$ of the base-view data block Ln by the read rate $R_{UD108}$, that is, $S_{EXT1}[n]/R_{UD108}$. Meanwhile, the lengths of the read periods $PR_D[n+1]$ and $PR_R[n+1]$ of the $(n+1)^{th}$ dependent-view data blocks D(n+1) and R(n+1) are the same as a value obtained by dividing the sizes $S_{EXT2}[n+1]$ and $S_{EXT3}[n+1]$ of the $(n+1)^{th}$ dependent-view data blocks D(n+1) and R(n+1) by the read rate $R_{UD108}$, that is $S_{EXT2}[n+1]/R_{UD108}$, $S_{EXT3}[n+1]/R_{UD108}$. Accordingly, the size $S_{EXT1}[n]$ of the base-view data block Ln should satisfy the following Expression 11.

$$S_{EXT1}[n] \geq \left(\frac{S_{EXT1}[n]}{R_{UD108}} + T_{JUMP0}[3n+2] + \frac{S_{EXT3}[n+1]}{R_{UD108}} + T_{JUMP0}[3n+3] + \frac{S_{EXT2}[n+1]}{R_{UD108}} + T_{JUMP0}[3n+4]\right) \times R_{EXT1}[n]$$

Expression 11

$$\therefore S_{EXT1}[n] \geq CEIL\left\{\frac{R_{EXT1}[n]}{8} \times \frac{R_{UD108}}{R_{UD108} - R_{EXT1}[n]} \times \left(\frac{S_{EXT2}[n+1] + S_{EXT3}[n+1]}{R_{UD108}} + 3 \times T_{JUMP0}\right)\right\}$$

Similarly, the size $S_{EXT2}[n]$ of the $n^{th}$ right-view data block Rn and the size $S_{EXT3}[n]$ of the depth map data block Dn should satisfy the following Expression 12 and Expression 13, respectively.

$$S_{EXT2}[n] \geq \left(\frac{S_{EXT2}[n]}{R_{UD108}} + T_{JUMP0}[3n+1] + \frac{S_{EXT1}[n]}{R_{UD108}} + T_{JUMP0}[3n+2] + \frac{S_{EXT3}[n+1]}{R_{UD108}} + T_{JUMP0}[3n+3]\right) \times R_{EXT2}[n]$$

Expression 12

$$\therefore S_{EXT2}[n] \geq CEIL\left\{\frac{R_{EXT2}[n]}{8} \times \frac{R_{UD108}}{R_{UD108} - R_{EXT2}[n]} \times \left(\frac{S_{EXT1}[n] + S_{EXT3}[n+1]}{R_{UD108}} + 3 \times T_{JUMP0}\right)\right\}$$

$$S_{EXT3}[n] \geq \left(\frac{S_{EXT3}[n]}{R_{UD108}} + T_{JUMP0}[3n] + \frac{S_{EXT2}[n]}{R_{UD108}} + T_{JUMP0}[3n+1] + \frac{S_{EXT1}[n]}{R_{UD108}} + T_{JUMP0}[3n+2]\right) \times R_{EXT3}[n]$$

Expression 13

$$\therefore S_{EXT3}[n] \geq CEIL\left\{\frac{R_{EXT3}[n]}{8} \times \frac{R_{UD108}}{R_{UD108} - R_{EXT3}[n]} \times \left(\frac{S_{EXT2}[n] + S_{EXT1}[n]}{R_{UD108}} + 3 \times T_{JUMP0}\right)\right\}$$

Note that in Expressions 11 to 13, each zero sector transition time $T_{JUMP0}[.]$ is replaced by a typical value $T_{JUMP0}$.

FIG. 63A is a graph showing changes in data amounts DA1, DA2, and DA3 accumulated in the read buffers 6121, 6122, and 6133, and changes in the sum DA1+DA2+DA3, when 3D images are seamlessly played back continuously from two different super extent blocks 6301 and 6302. FIG. 63B is a schematic diagram showing the relationship between these two super extent blocks 6301 and 6302, and the playback path 6320 in super mode. As shown in FIG. 63B, the super extent blocks 6301 and 6302 are composed of data blocks Dk, Rk, and Lk (k=0, ..., N−2, N−1, N, ...) in an interleaved arrangement. The integer N represents a total number of base-view data blocks included in the previous super extent block 6301. The two super extent blocks 6301 and 6302 are separated at the layer boundary LB. Following the playback path 6320, first, the entirety of the previous super extent block 6301 is read collectively as a single extent SP EXT SP[0]. Immediately thereafter, a long jump $J_{LY}$ occurs due to the layer transition. Then the next super extent block 6302 is read collectively as another extent SP EXTSP [1].

In FIG. 63A, the alternate long and short dash line graph shows changes in the data amount DA1 accumulated in the first read buffer 6121, the dotted line graph shows changes in the accumulated data amount DA2 in the second read buffer 6122, the broken line graph shows changes in the accumulated data amount DA3 in the third read buffer 6123, and the solid line graph shows changes in the sum of the three types of data amounts, DA1+DA2+DA3. The sum DA1+DA2+DA3 actually changes minutely each time one data block is read. However, the solid line graph is a linear approximation of those minute changes. Furthermore, since the zero sector transition time $T_{JUMP0}$ is negligible compared to the length of the read period $PR_{SBLK}[0]$ of one entire super extent block, in FIG. 63A, the zero sector transition time $T_{JUMP0}$ is considered to be "0".

As shown in FIG. 63A, in the read period $PR_{SBLK}[0]$ in which the entirety of one super extent block 6301 is read from the BD-ROM disc 101 to the read buffers 6121, 6122, and 6123, the data amounts DA1, DA2 and DA3 increase. Specifically, during the read period $PR_{SBLK}[0]$ for the entirety of the super extent block 6301, the sum DA1+DA2+DA3 of the accumulated data amounts increase at a rate equal to the difference $R_{UD108}-R_{EXTSP}[0]$ between the read rate $R_{UD108}$ and the mean transfer rate $R_{EXTSP}[0]$. The mean transfer rate $R_{EXTSP}[O]$ is evaluated to be a value equal to the size of the entire super extent block 6301, that is, the size $S_{EXTSP}[0]$ of the extent SP EXT SP[0], divided by the extent ATC time $T_{EXTSP}$. This type of increase of the accumulated data amounts DA1, DA2, and DA3 can be realized by designing the sizes of the data blocks D and B to be greater than or equal to the minimum extent size.

At the time that the base-view data block L(N−1) of the tail of the super extent block 6301 is read into the first read buffer 6121, the sum DA1+DA2+DA3 of the accumulated data amounts reaches the maximum value. In the period $PJ_{LY}$ of an immediately following long jump $J_{LY}$, the sum DA1+DA2+DA3 of the accumulated data amounts decreases at the mean transfer rate $R_{EXTSP}[0]$. Accordingly, adjusting the maximum value of the sum of DA1+DA2+DA3 of the accumulated data amounts to be sufficiently large enables preventing underflow of the read buffers 6121-6123 and in the long jump $J_{LY}$. As a result, the two super extent blocks 6301 and 6302 can be seamlessly connected.

The maximum value of the sum DA1+DA2+DA3 of the accumulated data amounts is determined depending on the size of the previous super extent block 6301. Accordingly, to seamlessly connect the two super extent blocks 6301 and 6302, the size of the previous super extent block 6301, that is, the size $S_{EXTSP}[0]$ of the extent SP EXTSP[0] should satisfy the following condition.

Preloading is performed in the read periods $PR_D[0]+PR_R[0]$ and $PR_D[N]+PR_{L4}[N]$ of dependent-view data block pairs D0+R0 and DN+RN located at the top of the super extent blocks 6301 and 6302. Accordingly, to prevent underflow from occurring in the read buffers 6121-6123 during the long jump $J_{LY}$, the extent ATC time $T_{EXTSP}$ of the previous extent SP EXTSP[0] should be at least equal to the length of the period from the end time T10 of the preloading period $PR_D[0]+PR_R[0]$ in the super extent block 6301, to the end time T11 of the preloading period $PR_D[N]+PR_R[N]$ of the next super extent block 6302. In other words, the size $S_{EXTSP}[0]$ of the extent SP EXTSP[0] should be at least equal to the sum of data amounts transferred from the read buffers 6121-6123 to the system target decoder 6124 in the period from T10 to T11.

As clarified by FIG. 63A, the length of the period from T10 to T11 is equal to a value obtained by adding together the length of the read period $PR_{SBLK}[0]$ of the previous super extent block 6301, the jump time $T_{JUMP-LY}$ of the long jump $J_{LY}$, and the difference $T_{DIFF}$ between the lengths of the preload periods $PR_D[0]+PR_R[0]$ and $PR_D[N]+PR_R[N]$. Furthermore, the length of the read period $PR_{SBLK}[0]$ is equal to a value obtained by dividing the size $S_{EXTSP}[0]$ of the previous extent SP EXTSP[0] by the read rate $R_{UD108}/S_{EXTSP}[0]/$ $R_{UD108}$. Accordingly, the size $S_{EXTSP}[0]$ of the previous extent SP EXTSP[0] should satisfy the following Expression 14.

$$S_{EXTSP}[0] \geq \left(\frac{S_{EXTSP}[0]}{R_{UD108}} + T_{JUMP-LY} + T_{DIFF}\right) \times R_{EXTSP}[0] \quad \text{Expression 14}$$

$$\therefore S_{EXTSP}[0] \geq CEIL\left\{\frac{R_{EXTSP}[0]}{8} \times \frac{R_{UD108}}{R_{UD108} - R_{EXTSP}[0]} \times (T_{JUMP-LY} + T_{DIFF})\right\}$$

The lengths of the preload periods $PR_D[0]+PR_R[0]$ and $PR_D[N]+PR_R[N]$ are equal to values equal to the sizes $S_{EXT3}[0]+S_{EXT2}[0]$ and $S_{EXT3}[N]+S_{EXT2}[N]$ of the pairs D0+R0 and DN+RN divided by the read rate $R_{UD108}$ $S_{EXT3}[0]+S_{EXT2}[0])/R_{UD108}$, and $(S_{EXT3}[N]+S_{EXT2}[N])/R_{UD108}$. Accordingly, the difference $T_{DIFF}$ in length of the preload periods $PR_D[0]+PR_R[0]$ and $PR_D[N]+PR_R[N]$ is equal to the difference between these values: $T_{DIFF}=(S_{EXT3}[N]+S_{EXT2}[N])/R_{UD108}-(S_{EXT3}[0]+S_{EXT2}[0])/R_{UD108}$. Hereinafter, the size expressed by the right hand side of Expression 14 is referred to as the "minimum extent size of the extent SP".

[Conclusion]

To seamlessly play back both 2D video images and 3D video images from a plurality of super extent blocks, all of the above conditions should be satisfied. In particular, the sizes of the data blocks, extent blocks and super extent blocks should satisfy the following Conditions 1-8.

Condition 1: The size $S_{EXT2D}$ of a 2D extent should satisfy Expression 1.

Condition 2: The size $S_{EXT1}$ of a base-view data block should satisfy Expression 2.

Condition 3: The sizes $S_{EXT2}$ and $S_{EXT3}$ of a dependent-view data block should satisfy Expression 3.

Condition 4: The size $S_{EXTSS}$ of an extent block should satisfy Expression 6.

Condition 5: The size $S_{EXT1}$ of a base-view data block should satisfy Expression 11.

Condition 6: The size $S_{EXT2}$ of a right-view data block should satisfy Expression 12.

Condition 7: The size $S_{EXT3}$ of a depth map data block should satisfy Expression 13.

Condition 8: The size $S_{EXTSP}$ of a super extent block should satisfy Expression 14.

(F-3) Separation of Playback Path Before and After the Layer Boundary

As described above, to seamlessly play back video images, the super extent blocks should satisfy Conditions 1-8. This can be realized by sufficiently expanding the size of the data blocks. However, as shown in the arrangement shown in FIG. 51A, a sufficiently large capacity must be reserved in the read buffer.

To further reduce the capacity of the read buffers while seamless playback of video images is enabled during the long jump associated with switching between layers, etc., the playback path should be separated at positions before and after the layer boundary required by the long jump. Also, the arrangement of the data blocks before and after such positions should be changed from the interleaved arrangement.

Figure 64:
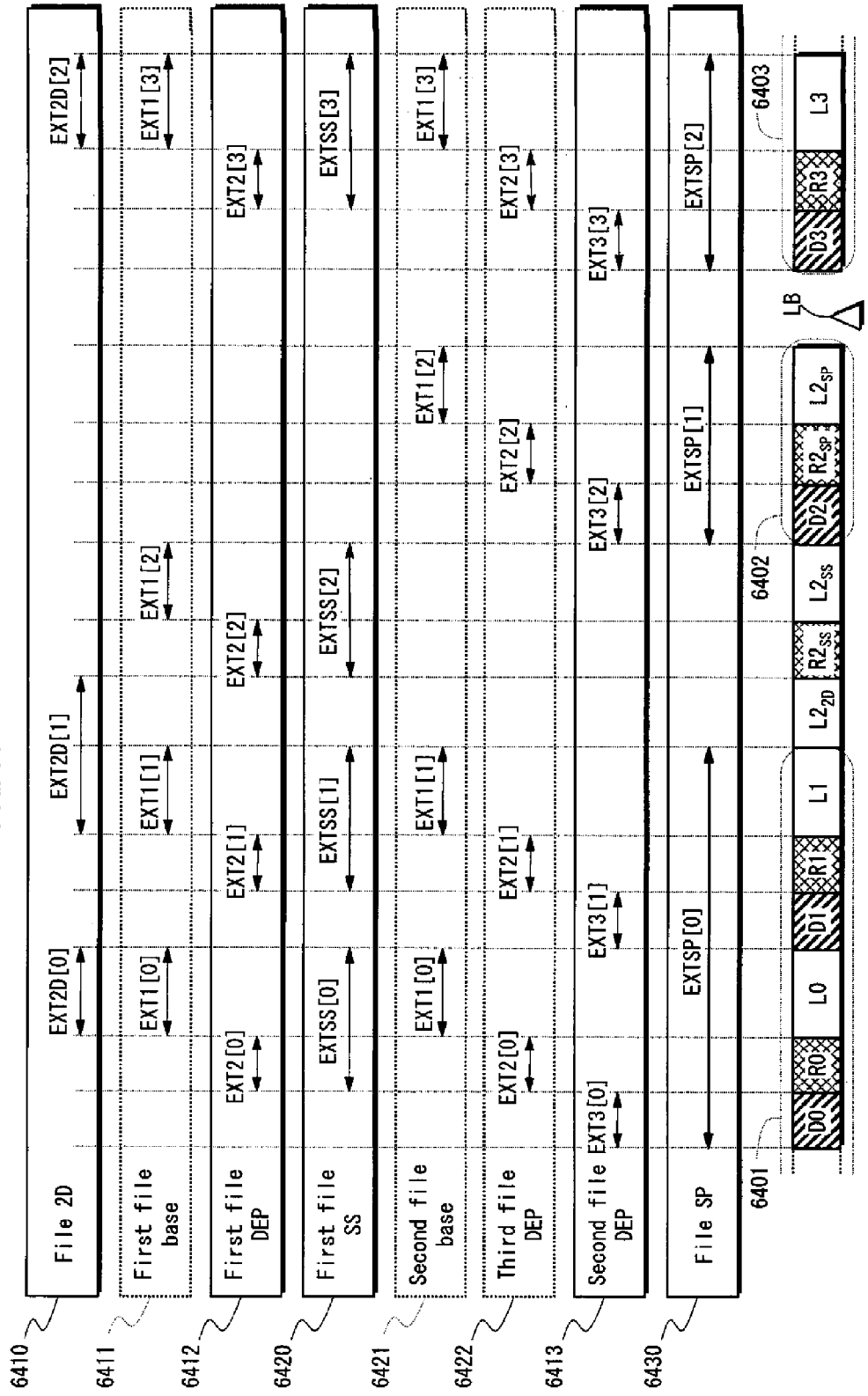
FIG. 64 is a schematic diagram showing an arrangement of three types of data blocks recorded on the BD-ROM disc 101 before or after a layer boundary LB.

FIG. 64 is a schematic diagram showing an arrangement of three types of data blocks recorded on the BD-ROM disc 101 before or after a layer boundary LB. As shown in FIG. 64, a first super extent block 6401, a block exclusively for 2D playback $L2_{2D}$, blocks exclusively for SS playback $R2_{SS}$ and $L2_{SS}$, and the second super extent block 6402 are arranged in order before the layer boundary LB. Meanwhile, a third super extent block 6903 is arranged after the layer boundary LB. Three types of data blocks Dn, Rn, and Ln (n= . . . , 0, 1, 2, 3, . . . ) form an interleaved arrangement in each of the super extent blocks 6401-6403. In particular, the extent ATC time is the same in the $n^{th}$ data block group Dn, Rn, and Ln. Furthermore, the data blocks in each group are arranged in the following order: the depth map data block Dn, the right-view data block Rn, and the base-view data block Ln. In the second super extent block 6402, the content of the stream data is continuous from the data blocks D1, R1, and L1 located at the tail of the first super extent block 6401, and to the data blocks D4, R4, and L4 located at the head of the third super extent block 6403. The right-view data block $R2_{SP}$ and the base-view data block $L2_{SP}$ included in the second super extent block 6402 are both blocks exclusively for SP playback. The block exclusively for 2D playback $L2_{2D}$, the block exclusively for SS playback $L2_{SS}$, and the block exclusively for SP playback $L2_{SP}$ are bit-for-bit matches with each other, and the block exclusively for SS playback $R2_{SS}$ is a bit-for-bit match with the block exclusively for SP playback $R2_{SP}$.

As further shown in FIG. 64, with the exceptions of the block exclusively for SS playback $L2_{SS}$ and the block exclusively for SP playback $L2_{SP}$, the base-view data blocks can be accessed as the extents EXT2D[0], EXT2D[1], and EXT2D[2] of the file 2D 6410. In particular, the pair L1+L[2]$_{2D}$ of the last base-view data block L1 in the first super extent block 6401 and the block exclusively for 2D playback $L2_{2D}$ can be accessed as a single 2D extent EXT2D[1]. Meanwhile, the right-view data blocks other than the block exclusively for SP playback $R2_{SP}$ can be accessed as the extents EXT2[0], EXT2[1], EXT2[2] and EXT2[3] of the first file DEP 6412. Furthermore, with the exceptions of the blocks exclusively for SP playback $R2_{SP}$ and $L2_{SP}$, the pairs R0+L0, R1+L1, $R2_{SS}$+$L2_{SS}$, and R3+L3 of contiguous data blocks and base-view data blocks can be accessed as the extents EXTSS[0], EXTSS[1] and EXTSS[2] of the file SS 6420. In that case, with the exceptions of the block exclusively for 2D playback $L2_{2D}$ and the block exclusively for SP playback $L2_{SP}$, the base-view data blocks L0, L1, $L2_{SS}$, and L3 can be extracted from the extents SS SEXTSS[0], EXTSS[1], EXTSS[2], and EXTSS [3].

Additionally, the depth map data block Dn can be accessed as the extent EXT3[n] of the second file DEP 6413. Furthermore, with the exceptions of the block exclusively for 2D playback $L2_{2D}$ and the blocks exclusively for SS playback $R2_{SS}$ and $L2_{SS}$, the entirety of the super extent blocks 6401-6403 can be accessed as the extents EXTSP[0], EXTSP[1], and EXTSP[2] of the file SP 6430. In this case, with the exceptions of the block exclusively for 2D playback $L2_{2D}$ and the block exclusively for SS playback $L2_{SS}$, the base-view data blocks L0, L1, $L2_{SP}$ and L3 can be extracted from the extents SP EXTSP[0], EXTSP[1] and EXTSP[2] as the extents EXT1[0], EXT1[1], EXT1[2], and EXT1[3] of a second file base 6421. Similarly, the right-view data blocks R0, R1, $R2_{SP}$, and R3 other than the block exclusively for SS playback $R2_{SS}$ can be extracted from the extents SP EXTSP [0] EXTSP[1] and EXTSP[2] as the extents EXT2[0], EXT2 [1], EXT2[2], and EXT2[3] of the third file DEP 6422. The second file base 6421 and the third file DEP 6422, both similarly to the first file base 6411, are "virtual files". That is to say, the files 6421 and 6422 are not recognized by the file system, and do not appear in the directory/file structure shown in FIG. 2. The extents EXT1[n] of the second file base 6421 and the extents EXT2[n] of the third file DEP 6422, similarly to the base-view extents, are referenced by the extent start point in the clip information file.

The playback device in 2D playback mode plays back the file 2D 6410. Accordingly, the base-view data blocks L0, and L1 and the block exclusively for 2D playback $L2_{2D}$ in the first super extent block 6401, and the base-view data block L3 in the third super extent block 6403 are read as 2D extents EXT2D[n], and the reading of other data blocks is skipped by a jump. For this reason, for seamless playback of 2D images, these 2D extents EXT2D[n] should satisfy Condition 1.

The playback device in L/R mode plays back a file SS 6420. Accordingly, with the exceptions of the blocks exclusively for SP playback $R2_{SP}$ and $L2_{SP}$, the pairs R0+L0, R1+L1, $R2_{SS}$+$L2_{SS}$, and R3+L3 of contiguous right-view data blocks and base-view data blocks are read continuously as the extents SS EXT SS[n]. Meanwhile, the reading of the other data blocks is skipped by a jump. For this reason, for seamless playback of the 3D images, the data blocks included in these extents SS EXTSP[n] should satisfy Conditions 2 and 3, and the entirety of the extent SS EXTSP[n] should satisfy Condition 4.

The playback device in super mode plays back a file SP 6430. Accordingly, the entirety of the super extent blocks 6401-6403 are continuously read as the extents SP EXTSP [n], and reading of the other data blocks are skipped by a jump. For this reason, for seamless playback of the 3D images, the data blocks included in the extents SP EXTSP[n] should satisfy Conditions 5-7, and for the entirety of the extents SP EXTSP[n] to satisfy Condition 8.

As clarified by FIG. 64, the respective playback paths in 2D playback mode, L/R mode, and super mode pass through different base-view data blocks $L2_{2D}$, $L2_{SS}$, and $L2_{SP}$ immediately before the layer boundary LB. Since the data blocks $L2_{2D}$, $L2_{SS}$, and $L2_{SP}$ are bit-for-bit matches with each other, the base-view video frames to be played back are the same in any playback mode. In this way, the playback paths are separated immediately before the long jump associated with switching layers. Accordingly, it is easy to design the sizes of the data blocks so that Conditions 1-8 necessary for seamless playback are simultaneously satisfied.

(F-4) Structure of the Playback Device in Super Mode

The fundamental part of the structure of the playback device in super mode is identical to the 3D playback device shown in FIGS. 44 to 46. Therefore, the following is a description of sections of the structure of the 3D playback device that are extended or modified, incorporating by reference the above description of the 3D playback device for details on the fundamental parts thereof.

Figure 65:
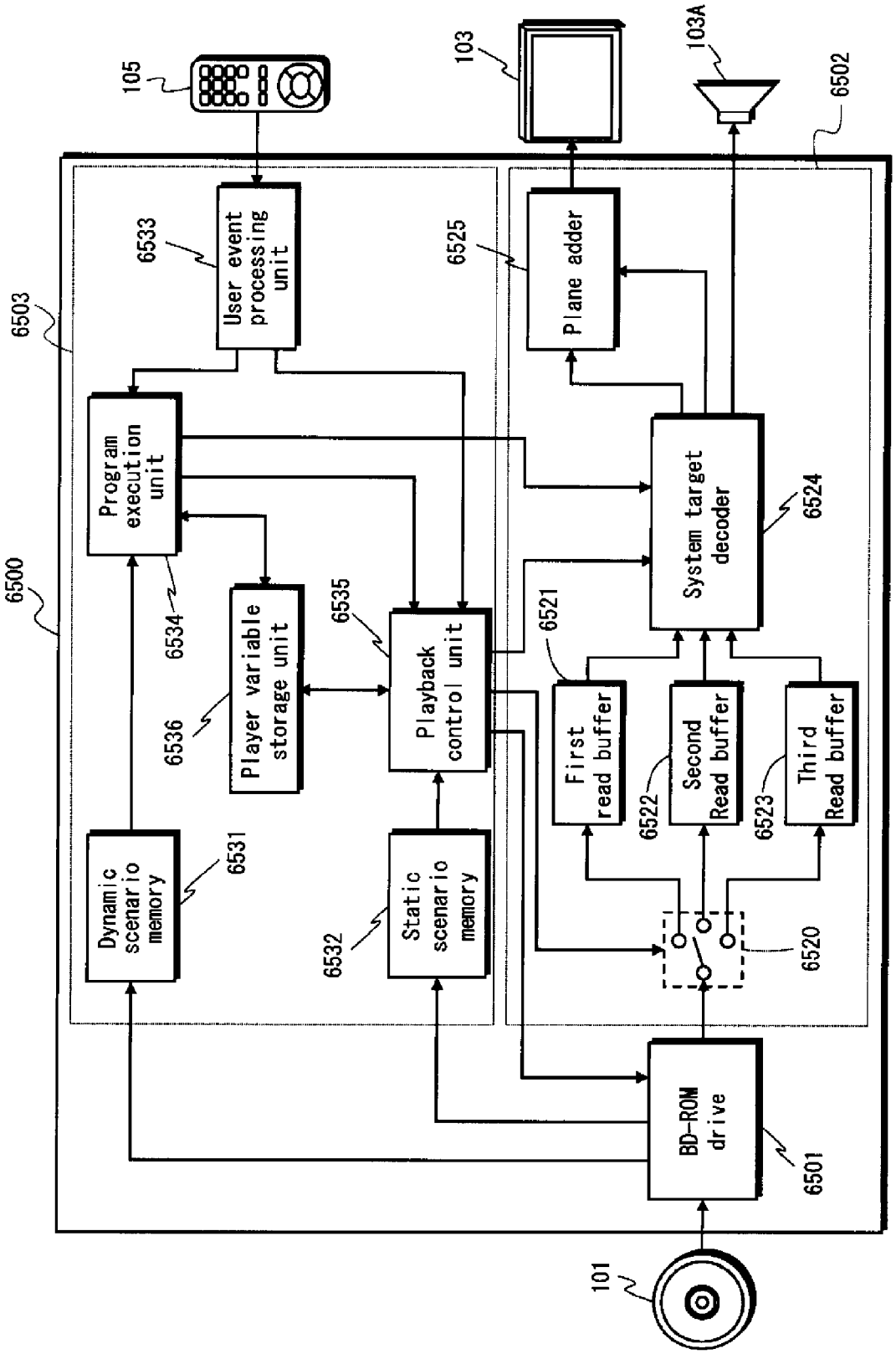
FIG. 65 is a functional block diagram of a playback device 6500 in super mode.

FIG. 65 is a functional block diagram of a playback device 6500 in super mode. The playback device 6500 includes a BD-ROM drive 6501, a playback unit 6502, and a control unit 6503. The playback unit 6502 includes a switch 6520, a first read buffer 6521, a second read buffer 6522, a third read buffer 6523, a system target decoder 6524, and a plane adder 6524. The control unit 6503 includes a dynamic scenario memory 6531, a static scenario memory 6532, a user event processing unit 6533, a program execution unit 6534, a playback control unit 6535, and a player variable storage unit 6536. The playback unit 6502 and the control unit 6503 are mounted on a different integrated circuit, but may alternatively be mounted on a single integrated circuit. In particular, the control unit 6503 has an identical structure with the 3D playback device shown in FIG. 44. Accordingly, details thereof are incorporated by reference to the above explanation of the 3D playback device.

The BD-ROM drive 6501 includes elements identical to the BD-ROM drive 4401 in the 3D playback device shown in FIG. 44. When the playback control unit 6535 indicates a range of LBN, the BD-ROM drive 6501 reads data from the sector group on the BD-ROM disc 101 indicated by the range. In particular, source packet groups belonging respectively to extents SS and extents SP are transferred from the BD-ROM drive 6501 to the switch 6520. In this case, each extent SP includes at least one set of three types of data blocks, as shown in FIG. 57. These data blocks need to be transferred in parallel to different read buffers 6521-6523. Accordingly, the BD-ROM drive 6501 needs to have at least the same access speed as the BD-ROM drive 4401 in the 3D playback device.

The switch 6520 receives extents SS and extents SP from the BD-ROM drive 6501. On the other hand, the switch 6520 receives, from the playback control unit 6535, information indicating each boundary between blocks included in the extents SS and the extents SP. This information indicates the number of source packets from the beginning of the extent SS or extent SP to each boundary, for example. In this case, the playback control unit 6535 generates this information by referring to the extent start point in the clip information file. The switch 6520 further refers to this information to extract base-view extents from each extent SS or extent SP, then transmitting the data blocks to the first read buffer 6521. Similarly, the switch 6520 transmits the right-view extents to the second read buffer 6522, and transmits the depth map extents to the third read buffer 6523.

The read buffers 6521-6523 are buffer memories that use a memory element in the playback unit 6502. In particular, different areas in a single memory element are used as the read buffers 6521-6523. Alternatively, different memory elements may be used as the read buffers 6521-6523.

First, the system target decoder 6524 in L/R mode alternately reads source packets from base-view extents stored in the first read buffer 6521 and right-view extents stored in the second read buffer 6522. Meanwhile, the system target decoder 6524 in depth mode alternately reads source packets from the base-view extents stored in the first read buffer 6521 and depth map extents stored in the second read buffer 6523. Next, the system target decoder 6524 separates elementary streams from each source packet via demultiplexing and furthermore, from the separated streams, decodes the data shown by the PID indicated by the playback control unit 6535. The system target decoder 6524 then writes the decoded elementary streams in an internal plane memory according to the type thereof. In particular, the base-view video streams are written in the left-view video plane memory, the right-view video stream is written in the right-view plane memory, and the depth map stream is written in the depth plane. The other elementary streams are written in a dedicated plane memory, or output to an audio mixer. The system target decoder 6524 also performs rendering processing on graphics data from the program execution unit 6534, and writes this data in the image plane memory.

Similarly to the process shown in FIG. 44, the system target decoder 6524 is compatible with B-D presentation mode/B-B presentation mode, and 2-plane mode/1-plane+offset mode/1 plane+zero offset mode. Accordingly, the description of the details thereof can be found in the description of FIG. 44.

The plane adder 6525 receives each type of plane data from the system target decoder 6524 and superimposes the pieces of plane data to create one composite frame or field. In particular, in L/R mode, from among the other pieces of plane data, the plane adder 6525 superimposes pieces that represent the left-view on the left-view plane data and pieces that represent the right-view on the right-view plane data. On the other hand, the plane adder 6525 in depth mode first generates a pair of left-view video plane data and right-view video plane data from both pieces of video plane data. Subsequently, the plane adder 6525 performs the same composition processing as in L/R mode.

When receiving an indication of 1 plane+offset mode or 1 plane+zero offset mode from the playback control unit 6535 as the presentation mode for the secondary video plane, PG plane, IG plane, or image plane, the plane adder 6525 performs cropping processing on the plane data received from the system target decoder 6524. A pair of left-view plane data and right-view plane data is thus generated. The description of cropping processing is found in the description of FIG. 44. Subsequently, the plane adder 6525 performs the same composition processing as in L/R mode. The composited frame or field is output to the display device 103 and displayed on the screen.

Figure 66:
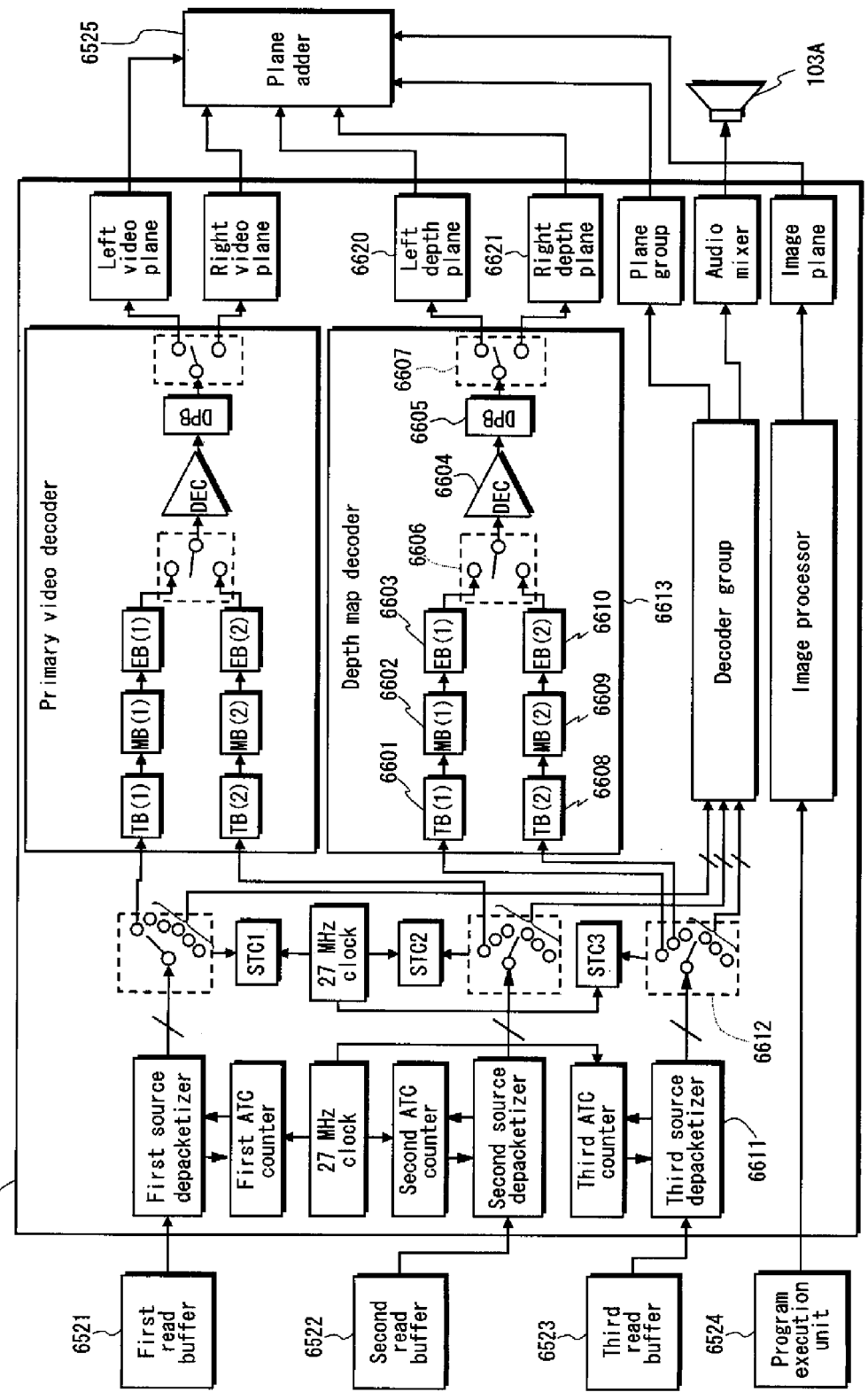
FIG. 66 is a functional block diagram of a system target decoder 6524 shown in FIG. 65.

FIG. 66 is a functional block diagram of the system target decoder 6524. The structural elements shown in FIG. 66 differ from the 3D playback device 4423 shown in FIG. 46 in the following two points: 1) the input channel from the read buffer to each decoder is tripled, and 2) a depth map decoder 6613 has been added. Meanwhile, the other decoders, the audio mixer, the image processor, and the plane memories are the same as those of the 3D playback device shown in FIG. 46. Accordingly, the following describes input systems 6611 and 6612 from the third read buffer 6523 and the depth map decoder 6613, and the details of the other similar constituent elements can be found in the description of FIG. 46.

The third source depacketizer 6611 reads source packets from the third read buffer 6523. The third source depacketizer 6611 further extracts TS packets included in the source packets, and transmits the TS packets to the third PID filter 6612. The third source depacketizer 6611 further causes the time of transferring the TS packets to match the ATS of the source packets. Similarly to the synchronization by the source depacketizer shown in FIG. 46, this synchronization can be realized by counting a number of clock pulses generated by a 27 MHz clock with use of a third ATC counter.

Each time the third PID filter 6612 receives a TS packet from the third source depacketizer 6611, the third PID filter 6612 compares the PID of the received TS packet with a selected PID. The playback control unit 6535 designates the selected PID beforehand in accordance with the STN table in the 3D playlist file. When the two PIDs match, the third PID filter 6612 transfers the TS packets to the decoder assigned to the PID. For example, if a PID is 0x1013, the TS packets are transferred to TB(1) 6601 in the depth map decoder 6613, whereas TS packets with PIDs ranging from 0x1B20-0x1B3F, 0x1220-0x127F, and 0x1420x0x147F are transferred to the secondary video decoder, PG decoder, or IG decoder respectively.

In addition to an elementary stream representing a depth map of a left view, there are cases in which an elementary stream representing a depth map of a right view is multiplexed in a depth map stream. Hereinafter, the former is referred to as a "left-view depth map stream", and the latter is referred to as a "right-view depth map stream". In this case, different PIDs are allocated to the left-view depth map stream and the right-view depth map stream. The third PID filter 6612 changes the transmission destination of the TS packets included in the respective depth map streams according to these PIDs. By this process, the TS packets included in the left-view depth map stream are transmitted to the TB (1) 6601 in the depth map decoder 6613, and the TS packets included in the right-view depth map stream are transmitted to the TB (2) 6608. Furthermore, the right-view depth map is compressed, according to an encoding method such as MVC, using the left-view depth map as a reference picture. Accordingly, decoding of the depth map streams of the left view and the right view by the depth map decoder 6613 is performed similarly to the decoding of the video streams of the base-view and the dependent-view by the primary video decoder.

Similarly to the primary video decoder, the depth map decoder 6613 includes a TB(1) 6601, MB(1) 6602, EB(1) 6603, TB(2) 6608, MB(2) 6609, EB(2) 6610, buffer switch 6606, DEC 6604, DPB 6605, and picture switch 6607. The TB(1) 6601, MB(1) 6602, EB(1) 6603, TB(2) 6608, MB(2) 6609, EB(2) 6610 and DPB 6605 are all buffer memories, each of which uses an area of the memory elements included in the depth map decoder 6613. Note that some or all of these buffer memories may be separated on different memory elements.

The TB(1) 6601 receives TS packets that include a left-view depth map stream from the third PID filter 6612 and stores the TS packets as they are. The MB(1) 6602 stores PES packets reconstructed from the TS packets stored in the TB(1) 6601. The TS headers of the TS packets are removed at this point. The EB(1) 6603 extracts and stores encoded depth maps from the PES packets stored in the MB(1) 6602. The PES headers of the PES packets are removed at this point.

The TB(2) 6608 receives TS packets that include a right-view depth map stream from the third PID filter 6612 and stores the TS packets as they are. The MB(2) 6609 stores PES packets reconstructed from the TS packets stored in the TB(2) 6608. The TS headers of the TS packets are removed at this point. The EB(2) 6610 extracts and stores encoded depth maps from the PES packets stored in the MB(2) 4609. The PES headers of the PES packets are removed at this point.

The buffer switch 6606 transfers the headers of the depth maps stored in the EB(1) 6603 and the EB(2) 6610 in response to a request from the DEC 6604. The buffer switch 6606 further transfers the depth maps to the DEC 6604 at the times indicated by the DTSs included in the original TS packets. In this case, the DTSs for a pair of pictures belonging to the same depth map stream between the left-view video stream and right-view stream are the same. When encoding the depth maps, one of each pair is used as a reference picture for the other one. Accordingly, among a pair of depth maps having the same DTS, the buffer switch 6606 first transfers the depth map stored in the EB (1) 6603 to the DEC 6604.

The DEC 6604 is a hardware decoder specialized for performing decoding processing, and in particular is constituted from an LSI equipped with an accelerator function for the decoding processing. The DEC 6604 sequentially decodes depth maps transferred from the buffer switch 6606. To perform this decoding processing, the DEC 6604, in advance, analyzes each depth map header, specifies a compression encoding method and a stream attribute of the compressed pictures stored in the depth map, and selects a decoding method based on these. The DEC 6604 further transmits the decoded depth map to the DPB 6605.

The DPB 6605 temporarily stores the decoded, uncompressed depth map. When the DEC 6604 decodes a P picture or a B picture, the DPB 6605 searches for reference pictures from among the stored, uncompressed depth maps in accordance with a request from the DEC 6604, and provides the reference pictures to the DEC 6604.

The picture switch 6607 writes the uncompressed depth maps from the DPB 6605 to either the left depth plane memory 6620 or the right depth plane memory 6621 at the time indicated by the PTS included in the original TS packet. In this case, the PTS of the depth map in the left view and the PTS of the depth map for the right view are is the same. Accordingly, from among a pair of depth maps having the same PTS that are stored in the DPB 6605, the picture switch 6607 first writes the left-view depth map into the left depth plane memory 6620, and next writes the right-view depth map into the right depth plane memory 6621. When reading the video plane from the left video plane memory, the plane adder 6525 in depth mode reads the depth maps in the left depth plane memory 6520 at the same time. Meanwhile, when reading the video plane from the right video plane memory, the plane adder 6525 reads the depth maps in the left depth plane memory 6521 at the same time.

Figure 15:
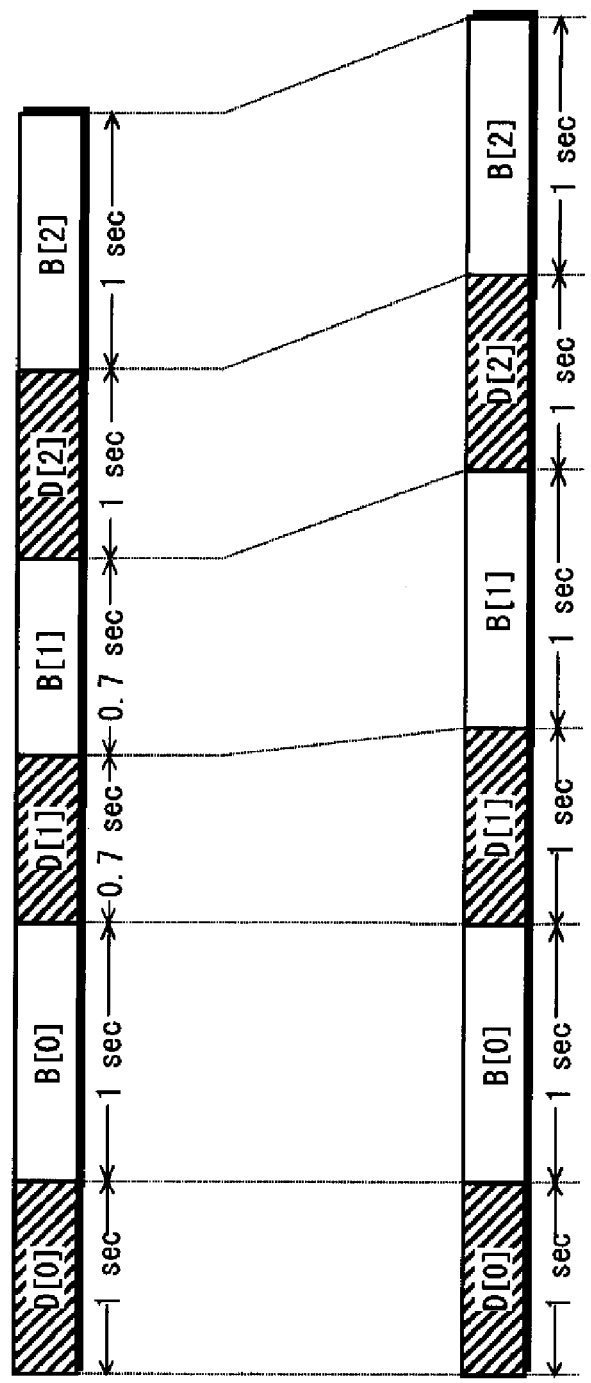
FIGS. 15A and 15B are schematic diagrams showing different examples of ATC times for each extent in a dependent-view block group D[n] and a base-view data block group B[n] recorded in an interleaved arrangement (n=0, 1, 2)

(G) In the interleaved data blocks shown in FIG. 15, in pairs of data blocks having the same extent ATC time, the playback periods may match, and the playback time of the video stream may be the same. That is to say, the number of VAUs and the number of pictures may be the same between these data blocks. The significance of this is as follows.

Figure 67A:
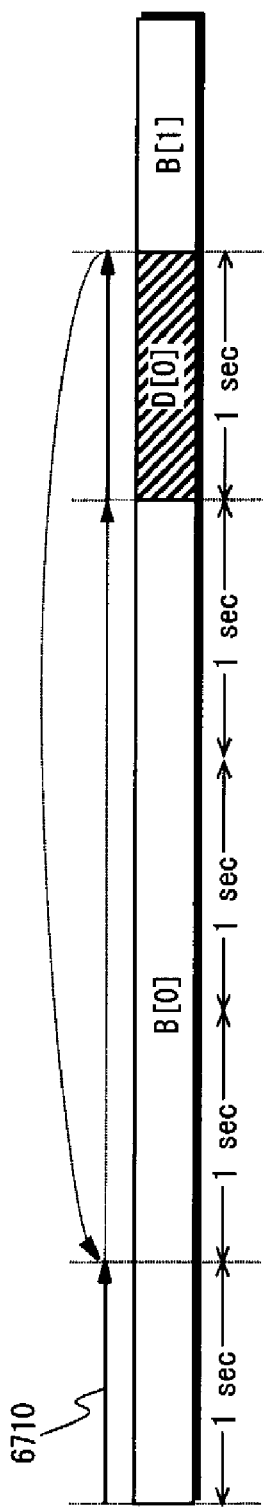
FIG. 67A is a schematic diagram showing the playback path when the extent ATC times differ between base-view data blocks and dependent-view data blocks that are contiguous to each other and the playback times of the video streams are also different.

FIG. 67A is a schematic diagram showing the playback path when the extent ATC times differ between base-view data blocks and dependent-view data blocks that are contiguous to each other and the playback times of the video streams are also different. As shown in FIG. 67A, the playback time of the base-view data block B[0] at the head of the base-view data block B[0] is 4 seconds, and the playback time of the dependent-view data block D[0] at the head is 1 second. The portions of the base-view video stream necessary for decoding the dependent-view data block D[0] have the same playback time as the dependent-view data block D[0]. Accordingly, to cut back on capacity of the read buffers in the playback device, as shown by the arrow 6710 in FIG. 67A, it is preferable for the playback device to read the base-view data block B[0] and the dependent-view data block D[0] alternately for the same playback time, for example one second each. However, in this case, as shown by the broken line in FIG. 67A, a jump occurs midway through the read processing. As a result, it is difficult to cause read processing to keep up with decoding processing, and thus it is difficult to stably maintain seamless playback.

Figure 67B:
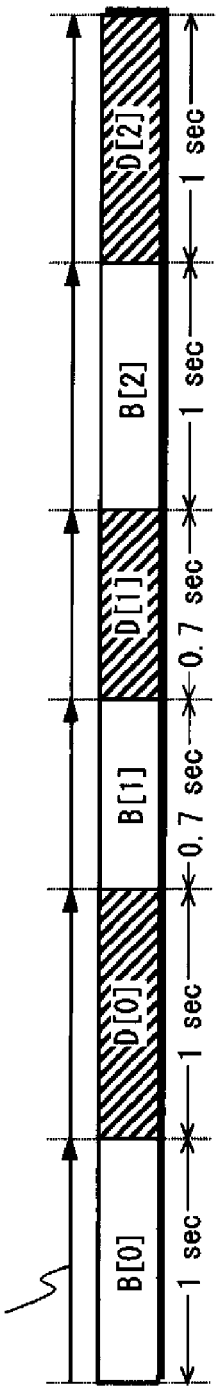
FIG. 67B is a schematic diagram showing the playback path when the playback times of the video stream are the same between base-view data blocks and dependent-view data blocks that are contiguous to each other.

FIG. 67B is a schematic diagram showing the playback path when the playback times of the video stream are the same between base-view data blocks and dependent-view data blocks that are contiguous. On the BD-ROM disc 101 according to embodiment 1 of the present invention, as shown in FIG. 67B, the playback time of the video stream between a pair of contiguous data blocks may be the same. For example, for the pair of the top data blocks B[0] and D[0], the playback times of the video stream are both equal to one second, and the playback times of the video stream for the second pair of data blocks B[1] and D[1] are both equal to 0.7 seconds. In this case, the playback device in 3D playback mode reads data blocks B[0], D[0], B[1], D[1] in order from the top, as shown by arrow 6720 in FIG. 67B. Simply in this way, the playback device can smoothly read the main TS and sub-TS alternately. In particular, since no jump occurs during read processing, seamless playback of 3D video images can be stably maintained.

Actually, if the extent ATC time is the same between a base-view data block and a dependent-view data block that are contiguous, synchronous decoding processing can be maintained without causing a jump in the read processing. Accordingly, even if the playback period or the video stream's playback time is not the same, similarly to the case shown in FIG. 67B, simply by reading the data blocks from the top in order, the playback device can stably maintain seamless playback of the 3D video images.

Between a base-view data block and a dependent-view data block that are contiguous to each other, the number of headers for any VAU, or the number of PES headers may be the same.

These headers are used for synchronizing the decoding processing between the data blocks. Accordingly, if the number of headers is the same between the data blocks, even if the actual number of VAUs is not the same, it is comparatively easy to maintain synchronous decoding processing. Furthermore, unlike a case in which the actual number of VAUs is the same, not all of the data of the VAUs need to be multiplexed in the same data block. For this reason, there is a high degree of flexibility when multiplexing stream data in an authoring process of the BD-ROM disc 101.

The number of entry points may be the same between a base-view data block and a dependent-view data block that are contiguous. FIG. 68 is a schematic diagram showing a relationship between entry points and data blocks when that condition is applied to the super extent blocks. As shown in FIG. 68, the extents EXT2D[n] (n=0, 1, 2, ...) in the file 2D 241 reference the base-view data block Ln, the right-view extent EXT2 [n] of the first file DEP 242 references the right-view data block Rn, and the depth map extent EXT3[n] of the second file DEP 243 references the depth map data block Dn. In FIG. 68, the entry points are shown by triangles 6801, 6802, and 6803, and the number of entry points included in the extents is indicated by a numeral. Between three files 241, 242, and 243, the extents EXT2D[n], EXT2 [n], and EXT3[n] in the same order from the top include the same-numbered entry points 6801, 6802, and 6803. When playing back 3D images from the super extent blocks Dn, Rn, and Ln, a jump occurs in L/R mode for each depth map data block Dn, and in depth mode, a jump occurs for each right-view data block Rn. Meanwhile, in super mode, a jump does not occur between the data blocks. In this way, the existence of the jump depends on the playback mode. However, when the number of entry points is the same between the data blocks, the playback time is also substantially the same. Accordingly, whether there is a jump or not, it is easy to maintain synchronous decoding processing. Furthermore, unlike a case in which the actual number of VAUs is the same, not all of the data of the VAUs need to be multiplexed in the same data block. For this reason, there is a high degree of flexibility when multiplexing stream data in an authoring process of the BD-ROM disc 101.

(H) Multiangle

Figures 69A, 69B, 69C:
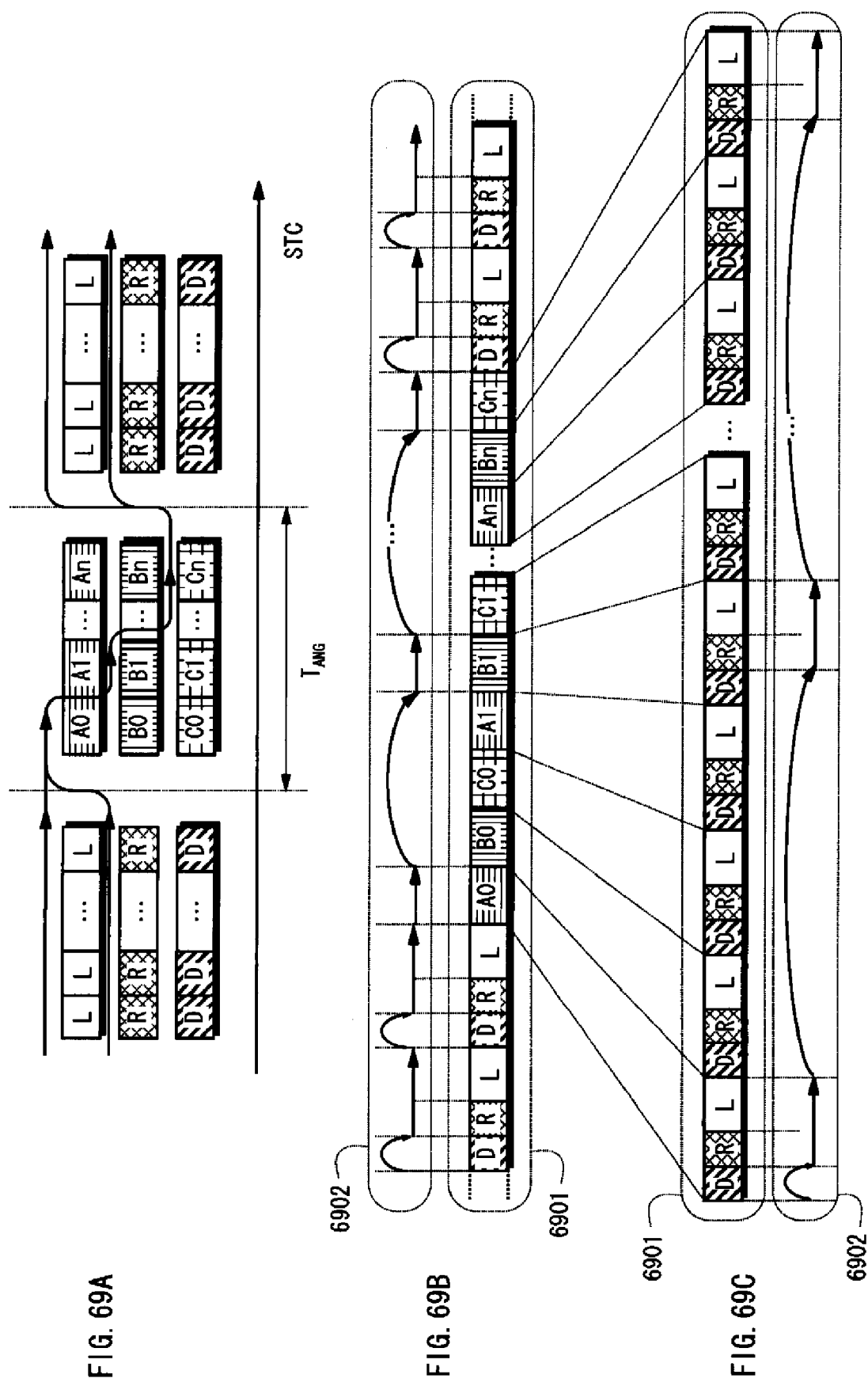
FIG. 69A is a schematic diagram showing a playback path of multiplexed stream data corresponding to multiple angles.
FIG. 69B is a schematic diagram showing data blocks 6901 recorded on the BD-ROM disc and the playback path 6902 corresponding thereto in L/R mode.
FIG. 69C shows super extent blocks included in stream data Ak, Bk, and Ck, each of which pertains to a different viewing angle.

FIG. 69A is a schematic diagram showing a playback path of multiplexed stream data corresponding to multiple angles.

As shown in FIG. 69A, three types of stream data L, R, and D representing base-view, right-view, and depth map are multiplexed in the multiplexed stream data. For example, in L/R mode, base-view stream data and right-view stream data are played back in parallel. Furthermore, stream data Ak, Bk, and Ck, separated according to angle, are multiplexed in playback portions in a multiangle playback period $T_{ANG}$ (k=0, 1, 2, ..., n). The stream data Ak, Bk, and Ck representing each angle are divided into portions in which the playback time is the same as the angle change interval. Base-view stream data, right-view stream data, and depth map stream data are further multiplexed in the portions Ak, Bk, and Ck. In the multiangle period $T_{ANG}$, a playback target can be switched, according to a user operation or an instruction of an application program, between the stream data Ak, Bk, and Ck separated by angle.

FIG. 69B is a schematic diagram showing data blocks 6901 recorded on the BD-ROM disc and the playback path 6902 corresponding thereto in L/R mode. The data blocks 6901 include stream data L, R, D, Ak, Bk, and Ck shown in FIG. 69A. As shown in FIG. 69B, in the data blocks 6901, in addition to the normal stream data L, R, and D, the stream data Ak, Bk, and Ck separated by angle are recorded in an interleaved arrangement. In L/R mode, as shown by the playback path 6902, the right-view data block R and the base-view data block L are read, and the reading of the depth map data block D is skipped by a jump. Furthermore, among the stream data Ak, Bk, and Ck separated by angle, data of selected ones A0, B1, Cn are read, and the reading of the other data blocks is skipped by a jump.

FIG. 69C shows super extent blocks included in stream data Ak, Bk, and Ck, each of which pertains to a different viewing angle. As shown in FIG. 69C, in the stream data Ak, Bk, and Ck of the angles, three types of data blocks L, R, and D form an interleaved arrangement. In L/R mode, as shown by the playback path 6902, among the stream data Ak, Bk, and Ck separated by angle, the right-view data block R and the base-view data block L are read from the selected ones A0, B1, Cn. Meanwhile, reading of the other data blocks is skipped. In contrast, in super mode, the entirety of data blocks are continuously read from the stream data A0, B1, Cn of the selected angles. Meanwhile, reading of the stream data of other angles is skipped by a jump. Alternatively, stream data may be read for all angles regardless of whether a selection is made.

Note that the stream data Ak, Bk, and Ck for each of the angles may be included in a single multiplexed stream data piece. However, it is necessary for the recording rate to be suppressed into a range of system rates in which playback by a 2D playback device is possible. Also, a number of stream data (TS) to be transferred to the system target decoder is different between such multiplexed stream data and the multiplexed stream data of the other 3D images. Accordingly, each piece of playitem information (PI) may include a flag indicating a number of TSs to be played back. With use of the flag, switching can be performed within a single playlist file between these pieces of multiplexed stream data. In a PI specifying two TSs to be played back in 3D mode, the flag indicates two TSs. Meanwhile, in a PI that specifies a single TS, such as the above-described multiplexed stream data, to be played back, the flag indicates one TS. The 3D playback device can switch a setting of the system target decoder according to the value of the flag. Furthermore, the flag may be expressed as a connection condition (CC) value. For example, when the CC indicates "7", a transition is performed from two TSs to one TS, and when the CC indicates "8", a transition is performed from one TS to 2 TSs.

Embodiment 2

The following describes, as embodiment 2 of the present invention, a recording device and recording method of a recording medium according to embodiment 1 of the present invention. This recording device is a so-called authoring device. Authoring devices are normally installed in production studios for making movie contents for distribution, and are used by authoring staff. Following an operation by the authoring staff, the recording device first converts a movie content into a digital stream using a compression encoding method according to MPEG standards, that is to say, into an AV file. Next, the recording device creates a scenario. "Scenarios" are information defining a playback method of titles included in movie contents. Specifically, scenarios include the above-described dynamic scenario information and static scenario information. Next, the recording device generates a volume image or an update kit for BD-ROM discs from the digital streams and the scenarios. Lastly, with use of the arrangement of extents described in embodiment 1, the recording device records the volume image onto the recording medium.

Figure 70:
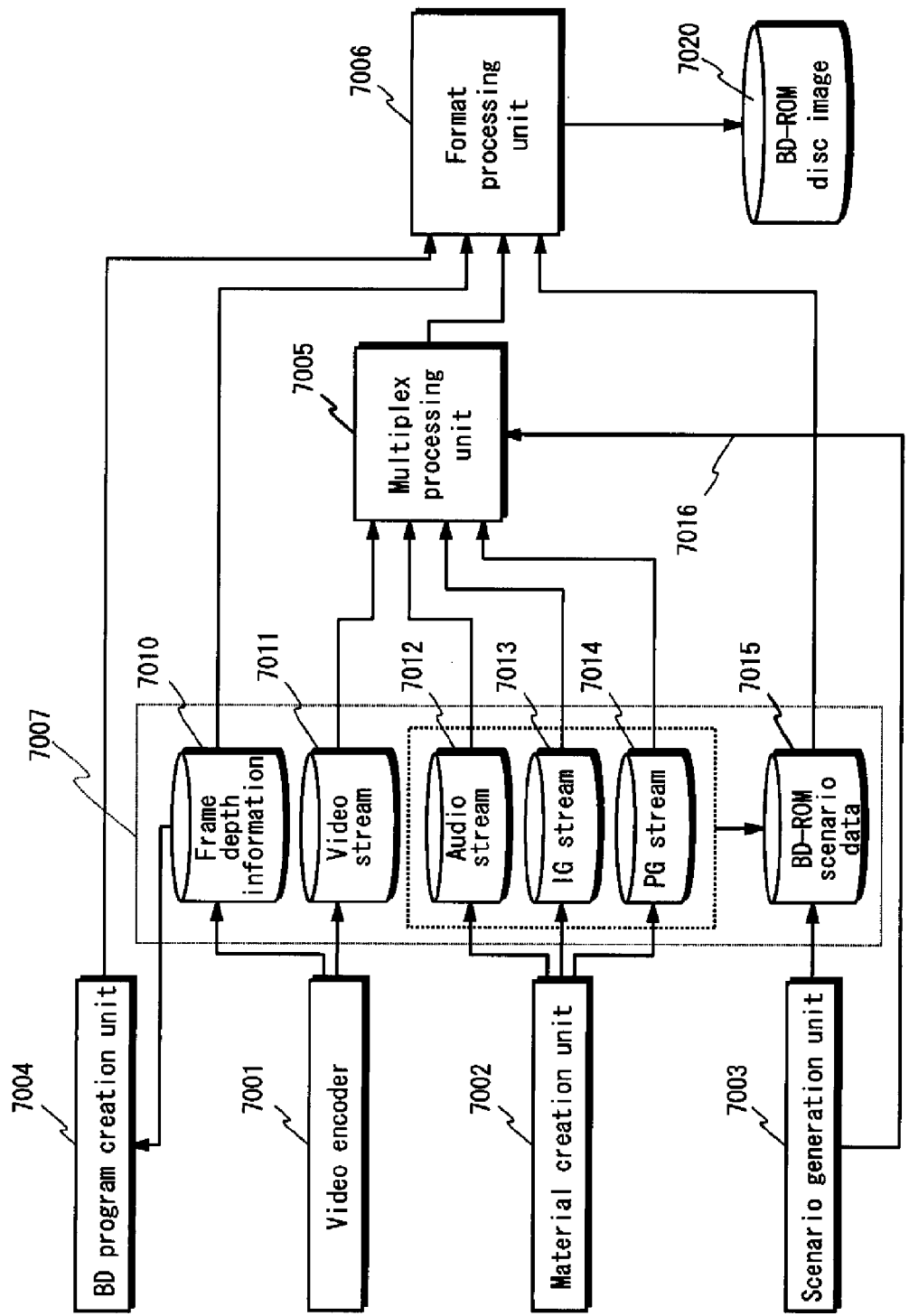
FIG. 70 is a block diagram showing the internal structure of a recording device according to embodiment 2 of the present invention.

FIG. 70 is a block diagram showing the internal structure of a recording device. As shown in FIG. 70, the recording device includes a video encoder 7001, a material creation unit 7002, a scenario generation unit 7003, a BD program creation unit 7004, a multiplex processing unit 7005, a format processing unit 7006, and a database unit 7007.

The database unit 7007 is a nonvolatile memory device in the recording device, and in particular is a hard disc drive HDD. Alternatively, the database unit 7007 may be an HDD provided externally to the recording device, and may be a nonvolatile semiconductor memory provided internally or externally to the recording device.

The video encoder 7001 receives video data such as compressed bit map data from the authoring staff, and compresses the video data using a compression encoding method such as MPEG-4 AVC or MPEG-2. By doing this, the primary video data is converted into a primary video stream, and the secondary video data is converted into a secondary video stream. In particular, the 3D data is converted into a base-view video stream and a dependent-view video stream. As shown in FIG. 6, the video encoder 7001 converts the left-view video stream into a base-view video stream by inter-picture predictive encoding with pictures of the left-view video stream, and converts the right-view video stream into a dependent-view video stream by inter-base-view picture predictive encoding, not only using the pictures of the right-view video stream but instead using the base-view pictures. Note that the right-view video stream may be converted to a base-view video stream. Furthermore, a left-view video stream may be converted into a dependent-view video stream.

During the above-described process of inter-picture predictive encoding, the video encoder 7001 further detects motion vectors between left video images and right video images and calculates depth information of each 3D video image based on the detected motion vectors. The calculated depth information of each 3D video image is organized into the frame depth information 7010 that is stored in the database unit 7007. Also, the video encoder 7001 may generate a depth map for left view or right view with use of the depth information 7010. In that case, as shown in FIG. 7, the video encoder 7001 converts stream data of the left video images or the right video images into a base-view video stream and a depth map video stream by inter-picture predictive encoding with pictures of its own respective video stream. The converted streams 7011 are stored in the database unit 7007.

FIGS. 71A and 71B are schematic diagrams showing a left-video image picture and a right-video image picture used in display of one scene in a 3D video image, and FIG. 71C is a schematic diagram showing depth information calculated from these pictures by the video encoder 7001.

The video encoder 7001 first compresses each picture using the redundancy between the left and right pictures. At that time, the video encoder 7001 compares an uncompressed left picture and an uncompressed right picture on a per-macroblock basis (each macroblock containing a matrix of 8×8 or 16×16 pixels) so as to detect a motion vector for each image in the two pictures. Specifically, as shown in FIGS. 71A and 71B, a left video picture 7101 and a right video picture 7102 are each divided into a matrix of macroblocks 7103. Next, the areas occupied by the image data in picture 7101 and picture 7102 are compared for each macroblock 7103, and a motion vector between these pieces of image data is detected based on the result of the comparison. For example, the area occupied by image 7104 showing a "house" in picture 7101 is substantially the same as that in picture 7102. Accordingly, a motion vector is not detected from such areas. On the other hand, the area occupied by image 7105 showing a "sphere" in picture 7101 is substantially different from the area in picture 7102. Accordingly, a motion vector indicating the displacement between the images 7105 showing the "spheres" in the pictures 7101 and 7102 is detected from these areas.

The video encoder 7001 next makes use of the detected motion vector not only when compressing the pictures 7101 and 7102, but also when calculating the binocular parallax pertaining to a 3D video image constituted from the pieces of image data 7104 and 7105. Furthermore, in accordance with the binocular parallax thus obtained, the video encoder 7001 calculates the "depths" of each image, such as the images 7104 and 7105 of the "house" and "sphere". The information indicating the depth of each image may be organized, for example, into a matrix 7106 of the same size as the matrix of the macroblocks in pictures 7101 and 7102 as shown in FIG. 71C. The frame depth information 7010 shown in FIG. 70 includes this matrix 7106. In this matrix 7106, blocks 7101 are in one-to-one correspondence with the macroblocks 7103 in pictures 7101 and 7102. Each block 7101 indicates the depth of the image shown by the corresponding macroblocks 7103 by using, for example, a depth of eight bits. In the example shown in FIGS. 71A-71C, the depth of the image 7105 of the "sphere" is stored in each of the blocks in an area 7108 in the matrix 7106. This area 7108 corresponds to the entire areas in the pictures 7101 and 7102 that represent the image 7105.

Referring again to FIG. 70, the material creation unit 7002 creates elementary streams other than video streams, such as an audio stream 7012, PG stream 7013, and IG stream 7014 and stores the created streams into the database unit 7007. For example, the material creation unit 7002 receives uncompressed LPCM audio data from the authoring staff, encodes the uncompressed LPCM audio data in accordance with a compression/encoding scheme such as AC-3, and converts the encoded LPCM audio data into the audio stream 7012. The material creation unit 7002 additionally receives a subtitle information file from the authoring staff and creates the PG stream 7013 in accordance with the subtitle information file. The subtitle information file defines image data for showing subtitles, display timings of the subtitles, and visual effects to be added to the subtitles (e.g., fade-in and fade-out). Furthermore, the material creation unit 7002 receives bitmap data and a menu file from the authoring staff and creates the IG stream 7014 in accordance with the bitmap data and the menu file. The bitmap data shows images that are to be presented on a menu. The menu file defines how each button on the menu is to be transitioned from one state to another and defines visual effects to be added to each button.

The scenario generation unit 7003 creates BD-ROM scenario data 7015 in accordance with an instruction that has been issued by the authoring staff and received via GUI and then stores the created BD-ROM scenario data 7015 in the database unit 7007. The BD-ROM scenario data 7015 described here defines methods of playing back the elementary streams 7011-7014 stored in the database unit 7007. Of the file group shown in FIG. 2, the BD-ROM scenario data 7015 includes the index file 211, the movie object file 212, and the playlist files 221-223. The scenario generation unit 7003 further creates a parameter file 7016 and transfers the created parameter file 7016 to the multiplex processing unit 7005. The parameter file 7016 defines, from among the elementary streams 7011-7014 stored in the database unit 7007, stream data to be multiplexed into the main TS and sub-TS.

The BD program creation unit 7004 provides the authoring staff with a programming environment for programming a BD-J object and Java application programs. The BD program creation unit 7004 receives a request from a user via GUI and creates each program's source code according to the request. The BD program creation unit 7004 further creates the BD-J object file 251 from the BD-J object and compresses the Java application programs in the JAR file 261. The files 251 and 261 are transferred to the format processing unit 7006.

Here, it is assumed that the BD-J object is programmed in the following way: the BD-J object causes the program execution units 4034 and 4434 shown in FIGS. 40 and 44 to transfer graphics data for GUI to the system target decoders 4023 and 4423. Furthermore, the BD-J object causes the system target decoders 4023 and 4423 to process graphics data as image plane data. In this case, the BD program creation unit 7004 may set offset information corresponding to the image plane data in the BD-J object by using the frame depth information 7010 stored in the database unit 7007.

In accordance with the parameter file 7016, the multiplex processing unit 7005 multiplexes each of the elementary streams 7011-7014 stored in the database unit 7007 to form a stream file in MPEG-2 TS format. More specifically, as shown in FIG. 4, each of the elementary streams 7011-7014 is converted into a source packet sequence, and the source packets included in each sequence are assembled to construct a single piece of multiplexed stream data. In this manner, the main TS and sub-TS are created.

In parallel with the aforementioned processing, the multiplex processing unit 7005 creates the 2D clip information file and dependent-view clip information file by the following procedure. First, the entry map 2430 shown in FIG. 25 is generated for each file 2D and file DEP. Next, referring to the entry map of each file, the extent start point 2442 shown in FIG. 27 is created. At that time, the extent ATC times are adjusted to be the same between contiguous data blocks. Furthermore, the size of a 2D extent is designed to satisfy Condition 1, the size of a base-view extent is designed to satisfy Condition 2, the size of a dependent-view extent is designed to satisfy Condition 3, and the size of an extent SS is designed to satisfy Condition 4. Next, the stream attribute information shown in FIG. 24 is extracted from the elementary streams to be multiplexed in the main TS and the sub-TS, respectively. Furthermore, as shown in FIG. 24, a combination of an entry map, a piece of 3D meta data, and a piece of stream attribute information is associated with a piece of clip information.

Figure 72:
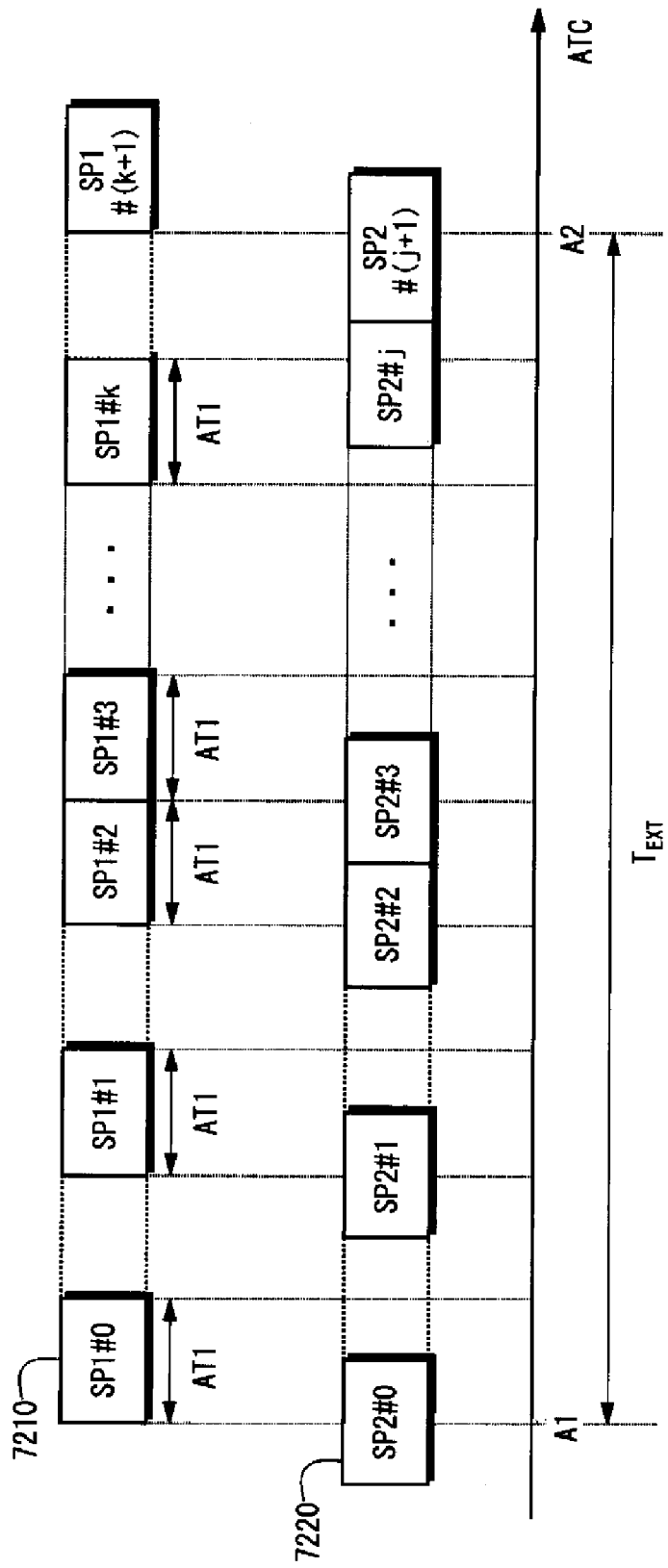
FIG. 72 is a schematic diagram showing a method of aligning ATC times of extents between contiguous data blocks.

FIG. 72 is a schematic diagram showing a method of aligning extent ATC times between contiguous data blocks. As shown in FIG. 72, rectangles 7210 represent source packets to be stored in base-view data blocks and SPN#n (n=0, 1, 2, 3, . . . , k), and rectangles 7220 represent source packets stored in dependent-view data blocks and SP2#m (m=0, 1, 2, 3, . . . , j). These rectangles 7210 and 7220 are arranged according to the order of ATSs of the source packets in the ATC time axis direction. The positions of the tops of the rectangles 7210 and 7220 represent the values of the ATSs of the source packets. A length AT1 of the rectangles 7210 and 7220 represents a time required by the 3D playback device to transfer one source packet from the read buffer to the system target decoder.

The source packets, SP1#n, represented by the rectangles 7210 are stored in one base-view data block B[i]. In this case, the source packets, SP2#m, to be stored in the corresponding dependent-view data blocks D[i] are selected as follows. First, the extent ATC time $T_{EXT}$ of the base-view data block B[i] and the ATS (EXT1[i]_STARTATC) A1 of SP1#0 located at the top thereof are calculated. The ATS A1 is referred to as the first ATS. Next, the sum of the extent ATC time $T_{EXT}$ and the first ATS A1, that is, the ATS A2=A1+$T_{EXT}$ of SP1#(k+1) located at the top of the next base-view data block B[i+1] is obtained. This ATS A2 is referred to as the second ATS. Next, among SP2#m, the source packets represented by the other rectangles 7220, source packets SP2#0, 1, 2, . . . , j are selected, which are each transferred from the read buffer to the system decoder during a period that overlaps with the period from the first ATS A1 to the second ATS A2, and that is finished before the second ATS A2. Alternatively, source packets SP2#1, 2, . . . , j, j+1 may be selected, which are each transferred during a period that overlaps with the period from the first ATS A1 to the second ATS A2, and that starts at or after the first ATS A1. In this way, the dependent-view data block D[i] is constituted from selected source packets.

The format processing unit 7006 creates a BD-ROM disc image 7020 of the directory structure shown in FIG. 2 from (i) the BD-ROM scenario data 7015 stored in the database unit 7007, (ii) a group of program files including, among others, a BD-J object file created by the BD program creation unit 7004, and (iii) multiplexed stream data and clip information files generated by the multiplex processing unit 7005. In this directory structure, UDF is used as a file system.

When creating file entries for each of the files 2D, files DEP, and files SS, the format processing unit 7006 refers to the entry maps and 3D meta data included in each of the 2D clip information files and dependent-view clip information files. The SPN for each entry point and extent start point is thereby used in creating each allocation descriptor. In particular, values of LBNs to be expressed by allocation descriptors and sizes of extents are determined as represented by the interleaved arrangement shown in FIG. 13. The file SS and file 2D thus share each base-view data block, and the file SS and file DEP thus share each dependent-view data block. On the other hand, at locations where a long jump is necessary, allocation descriptors are created so as to represent one of the Arrangements 1 and 2, for example. In particular, some base-view data blocks are only referred to by allocation descriptors in the file 2D as blocks exclusively for 2D playback, and duplicate data thereof is referred to by allocation descriptors in the file SS as blocks exclusively for SS playback.

In addition, by using the frame depth information 7010 stored in the database unit 7007, the format processing unit 7006 creates the offset table shown in FIG. 26A for each secondary video stream 7011, PG stream 7013, and IG stream 7014. The format processing unit 7006 furthermore stores the offset table in the 3D meta data for the 2D clip information file. At this point, the positions of image data pieces within left and right video frames are automatically adjusted so that 3D video images represented by one stream avoid overlap with 3D video images represented by other streams in the same visual direction. Furthermore, the offset value for each video frame is also automatically adjusted so that depths of 3D video images represented by one stream avoid agreement with depths of 3D video images represented by other streams.

Figure 73:
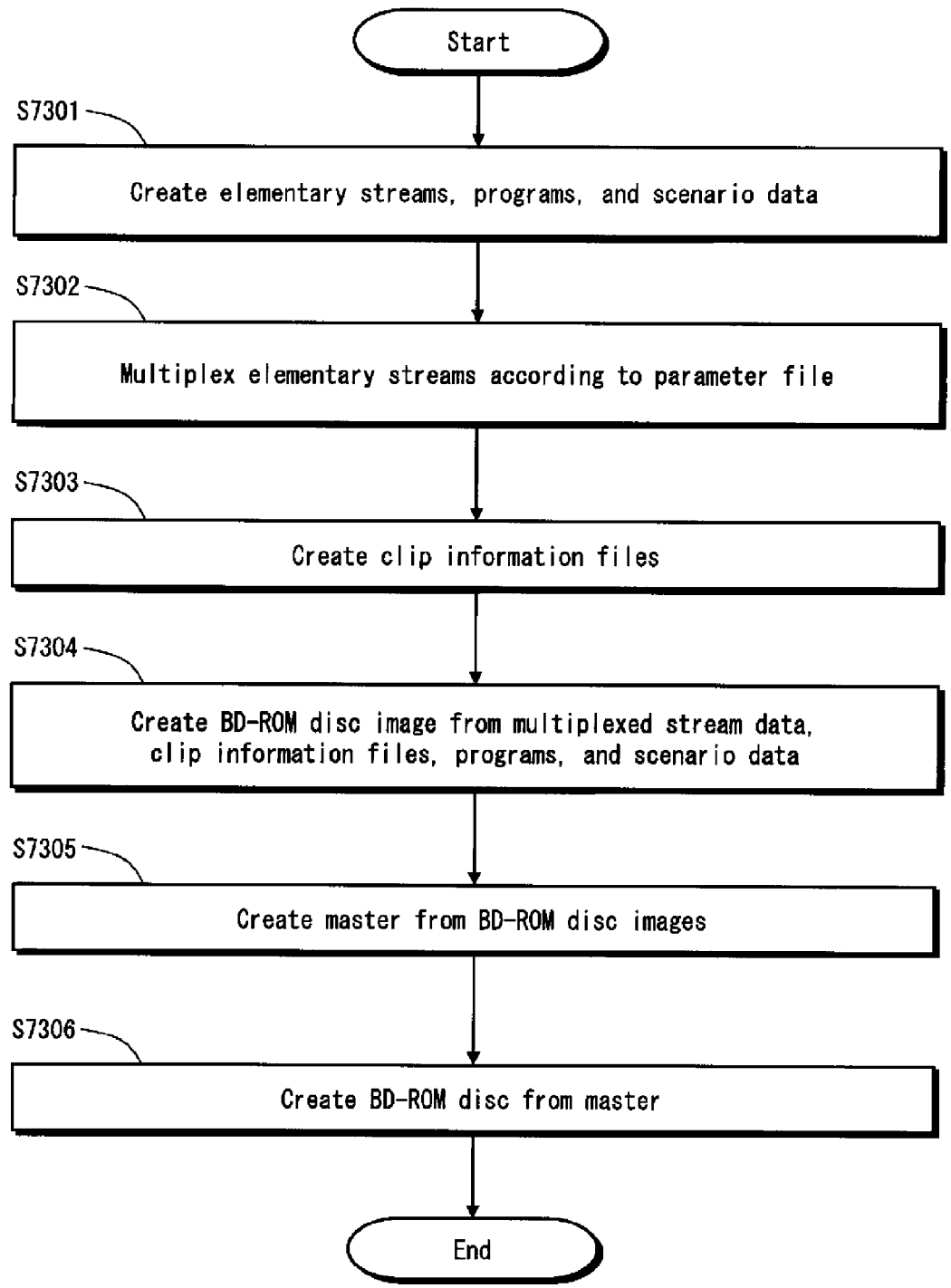
FIG. 73 is a flowchart showing a method of recording movie content to a BD-ROM disc with use of the recording device shown in FIG. 70.

FIG. 73 is a flowchart showing a method of recording movie content to a BD-ROM disc with use of the recording device shown in FIG. 70. This method is started by applying power to the recording device, for example.

In step S7301, elementary streams, programs, and scenario data to be recorded on the BD-ROM are generated. In other words, the video encoder 7001 generates frame depth information 7010 and a video stream 7011. The material creation unit 7002 creates the audio stream 7012, the PG stream 7013, and the IG stream 7014. The scenario generation unit 7003 creates the BD-ROM scenario data 7015. This created data is stored in the database unit 7007. Meanwhile, the scenario generation unit 7003 further creates the parameter file 7016 and transmits the parameter file 7016 to the multiplex processing unit 7005. Additionally, the BD-program creation unit 7004 creates a BD-J object file and a JAR file and transmits the BD-J object file and the JAR file to the format processing unit 7006. Thereafter, the processing proceeds to step S7302.

In step S7302, the multiplex processing unit 7005 reads the elementary streams 7011-7014 from the database unit 7007 according to the parameter file 7016, and multiplexes the elementary streams into MPEG2-TS format stream files. Thereafter, the processing proceeds to step S7303.

In step S7303, the multiplex processing unit 7005 creates a 2D clip information file and a dependent-view clip information file. In particular, when entry maps and extent start points are created, the extent ATC times are adjusted to be the same between contiguous data blocks. Furthermore, the sizes of the 2D extents are designed so as to satisfy Condition 1, the sizes of the base-view extents are designed so as to satisfy Condition 2, the sizes of the dependent-view extents are designed so as to satisfy Condition 3, and the sizes of the extents SS are designed so as to satisfy Condition 4. Thereafter, processing proceeds to step S7304.

In step S7304, the format processing unit 7006 creates a BD-ROM disc image 7020 with the directory structure shown in FIG. 2 with use of BD-ROM scenario data 7015 stored in the database unit 7007, program files created by the BD program creation unit 7004, and multiplexed stream data and clip information files created by the multiplexing processing unit 7005. At that time, with use of the frame depth information 7010, the format processing unit 7006 creates an offset table for each of the secondary stream 7011, the PG stream 7013, and the IG public networks. In conjunction with the type of medium ME, types of medium IF unit 1 include a disc drive, card IF, CAN tuner, Si tuner, and network IF.

The memory unit 2 temporarily stores both the data that is received or read from the medium ME by the medium IF unit 1 and data that is being processed by the integrated circuit 3. A synchronous dynamic random access memory (SDRAM), double-data-rate x synchronous dynamic random access memory (DDRx SDRAM; x=1, 2, 3, . . . ) etc. is used as the memory unit 2. The memory unit 2 is a single memory element. Alternatively, the memory unit 2 may include a plurality of memory elements.

Figure 74:
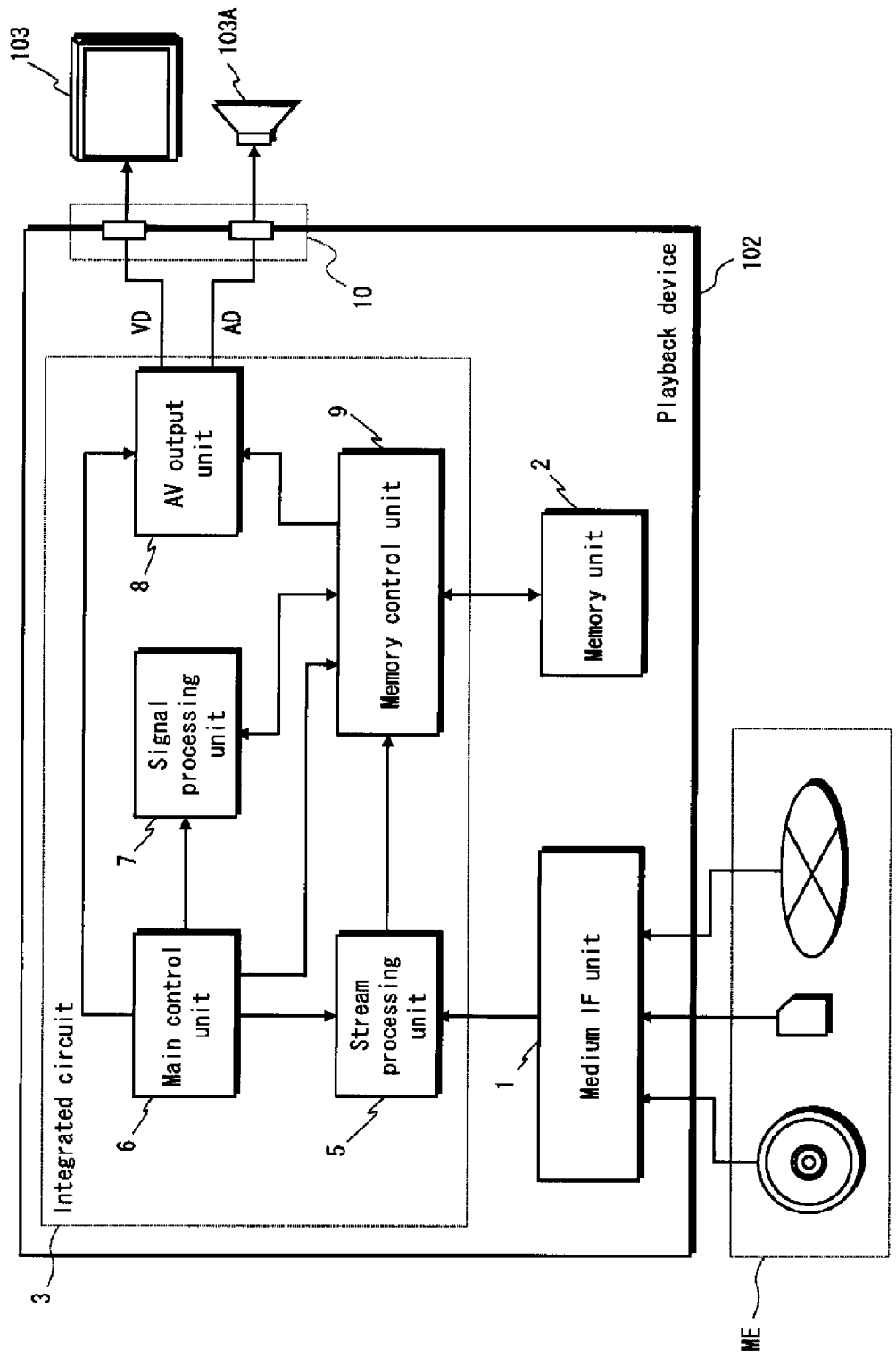
FIG. 74 is a functional block diagram of an integrated circuit 3 according to embodiment 3 of the present invention.

The integrated circuit 3 is a system LSI and performs video and audio processing on the data transmitted from the medium IF unit 1. As shown in FIG. 74, the integrated circuit 3 includes a main control unit 6, stream processing unit 5, signal processing unit 7, memory control unit 9, and AV output unit 8.

The main control unit 6 includes a processor core and program memory. The processor core includes a timer function and an interrupt function. The program memory stores basic software such as the OS. The processor core controls the entire integrated circuit 3 in accordance with the programs stored, for example, in the program memory.

Under the control of the main control unit 6, the stream processing unit 5 receives data from the medium ME transmitted via the medium IF unit 1. Furthermore, the stream processing unit 5 stores the received data in the memory unit 2 via a data bus in the integrated circuit 3. Additionally, the stream processing unit 5 separates visual data and audio data from the received data. As previously described, the data received from the medium ME includes data designed according to embodiment 1. In this case, "visual data" includes a primary video stream, secondary video streams, PG streams, and IG streams. "Audio data" includes a primary audio stream and secondary audio streams. In particular, in the data structure according to embodiment 1, main-view data and sub-view data are separated into a plurality of extents, and alternately arranged to form one series of extent blocks. When receiving the extent blocks, under the control of the main control unit 6, the stream processing unit 5 extracts the main-view data from the extent blocks and stores it in a first area in the memory unit 2, and extracts the sub-view data and stores it in the second area in the memory unit 2. The main-view data includes a left-view video stream, and the sub-view data includes a right-view video stream. The reverse may also be true. Also, a combination of a main view and a sub view may be a combination between 2D video and a depth map. The first area and second area in the memory unit 2 referred to here are a logical partition of a single memory element. Alternatively, each area may be included in physically different memory elements.

The visual data and audio data separated by the stream processing unit 5 are compressed via coding. Types of coding methods for visual data include MPEG-2, MPEG-4 AVC, MPEG-4 MVC, SMPTE VC-1, etc. Types of coding of audio data include Dolby AC-3, Dolby Digital Plus, MLP, DTS, DTS-HD, linear PCM, etc. Under the control of the main control unit 6, the signal processing unit 7 decodes the visual data and audio data via a method appropriate for the coding method used. The signal processing unit 7 corresponds, for example, to each of the decoders shown in FIG. 46.

A time (t) required by the signal processing unit 7 for decoding all data blocks in one extent block is greater than or equal to the total of the following three times ($t_1$, $t_2$, and $t_3$), where ($t_1$) is the time required by the medium IF unit 1 for reading all data blocks except for the top data block of the one extent block, ($t_2$) is the time required by the medium IF unit 1 between finishing reading the end of the one extent block and starting to read the top of the next extent block, and ($t_3$) is the time required by the medium IF unit 1 for reading the top data block in the next extent block.

The memory control unit 9 arbitrates access to the memory unit 2 by the function blocks 5-8 in the integrated circuit 3.

Under the control of the main control unit 6, the AV output unit 8 processes the visual data and audio data decoded by the signal processing unit 7 into appropriate forms and, via separate output terminals 10, outputs the results to the display device 103 and to speakers in the display device 103. Such processing of data includes superimposing visual data, converting the format of each piece of data, mixing audio data, etc.

Figure 75:
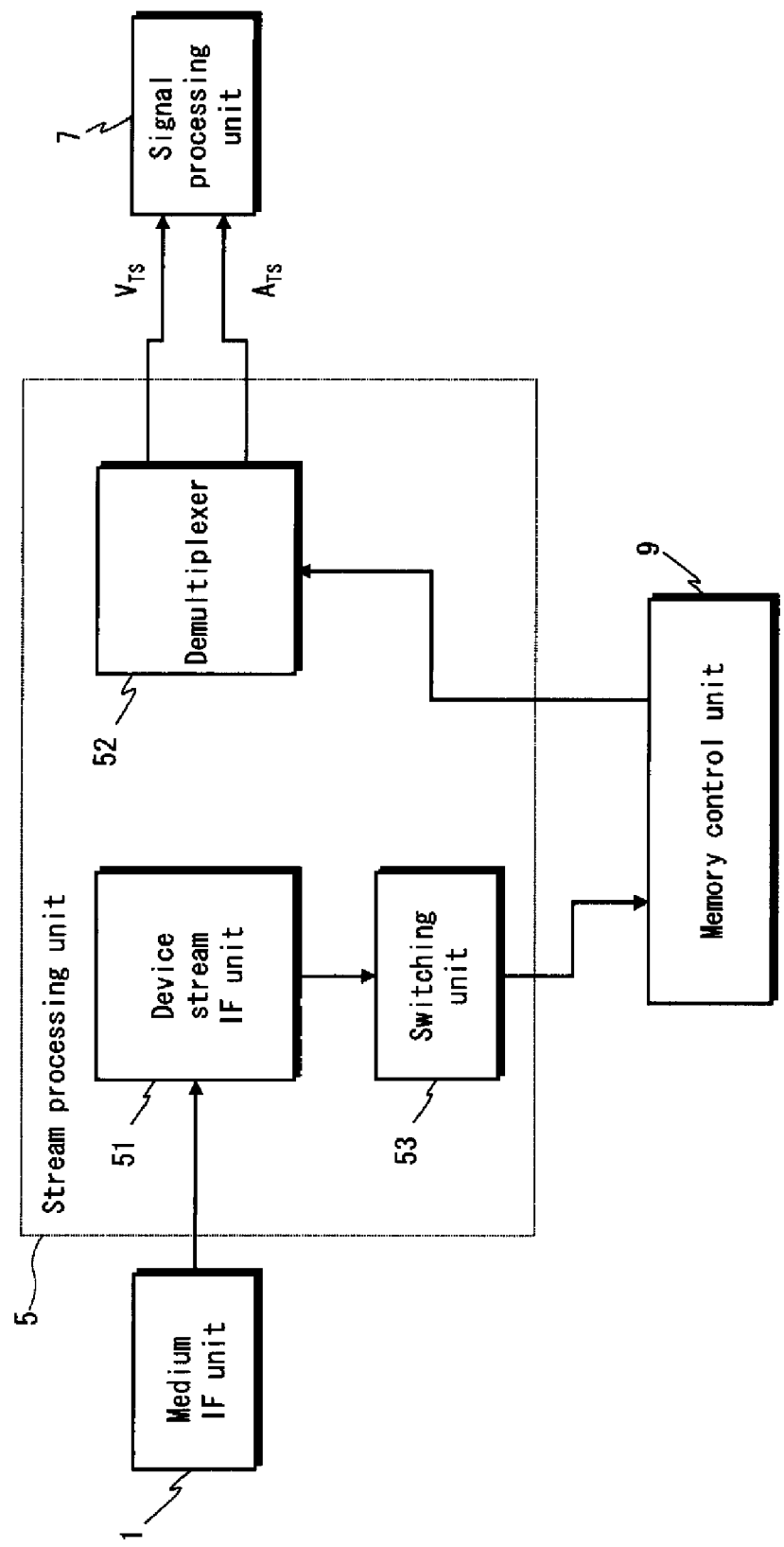
FIG. 75 is a functional block diagram showing a typical structure of the stream processing unit 5 shown in FIG. 74.

FIG. 75 is a functional block diagram showing a typical structure of the stream processing unit 5. As shown in FIG. 75, the stream processing unit 5 includes a device stream IF unit 51, a demultiplexer 52, and a switching unit 53.

The device stream IF unit 51 is an interface that transfers data between the medium IF unit 1 and the other function blocks 6-9 in the integrated circuit 3. For example, if the medium ME is an optical disc or a hard disk, the device stream IF unit 51 includes a serial advanced technology attachment (SATA), advanced technology attachment packet interface (ATAPI), or parallel advanced technology attachment (PATA). When the medium ME is a semiconductor memory such as an SD card, USB memory, etc., the device stream IF unit 51 includes a card IF. When the medium ME is a broadcast wave such as CATV or the like, the device stream IF unit 51 includes a tuner IF. When the medium ME is a network such as the Ethernet™, a wireless LAN, or wireless public network, the device stream IF unit 51 includes a network IF. Depending on the type of medium ME, the device stream IF unit 51 may achieve part of the functions of the medium IF unit 1. Conversely, when the medium IF unit 1 is internal to the integrated circuit 3, the device stream IF unit 51 may be omitted.

From the memory control unit 9, the demultiplexer 52 receives data transmitted from the medium ME to the memory unit 2 and separates visual data and audio data from the received data. Each extent included in data structured according to embodiment 1 consists of source packets for a video stream, audio stream, PG stream, IG stream, etc., as shown in FIG. 4. In some cases, however, the sub-view data may not include an audio stream. The demultiplexer 52 reads PIDs from source packets and, in accordance with the PIDs, separates a source packet group into visual TS packets $V_{TS}$ and audio TS packets $A_{TS}$. The separated TS packets $V_{TS}$ and $A_{TS}$ are transferred to the signal processing unit 7 either directly or after temporary storage in the memory unit 2. The demultiplexer 52 corresponds, for example, to the source depacketizers 4611 and 4612 and the PID filters 4613 and 4614 shown in FIG. 46.

The switching unit 53 switches the output destination in accordance with the type of data received by the device stream IF unit 51. For example, when the device stream IF unit 51 receives the main-view data, the switching unit 53 switches the storage location of the data to the first area in the memory unit 2. Conversely, when the device stream IF unit 51 receives the sub-view data, the switching unit 53 switches the storage location of the data to the second area in the memory unit 2.

Figure 76:
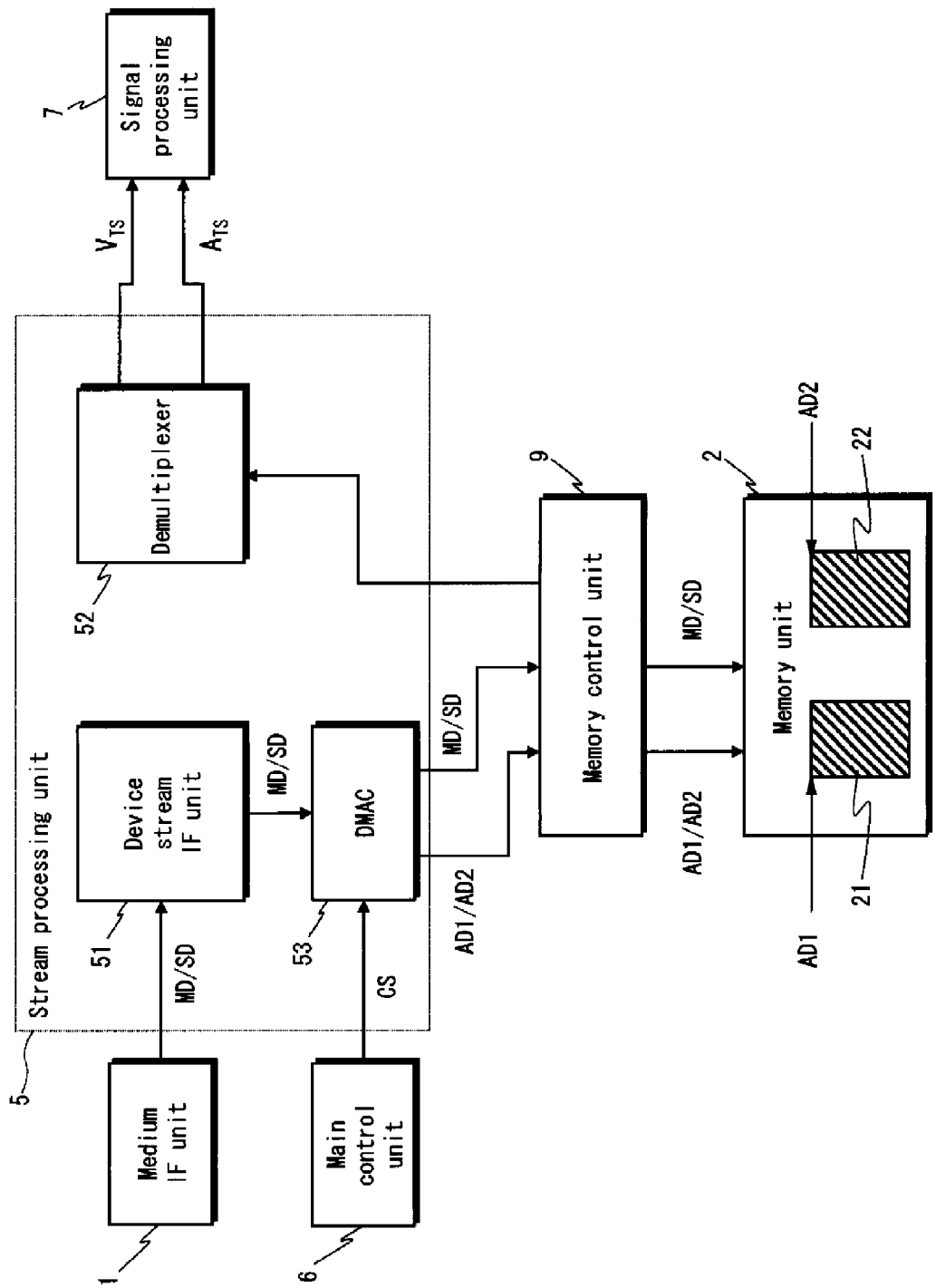
FIG. 76 is a schematic diagram showing the surrounding configuration when a switching unit 53 shown in FIG. 75 is a DMAC.

The switching unit 53 is, for example, a direct memory access controller (DMAC). FIG. 76 is a schematic diagram showing the surrounding configuration of the switching unit 53 in this case. Under the control of the main control unit 6, the DMAC 53 transmits data received by the device stream IF unit 51 as well as the address of the location for storage of the data to the memory control unit 9. Specifically, when the device stream IF unit 51 receives main-view data MD, the DMAC 53 transmits the main-view data MD along with an address 1 AD1. This "address 1 AD1" is data indicating the top address AD1 in the first storage area 21 in the memory unit 2. On the other hand, when the device stream IF unit 51 receives sub-view data SD, the DMAC 53 transmits the sub-view data SD along with an address 2 AD2. This "address 2 AD2" is data indicating the top address AD2 in the second storage area 22 in the memory unit 2. The DMAC 53 thus switches the output destination, in particular the storage location in the memory unit 2, in accordance with the type of data received by the device stream IF unit 51. The memory control unit 9 stores the main-view data MD and the sub-view data SD received from the DMAC 53 in the respective areas 21 and 22 of the memory unit 2 shown by the addresses AD1 and AD2 received simultaneously with the streams.

The main control unit 6 refers to the extent start points in the clip information file for the switching unit 53 to switch the storage location. In this case, the clip information file is received before either the main-view data MD and the sub-view data SD, and is stored in the memory unit 2. In particular, the main control unit 6 refers to the file base to recognize that the data received by the device stream IF unit 51 is the main-view data MD. Conversely, the main control unit 6 refers to the file DEP to recognize that the data received by the device stream IF unit 51 is sub-view data. Furthermore, the main control unit 6 transmits a control signal CS to the switching unit 53 in accordance with the results of recognition and causes the switching unit 53 to switch the storage location. Note that the switching unit 53 may be controlled by a dedicated control circuit separate from the main control unit 6.

In addition to the function blocks 51, 52, and 53 shown in FIG. 75, the stream processing unit 5 may be further provided with an encryption engine, a security control unit, and a controller for direct memory access. The encryption engine decrypts encrypted data, key data, etc. received by the device stream IF unit 51. The security control unit stores the private key and uses it to control execution of a device authentication protocol or the like between the medium ME and the playback device 102.

In the above example, when data received from the medium ME is stored in the memory unit 2, the storage location thereof is switched according to whether the data is a main-view stream MD or sub-view data SD. Alternatively, regardless of type, the data received from the medium ME may be temporarily stored in the same area in the memory unit 2 and separated into the main-view data MD and the sub-view stream SD when subsequently being transferred to the demultiplexer 52.

Figure 77:
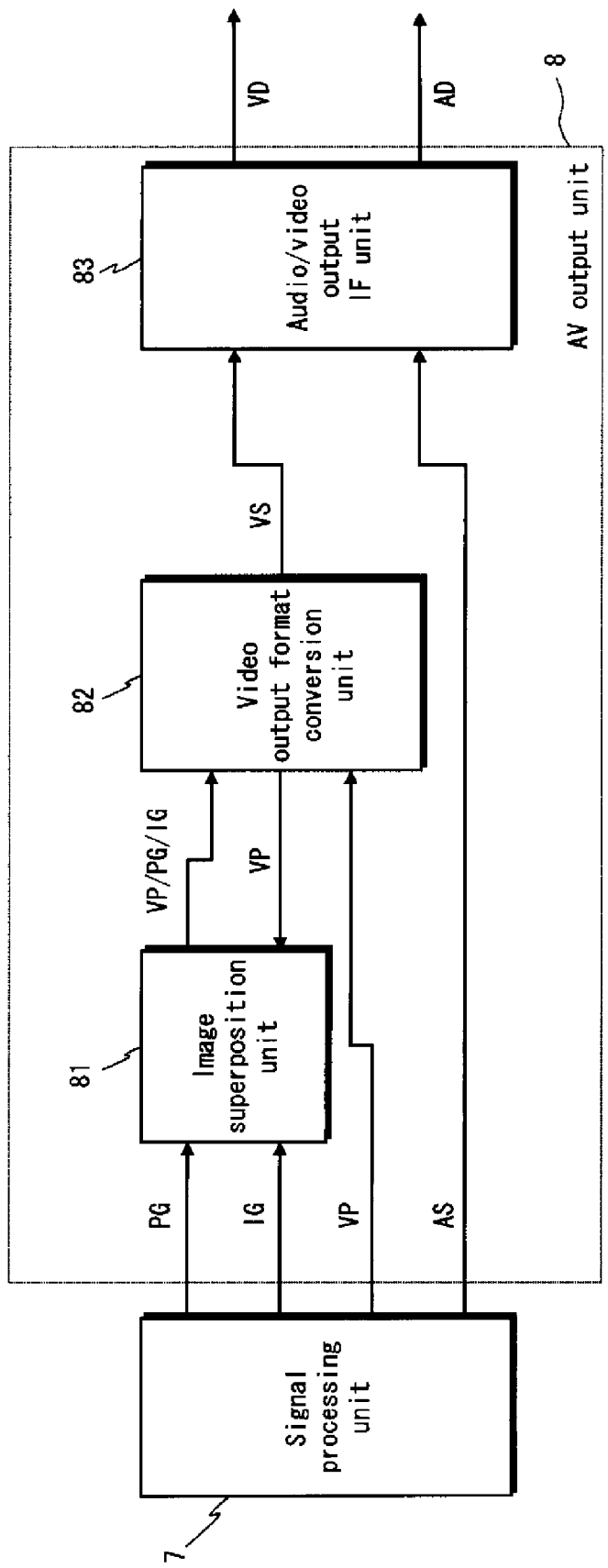
FIG. 77 is a functional block diagram showing a typical structure of the AV output unit 8 shown in FIG. 74.

FIG. 77 is a functional block diagram showing a typical structure of the AV output unit 8. As shown in FIG. 77, the AV output unit 8 is provided with an image superposition unit 81, video output format conversion unit 82, and audio/video output IF unit 83.

The image superposition unit 81 superimposes visual data VP, PG, and IG decoded by the signal processing unit 7. Specifically, the image superposition unit 81 first receives processed right-view or left-view video plane data from the video output format conversion unit 82 and decoded PG plane data PG and IG plane data IG from the signal processing unit 7. Next, the image superposition unit 81 superimposes PG plane data PG and IG plane data IG on the video plane data VP in units of pictures. The image superposition unit 81 corresponds, for example, to the plane adder 4424 shown in FIGS. 44, 46, and 47.

The video output format conversion unit 82 receives decoded video plane data VP from the signal processing unit 7 and superimposed visual data VP/PG/IG from the image superposition unit 81. Furthermore, the video output format conversion unit 82 performs various processing on the visual data VP and VP/PG/IG as necessary. Such processing includes resizing, IP conversion, noise reduction, and frame rate conversion. Resizing is processing to enlarge or reduce the size of the visual images. IP conversion is processing to convert the scanning method between progressive and interlaced. Noise reduction is processing to remove noise from the visual images. Frame rate conversion is processing to convert the frame rate. The video output format conversion unit 82 transmits processed video plane data VP to the image superposition unit 81 and transmits processed visual data VS to the audio/video output IF unit 83.

The audio/video output IF unit 83 receives visual data VS from the video output format conversion unit 82 and receives decoded audio data AS from the signal processing unit 7. Furthermore, the audio/video output IF unit 83 performs processing such as coding on the received data VS and AS in conjunction with the data transmission format. As described below, part of the audio/video output IF unit 83 may be provided externally to the integrated circuit 3.

Figure 78:
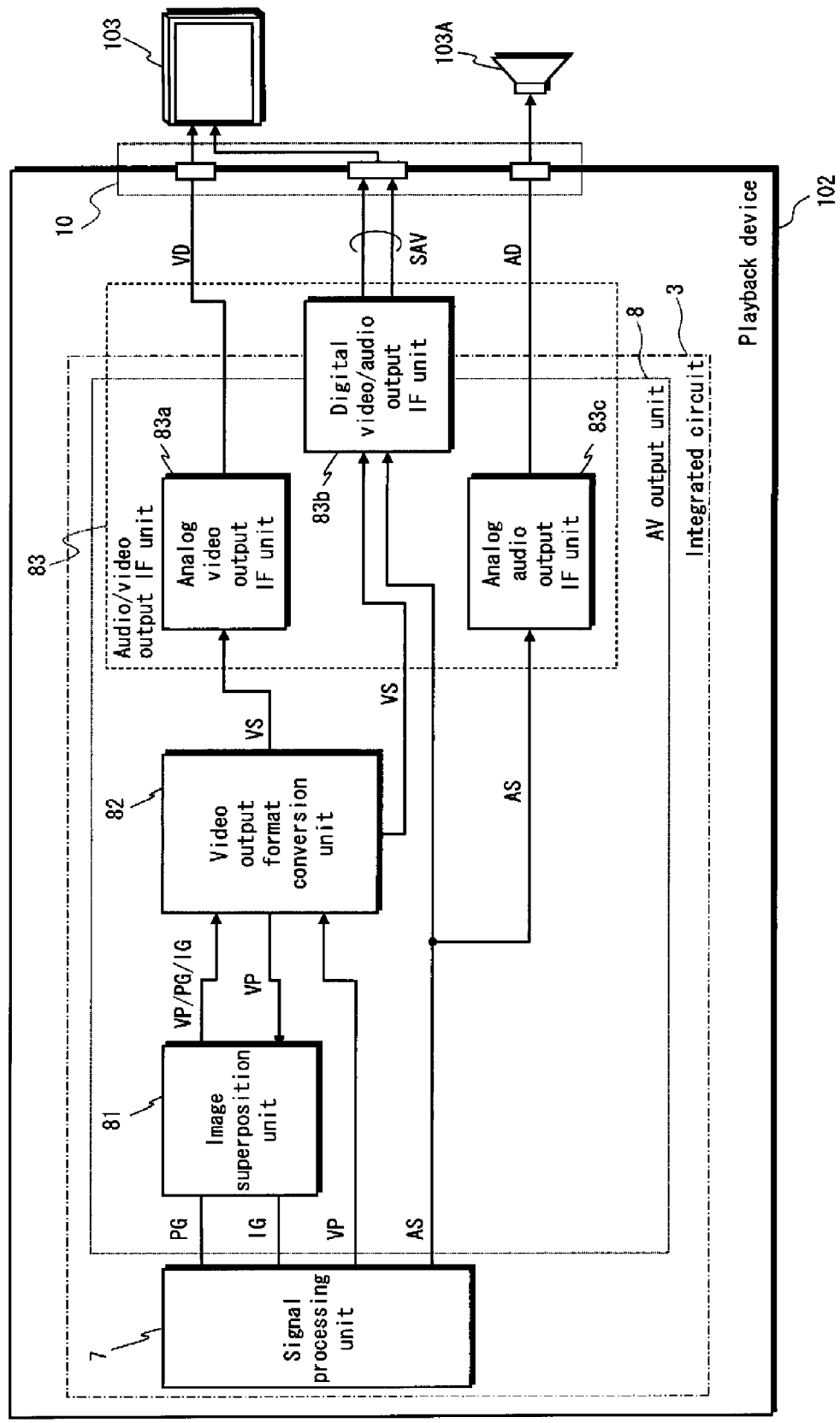
FIG. 78 is a schematic diagram showing details regarding data output by the playback device 102, which includes an AV output unit 8 shown in FIG. 77.

FIG. 78 is a schematic diagram showing details regarding data output by the playback device 102, which includes the AV output unit 8. As shown in FIG. 78, the audio/video output IF unit 83 includes an analog video output IF unit 83a, digital video/audio output IF unit 83b, and analog audio output IF unit 83c. The integrated circuit 3 and playback device 102 are thus compatible with various formats for transmitting visual data and audio data, as described below.

The analog video output IF unit 83a receives visual data VS from the video output format conversion unit 82, converts/encodes this data VS into data VD in analog video signal format, and outputs the data VD. The analog video output IF unit 83a includes a composite video encoder, S video signal (Y/C separation) encoder, component video signal encoder, D/A converter (DAC), etc. compatible with, for example, one of the following formats: NTSC, PAL, and SECAM.

The digital video/audio output IF unit 83b receives decoded audio data AS from the signal processing unit 7 and receives visual data VS from the video output format conversion unit 82. Furthermore, the digital video/audio output IF unit 83b unifies and encrypts the data AS and data VS. Afterwards, the digital video/audio output IF unit 83b encodes the encrypted data SVA in accordance with data transmission standards and outputs the result. The digital video/audio output IF unit 83b corresponds, for example, to a high-definition multimedia interface (HDMI) or the like.

The analog audio output IF unit 83c receives decoded audio data AS from the signal processing unit 7, converts this data into analog audio data AD via D/A conversion, and outputs the audio data AD. The analog audio output IF unit 83c corresponds, for example, to an audio DAC.

The transmission format for the visual data and audio data can switch in accordance with the type of the data reception device/data input terminal provided in the display device 103/speaker 103A. The transmission format can also be switched by user selection. Furthermore, the playback device 102 can transmit data for the same content not only in a single transmission format but also in multiple transmission formats in parallel.

The AV output unit 8 may be further provided with a graphics engine in addition to the function blocks 81, 82, and 83 shown in FIGS. 77 and 78. The graphics engine performs graphics processing, such as filtering, screen composition, curve rendering, and 3D presentation processing on the data decoded by the signal processing unit 7.

The function blocks shown in FIGS. 74, 75, 77, and 78 are included in the integrated circuit 3. This is not a requirement, however, and part of the function blocks may be external ,to the integrated circuit 3. Also, unlike the structure shown in FIG. 74, the memory unit 2 may be included in the integrated circuit 3. Further more, the main control unit 6 and signal processing unit 7 need not be completely separate function blocks. The main control unit 6 may, for example, perform part of the processing corresponding to the signal processing unit 7.

Figure 79A:
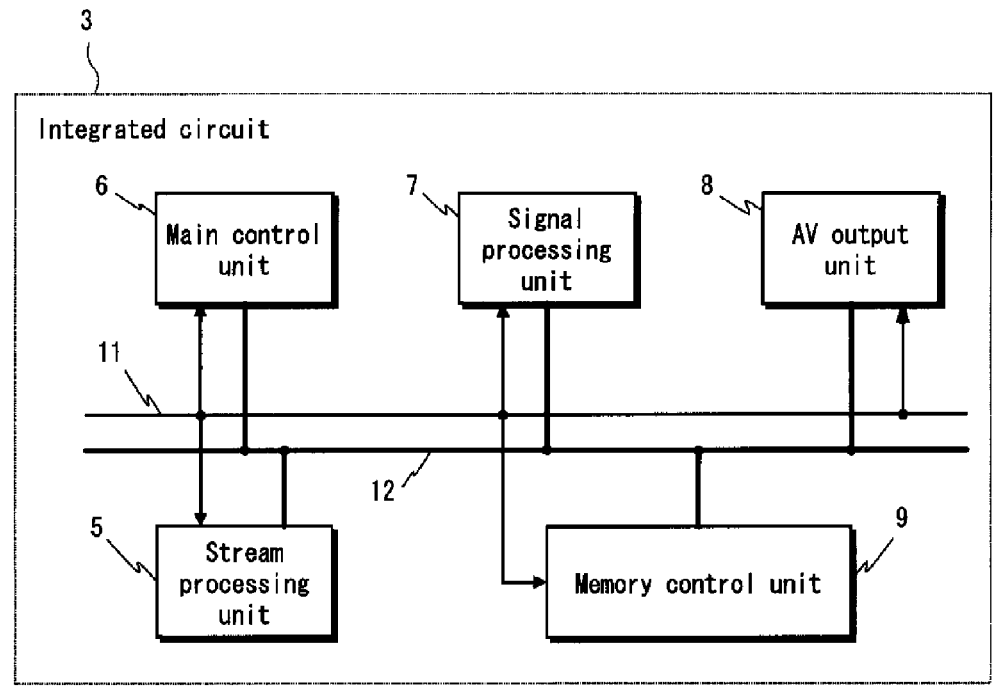
FIGS. 79A and 79B are schematic diagrams showing examples of the topology of a control bus and data bus in the integrated circuit 3 shown in FIG. 74.
Figure 79B:
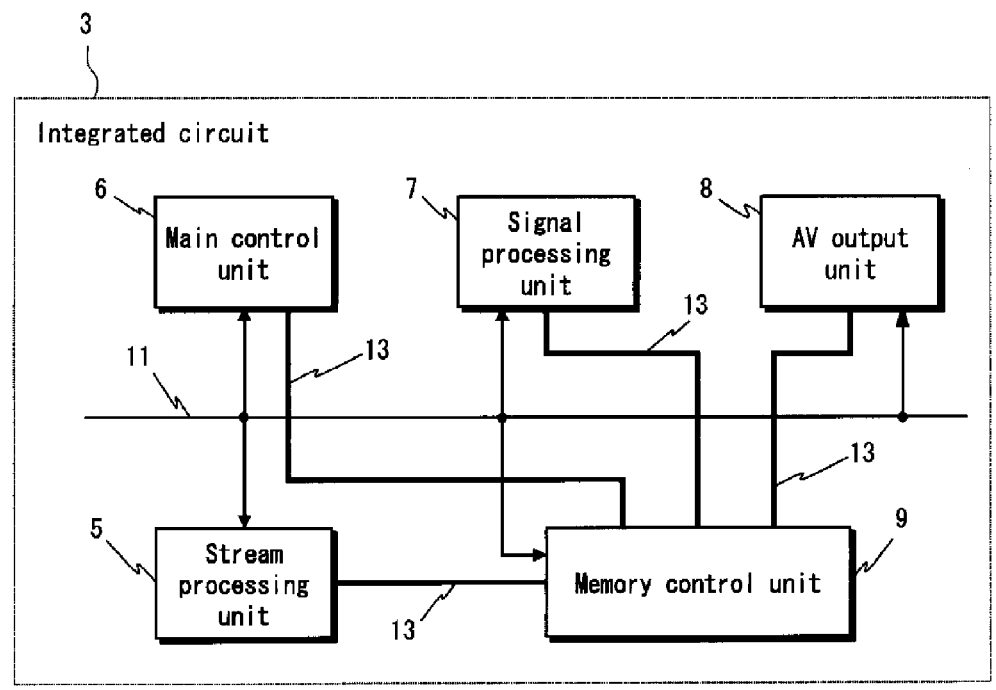

The topology of the control bus and data bus that connect the function blocks in the integrated circuit 3 may be selected in accordance with the order and the type of the processing by each function block. FIGS. 79A and 79B are schematic diagrams showing examples of the topology of a control bus and data bus in the integrated circuit 3. As shown in FIG. 79A, both the control bus 11 and data bus 12 are designed so as to directly connect each of the function blocks 5-9 with all of the other function blocks. Alternatively, as shown in FIG. 79B, the data bus 13 may be designed so as to directly connect each of the function blocks 5-8 with only the memory control unit 9. In this case, each of the function blocks 5-8 transmits data to the other function blocks via the memory control unit 9 and, additionally, the memory unit 2.

Instead of an LSI integrated on a single chip, the integrated circuit 3 may be a multi-chip module. In this case, since the plurality of chips composing the integrated circuit 3 are sealed in a single package, the integrated circuit 3 looks like a single LSI. Alternatively, the integrated circuit 3 may be designed using a field programmable gate array (FPGA) or a reconfigurable processor. An FPGA is an LSI that can be programmed after manufacture. A reconfigurable processor is an LSI whose connections between internal circuit cells and settings for each circuit cell can be reconfigured.

<Playback Processing by the Playback Device 102 Using the Integrated Circuit 3>

Figure 80:
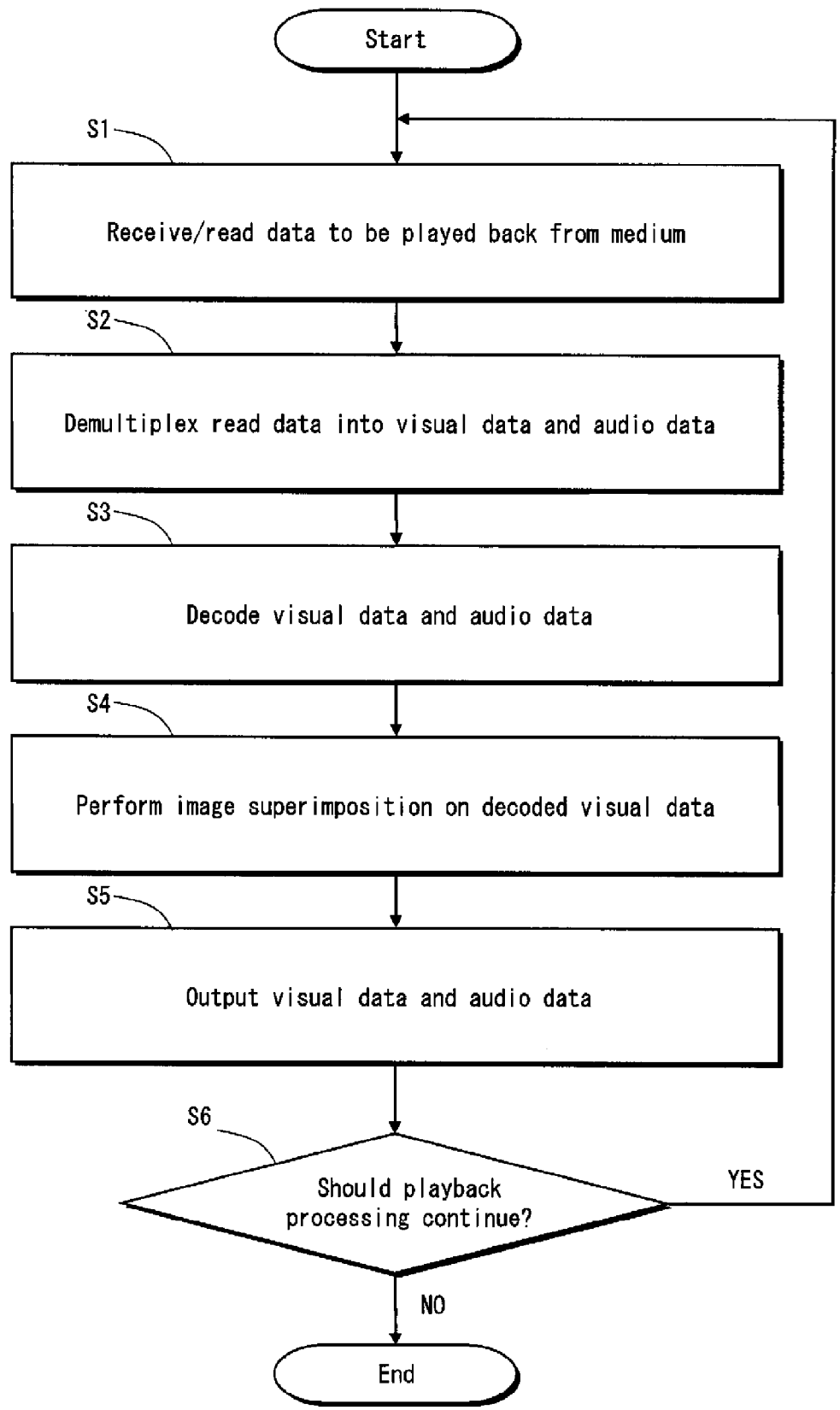
FIG. 80 is a flowchart of playback processing by the playback device 102 that uses the integrated circuit 3 shown in FIG. 74.

FIG. 80 is a flowchart of playback processing by a playback device 102 that uses the integrated circuit 3. This playback processing begins when the medium IF unit 1 is connected to the medium ME so as to be capable of data transmission, as for example when an optical disc is inserted into the disc drive. During this processing, the playback device 102 receives data from the medium ME and decodes the data. Subsequently, the playback device 102 outputs the decoded data as a video signal and an audio signal.

In step S1, the medium IF unit 1 receives or reads data from the medium ME and transmits the data to the stream processing unit 5. Processing then proceeds to step S2.

In step S2, the stream processing unit 5 separates the data received or read in step S1 into visual data and audio data. Processing then proceeds to step S3.

In step S3, the signal processing unit 7 decodes each piece of data separated in step S2 by the stream processing unit 5 using a method appropriate for the coding method. Processing then proceeds to step S4.

In step S4, the AV output unit 8 superimposes the pieces of visual data decoded by the signal processing unit 7 in step S3. Processing then proceeds to step S5.

In step S5, the AV output unit 8 outputs the visual data and audio data processed in steps S2-4. Processing then proceeds to step S6.

In step S6, the main control unit 6 determines whether the playback device 102 should continue playback processing. When, for example, data that is to be newly received or read from the medium ME via the medium IF unit 1 remains, processing is repeated starting at step S1. Conversely, processing ends when the medium IF unit 1 stops receiving or reading data from the medium ME due to the optical disc being removed from the disc drive, the user indicating to stop playback, etc.

FIG. 81 is a flowchart showing details on steps S1-6 shown in FIG. 80. The steps S101-110 shown in FIG. 81 are performed under the control of the main control unit 6. Step S101 corresponds mainly to details on step S1, steps S102-S104 correspond mainly to details on step S2, step S105 corresponds mainly to details on step S3, steps S106-S108 correspond mainly to details on step S4, and steps S109 and S110 correspond mainly to details on step S5.

In step S101, before reading or receiving from the medium ME, via the medium IF unit 1, data to be played back, the device stream IF unit 51 reads or receives data necessary for such playback, such as a playlist and clip information file. Furthermore, the device stream IF unit 51 stores this data in the memory unit 2 via the memory control unit 9. Processing then proceeds to step S102.

In step S102, from the stream attribute information included in the clip information file, the main control unit 6 identifies the coding method of the video data and audio data stored in the medium ME. Furthermore, the main control unit 6 initializes the signal processing unit 7 so that decoding can be performed in accordance with the identified coding method. Processing then proceeds to step S103.

In step S103, the device stream IF unit 51 receives or reads video data and audio data for playback from the medium ME via the medium IF unit 1. In particular, this data is received or read in units of extents. Furthermore, the device stream IF unit 51 stores this data in the memory unit 2 via the switching unit 53 and the memory control unit 9. When the main-view data is received or read, the main control unit 6 switches the storage location of the data to the first area in the memory unit 2 by controlling the switching unit 53. Conversely, when the sub-view stream is received or read, the main control unit 6 switches the storage location of the data to the second area in the memory unit 2 by controlling the switching unit 53. Processing then proceeds to step S104.

In step S104, the data stored in the memory unit 2 is transferred to the demultiplexer 52 in the stream processing unit 5. The demultiplexer 52 first reads a PID from each source packet composing the data. Next, in accordance with the PID, the demultiplexer 52 identifies whether the TS packets included in the source packet are visual data or audio data. Furthermore, in accordance with the results of identification, the demultiplexer 52 transmits each TS packet to the corresponding decoder in the signal processing unit 7. Processing then proceeds to step S105.

In step S105, each decoder in the signal processing unit 7 decodes transmitted TS packets using an appropriate method. Processing then proceeds to step S106.

In step S106, each picture in the left-view video stream and right-view video stream that were decoded in the signal processing unit 7 are transmitted to the video output format conversion unit 82. The video output format conversion unit 82 resizes these pictures to match the resolution of the display device 103. Processing then proceeds to step S107.

In step S107, the image superposition unit 81 receives video plane data, which is composed of pictures resized in step S106, from the video output format conversion unit 82. On the other hand, the image superposition unit 81 receives decoded PG plane data and IG plane data from the signal processing unit 7. Furthermore, the image superposition unit 81 superimposes these pieces of plane data. Processing then proceeds to step S108.

In step S108, the video output format conversion unit 82 receives the plane data superimposed in step S107 from the image superposition unit 81. Furthermore, the video output format conversion unit 82 performs IP conversion on this plane data. Processing then proceeds to step S109.

In step S109, the audio/video output IF unit 83 receives visual data that has undergone IP conversion in step S108 from the video output format conversion unit 82 and receives decoded audio data from the signal processing unit 7. Furthermore, the audio/video output IF unit 83 performs coding, D/A conversion, etc. on these pieces of data in accordance with the data output format in the display device 103/speaker 103A and with the format for transmitting data to the display device 103/speaker 103A. The visual data and audio data are thus converted into either an analog output format or a digital output format. Analog output formats of visual data include, for example, a composite video signal, S video signal, component video signal, etc. Digital output formats of visual data/audio data include HDMI or the like. Processing then proceeds to step S110.

In step S110, the audio/video output IF unit 83 transmits the audio data and visual data processed in step S109 to the display device 103/speaker 103A. Processing then proceeds to step S6, for which the above description is cited.

Each time data is processed in each of the above steps, the results are temporarily stored in the memory unit 2. The resizing and IP conversion by the video output format conversion unit 82 in steps S106 and S108 may be omitted as necessary. Furthermore, in addition to or in lieu of these processes, other processing such as noise reduction, frame rate conversion, etc. may be performed. The order of processing may also be changed wherever possible.

<Supplementary Explanation>
<<Principle of 3D Video Image Playback>>

Playback methods of 3D video images are roughly classified into two categories: methods using a holographic technique, and methods using parallax video.

A method using a holographic technique is characterized by allowing a viewer to perceive objects in video as stereoscopic by giving the viewer's visual perception substantially the same information as optical information provided to visual perception by human beings of actual objects. However, although a technical theory for utilizing these methods for moving video display has been established, it is extremely difficult to construct, with present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of a viewer's eyes for the same scene, i.e. the pair of a left-view and a right-view. A method using a parallax video is characterized by playing back the left-view and right-view of a single scene so that the viewer sees each view in only one eye, thereby allowing the user to perceive the scene as stereoscopic.

Figure 82B:
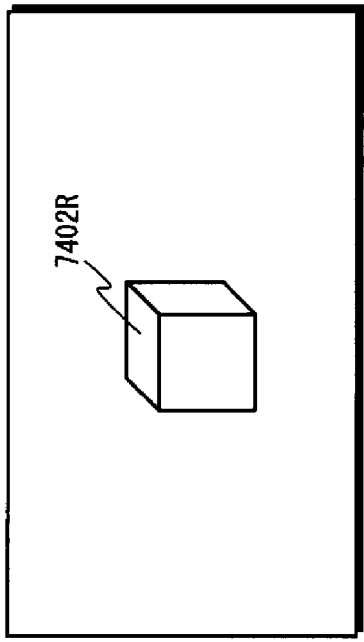
FIGS. 82A, 82B, and 82C are schematic diagrams illustrating the principle of playing back 3D video images according to a method using parallax video images.
Figure 82C:
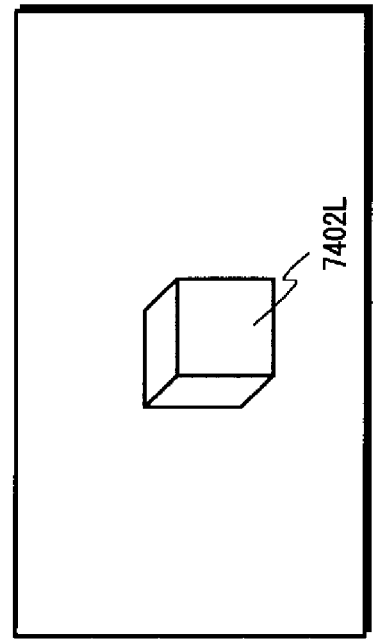
Figure 82A:
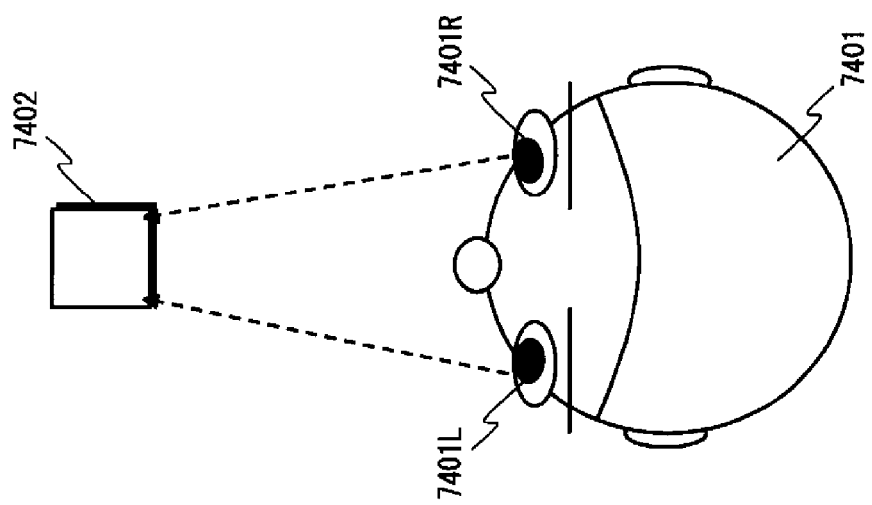
Figure 84:
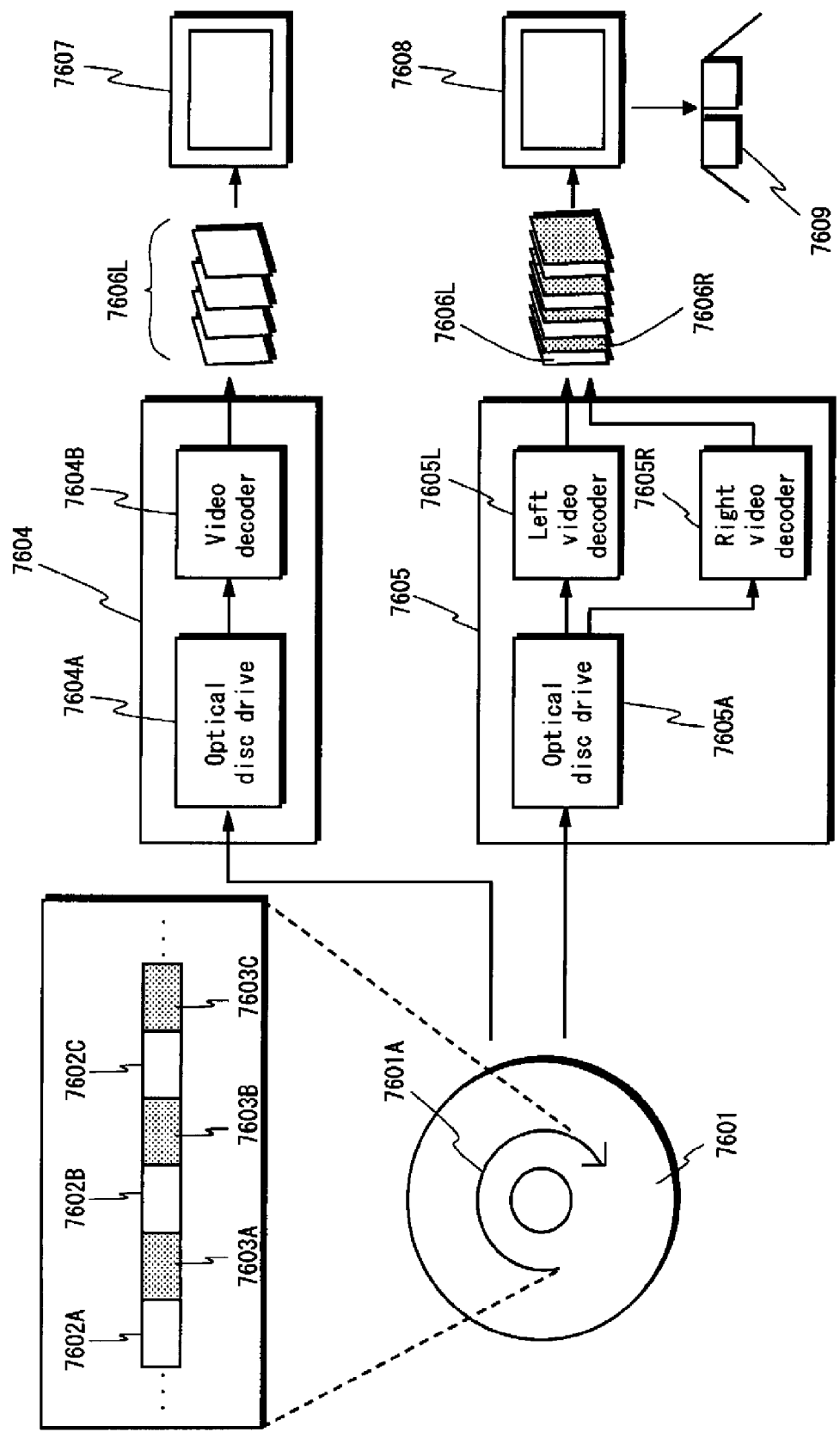
FIG. 84 is a schematic diagram showing a technology to guarantee compatibility of an optical disc on which 3D video content is recorded with a 2D playback device.

FIGS. 82A, 82B, 82C are schematic diagrams illustrating the principle of playing back 3D video images (stereoscopic video) according to a method using parallax video. FIG. 82A is a top view of a viewer 7901 looking at a cube 7402 placed directly in front of the viewer's face. FIGS. 82B and 82C are schematic diagrams showing the outer appearance of the cube 7402 as a 2D video image as perceived respectively by the left eye 7401L and the right eye 7401R of the viewer 7401. As is clear from comparing FIG. 82B and FIG. 82C, the outer appearances of the cube 7402 as perceived by the eyes are slightly different. The difference in the outer appearances, i.e., the binocular parallax allows the viewer 7401 to recognize the cube 7402 as three-dimensional. Thus, according to a method using parallax video, left and right 2D video images with different viewpoints are first prepared for a single scene. For example, for the cube 7402 shown in FIG. 82A, the left view of the cube 7402 shown in FIG. 82B and the right view shown in FIG. 82C are prepared. At this point, the position of each viewpoint is determined by the binocular parallax of the viewer 7401. Next, each video image is played back so as to be perceived only by the corresponding eye of the viewer 7401. Consequently, the viewer 7401 recognizes the scene played back on the screen, i.e., the video image of the cube 7402, as stereoscopic. Unlike methods using a holography technique, methods using parallax video thus have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, and two-color separation methods.

In alternate frame sequencing, left and right 2D video images are alternately displayed on a screen for a predetermined time, while the viewer observes the screen using shutter glasses. Here, each lens in the shutter glasses is, for example, formed by a liquid crystal panel. The lenses pass or block light in a uniform and alternate manner in synchronization with switching of the 2D video images on the screen.

That is, each lens functions as a shutter that periodically blocks an eye of the viewer. More specifically, while a left video image is displayed on the screen, the shutter glasses make the left-side lens transmit light and the right-hand side lens block light. Conversely, while a right video image is displayed on the screen, the shutter glasses make the right-side glass transmit light and the left-side lens block light. As a result, the viewer sees afterimages of the right and left video images overlaid on each other and thus perceives a single 3D video image.

According to the alternate-frame sequencing, as described previously, right and left video images are alternately displayed in a predetermined cycle. For example, when 24 video frames are displayed per second for playing back a normal 2D movie, 48 video frames in total for both right and left eyes need to be displayed for a 3D movie. Accordingly, a display device capable of quickly executing rewriting of the screen is preferred for this method.

In a method using a lenticular lens, a right video frame and a left video frame are respectively divided into reed-shaped small and narrow areas whose longitudinal sides lie in the vertical direction of the screen. In the screen, the small areas of the right video frame and the small areas of the left video frame are alternately arranged in the landscape direction of the screen and displayed at the same time. Here, the surface of the screen is covered by a lenticular lens. The lenticular lens is a sheet-shaped lens constituted from parallel-arranged multiple long and thin hog-backed lenses. Each hog-backed lens lies in the longitudinal direction on the surface of the screen. When a viewer sees the left and right video frames through the lenticular lens, only the viewer's left eye perceives light from the display areas of the left video frame, and only the viewer's right eye perceives light from the display areas of the right video frame. This is how the viewer sees a 3D video image from the parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the display through polarization glasses. Here, for the polarization glasses, a longitudinal polarization filter is provided for the left lens, and a lateral polarization filter is provided for the right lens. Consequently, the right and left video images are each perceived only by the corresponding eye, thereby allowing the viewer to perceive a stereoscopic video image.

In a method using parallax video, in addition to being constructed from the start by a combination of left and right video images, the 3D video content can also be constructed from a combination of 2D video images and a depth map. The 2D video images represent 3D video images projected on a hypothetical 2D picture plane, and the depth map represents the depth of each pixel in each portion of the 3D video image as compared to the 2D picture plane. When the 3D content is constructed from a combination of 2D video images with a depth map, the 3D playback device or the display device first constructs left and right video images from the combination of 2D video images with a depth map and then creates 3D video images from these left and right video images using one of the above-described methods.

FIG. 83 is a schematic diagram showing an example of constructing a left-view 7503L and a right-view 7503R from a combination of a 2D video image 7501 and a depth map 7502. As shown in FIG. 83, a circular plate 7511 is shown in the background 7512 of the 2D video image 7501. The depth map 7502 indicates the depth for each pixel in each portion of the 2D video image 7501. According to the depth map 7502, in the 2D video image 7501, the display area 7521 of the circular plate 7511 is closer to the viewer than the screen, and the display area 7522 of the background 7512 is deeper than the screen. The parallax video generation unit 7500 in the playback device 102 first calculates the binocular parallax for each portion of the 2D video image 7501 using the depth of each portion indicated by the depth map 7502. Next, the parallax video generation unit 7500 shifts the presentation position of each portion in the 2D video image 7501 in accordance with the calculated binocular parallax to construct the left-view 7503L and the right-view 7503L. In the example shown in FIG. 83, the parallax video generation unit 7500 shifts the presentation position of the circular plate 7511 in the 2D video image 7501 as follows: the presentation position of the circular plate 7531L in the left-view 7503L is shifted to the right by half of its binocular parallax, S1, and the presentation position of the circular plate 7531R in the right-view 7503L is shifted to the left by half of its binocular parallax, S1. In this way, the viewer perceives the circular plate 7511 as being closer than the screen. Conversely, the parallax video generation unit 7500 shifts the presentation position of the background 7512 in the 2D video image 7501 as follows: the presentation position of the background 7532L in the left-view 7503L is shifted to the left by half of its binocular parallax, S2, and the presentation position of the background 7532R in the right-view 7503R is shifted to the right by half of its binocular parallax, S2. In this way, the viewer perceives the background 7512 as being deeper than the screen.

A playback system for 3D video images with use of parallax video has already been established for use in movie theaters, attractions in amusement parks, and the like. Accordingly, this method is also useful for implementing home theater systems that can play back 3D video images. In the embodiments of the present invention, among methods using parallax video, an alternate-frame sequencing method or a method using polarization glasses is assumed to be used. However, apart from these methods, the present invention can also be applied to other, different methods, as long as they use parallax video. This will be obvious to those skilled in the art from the above explanation of the embodiments.

<<File System Recorded on BD-ROM Disc>>

When UDF is used as the file system, the volume area 202B shown in FIG. 2 generally includes areas in which a plurality of directories, a file set descriptor, and a terminating descriptor are respectively recorded. Each "directory" is a data group composing the directory. The "file set descriptor" indicates the LBN of a sector in which a file entry for the root directory is stored. The "terminating descriptor" indicates the termination of the recording area for the file set descriptor.

Each directory shares a common data structure. The directory especially includes a file entry, a directory file, and a subordinate file group.

The "file entry" includes a descriptor tag, Information Control Block (ICB) tag, and an allocation descriptor. The "descriptor tag" indicates that the type of the data that includes the descriptor tag is a file entry. For example, when the value of the descriptor tag is "261", the type of that data is a file entry. The "ICB tag" indicates attribute information for the file entry itself. The "allocation descriptor" indicates the LBN of the sector on which the directory file belonging to the same directory is recorded.

The "directory file" typically includes several of each of a file identifier descriptor for a subordinate directory and a file identifier descriptor for a subordinate file. The "file identifier descriptor for a subordinate directory" is information for accessing the subordinate directory located directly below the directory. The file identifier descriptor for a subordinate directory includes identification information for the subordinate directory, a directory name length, a file entry address, and an actual directory name. In particular, the file entry address indicates the LBN of the sector on which the file entry of the subordinate directory is recorded. The "file identifier descriptor for a subordinate file" is information for accessing the subordinate file located directly below the directory. The file identifier descriptor for a subordinate file includes identification information for the subordinate file, a file name length, a file entry address, and an actual file name. In particular, the file entry address indicates the LBN of the sector on which the file entry of the subordinate file is recorded. The "file entry of the subordinate file", as described below, includes address information for the data constituting the actual subordinate file.

By tracing the file set descriptors and the file identifier descriptors of subordinate directories/files in order, the file entry of an arbitrary directory/file recorded on the volume area 202B can be accessed. Specifically, first, the file entry of the root directory is specified from the file set descriptor, and the directory file for the root directory is specified from the allocation descriptor in this file entry. Next, the file identifier descriptor for the directory is detected from the directory file, and the file entry for the directory is specified from the file entry address therein. Furthermore, the directory file for the directory is specified from the allocation descriptor in the file entry. Subsequently, from within the directory file, the file entry for the subordinate file is specified from the file entry address in the file identifier descriptor for the subordinate file.

The "subordinate file" includes extents and a file entry. The "extents" are a generally multiple in number and are data sequences whose logical addresses, i.e. LBNs, are consecutive on the disc. The entirety of the extents comprise the actual subordinate file. The "file entry" includes a descriptor tag, an ICB tag, and allocation descriptors. The "descriptor tag" indicates that the type of the data that includes the descriptor tag is a file entry. The "ICB tag" indicates attribute information of the actual file entry. The "allocation descriptors" are provided in a one-to-one correspondence with each extent and indicate the arrangement of each extent on the volume area 202B, specifically the size of each extent and the LBN for the top of the extent. Alternatively, by making the LBNs consecutive between areas that indicate allocation descriptors, these allocation descriptors taken as a whole may indicate the allocation of one extent. As shown by the dashed lines with an arrow, by referring to each allocation descriptor and each extent can be accessed. Also, the two most significant bits of each allocation descriptor indicate whether an extent is actually recorded on the sector for the LBN indicated by the allocation descriptor. More specifically, when the two most significant bits indicate "0", an extent has been assigned to the sector and has been actually recorded thereat. When the two most significant bits indicate "1", an extent has been assigned to the sector but has not been yet recorded thereat.

Like the above-described file system employing a UDF, when each file recorded on the volume area 202B is divided into a plurality of extents, the file system for the volume area 202B also generally stores the information showing the locations of the extents, as with the above-mentioned allocation descriptors, in the volume area 202B. By referring to the information, the location of each extent, particularly the logical address thereof, can be found.

<<Data Distribution via Broadcasting or Communication Circuit>>

The recording medium according to embodiment 1 of the present invention may be, in addition to an optical disc, a general removable medium available as a package medium, such as a portable semiconductor memory device including an SD memory card. Also, embodiment 1 describes an example of an optical disc in which data has been recorded beforehand, namely, a conventionally available read-only optical disc such as a BD-ROM or a DVD-ROM. However, the embodiment of the present invention is not limited to these. For example, when a terminal device writes a 3D video content that has been distributed via broadcasting or a network into a conventionally available writable optical disc such as a BD-RE or a DVD-RAM, arrangement of the extents according to the above-described embodiment may be used. Here, the terminal device may be incorporated in a playback device, or may be a device different from the playback device.

<<Playback of Semiconductor Memory Card>>

The following describes a data read unit of a playback device in the case where a semiconductor memory card is used as the recording medium according to embodiment 1 of the present invention instead of an optical disc.

A part of the playback device that reads data from an optical disc is composed of, for example, an optical disc drive. Conversely, a part of the playback device that reads data from a semiconductor memory card is composed of an exclusive interface (I/F). Specifically, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<<Copyright Protection Technique for Data Stored in BD-ROM Disc>>

Here, the mechanism for protecting copyright of data recorded on a BD-ROM disc is described, as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon another part of the data necessary for generating the "key", namely, a media key block (MKB), and encrypted data of the "key", namely, an encrypted title key. The device key, the MKB, and the encrypted title key are associated with one another, and each are further associated with a particular ID written into a BCA 201 recorded on the BD-ROM disc 101 shown in FIG. 2, namely, a volume ID. When the combination of the device key, the MKB, the encrypted title key, and the volume ID is not correct, the encrypted data cannot be decoded. In other words, only when the combination is correct, the above-mentioned "key", namely the title key, can be generated. Specifically, the encrypted title key is first decrypted using the device key, the MKB, and the volume ID. Only when the title key can be obtained as a result of the decryption, the encrypted data can be decoded using the title key as the above-mentioned "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and in particular to a portable semiconductor memory card such as an SD card.

<<Recording Data on a.Recording Medium through Electronic Distribution>>

The following describes processing to transmit data, such as an AV stream file for 3D video images (hereinafter, "distribution data"), to the playback device according to embodiment 1 of the present invention via electronic distribution and to cause the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. At this point, the playback device reads identification information of the SD memory card from the SD memory card and transmits the read identification information to the distribution server together with the transmission request. The identification information of the SD memory card is, for example, an identification number specific to the SD memory card and, more specifically, is a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. The encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have a risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information and records them in the SD memory card via the exclusive I/F of the card slot.

Encrypted distribution data recorded on the SD memory card is decrypted using the public key information in the following manner, for example. First, three types of checks are performed as authentication of the public key information. These checks may be performed in any order.

(1) Does the identification information of the SD memory card included in the public key information match the identification number stored in the SD memory card inserted into the card slot?

(2) Does a hash value calculated based on the public key information match the hash value included in the signature information?

(3) Is the playback device excluded from the device list indicated by the public key information, and specifically, is the device key of the playback device excluded from the device list?

If at least any one of the results of the checks (1) to (3) is negative, the playback device stops decryption processing of the encrypted data. Conversely, if all of the results of the checks (1) to (3) are affirmative, the playback device authorizes the public key information and decrypts the encrypted title key included in the public key information using the device key, the MKB, and the identification information of the SD memory card, thereby obtaining a title key. The playback device further decrypts the encrypted data using the title key, thereby obtaining, for example, a video stream and/or an audio stream.

The above mechanism has the following advantage. If a playback device, compositional elements, and a function (program) that have the risk of being used in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to realize an illegal copy of the SD memory card easily. In other words, if the tampering allows generation of a plurality of semiconductor memory cards having the same identification information, it is impossible to distinguish between authorized products and unauthorized copy products by performing the above check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, then when an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that it is preferable that the above-described application program check whether the application program itself has been tampered with before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<<Application to Real-Time Recording>>

Embodiment 2 of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file on a writable recording medium such as a BD-RE disc, a BD-R disc, a hard disk, or a semiconductor memory card (hereinafter, "BD-RE disc or the like") and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. At this time, an "is_angle_change" flag is added to the entry point. The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<<Managed Copy>>

The playback device according to embodiment 1 of the present invention may write a digital stream recorded on the BD-ROM disc 101 on another recording medium via a managed copy. Here, managed copy refers to a technique for permitting copy of a digital stream, a playlist file, a clip information file, and an application program from a read-only recording medium such as a BD-ROM disc to a writable recording medium only in the case where authentication via communication with the server succeeds. This writable recording medium may be a writable optical disc, such as a BD-R, BD-RE, DVD-R, DVD-RW, or DVD-RAM, a hard disk, or a portable semiconductor memory device such as an SD memory card, Memory Stick™, Compact Flash™, Smart Media™ or Multimedia Cardm. A managed copy allows for limitation of the number of backups of data recorded on a read-only recording medium and for charging a fee for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. This "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<<Method for Describing Data Structure>>

Among the data structures in embodiment 1 of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in embodiment 1 is described using a high level programming language. Accordingly, the data structure is converted by a computer into a computer readable code via the translation process performed by a compiler, which includes "syntax analysis", "optimization", "resource allocation", and "code generation", and the data structure is then recorded on the recording medium. By being described in a high level programming language, the data structure is treated as a part other than the method of the class structure in an object-oriented language, specifically, as an array type member variable of the class structure, and constitutes a part of the program. In other words, the data structure is substantially equivalent to a program. Therefore, the data structure needs to be protected as a computer related invention.

<<Management of Playlist File and Clip Information. File by Playback Program>>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory device of a computer and is then executed by the computer. The loading process includes compile processing or link processing. By these processes, the playback program is divided into a plurality of sections in the memory device. The sections include a text section, a data section, a bss section, and a stack section. The text section includes a code array of the playback program, an initial value, and non-rewritable data. The data section includes variables with initial values and rewritable data.

In particular, the data section includes a file, recorded on the recording device, that can be accessed at any time. The bss section includes variables having no initial value. The data included in the bss section is referenced in accordance with commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording device into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback device for playing back video images from a recording medium having recorded thereon:
   a main-view stream used for monoscopic video playback; and
   a sub-view stream used for stereoscopic video playback in combination with the main-view stream, wherein
       the sub-view stream is encoded with reference to the main-view stream,
       the main-view stream is divided into a plurality of main-view data blocks,
       the sub-view stream is divided into a plurality of sub-view data blocks,
   the main-view data blocks and the sub-view data blocks are successively recorded in an interleaved arrangement, and constitute a plurality of extent blocks,
   each of the extent blocks is referred to during stereoscopic video playback as a single extent,
   a top data block in each of the extent blocks is a sub-view data block,
       the playback device comprises:
       a reading unit operable to read the extent blocks from the recording medium;
       a switching unit operable to extract the main-view stream and the sub-view stream from the extent blocks read by the reading unit;
       a first read buffer operable to store therein the main-view stream extracted by the switching unit;
       a second read buffer operable to store therein the sub-view stream extracted by the switching unit; and
       a decoding unit operable to read and decode the main-view stream from the first read buffer, and read and decode the sub-view stream from the second read buffer, and a time (t) required for the decoding unit to decode all data blocks in one extent block is greater than or equal to a sum $(t_1+t_2+t_3)$ of a time $(t_1)$ required for the reading unit to read the data blocks except for a top data block in the extent block, a time $(t_2)$ required for the reading unit to start to read a top of a next extent block from a time of finishing reading a tail of the extent block, and a time $(t_3)$ required for the reading unit to read the top data block in the next extent block.

2. The playback device of claim 1, wherein during stereoscopic video playback, underflow does not occur in the first read buffer and the second read buffer from the time when the reading unit finishes reading the tail of the extent block until a time when the reading unit reads the entirety of the top data block in the next extent block.

3. A recording medium playback system comprising a recording medium and a playback device for playing back the recording medium, the recording medium having recorded thereon:

a main-view stream used for monoscopic video playback; and a sub-view stream used for stereoscopic video playback in combination with the main-view stream, wherein the sub-view stream is encoded with reference to the main-view stream, the main-view stream is divided into a plurality of main-view data blocks, the sub-view stream is divided into a plurality of sub-view data blocks, the main-view data blocks and the sub-view data blocks are successively recorded in an interleaved arrangement, and constitute a plurality of extent blocks, each of the extent blocks is referred to during stereoscopic video playback as a single extent, a top data block in each of the extent blocks is a sub-view data block, a lower limit for a size of the $n^{th}$ extent block $S_{EXTSS}[n]$ (the number n being an integer greater than or equal to 1) is represented by a right-hand side of the following expression:

$$S_{EXTSS}[n] \geq \frac{R_{ud} \times R_{EXTSS}[n]}{R_{ud} - R_{EXTSS}[n]} \times (T_{jump}[n] + T_{DIFF}[n])$$

where the $n^{th}$ extent block is read at a rate $R_{ud}$ from the recording medium to a read buffer, the $n^{th}$ extent block is transferred at an average rate $E_{EXTSS}[n]$ from the read buffer to a decoder, a time $T_{jump}[n]$ is required for a jump from the $n^{th}$ extent block to the $(n+1)^{th}$ extent block, and a difference $T_{DIFF}[n]$ is a result of subtracting a time required to read all data blocks in the $n^{th}$ extent block from a time required to read all data blocks in the $(n+1)^{th}$ extent block, the playback device comprises:

a reading unit operable to read the extent blocks from the recording medium;

a switching unit operable to extract the main-view stream and the sub-view stream from the extent blocks read by the reading unit;

a first read buffer operable to store therein the main-view stream extracted by the switching unit;

a second read buffer operable to store therein the sub-view stream extracted by the switching unit; and a decoding unit operable to read and decode the main-view stream from the first read buffer, and read and decode the sub-view stream from the second read buffer, and a time (t) required for the decoding unit to decode all data blocks in one extent block is greater than or equal to a sum $(t_1+t_2+t_3)$ of a time $(t_1)$ required for the reading unit to read the data blocks except for a top data block in the extent block, a time $(t_2)$ required for the reading unit to start to read a top of a next extent block from a time of finishing reading a tail of the extent block, and a time $(t_3)$ required for the reading unit to read the top data block in the next extent block.

4. A playback device, comprising:

a reading unit operable to read information including an extent block from a recording medium, the extent block being a consecutive area which stores one or more data blocks belonging to a main-view stream and one or more data blocks belonging to a sub-view stream alternately, the main-view stream being used for monoscopic video playback, the sub-view stream being used for stereoscopic video playback in combination with the main-view stream, and a top data block in the extent block belonging to the sub-view stream;

a switching unit operable to extract data belonging to the main-view stream and data belonging to the sub-view stream from the read information;

a first read buffer operable to store the data belonging to the main-view stream extracted by the switching unit;

a second read buffer operable to store the data belonging to the sub-view stream extracted by the switching unit; and a decoding unit operable to decode the data belonging to the main-view stream from the first read buffer, and decode the data belonging to the sub-view stream from the second read buffer, wherein a size of the extent block is represented by the following expression:

$$S_{EXTSS} \geq \frac{R_{ud} \times R_{EXTSS}}{R_{ud} - R_{EXTSS}} \times \left(T_{jump} + \frac{S_{1stEXTSS}EXTSS_{next} - S_{1stEXTSS}EXTSS}{R_{ud}}\right)$$

where $S_{EXTSS}$ is the size of the extent block, Rud is a data rate from the reading unit to a read buffer including the first read buffer and the second read buffer, $R_{EXTSS}$ is an average bit rate of the extent block, $T_{jump}$ is a jump time from the extent block to a next extent block, $S_{1stEXTSS}EXTSS$ is a size of the top data block in the extent block, and $S_{1stEXTSS}EXTSS_{next}$ is a size of a top data block in the next extent block.

5. A playback system including a playback device and a recording medium, wherein the recording medium comprises:

an extent block being a consecutive area which stores one or more data blocks belonging to a main-view stream and one or more data blocks belonging to a sub-view stream alternately, the main-view stream being used for monoscopic video playback, the sub-view stream being used for stereoscopic video playback in combination with the main-view stream, and a top data block in the extent block belonging to the sub-view stream;

wherein the playback device comprises:

a reading unit operable to read information including the extent block from the recording medium;

a switching unit operable to extract data belonging to the main-view stream and data belonging to the sub-view stream from the read information;

a first read buffer operable to store the data belonging to the main-view stream extracted by the switching unit;

a second read buffer operable to store the data belonging to the sub-view stream extracted by the switching unit; and a decoding unit operable to decode the data belonging to the main-view stream from the first read buffer, and decode the data belonging to the sub-view stream from the second read buffer, and wherein a size of the extent block is represented by the following expression:

$$S_{EXTSS} \geq \frac{R_{ud} \times R_{EXTSS}}{R_{ud} - R_{EXTSS}} \times \left(T_{jump} + \frac{S_{1stEXTSS}EXTSS_{next} - S_{1stEXTSS}EXTSS}{R_{ud}}\right)$$

where $S_{EXTSS}$ is the size of the extent block, Rud is a data rate from the reading unit to a read buffer including the first read buffer and the second read buffer, $R_{EXTSS}$ is an average bit rate of the extent block, $T_{jump}$ is a jump time from the extent block to a next extent block, $S_{1stEXTSS}EXTSS$ is a size of the top data block in the extent block, and $S_{1stEXTSS}EXTSS_{next}$ is a size of a top data block in the next extent block.

* * * * *